US 11,976,715 B2

(12) United States Patent
Kawada et al.

(10) Patent No.: US 11,976,715 B2
(45) Date of Patent: May 7, 2024

(54) GEAR HOUSING FOR A PLANETARY GEAR DEVICE THAT STRUCTURALLY ISOLATES AN INNER GEAR

(71) Applicant: ENPLAS CORPORATION, Kawaguchi (JP)

(72) Inventors: Toshiki Kawada, Kawaguchi (JP); Shohei Ishida, Kawaguchi (JP); Takuya Kaneko, Kawaguchi (JP)

(73) Assignee: ENPLAS CORPORATION, Kawaguchi (JP)

( * ) Notice: Subject to any disclaimer, the term of this patent is extended or adjusted under 35 U.S.C. 154(b) by 0 days.

(21) Appl. No.: 17/653,482

(22) Filed: Mar. 4, 2022

(65) Prior Publication Data

US 2022/0186825 A1    Jun. 16, 2022

Related U.S. Application Data

(63) Continuation of application No. 17/060,969, filed on Oct. 1, 2020, now Pat. No. 11,300,195, which is a
(Continued)

(30) Foreign Application Priority Data

Aug. 2, 2019    (JP) ................................ 2019-143338
Nov. 29, 2019  (JP) ................................ 2019-217590
(Continued)

(51) Int. Cl.
 *F16H 57/028*    (2012.01)
 *F16H 1/46*      (2006.01)
(Continued)

(52) U.S. Cl.
 CPC ............. *F16H 57/028* (2013.01); *F16H 1/46* (2013.01); *F16H 55/14* (2013.01);
(Continued)

(58) Field of Classification Search
 CPC .... F16H 57/08; F16H 57/028; F16H 57/0006; F16H 55/14; F16H 2055/176; F16H 1/46
(Continued)

(56) References Cited

U.S. PATENT DOCUMENTS

| 4,055,080 A | 10/1977 | Farr et al. |
| 4,838,123 A | 6/1989  | Matoba |

(Continued)

FOREIGN PATENT DOCUMENTS

| JP | S62-228737 A | 10/1987 |
| JP | H04-039446 A | 2/1992 |

(Continued)

OTHER PUBLICATIONS

International Search Report and the Written Opinion of the International Searching Authority in PCT/JP2020/029528, dated Oct. 20, 2020, 9 pages.

(Continued)

*Primary Examiner* — Roger L Pang
(74) *Attorney, Agent, or Firm* — Sterne, Kessler, Goldstein & Fox P.L.L.C.

(57) ABSTRACT

Separate structural units for an inner gear and a housing of a planetary gear device include an inner gear with a first raised portion formed on the outer peripheral surface of the inner gear, where the first raised portion extends towards in a direction that is inclined with respect to the axial direction of the inner gear. A housing includes a second raised portion formed on an inner peripheral surface, where the second raised portion extends in a direction that is inclined in respect to the axial direction. The housing contains the inner gear such that there is a gap formed between the inner peripheral surface of the housing and the outer peripheral surface of the inner gear. Movement of the inner gear within
(Continued)

the interior of the housing is limited through linear contact of the first raised portion and the second raised portion.

3 Claims, 86 Drawing Sheets

Related U.S. Application Data continuation of application No. 16/945,779, filed on Jul. 31, 2020, now Pat. No. 11,156,286.

(30) Foreign Application Priority Data

Nov. 29, 2019 (JP) ................................. 2019-217592
Dec. 27, 2019 (JP) ................................. 2019-239511
Jan. 10, 2020 (JP) ................................. 2020-003150

(51) Int. Cl.
  *F16H 55/14*   (2006.01)
  *F16H 57/00*   (2012.01)
  *F16H 57/08*   (2006.01)
  *F16H 55/17*   (2006.01)

(52) U.S. Cl.
  CPC ......... *F16H 57/0006* (2013.01); *F16H 57/08* (2013.01); *F16H 2055/176* (2013.01)

(58) Field of Classification Search
  USPC ................................. 475/331, 346
  See application file for complete search history.

(56) References Cited

U.S. PATENT DOCUMENTS

| 5,660,494 | A | 8/1997 | Schwarzler et al. |
| 6,966,391 | B2 | 11/2005 | Tang |
| 8,864,621 | B2 * | 10/2014 | Phebus ............... F16H 1/46 |
| | | | 475/346 |
| 2010/0292043 | A1 | 11/2010 | Tao et al. |
| 2011/0111917 | A1 | 5/2011 | Heitzenrater et al. |
| 2019/0063555 | A1 | 2/2019 | Ohishi et al. |

FOREIGN PATENT DOCUMENTS

| JP | H06-74835 B2 | 9/1994 |
| JP | H08-303532 A | 11/1996 |
| JP | 2013-130255 A | 7/2013 |
| WO | WO 1997041369 A1 | 11/1997 |

OTHER PUBLICATIONS

International Search Report and the Written Opinion of the International Searching Authority in PCT/JP2020/029530, dated Oct. 13, 2020, 9 pages.
International Search Report and the Written Opinion of the International Searching Authority in PCT/JP2020/029542, dated Oct. 6, 2020, 9 pages.
International Search Report and the Written Opinion of the International Searching Authority in PCT/JP2020/029551, dated Oct. 6, 2020, 9 pages.

* cited by examiner

GEAR HOUSING FOR A PLANETARY GEAR DEVICE THAT STRUCTURALLY ISOLATES AN INNER GEAR

TECHNICAL FIELD

The present disclosure relates to separate structural units for an inner gear and a housing, a planetary gear device comprising said separate structural units, and an actuator comprising said planetary gear device.

BACKGROUND

Planetary gear devices are used in a variety of technologies, such as automobiles, robots, and the like. Because planetary gear devices are structured through a combination of a plurality of gears, noise and vibration is produced during operation. Technologies have been proposed to suppress the production of noise and vibration when the planetary gear device is operating.

As one of such technologies that has been proposed, Patent Document 1 discloses a planetary gear device with a structure that separates the inner gear and the housing, with a gap between the two. Using a structure wherein the inner gear and the housing are separate makes transmission of vibrations from the inner gear to the housing more difficult, reducing the noise that is produced from the vibrations. See Patent Document 1: Japanese Published Examined Patent Application H06-074835 B2.

SUMMARY

In the planetary gear device of Patent Document 1, the outer peripheral surface of the inner gear and the inner peripheral surface of the housing are formed with shapes that fit together. Because of this, when the inner gear moves during operation of the planetary gear device, there is contact between the outer peripheral surface of the inner gear and the inner peripheral surface of the housing, in a range that has some degree of width. Through this, in the state wherein there is contact between the inner gear and the housing, the vibration of the planetary gear mechanism that propagates to the inner gear is readily transmitted to the housing, so there is a problem in that there is a tendency for the planetary gear device to also produce noise.

The present disclosure is to solve problem areas such as described above, and the object is to provide separate structural units for the inner gear and the housing, able to suppress transmission of the vibrations from the planetary gear mechanism and noise that is produced by the planetary gear device, and to provide a planetary gear device equipped with the separate structural units, and an actuator equipped with the planetary gear device.

Solution to Problem

Separate structural units for an inner gear and a housing according to the present disclosure comprise: an inner gear having a first raised portion, extending in the axial direction from one side to the other side, is formed on the outer peripheral surface; and a housing wherein a second raised portion extending in the axial direction from one side to the other side is formed on the inner peripheral surface, and that contains the inner gear in a state wherein there is a gap from the inner peripheral surface, wherein: the movement of the inner gear within the interior of the housing is limited through linear contact between the first raised portion and the second raised portion.

In another aspect of the present disclosure, separate structural units for an inner gear and a housing comprise: an inner gear with a plurality of first raised portions and a contacting portion that is located between adjacent first raised portions, formed on the outer peripheral surface thereof; and a housing wherein a second raised portion is formed on the inner peripheral surface thereof, for containing the inner gear in a state wherein a gap is provided from the inner peripheral surface, wherein: movement of the inner gear within the housing is limited through contact of the first raised portion and the second raised portion, and movement within the housing is limited through contact of the contacting portion and the inner peripheral surface of the housing; and an opening that is provided in the axial direction is formed on the inside of the contacting portion of the inner gear.

In another aspect of the present disclosure, separate structural units for an inner gear and a housing comprise: an inner gear wherein a plurality of first raised portions that extend in a prescribed direction is formed on the outer peripheral surface; and a housing wherein a plurality of second raised portions, which extend in the prescribed direction, is formed on the inner peripheral surface thereof, for containing the inner gear in a state wherein a gap is provided from the inner peripheral surface, wherein: the movement of the inner gear within the housing is limited through linear contact of the first raised portion with the corresponding second raised portion; and the plurality of first raised portions and the plurality of second raised portions are disposed with each equally spaced.

In another aspect of the present disclosure, separate structural units for an inner gear and a housing comprise: an inner gear wherein a plurality of first raised portions that extend in a prescribed direction is formed on the outer peripheral surface; and a housing wherein a plurality of second raised portions, which extend in the prescribed direction, is formed on the inner peripheral surface thereof, for containing the inner gear in a state wherein a gap is provided from the inner peripheral surface, wherein: the movement of the inner gear within the housing is limited through linear contact of the first raised portion with the corresponding second raised portion; and the plurality of first raised portions and the plurality of second raised portions are disposed with each adjacent raised portion unequally spaced. In another aspect of the present disclosure, the separate structural units for an inner gear and a housing, according to the present disclosure, comprise: an inner gear that has an inner peripheral surface whereon is formed inner tooth portions, an outer peripheral surface whereon is formed a raised portion at at least a part thereof in the direction from one side to the other side in the axial direction, and an opening end face that extends between the inner peripheral surface and the outer peripheral surface on the end portion that is on the aforementioned other side; and a cylindrical housing for containing the inner gear, wherein the movement of the inner gear in the circumferential direction within the housing is limited by contact with the raised portion of the inner gear, wherein: the housing has a contact surface portion that is provided facing the opening end face on the other side of the inner gear; and the opening end face on the other side has a contacting portion that protrudes toward the contact surface portion side, where the contacting portion limits the movement of the inner gear toward the contact surface portion side through contact with the contact surface portion in the axial direction.

Of the first raised portion and the second raised portion, one raised portion may be formed in a pair with a space therebetween, and the other raised portion may be disposed so as to be inserted between the one raised portion that is formed in a pair; and of the location of contact of the one raised portion and the location of contact of the other raised portion, which linearly contact each other, at least one may be a curved surface.

The one raised portion may be the second raised portion and the other raised portion may be the first raised portion; and the first raised portion may have a cross-section that is triangular when sectioned by a plane that is perpendicular to the axial direction, and may linearly contact the second raised portion at an inclined surface that is formed in a plane.

The one raised portion may be the first raised portion and the other raised portion may be the second raised portion; and the second raised portion may have a cross-section that is triangular when sectioned by a plane that is perpendicular to the axial direction, and may contact the first raised portion at an inclined surface that is formed in a plane.

Of the location of contact of the first raised portion and the location of contact of the second raised portion, which linearly contact each other, one may be a convex curved surface and the other may be a plane.

The location of contact of the first raised portion and the location of contact of the second raised portion, which linearly contact each other, may be convex curved surfaces.

Of the location of contact of the first raised portion and the location of contact of the second raised portion, which linearly contact each other, one may be a convex curved surface and the other may be a concave curved surface.

The first raised portion and the second raised portion may make linear contact along the axial direction, where the range of linear contact of the first raised portion and the second raised portion may be shorter than the axial direction width of the inner gear.

The length with which the first raised portion extends on the inner gear may be shorter than the axial direction width of the inner gear.

The first raised portion may extend from only one end of the inner gear.

The first raised portion may extend from both ends of the inner gear, and the lengths of the first raised portions that extend from both ends may be shorter than the axial direction width of the inner gear.

The first raised portion may be structured from an outer tooth that is cut along the axial direction or an outer tooth that is cut along a direction that is inclined in respect to the axial direction, on the outer peripheral surface of the inner gear; and the second raised portion may be structured from an inner tooth that is cut along the axial direction or an inner tooth that is cut along a direction that is inclined in respect to the axial direction, on the inner peripheral surface of the housing.

A plurality of first raised portions may be provided on the inner gear along the axial direction, at intervals from each other.

One corresponding second raised portion may be provided for each of the plurality of first raised portions, where of the plurality of second raised portions, a portion may contact the corresponding first raised portion when the inner gear is rotated in a first direction, and the remaining portion may contact the corresponding first raised portion when the inner gear is rotated in a second direction.

The movement of the inner gear within the interior of the housing may be limited through linear contact between the first raised portion and the second raised portion in a direction that is perpendicular to the axial direction.

Of the first raised portions and the second raised portions, one may have a cross-section that is a triangle, when sectioned by a plane that is perpendicular to the axial direction, where the cross-sectional size of the triangle may vary depending on the position in the axial direction, and contact with the other is at a position that has the maximal cross-sectional size.

Separate structural units for an inner gear and a housing according to another aspect of the present disclosure comprise: an inner gear having a first raised portion formed on the outer peripheral surface; a housing wherein a second raised portion is formed on the inner peripheral surface thereof, for containing the inner gear in a state wherein a gap is provided from the inner peripheral surface, wherein: the movement of the inner gear within the interior of the housing is limited through point contact between the first raised portion and the second raised portion.

The first raised portion may be formed on the outer peripheral surface of the inner gear so as to extend from one side to the other side in the axial direction, and the second raised portion may be formed on the inner peripheral surface of the housing so as to extend from one side to the other side in the axial direction.

A protrusion may be formed on the first raised portion or the second raised portion at the location of contact between the first raised portion and the second raised portion, and the first raised portion and the second raised portion may make point contact through the protrusion.

A plurality of the protrusions may be formed along the axial direction.

The first raised portion may have a cross-section that is triangular when sectioned by a plane that is perpendicular to the axial direction, and the protrusion may be formed on an inclined surface that forms a plane.

The inner gear and the housing may be made from a synthetic resin; and the inner gear may be formed from a synthetic resin of a hardness that is less than that of the synthetic resin for forming the housing.

A planetary gear device according to the present disclosure comprises: separate structural units for an inner gear and a housing as set forth above; one or more planetary gears that mesh with the inner gear; a sun gear that meshes with the one or more planetary gears, positioned at the center of the one or more planetary gears; and a carrier that supports the one or more planetary gears rotatably.

The structure may further comprise a second sun gear that rotates similarly to the rotation of the carrier accompanying rotation of the carrier; one or more second planetary gears that are disposed on the periphery of the second sun gear, and that mesh with the second sun gear; a second carrier that supports one or more second planetary gears rotatably; and a second housing whereon is formed, on the inner peripheral surface thereof, inner teeth that mesh with the one or more second planetary gears, wherein: the housing and the second housing may be formed integrally.

In another aspect of the present disclosure, a planetary gear device comprises at least two stages of planetary gear mechanisms that each comprises: a sun gear; one or more planetary gears, arranged on the periphery of the sun gear, for meshing with the sun gear; and a carrier that supports the one or more planetary gears rotatably, wherein: of the at least two stages of planetary gear mechanisms, the planetary gear mechanism that operates at the highest speed comprises separate structural units for an inner gear and a housing as set forth above, where the one or more planetary gears of the planetary gear mechanism and the inner gear mesh; and of the at least two stages of the planetary gear mechanism, the planetary gear mechanism that operates at the lowest speed comprises a housing wherein inner teeth that mesh with the one or more planetary gears of the planetary gear mechanism are formed on the inner peripheral surface.

An actuator according the present disclosure comprises: a planetary gear device as set forth above; and a motor, connected to the planetary gear device, for driving the planetary gear device.

Advantageous Effects

In the present disclosure, the range of contact between the inner gear and the housing is narrower than in the prior art, thus reducing the transmission, to the housing, of vibrations caused by the planetary gear mechanism. This can suppress the transmission of vibrations from the planetary gear mechanism, and can suppress the noise that is produced from the planetary gear device accompanying vibration of the planetary gear mechanism.

BRIEF DESCRIPTIONS OF DRAWINGS

FIG. 54A is a rear view of an inner gear as the first modified example and FIG. 54B is a right side view of said gear.

FIG. 56A is a rear view of an inner gear as the second modified example and FIG. 56B is a right side view of said gear.

FIG. 57A is a rear view of an inner gear as the third modified example and FIG. 57B is a right side view of said gear.

FIG. 58A is a rear view of an inner gear as the fourth modified example and FIG. 58B is a right side view of said gear.

FIG. 59A is a rear view of an inner gear as the fifth modified example and FIG. 59B is a right side view of said gear.

FIG. 60A is a rear view of an inner gear as the sixth modified example and FIG. 60B is a right side view of said gear.

FIG. 61A is a rear view of an inner gear as the seventh modified example and FIG. 61B is a right side view of said gear.

FIG. 62A is a rear view of an inner gear as the eighth modified example and FIG. 62B is a right side view of said gear.

FIG. 63A is a rear view of an inner gear as the ninth modified example and FIG. 63B is a right side view of said gear.

FIG. 64A is a rear view of an inner gear as the $10^{th}$ modified example and FIG. 64B is a right side view of said gear.

FIG. 65A is a rear view of an inner gear as the $11^{th}$ modified example and FIG. 65B is a right side view of said gear.

FIG. 66A is a rear view of an inner gear as the $12^{th}$ modified example and FIG. 66B is a right side view of said gear.

FIG. 68A is a diagram when viewed from the arrow XVII in FIG. 67, and FIG. 68B is a cross-sectional diagram sectioned with the section B-B in FIG. 68A.

FIG. 70A is a diagram when viewed from the arrow XIX in FIG. 69, and FIG. 70B is a cross-sectional diagram sectioned with the section B-B in FIG. 70A.

FIG. 74A is a diagram when viewed from the −X direction side, and FIG. 74B is a cross-sectional diagram sectioned with the section B-B in FIG. 74A.

FIG. 75A is a diagram when viewed from the +X direction side, and FIG. 75B is a cross-sectional diagram sectioned with the section B-B in FIG. 75A.

FIG. 85A is a diagram when viewed from the −X direction side, and FIG. 85B is a cross-sectional diagram sectioned with the section B-B in FIG. 85A.

FIG. 86A is a diagram when viewed from the +X direction side, and FIG. 86B is a cross-sectional diagram sectioned with the section B-B in FIG. 86A.

DETAILED DESCRIPTION

Separate structural units for an inner gear and a housing, a planetary gear device, and an actuator according to an ideal embodiment according to the present disclosure will be explained below in reference to the drawings. Note that for ease in understanding the drawings, in each of the drawings an orthogonal coordinate system is depicted with an X axis that is parallel to the axial direction of the actuator 1 according to the embodiment according to the present disclosure, and a Y axis and a Z axis that are perpendicular to the X axis.

EXAMPLE 1

(Structure of the Actuator 1)

Figure 1:
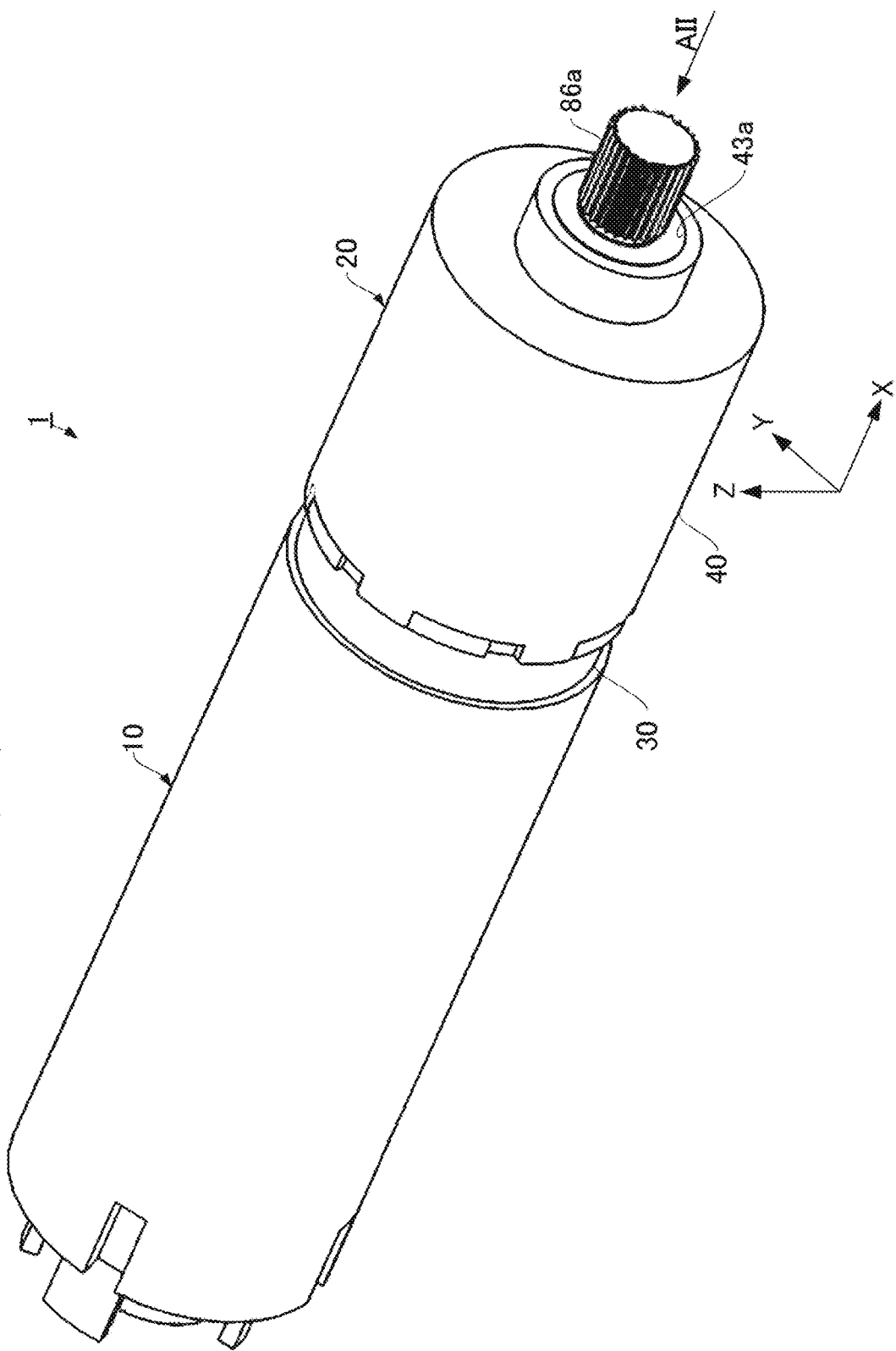
FIG. 1 is a perspective diagram of an actuator according to a first embodiment according to the present disclosure.
Figure 2:
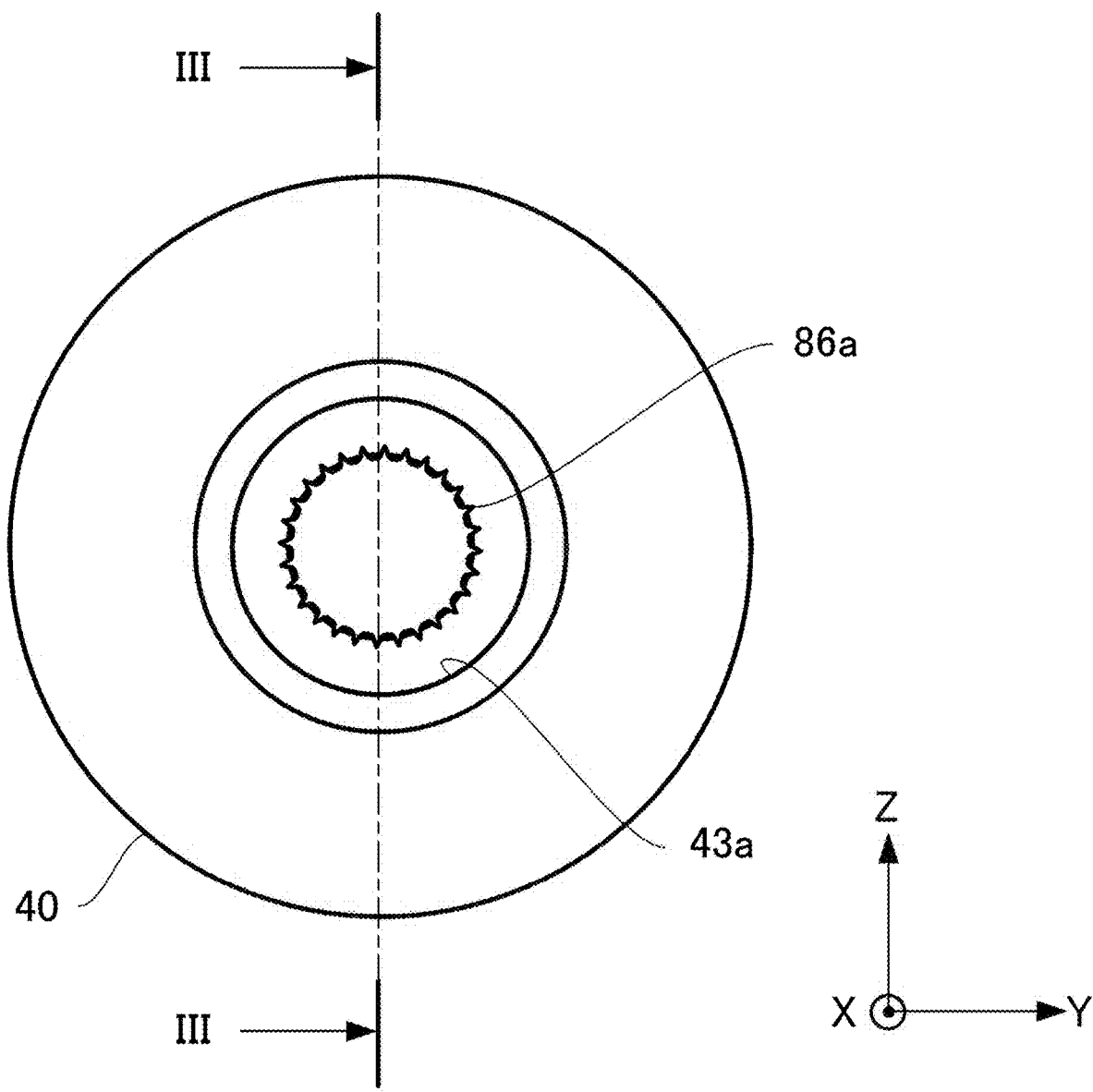
FIG. 2 is a front view of an actuator viewed from the arrow AII in FIG. 1.

As illustrated in FIG. 1 and FIG. 2, the actuator 1 comprises, for example, a motor 10, and a planetary gear device 20 that is connected to the motor 10.

Figure 3:
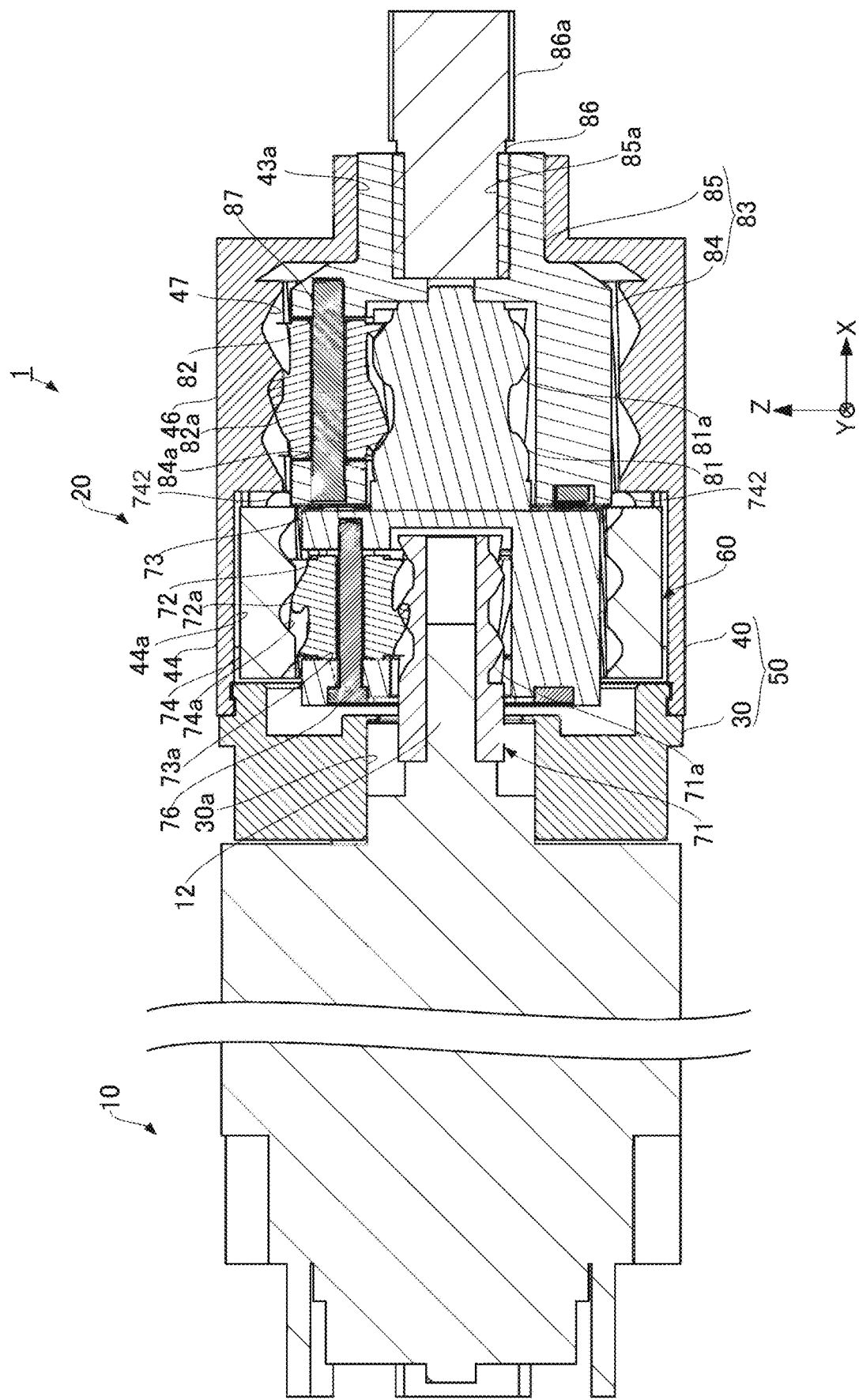
FIG. 3 is a cross-sectional diagram of an actuator, sectioned on the section line III-III in FIG. 2.
Figure 4:
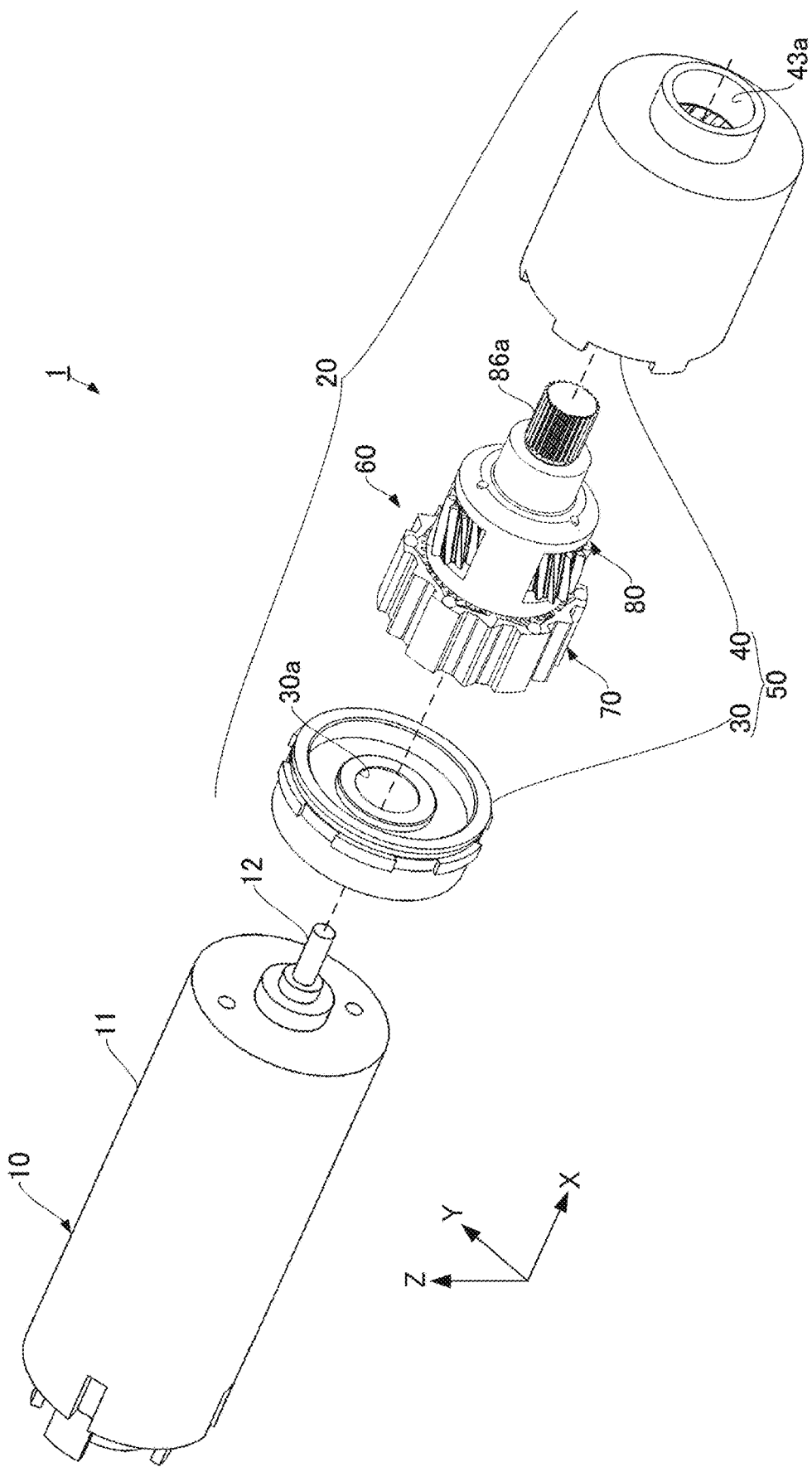
FIG. 4 is an assembly perspective diagram of an actuator according to a first embodiment according to the present disclosure.

The motor 10 has, for example, a motor main unit 11 and a rotary shaft 12, as illustrated in FIG. 3 and FIG. 4. The motor 10 rotates the rotary shaft 12, under the control of a controlling portion, not shown, to drive the planetary gear device 20.

The planetary gear device 20 reduces, by a prescribed reduction ratio, the rotation that is inputted from the motor 10, directed in FIG. 1, and outputs it to an output gear 86a. The planetary gear device 20 comprises, for example, a housing 50, which has a first housing 30 and a second housing 40, and a planetary gear mechanism 60 that is contained within the housing 50, as depicted in FIG. 3 and FIG. 4.

The first housing 30 is a member for, for example, attaching the motor 10 to the planetary gear device 20. Moreover, the first housing 30 is assembled together with the second housing 40 to form a containing space S, depicted in FIG. 5, for containing the planetary gear mechanism 60. The first housing 30 covers the opening portion on the −X direction side of the containing space S, preventing the planetary gear mechanism 60 from coming out from the containing space S. As illustrated in FIG. 4, an opening 30a is formed in the center of the first housing 30, and the rotary shaft 12 of the motor 10 passes therethrough. The rotary shaft 12 that passes through the opening 30a is secured (connected) to a sun gear 71, described below, of the planetary gear mechanism 60. The first housing 30 is formed through injection molding, made from, for example, a synthetic resin.

Figure 5:
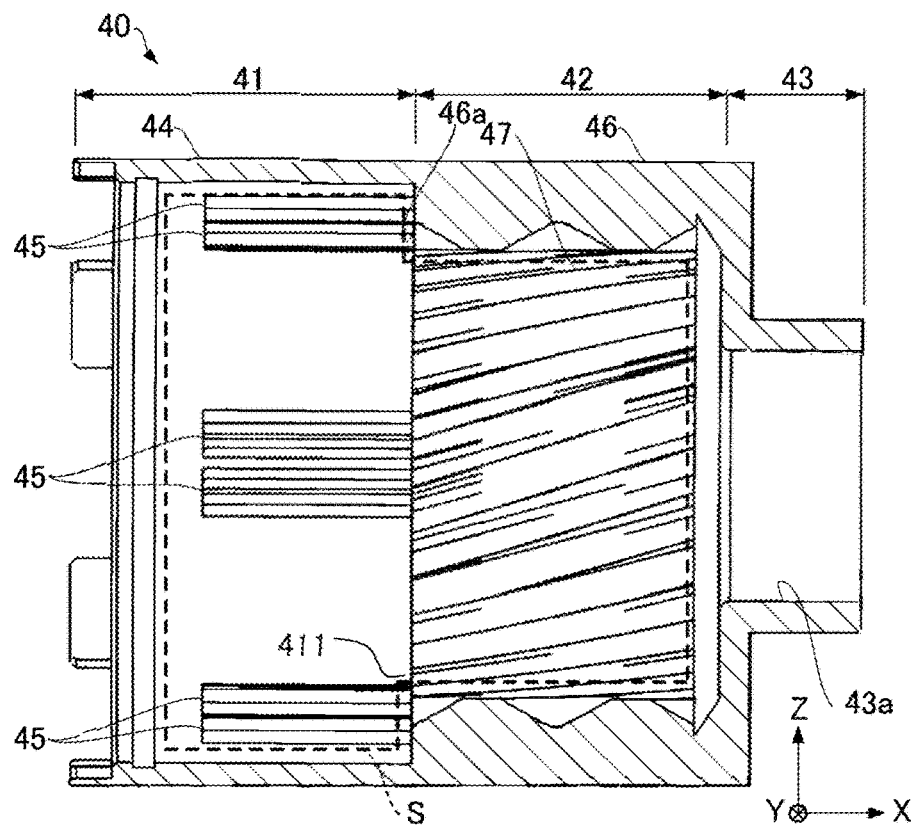
FIG. 5 is a cross-sectional diagram of a second housing according to a first embodiment according to the present disclosure.
Figure 6:
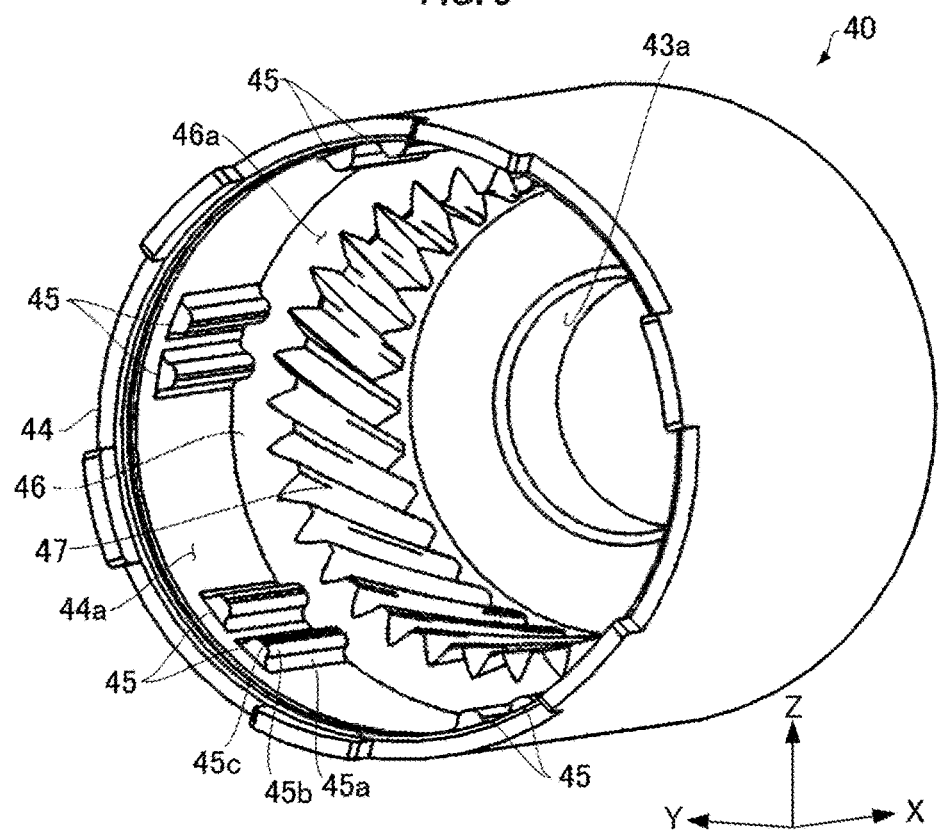
FIG. 6 is a perspective diagram of a second housing according to a first embodiment according to the present disclosure.

The second housing 40 is open on the side (the "one side") that is connected to the first housing 30, as illustrated in FIG. 5 and FIG. 6, for example, and the planetary gear mechanism 60, depicted in FIG. 4, can be contained therein from this open part. The planetary gear mechanism 60, as depicted in FIG. 4, for example, has a first planetary gear mechanism 70, a second planetary gear mechanism 80, and an output gear 86a, arranged along the axial direction. The planetary gear mechanism 60 reduces, in two stages, the (inputted) rotation produced by the motor 10, and outputs it from the output gear 86a. The second housing 40, as illustrated in FIG. 5, for example, has a first position 41 wherein the first planetary gear mechanism 70 is contained, a second position 42 wherein the second planetary gear mechanism 80 is contained, and a third position 43 wherein the output gear 86a of the second planetary gear mechanism 80 protrudes to the outside.

Figure 9:
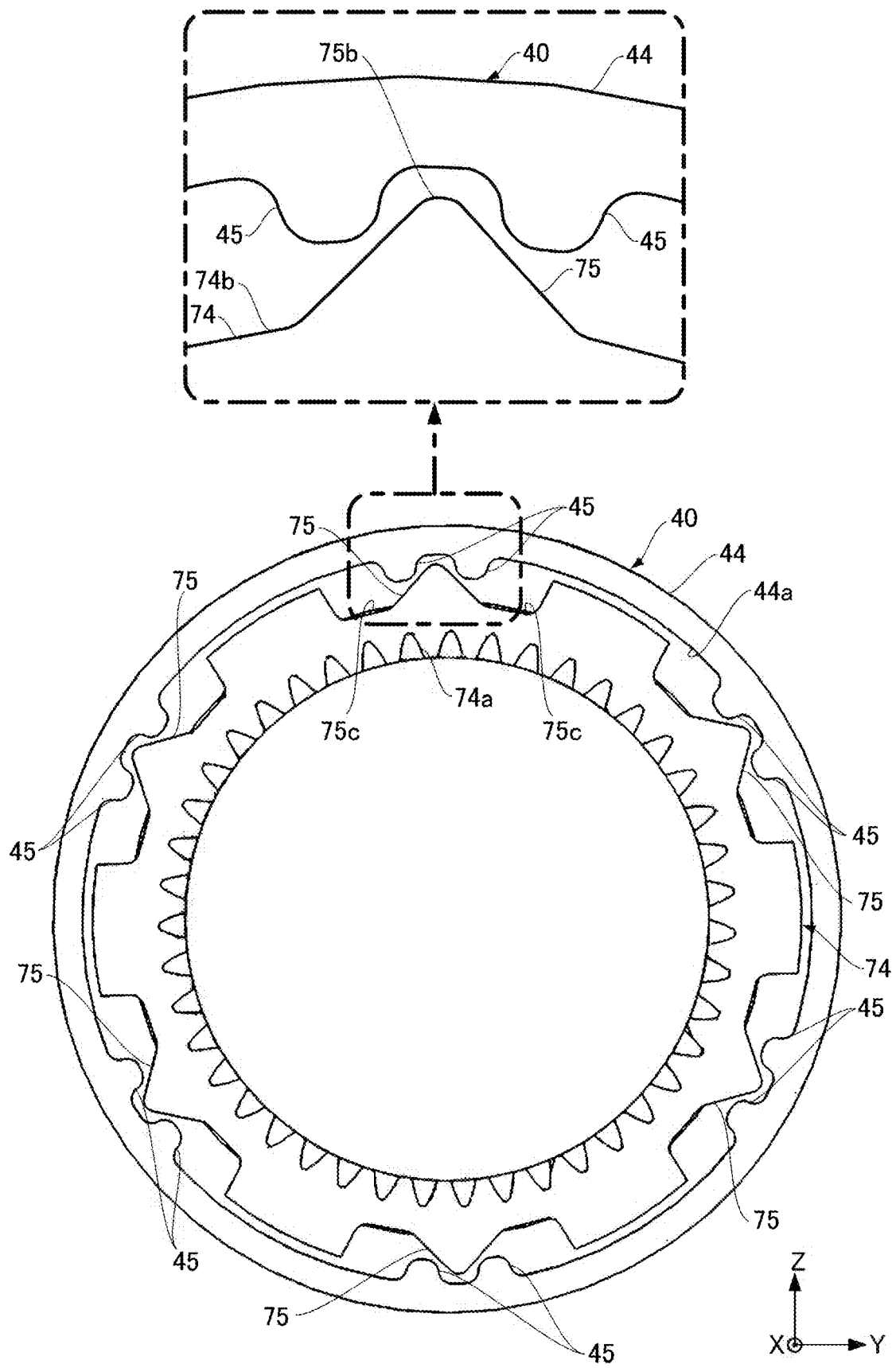
FIG. 9 is a diagram for explaining the relationship between the second housing and the internal gear according to a first embodiment according to the present disclosure.
Figure 10:
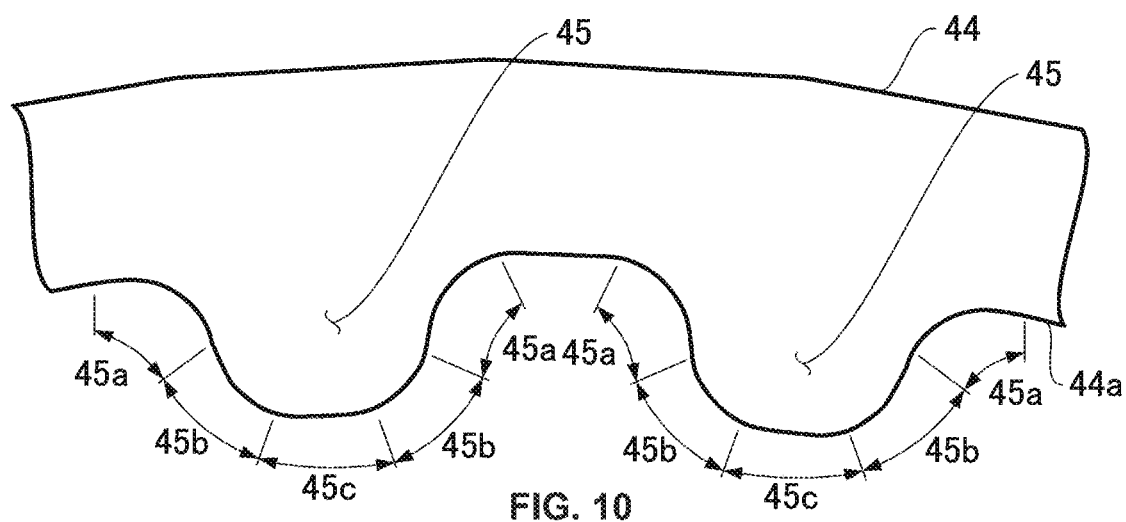
FIG. 10 is an explanatory diagram focusing on a stopper that is formed in the second housing depicted in FIG. 9.

The first position 41 of the second housing 40, as depicted in FIG. 5 and FIG. 6, for example, has a round cylinder 44 and a stopper (second raised portion) 45 that extends along the axial direction (from one side in the axial direction toward the other side). The stopper 45 has a cross-section of a chevron shape when sectioned with a cross-section that is perpendicular to the axial direction, where the shape and size thereof are constant in the axial direction. The stopper 45 is formed in the range of a portion of the first position 41, in the axial direction, but may instead be formed across the entire range thereof. The stopper 45, as illustrated in FIG. 9, for example, is disposed so as to form a pair, in the circumferential direction of the inner wall 44a of the round cylinder 44. Pairs of stoppers 45 are provided in six locations, with equal spacing, on the inner wall 44a of the round cylinder 44, for example. The cross-sectional shape of each stopper 45, as illustrated in FIG. 10, for example, has a standing portion 45a that forms an arc that gradually rises from the inner wall 44a of the round cylinder 44, a rounded apex 45c, and a connecting portion 45b, for connecting the standing portion 45a and the apex 45c while bulging. Note that the shape and size of the cross-section of the stopper 45 are constant in the axial direction. Because of this, as can be appreciated from FIG. 6, for example, the standing portion 45a, the connecting portion 45b, and the apex 45c are curved surfaces that have no curve in the direction that is parallel to the axis. A movement limiting raised portion 75 of the inner gear 74, depicted in FIG. 9 and described below, is inserted between the pair of stoppers 45, to limit the movement of the inner gear 74 within the second housing 40.

The second position 42 of the second housing 40, as illustrated in FIG. 5 and FIG. 6, for example, has a round cylinder 46 and an inner tooth portion 47 that is formed on the inner wall of the round cylinder 46. The inner tooth portion 47 is at an incline, with an angle in respect to the axial direction, for example. That is, the second position 42 where the inner tooth portion 47 exists is structured as, for example, a helical gear.

The third position 43 of the second housing 40 forms, for example, a cylinder, and has an opening 43a through which passes the output gear 86a of the planetary gear mechanism 60, depicted in FIG. 4. The torque outputted from the output gear 86a can be transmitted to an external mechanism thereby. The second housing 40 is formed through injection molding, made from, for example, a synthetic resin.

Additionally, for convenience in the present specification, in FIG. 4 through FIG. 6 the side of the second housing 40 that is open so as to attach to the first housing 30 is termed the "one side" (the −X direction side), and the side of the second housing 40 that has the opening 43a of the third position 43, which is the opposite side, is termed the "other side" (the +X direction side). However, the present disclosure is not limited thereto, and the side of the second housing 40 that has the opening 43a of the third position 43 may be read and interpreted as the one side, and the side of the second housing 40 that is open for attaching the first housing 30 may be read and interpreted as the other side.

The planetary gear mechanism 60, as illustrated in FIG. 4, for example, is contained within the housing 50, and reduces the rotation transmitted from the motor 10 and outputs it from the output gear 86a. The planetary gear mechanism 60 has, for example, a first planetary gear mechanism 70 and a second planetary gear mechanism 80, disposed along the axial direction.

Figure 7:
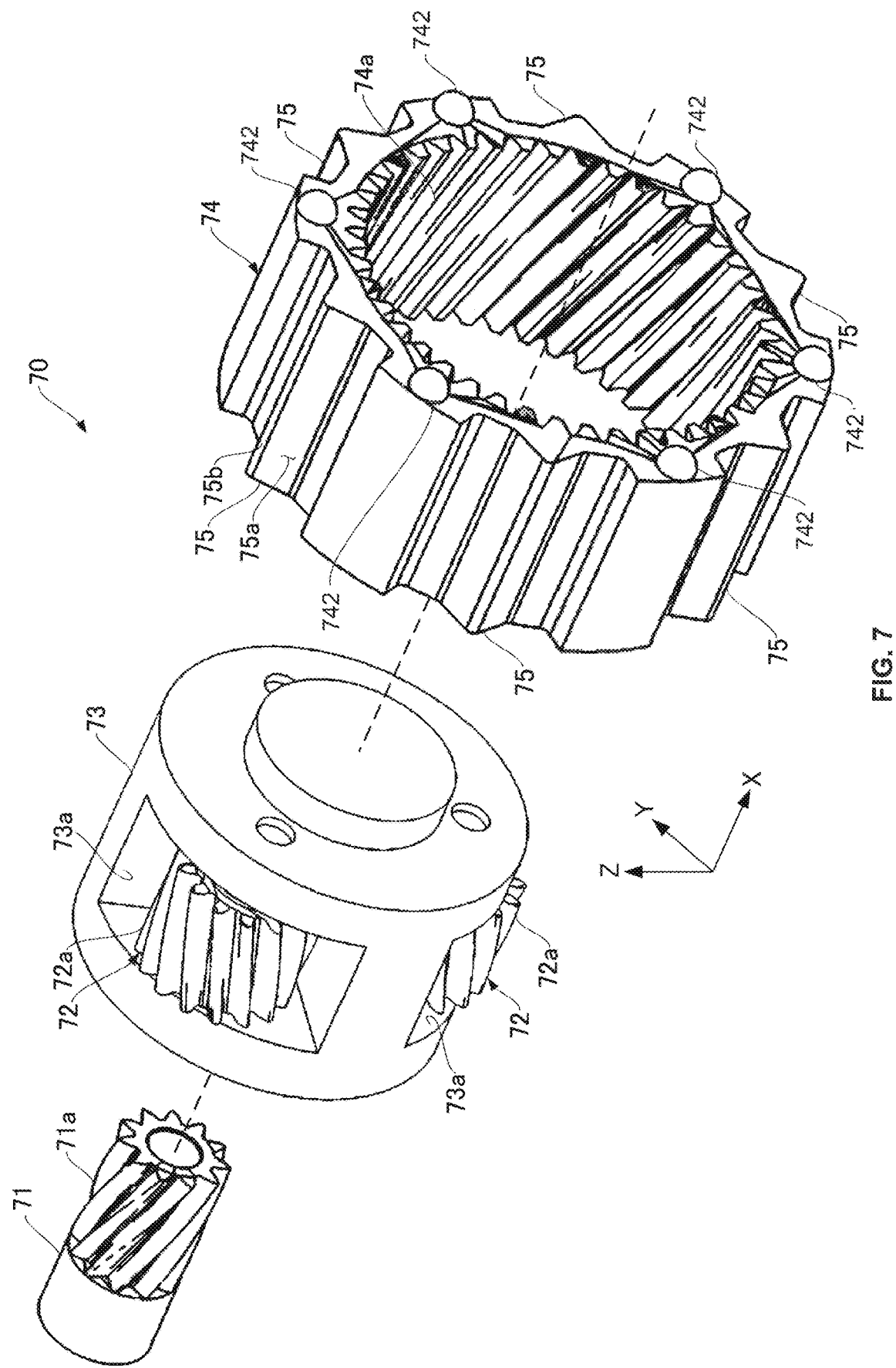
FIG. 7 is a perspective diagram of a first planetary gear mechanism according to a first embodiment according to the present disclosure.

The first planetary gear mechanism 70, as illustrated in FIG. 7, for example, comprises: a sun gear 71; three (a plurality of) planetary gears 72 that are disposed around the periphery centered on the sun gear 71; a carrier 73 for supporting rotatably the three (plurality of) planetary gears 72; and an inner gear 74. Note that while, for convenience in the perspective diagram in FIG. 7, only two planetary gears 72 are illustrated, another planetary gear 72 is provided at a position that is on the back side, hidden by the carrier 73.

The sun gear 71 is an outer gear having sun tooth portions 71a formed on the outer peripheral surface thereof, and a rotary shaft 12 of the motor 10, depicted in FIG. 4, is secured (connected) thereto. Through this, the sun gear 71 is rotated by the operation of the motor 10. The sun tooth portions 71a have, for example, helical teeth that are cut at an angle in respect to the axis of the sun gear 71. That is, the sun gear 71 is, for example, a helical gear.

The planetary gear 72 is, for example, an outer gear wherein planetary tooth portions 72a are formed on the outer peripheral surface thereof. The planetary tooth portions 72a have, for example, helical teeth that are cut at an angle in respect to the axis of the planetary gear 72. That is, the planetary gear 72 is, for example, a helical gear. Three planetary gears 72 are disposed at equal spacing on the same circle centered on the axis of the first planetary gear mechanism 70. The sun gear 71 is positioned between the three planetary gears 72, where the sun tooth portions 71a mesh with the respective planetary tooth portions 72a of the three planetary gears 72.

The carrier 73 is formed in, for example, a cylindrical shape, where three containing openings 73a, for containing the planetary gears 72, are formed in the outer peripheral surface thereof. Each of the individual planetary gears 72 is supported rotatably, by a pin 76 that faces in the axial direction, within the respective containing opening 73a, as illustrated in FIG. 3. The planetary gears 72 are attached in a state wherein, for example, a portion of the planetary tooth portion 72a protrudes from the outer peripheral surface of the carrier 73. Through this, the planetary tooth portion 72a can mesh with the inner tooth portion 74a of the inner gear 74, described below.

Inner tooth portions 74a are formed on the inner peripheral surface of the inner gear 74, as illustrated in, for example, FIG. 3 and FIG. 7. The inner tooth portion 74a is, for example, a helical gear having helical teeth that are cut at an angle in respect to the axis of the inner gear 74. The tooth tip rounding diameter for the inner gear 74 is greater than the diameter of the cylindrical carrier 73. Because of this, the carrier 73 that holds the planetary gear 72 is contained in the interior of the inner gear 74. The planetary tooth portions 72a that protrude from the outer peripheral surface of the carrier 73 are meshed with the inner tooth portions 74a of the inner gear 74.

Figure 11:
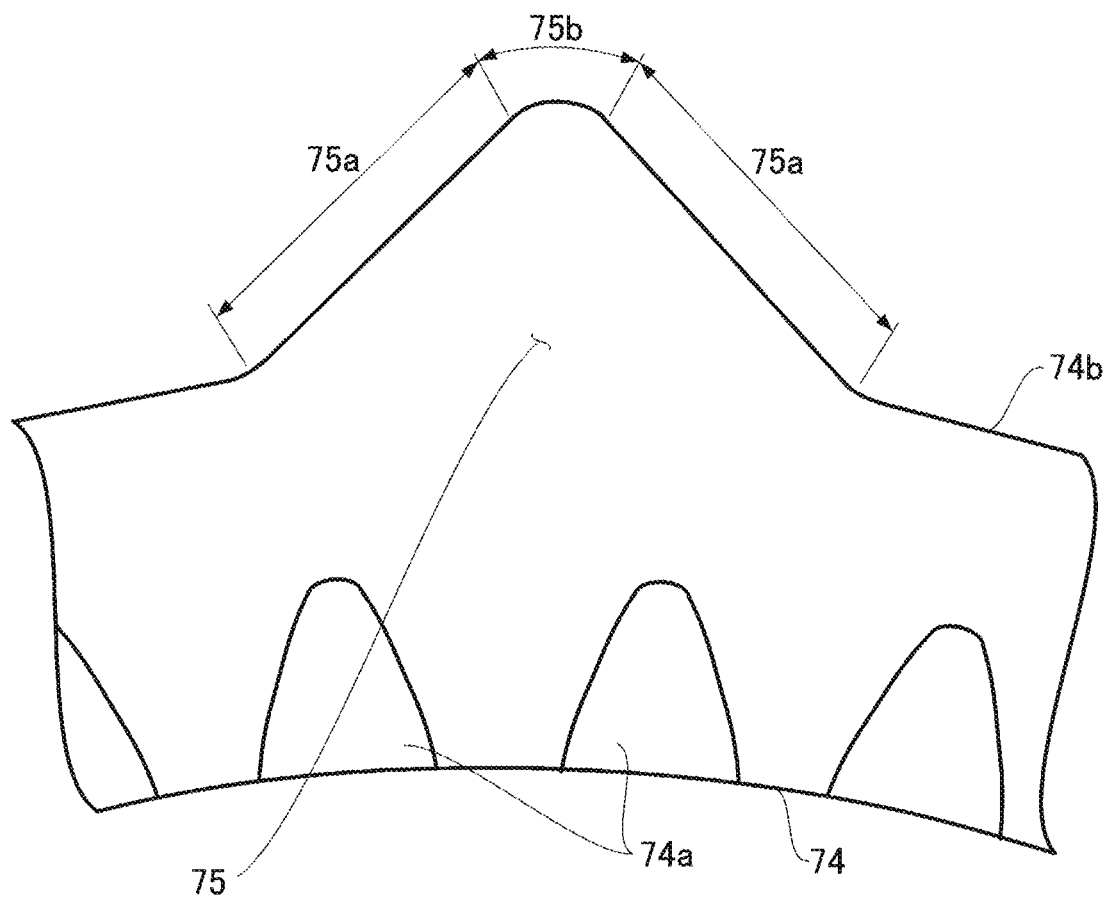
FIG. 11 is an explanatory diagram focusing on a movement limiting raised portion that is formed on the inner gear depicted in FIG. 9.

Moreover, movement limiting raised portions (first raised portions) 75, which enter into the gap between the pairs of stoppers 45 that are formed on the inner wall 44a of the second housing 40, for example, are formed on the outer peripheral surface of the inner gear 74, as illustrated in FIG. 9. The movement limiting raised portions 75 are provided corresponding to, for example, the pairs of stoppers 45, formed in six locations, similar to the pairs of stoppers 45. The movement limiting raised portions 75 have cross-sections that are essentially triangular when sectioned with a plane that is perpendicular to the axial direction. The movement limiting raised portions 75, as depicted in FIG. 11, have, for example, slanted edge portions 75*a* that are straight, rising from the outer peripheral surface 74*b* of the inner gear 74, and rounded apexes 75*b*, positioned at locations wherein the slanted edge portions 75*a*, which arise from both sides, intersect. Note that, as illustrated in FIG. 7, the cross-sectional shape and size of the movement limiting raised portion 75 is constant in the axial direction (with a constant extension from one side to the other side in the axial direction), and thus the slanted edge portion 75*a* of the movement limiting raised portion 75 structures a plane region. Note that while the movement limiting raised portions 75 are formed across the entire width of the inner gear 74, they may instead be formed in only a portion of the range thereof. Moreover, a hemispherical protrusion (also called a contact raised portion) 742, as illustrated in FIG. 7, is formed on an end face, on the +X direction side of the inner gear 74. A hemispherical protrusion 742 is formed in each of the gaps between neighboring movement limiting raised portions 75, formed in a total of six locations. When the inner gear 74 is contained in the first position 41 of the second housing 40, depicted in FIG. 5, the apexes of the six protrusions 742 will contact the stepped surface 46*a* (FIGS. 5 and 6) that is the boundary between the first position 41 and the second position 42 of the second housing 40. The form of contact between the protrusion 742 and the stepped surface 46*a* is that of a point contact, given that it is a contact between a spherical surface and a plane. The inner gear 74 is made from, for example, a synthetic resin. Note that, as described below, the inner gear 74 is formed from a synthetic resin of a hardness that is less than that of the synthetic resin from which the second housing 40, depicted in FIG. 9, is formed.

The inner gear 74 has a contact raised portion (contacting portion) 742 that protrudes in the axial direction on the end face 749 that is on the other side in the axial direction. The other side end face 749 is an opening end face that extends between the inner peripheral surface and the outer peripheral surface on the other side and portion in the axial direction. The contact raised portion 742 contacts the second housing 40 in the axial direction. In the second housing 40, the surface that is contacted by the contact raised portion 742 is a contact surface portion 411 that limits the movement of the inner gear 74 toward the other side in the actual direction through contact of the inner gear 74 with the end portion on the other side in the axial direction within the second housing 40. The contact surface portion 411 is provided facing the other side end face 749 in the inner gear. Note that the contact surface portion 411 is provided on the other side of the first position 41, but in the present disclosure also serves as the end face on the one side of the second position 42. The inner gear 74 is in a state that is contained within the second housing 40, contacting the contact surface portion 411 of the second housing 40, through the contact raised portion 742, in the axial direction.

The contact raised portion 742 protrudes toward the contact surface portion 411 side. These contact raised portions 742, in the present embodiment, are provided in a plurality in the circumferential direction on the end face 749. The number of contact raised portions 742 provided may be any number insofar the configuration is one wherein the gear 74 makes stable contact with the contact surface portion 411 within the second housing 40, for example, a configuration wherein there is contact with the contact surface portion 411 without axial tilting, and centered on the axial direction. At least three contact raised portions 742 that make point contact with the contact surface portion 411 are provided on the end face 749. Moreover, the contact raised portion 742 may protrude in a plurality thereof, with spaces therebetween, with equal spacing in the circumferential direction, on the end face (opening end face) 749, or may be provided in a plurality thereof, with spaces therebetween, with unequal spacing in the circumferential direction, on the end face 749. Moreover, there is no particular limitation on the number of contact raised portions 742, where at least one should be provided. Moreover, the contact raised portions 742 may be structured so that the area of the cross-section that is perpendicular to the axial direction becomes smaller the further away from the end face 749 that is the opening end face on the other side. Moreover, a contact raised portion 742 may be provided in the gear 74, in the same manner as with the end face 749, on the opening end face on the one side to which the first housing 30 is attached. Doing so can suppress the transmission of vibration to the first housing 30, or suppress transmission of vibration from the first housing 30.

The contact raised portion 742 contacts the second housing 40 at the other side, in the axial direction, of the inner gear 74, to become the vibration path to the second housing 40 for the vibration that is produced by the inner gear 74 side. The contact raised portion 742 has a smaller area for the cross-section that is perpendicular to the axial direction for the part of the inner gear 74 that contacts the second housing 40 in the axial direction than the cross-sectional area would be were the end face 749 to contact the second housing 40 in the axial direction.

The contact raised portion 742 may be structured so that the area of the cross-section that is perpendicular to the axial direction is gradually smaller toward the other side in the axial direction, that is, toward the contact surface portion 411. The contact raised portion 742 reduces the vibration, to the second housing 40, of the vibration that is produced within the inner gear 74, that is, the vibration that is driven by the first planetary gear mechanism 70.

In the present embodiment, the contact raised portion 742 is formed in a hemispherical shape, as illustrated in FIG. 3 and FIG. 7, so contacts, with a point contact, the contact surface portion 411 of the second housing 40 on the other side in the axial direction. This suppresses more effectively the transmission of vibration from the inner gear 74 side to the second housing 40 in the axial direction.

While the contact raised portion 742 of the present embodiment has a structure that is formed in a hemispherical shape, it may be structured in any shape insofar as it reduces the area of propagation of the vibration to the other end side in the axial direction. For example, the contact raised portion 742 may be formed in a conical body wherein the tip end portion on the contact surface portion 411 side is the apex. Inner gears equipped with contact raised portions as described above are described as modified examples 1 through 11 of inner gears used in the separate structural units, planetary gear devices, and actuators according to the present disclosure.

As illustrated in FIG. 9, the second housing 40 and the inner gear 74 are physically separate, and when the actuator 1 is not operating, a gap is formed therebetween. Because of this, the inner gear 74 is in a floating state within the second housing 40, allowing rotation around the axial direction, and movement in the direction that is perpendicular to the axial direction, within the second housing 40, in an amount commensurate with the gap that is provided between the inner gear 74 and the second housing 40. Additionally, through the movement limiting raised portion 75 that is formed on the inner gear 74 contacting the pair of stoppers 45, further movement of the inner gear 74 is prevented.

Figure 8:
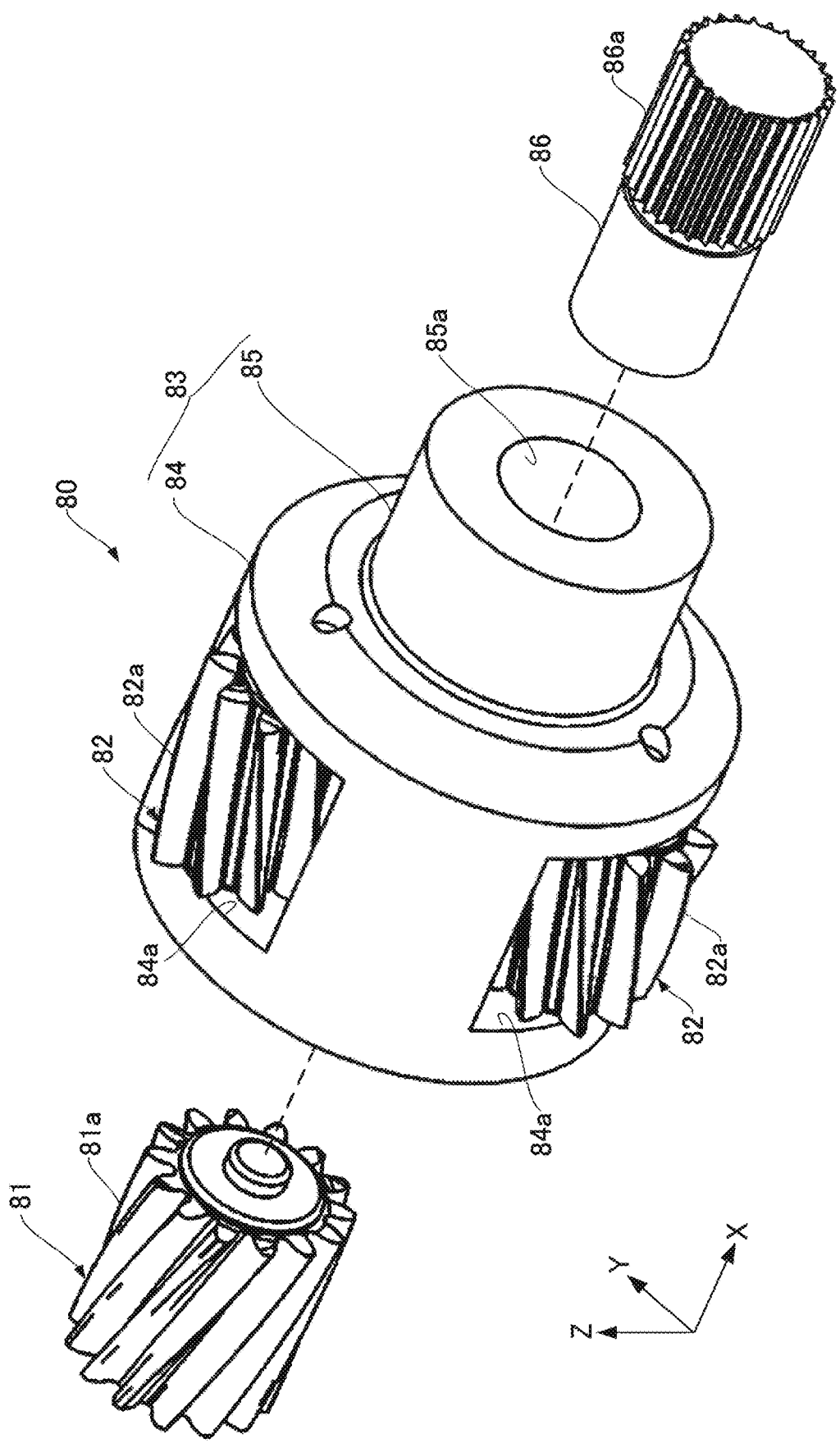
FIG. 8 is a perspective diagram of a second planetary gear mechanism according to a first embodiment according to the present disclosure.

The second planetary gear mechanism 80, which is another planetary gear mechanism, comprises, for example, a sun gear 81, three planetary gears 82, a carrier 83 that supports the three planetary gears 82 rotatably, and an output shaft 86, as depicted in FIG. 8. Note that while, for convenience in the perspective diagram in FIG. 8, only two planetary gears 82 are illustrated, another planetary gear 82 is provided at a position that is on the back side, hidden by the carrier 83.

The sun gear 81 is an outer gear whereon sun tooth portions 81a are formed on the outer peripheral surface, for example, and is secured (connected), in a state wherein the axes are aligned together, to the carrier 73 of the first planetary gear mechanism 70, depicted in FIG. 7. Through this, with the rotation of the carrier 73 of the first planetary gear mechanism 70, the sun gear 81 will rotate identically to the rotation of the carrier 73 of the first planetary gear mechanism 70 (linked so as to be synchronized). That is, the sun gear 81, accompanying rotation of the carrier 73 of the first planetary gear mechanism 70, rotates at the same rotational speed as the carrier 73 of the first planetary gear mechanism 70, in that the same rotational direction as the carrier 73 of the first planetary gear mechanism 70. The sun tooth portions 81a have, for example, helical teeth that are cut at an angle in respect to the axis of the sun gear 81. That is, the sun gear 81 is, for example, a helical gear.

The planetary gear 82 is, for example, an outer gear wherein planetary tooth portions 82a are formed on the outer peripheral surface thereof. The planetary tooth portions 82a have, for example, helical teeth that are cut at an angle in respect to the axis of the planetary gear 82. That is, the planetary gear 82 is, for example, a helical gear. Three planetary gears 82, for example, are disposed at equal spacing on the same circle centered on the axis of the second planetary gear mechanism 80. The sun gear 81 is positioned between the three planetary gears 82, where the sun tooth portions 81a mesh with the respective planetary tooth portions 82a of the three planetary gears 82. Additionally, the planetary gear 82 meshes with the inner tooth portions 47 that are formed on the second housing 40, depicted in FIG. 5 and FIG. 6.

The carrier 83 has, for example, a gear retaining portion 84 for holding the planetary gears 82, and an output shaft retaining portion 85 for holding the output shaft 86. The gear retaining portion 84 is formed in, for example, a cylindrical shape, where three containing openings 84a, for containing the planetary gears 82, are formed in the outer peripheral surface thereof. Each of the individual planetary gears 82 is attached rotatably, by a pin 87 that faces in the axial direction, within the respective containing opening 84a, as illustrated in FIG. 3. The planetary gears 82 are attached in a state wherein a portion of the planetary tooth portion 82a protrudes from the outer peripheral surface of the carrier 83. This makes it possible to mesh the planetary tooth portions 82a with the inner tooth portions 47 that are formed on the second housing 40. Moreover, the output shaft retaining portion 85, as illustrated in FIG. 8, is formed as a cylinder with a diameter that is smaller than that of the gear retaining portion 84, and a fitting hole 85a, for holding the output shaft 86, is formed in the center portion of the output shaft retaining portion 85.

The output shaft 86 is, for example, held on the carrier 83, and rotates together with the carrier 83. The output shaft 86 has an output gear 86a that has, on the shaft, teeth of a knurled shape. That is, the output shaft 86 structures, for example, a gear that has teeth of a knurled shape.

(Operation of the Actuator 1)

An example of the operation of the actuator 1 will be explained next. First, when the motor 10, depicted in FIG. 4, operates, the rotary shaft 12 rotates in a first direction or a second direction. The explanation below will be for the case wherein the rotary shaft 12 rotates in the first direction.

Note that the first direction, in relation to the directions of rotation of each of the members, is the clockwise direction for the case when all of the members are viewed from the direction indicated by the arrow AII shown in FIG. 1. On the other hand the second direction, in relation to the directions of rotation of each of the members, is the counterclockwise direction for the case when all of the members are viewed from the direction indicated by the arrow AII shown in FIG. 2.

When the rotary shaft 12 rotates in the first direction, the sun gear 71, depicted in FIG. 3 and FIG. 7, rotates in the first direction, accompanying the rotation of the rotary shaft 12. Accompanying rotation of the sun gear 71 in the first direction, the three planetary gears 72 that mesh with the sun gear 71 each rotate in the second direction. Moreover, because the planetary gears 72 mesh with the inner gear 74, they rotate (revolve) in the first direction around the axis of the first planetary gear mechanism 70, through the rotation in the second direction. Accompanying the rotation (revolution) of the planetary gears 72, the carrier 73 rotates in the first direction, centered on its own axis.

In this way, when the carrier 73 rotates in the first direction, the sun gear 81, depicted in FIG. 3 and FIG. 8, which is secured by the carrier 73, will rotate in the first direction. Accompanying rotation of the sun gear 81 in the first direction, the three planetary gears 82 that mesh with the sun gear 81 each rotate in the second direction. Moreover, because the planetary gears 82 mesh with the inner tooth portions 47, depicted in FIG. 5 and FIG. 6, they rotate (revolve) in the first direction around the axis of the second planetary gear mechanism 80, through the rotation in the second direction. Accompanying the rotation (revolution) of the planetary gears 82 in the first direction, the carrier 83 rotates in the first direction, centered on its own axis. Given this, the rotation of the carrier 83 is transmitted to the output shaft 86 that is held on the carrier 83.

While the description above was an explanation for the case wherein the rotary shaft 12 rotated in the first direction, if the rotary shaft 12 were rotated in the second direction, then the explanation of the operation of the actuator 1 would be identical, with only the directions of rotation of each of the gears being reversed.

Figure 12:
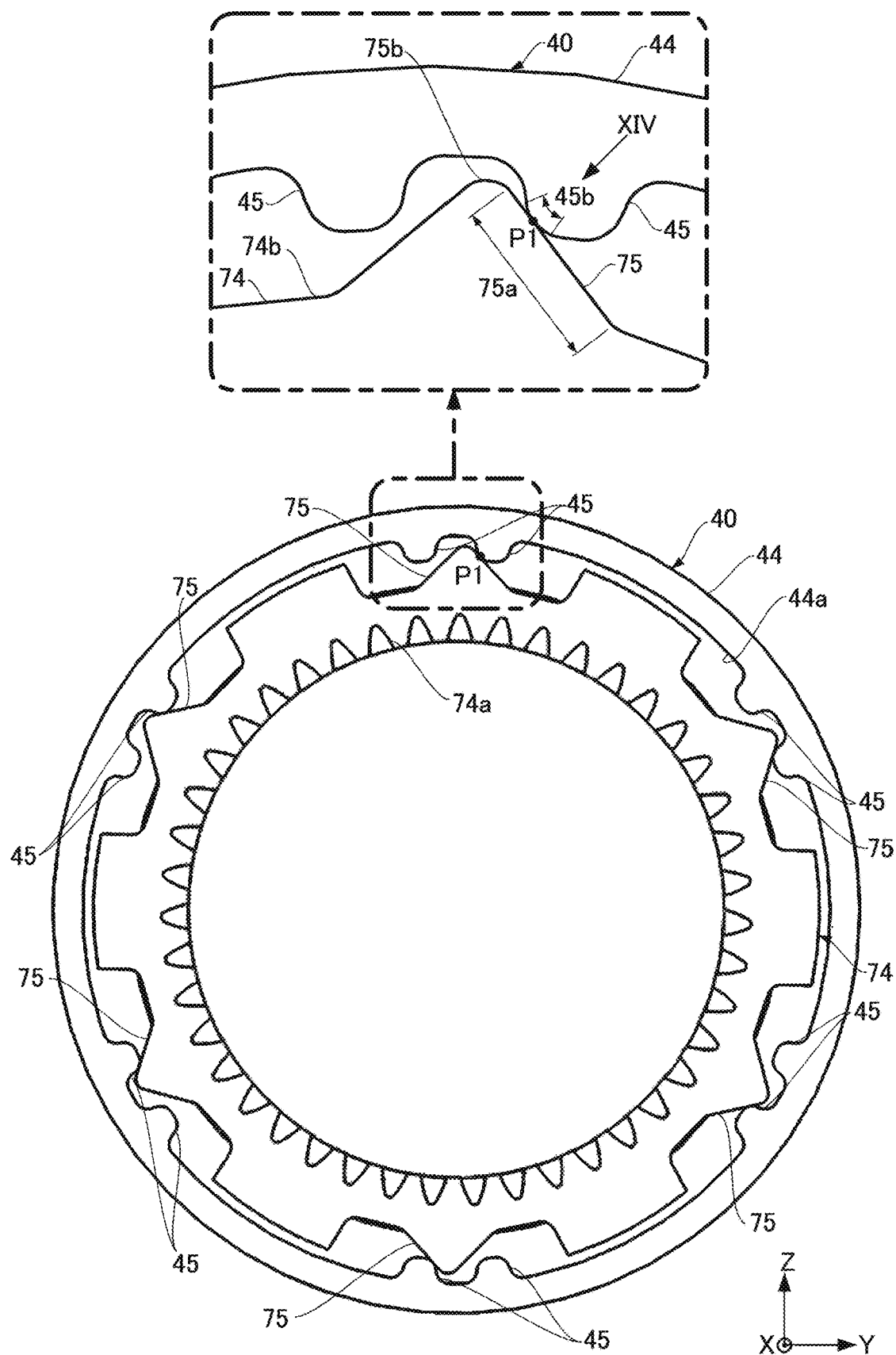
FIG. 12 is a diagram for explaining the state of contact with the second housing through rotation of the inner gear, depicted in FIG. 9, around the axis.

As described above, the second housing 40 and the inner gear 74 are physically separated. Additionally, when the actuator 1 is not operating, a gap is formed between the second housing 40 and the inner gear 74. Given this, when the actuator 1 operates, the inner gear 74 can rotate around the axis of the second housing 40, or move in a direction that is perpendicular to the axis, by an amount commensurate with the gap that is provided. For example, when the inner gear 74 is rotated in the first direction (clockwise) from the state shown in FIG. 9, each of the plurality of movement limiting raised portions 75, formed on the inner gear 74, will soon make linear contact with the corresponding stoppers 45 that are formed on the second housing 40, as depicted in FIG. 12. Through this, the inner gear 74 will be unable to rotate further in the clockwise direction. Because the stoppers 45 are formed in pairs, the rotation of the inner gear 74, around the axis, will be limited through the same linear contact even if the inner gear 74 were rotated in the second direction (the counterclockwise direction).

Figure 13:
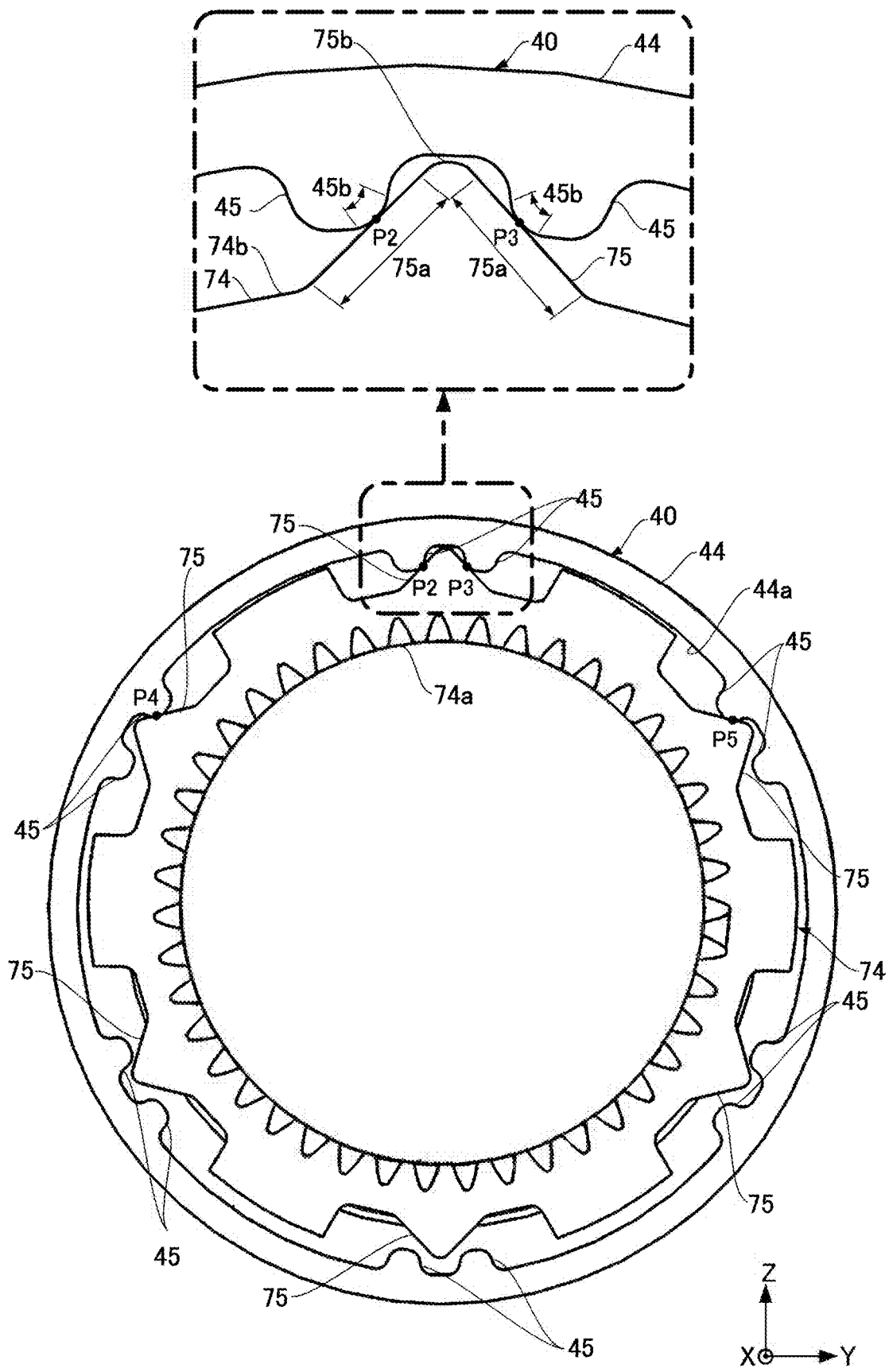
FIG. 13 is a diagram for explaining the state of contact with the second housing through movement of the inner gear, depicted in FIG. 9, in the direction that is perpendicular to the axis.

Moreover, the inner gear 74 moves, from the state depicted in FIG. 9, in a direction that is perpendicular to the axis, moving, for example, upward in the figure. Given this, as depicted in FIG. 13, the movement limiting raised portions 75 in the upper portion in the figure, formed on the inner gear 74, make linear contact with the pairs of stoppers 45 that are formed on the second housing 40. Through this, the inner gear 74 will be unable to move further in the upward direction, and the movement in the direction perpendicular to the axis will be limited. Moreover, in this case, the apexes 75b of the inner gear 74 (more specifically, the apexes 75b of the movement limiting raised portions 75) will not contact the second housing 40 (or, more specifically, the inner wall 44a of the round cylinder 44). Note that the limitation on the movement of the inner gear 74 in the directions perpendicular to the axis is not limited to upward movement of the inner gear 74. Because the six movement limiting raised portions 75 and pairs of stoppers 45 are arranged with equal spacing in the circumferential direction, they are able to limit movement of the inner gear 74 in a variety of directions, such as the vertical direction, crosswise direction, and diagonal direction.

(Effects)

Given the embodiment set forth above, even if, in the structural unit wherein the inner gear 74 and the second housing 40 are separated, the inner gear 74 were to move during operation of the actuator 1, the stoppers 45 and the movement limiting raised portions 75 would make linear contact, limiting the movement of the inner gear 74. FIG. 12 shows the state of linear contact between the inner gear 74 and the second housing 40 through rotation of the inner gear 74 around the axis. In this case the pairs of stoppers 45 and the movement limiting raised portions 75 make contact in all six locations, and the forms of contact are the same for all. Because of this, a single contact location, wherein the contact is at the top in the figure, will be explained referencing the enlarged view in FIG. 12. As illustrated in the figure, the location of contact between the connecting portion 45b of the stopper 45, illustrated through a bulging convex curve, and the slanted edge portion 75a of the movement limiting raised portion 75, illustrated by a straight line, can be depicted as a contact point P1. That is, the contact will be in an extremely limited range. Note that the cross-section of the second housing 40 and the cross-section of the inner gear 74 are of constant shapes and sizes in the axial direction. Because of this, the contact between the connecting portion 45b and the slanted edge portion 75a will be a contact between a convex curved surface that does not have a curve in the direction that is parallel to the axis, and a plane that is parallel to the axis. Because of this, the contact between the inner gear 74 and the second housing 40 will be linear contact, along the axial direction that is parallel to the X axis, as with the contact region 90 shown in FIG. 14.

Moreover, FIG. 13 shows the state of contact between the second housing 40 and the inner gear 74 through movement of the inner gear 74 in a direction that is perpendicular to the axis, for example, movement in the upward direction in the figure. As depicted in FIG. 13, the locations of contact between the second housing 40 and the inner gear 74 are the four locations indicated by the contact points P2 through P5. As shown in the enlarged view in FIG. 13, the contact points P2 and P3 are the locations of contact between the connecting portion 45b of the stopper 45, illustrated through a bulging convex curve, and the slanted edge portion 75a of the movement limiting raised portion 75, illustrated by a straight line. In the same manner as with the above, such locations of contact are linear contact between the two, given that it is contact of a convex curved surface, which has no curve in a direction that is parallel to the axis, and a plane that is parallel to the axis. Moreover, the contacts between the stoppers 45 and the movement limiting raised portions 75 at the contact points P4 and P5 will also be linear contacts, because they are contacts between convex curved surfaces and planes.

In this way, through providing pairs of stoppers 45 having chevron shapes that have convex curved surfaces, and structuring so as to insert, therebetween, triangular movement limiting raised portions 75 that have planar inclined surfaces, the contacts between the outer peripheral surfaces of the inner gear 74 and the inner peripheral surfaces of the second housing 40 can be caused to be linear contacts, even when the inner gear 74 has rotated around the axis, and even when it has moved in a direction perpendicular to the axis. Because the contact area between the outer peripheral surface of the inner gear 74 and the inner peripheral surface of the second housing 40, which, in this way, make linear contact, is small, the transmission to the second housing 40 of the vibration from the inner gear 74 during operation will be reduced. The vibration of the second housing 40 that is produced through transmission from the first planetary gear mechanism 70 is suppressed thereby, thus making it possible to suppress the noise that is produced from the planetary gear device 20 accompanying vibration caused by the first planetary gear mechanism 70.

Figure 14:
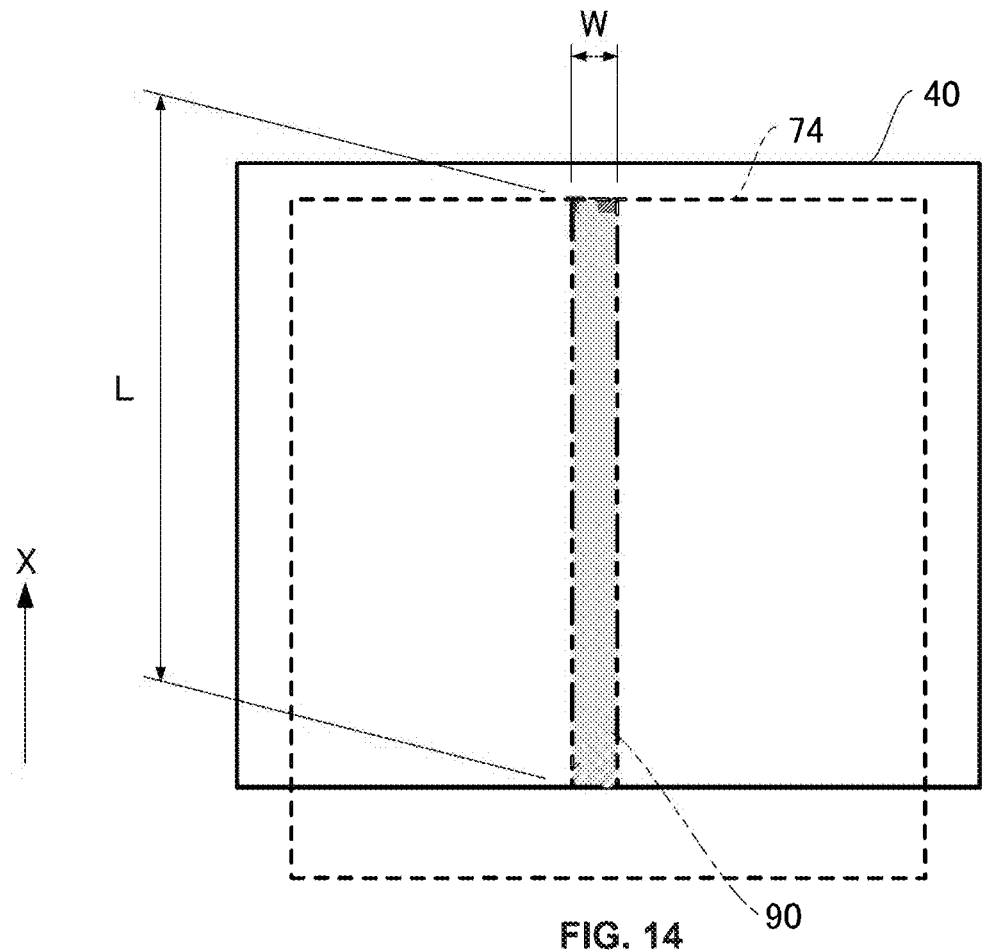
FIG. 14 is a diagram for explaining the state of contact between the second housing and the inner gear, when viewed from the arrow XIV in FIG. 12.

Note that the "linear contact" described in the present specification is a state of contact wherein the contacting part forms a line, and does not indicate only a state of contact that would be illustrated by a single point or a plurality of points that are the contact points in each individual cross-section, but rather, as depicted in FIG. 14, a state of contact in a form wherein the width W is considered to be adequately small, when compared to the length L in the contact region 90 is included. Moreover, the "linear contact" used in the present specification further includes a state of contact wherein the contact is discontinuous (contacting sporadically) so that the width W in the contact region 90 will form a line when an imaginary line is drawn along the axial direction. Moreover, the "linear contact" used in the present specification further includes a state of contact wherein the width W in the contact region 90 forms a line that describes an angled line, rather than being in the axial direction. Moreover, the "linear contact" used in the present specification further includes a state of contact wherein the contact is discontinuous (contacting sporadically) so that the width W in the contact region 90 will form a line when an imaginary line is drawn as an angled line, rather than along the axial direction. While in the embodiment described above the explanation described a form wherein the first raised portions and the second raised portions made linear contact, the present disclosure is not limited thereto, but rather the method of contact may be selected as appropriate depending on the form, and may be a form wherein there is point contact or a form wherein there is facial contact between the first raised portions and the second raised portions.

Moreover, in the present embodiment a hemispherical protrusion 74b is formed on the end face of the inner gear 74 in the +X direction side, where the protrusion 74b contacts the stepped surface 46a of the second housing 40 (FIGS. 5 and 6). The form of contact between the protrusion 74b and the stepped surface 46a can be kept to a contact in a limited range, that is, a point contact. This can reduce the transmission, to the second housing 40, of vibration from the inner gear 74 that is in operation.

Moreover, as depicted in FIG. 11, having the cross-section of the movement limiting raised portion 75, sectioned by a plane that is perpendicular to the axis, be a triangle, to structure with the apex 75b, which is narrow at the tip, facing outward, allows the inner gear 74 to be removed easily from the mold during injection molding. This can improve the yield.

Figure 15:
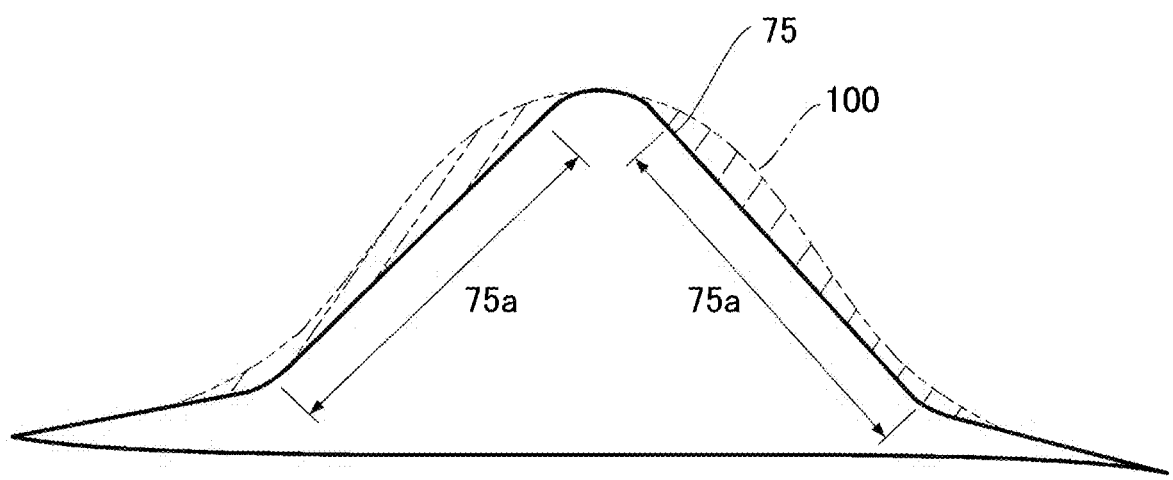
FIG. 15 is a schematic diagram comparing the movement limiting raised portion, depicted in FIG. 11, with another example of a movement limiting raised portion.

Moreover, as depicted in FIG. 15, the movement limiting raised portions 75 are formed with straight slanted edge portions 75a on both sides in a cross-section that is sectioned by a plane that is perpendicular to the axial direction. Moreover, FIG. 15 illustrates, as a reference example for a movement limiting raised portion 75, a movement limiting raised portion 100 of a shape wherein both sides are bulged, illustrated by the double dotted lines. Comparing the two, the cross-sectional area of the movement limiting raised portion 75 is smaller than the cross-sectional area of the movement limiting raised portion 100 by an amount commensurate with the area of the region indicated by the hatching. Given this, the present embodiment is able to reduce the load on the motor 10, and also reduce the manufacturing cost, by reducing the weight of the inner gear 74. Furthermore, because the of the reduction in weight of the inner gear 74 that will operate, the present disclosure can reduce (suppress) the impact when the inner gear 74 contacts the second housing 40, thus making it possible to reduce (suppress) the vibration of the second housing as well.

Moreover, the inner gear 74 is formed from a synthetic resin of a hardness that is less than that of the synthetic resin for forming the second housing 40. From the perspectives of mechanical strength, wear resistance, thermal durability, and the like, preferably the synthetic resin for forming the inner gear 74 and the second housing 40 uses an engineering plastic or a super engineering plastic. These synthetic resins may be, for example, ultrapolymer polyethylene (UHPE), polyphenylene sulfide (PPS), polyarylate (PAR), polyacetal (POM), polyamide (PA), polycarbonate (PC), polybutylene terephthalate (PBT), polyether sulfone (PES), polyether ether ketone (PEEK), or the like.

The synthetic resin for forming the inner gear 74 and the second housing 40 may be identical materials or may be different materials. They may be selected as appropriate in a range that produces the effects of the present disclosure.

Among the synthetic resins described above, the synthetic resin that is relatively soft, suitable for forming the inner gear 74, preferably uses, for example, an ultrapolymer polyethylene (UHPE), polyphenylene sulfide (PPS), polyarylate (PAR), polyacetal (POM), or polyamide (PA). Moreover, preferably the relatively hard synthetic resin that is suitable for forming the second housing 40 uses, for example, polycarbonate (PC), polybutylene terephthalate (PBT), polyether sulfone (PES) polyphenylene sulfide (PPS), polyether ether ketone (PEEK), polyacetal (POM), or polyamide (PA). Moreover, when synthetic resin materials having identical main components are used for the synthetic resin materials for forming the inner gear 74 and the second housing 40, preferably the synthetic resin for forming the second housing 40 will be harder, through changing, for example, the density of the synthetic resin.

By forming the inner gear 74 from a synthetic resin of a hardness that is less than that of the second housing 40, in this way, the impact when the inner gear 74 contacts the second housing 40 can be ameliorated, making it possible to reduce (suppress) the vibration produced in the second housing 40. Through this, the present disclosure is able to reduce (suppress) the noise caused by vibration of the second housing 40, enabling also a further reduction (suppression) in the noise when the inner gear 74 collides with the second housing 40. It is thus possible to suppress the noise produced from the planetary gear device 20 accompanying vibration caused by the first planetary gear mechanism 70.

Moreover, in the present embodiment the structure wherein the housing and the inner gear are separated is applied to only the first planetary gear mechanism that rotates at a high speed, and is not applied to the second stage planetary gear mechanism that rotates at a low speed. That is, in the present embodiment the structure wherein the inner gear is caused to float is used in the mechanism that rotates at a high speed, and which tends to produce large vibration and noise, where a housing structure wherein inner teeth are formed is used in the mechanism that rotates at a low speed, wherein the vibration and noise tends to be relatively less. Through this, the present embodiment not only suppresses the vibration and noise of the planetary gear device caused by the planetary gear mechanism, but also can prevent an increase in the number of components, beyond that which is necessary, in the planetary gear device, and prevent an increase in the assembly operations and assembly cost. Thus it is able to achieve a reduction in manufacturing cost of the planetary gear device. In this way, two mechanisms having different structures may be employed, as appropriate, depending on the form of rotation of the planetary gear mechanism, where the two mechanisms may be used in parallel.

Another embodiment according to the present disclosure will be explained next, but there are many features that are the same as in the first embodiment. Given this, the explanation below will center on the features that are different, and those features that are the same will be assigned identical reference symbols, and detailed explanations thereof will be omitted.

EXAMPLE 2

In the second embodiment the directions of extension of the pairs of stoppers are formed on the second housing and the movement limiting raised portions that are formed on the inner gear are different from those in the first embodiment. Note that the other structures are identical to the structures in the first embodiment.

Figure 16:
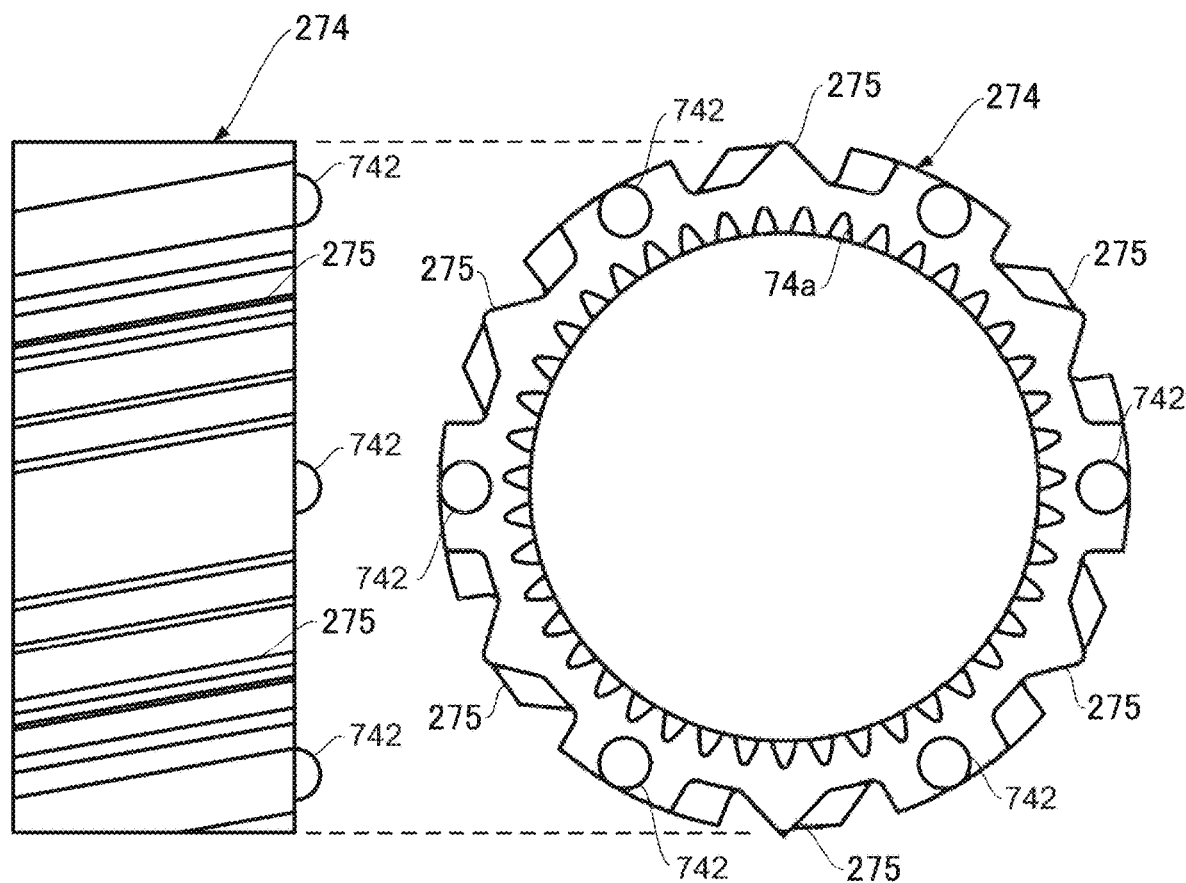
FIG. 16 is a diagram depicting an inner gear according to a second embodiment according to the present disclosure.

As depicted in FIG. 16, six movement limiting raised portions 275, which extend diagonally in respect to the X axial direction, are formed with equal spacing on the outer peripheral surface of the inner gear 274. The angles with which the six movement limiting raised portions 275 are inclined, in respect to the X axial direction, are all identical. The cross-section of the movement limiting raised portion 275, when sectioned by a plane that is perpendicular to the direction of extension thereof (the direction that is inclined in respect to the X axial direction) is the same shape as the cross-section wherein the movement limiting raised portion 75 of the first embodiment (FIG. 7) was sectioned by a plane that is perpendicular to the direction of extension thereof (the X axial direction). That is, the movement limiting raised portion 275 has a triangular cross-section, as depicted in FIG. 11.

Figure 17:
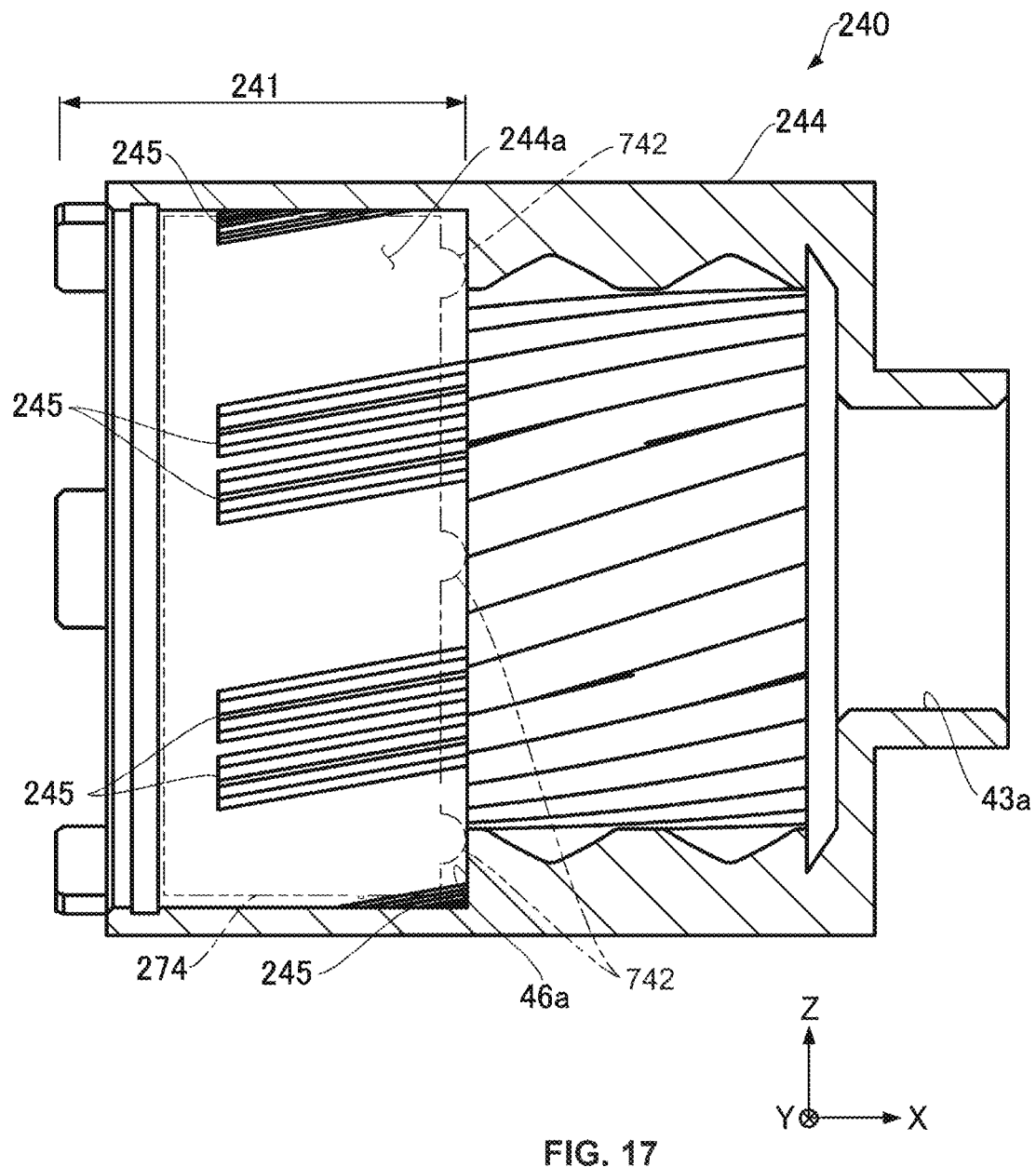
FIG. 17 is a cross-sectional diagram of a second housing according to a second embodiment according to the present disclosure.

The movement limiting raised portions 275 that are formed on the inner gear 274 are inserted between pairs of stoppers 245 that are formed at a first position 241 of a second housing 240 that is depicted in FIG. 17. The direction in which the pairs of stoppers 245 extend is the same as the direction of extension of the movement limiting raised portions 275 of the inner gear 274 that is contained in the second housing 240, a direction that is inclined in respect to the X axial direction. The cross-section of the pair of stoppers 245, when sectioned by a plane that is perpendicular to the direction of extension thereof (the direction that is inclined in respect to the X axial direction) is the same shape as the cross-section wherein the pair of stoppers 45 of the first embodiment (FIG. 6) was sectioned by a plane that is perpendicular to the direction of extension thereof (the X axial direction). That is, the pairs of stoppers 245 have cross sections of chevron shapes, as depicted in FIG. 10.

In this way, the cross-sectional shapes of the movement limiting raised portions 275 and the cross-sectional shapes of the stoppers 245 are the same shapes as in the first embodiment, thus causing the form of contact between the two to be linear contact. Moreover, the contact between the movement limiting raised portions 275 and the pairs of stoppers 245 will be linear contact along a direction that is inclined in respect to the X axial direction. In this way, the area of contact between the movement limiting raised portions 275 and the pairs of stoppers 245, which contact with linear contact, reducing the transmission of vibration from the inner gear 274, during operation, to the second housing 240. This suppresses the vibration of the second housing 240, which can suppress the noise that is produced from the planetary gear device.

Moreover, there is no particular limitation on the angle of the incline of the movement limiting raised portions 275 and the pairs of stoppers 245, in respect to the X axial direction, which may be inclined to the same angle as the angle of the teeth in the case of the inner gear being a helical gear, for example, or may be inclined at an angle that is opposite of the angle of the teeth, or may be inclined to some different angle. The angle of inclination of the movement limiting raised portions 275 and of the pairs of stoppers 245 being the same as the angle of the helical gear of the inner gear can reduce the thrusting force that is produced within the planetary gear device.

EXAMPLE 3

A third embodiment will be explained next in reference to FIG. 18 and FIG. 19. In the third embodiment, the number of pairs of stoppers formed on the second housing and the number of movement limiting raised portions formed on the inner gear is set to 3, reduced by half from the first embodiment wherein six of each were formed.

Figure 18:
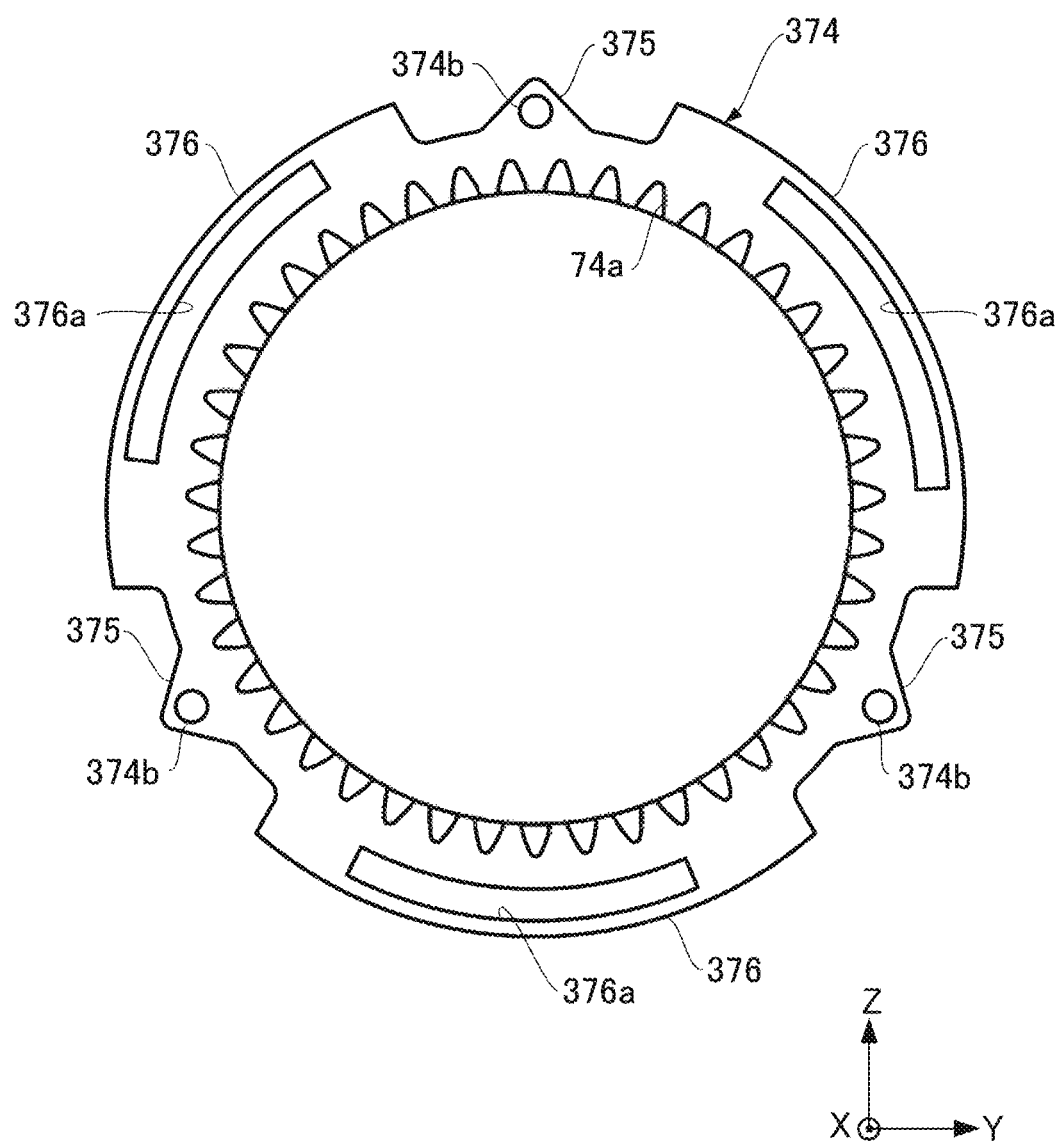
FIG. 18 is a diagram depicting an inner gear according to a third embodiment according to the present disclosure.

As depicted in FIG. 18, three movement limiting raised portions 375 that extend in the X axial direction are formed, with equal spacing, on the outer peripheral surface of the inner gear 374. The cross sections of the movement limiting raised portions 375 are the same shapes as the cross sections of the movement limiting raised portions 75 in the first embodiment, having triangular cross-sectional shapes, as depicted in FIG. 11. Three arc portions 376 that structure the outer peripheral surface of the inner gear 374 are formed between the movement limiting raised portions 375. On the insides of each of these three arc portions 376 are formed bow-shaped openings 376a that pass through the inner gear 374 in the X axial direction. These three arc portions 376 function as contacting portions for contacting the inner wall 344a of the second housing 340.

Figure 19:
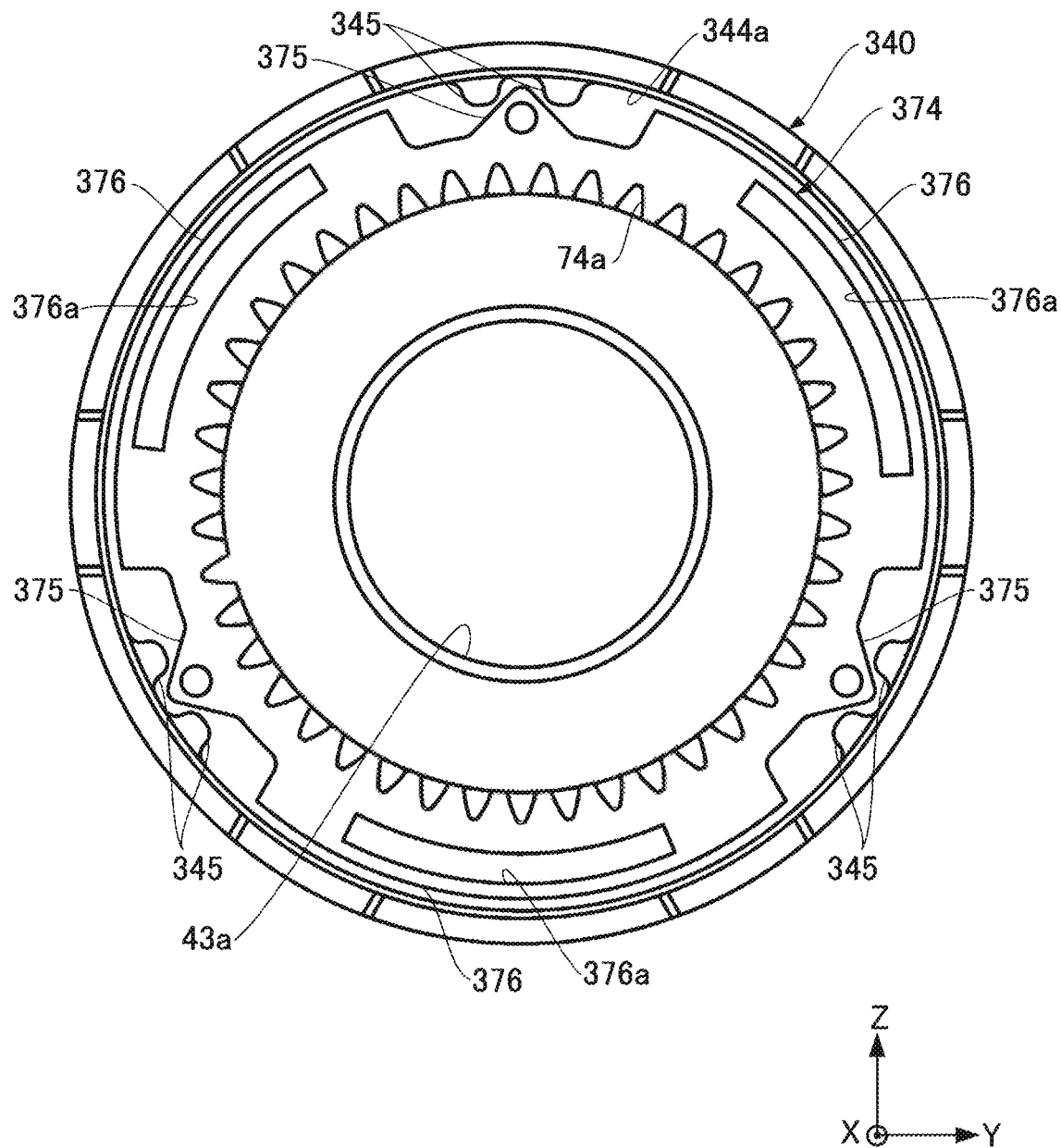
FIG. 19 is a diagram depicting the state wherein the inner gear is housed in the second housing according to the third embodiment according to the present disclosure.

As depicted in FIG. 19, three pairs of stoppers 345 are also formed with equal spacing on the inner wall 344a of the second housing 340, inserted between the movement limiting raised portions 375. The cross sections of the pairs of stoppers 345 are the same shapes as the cross sections of the pairs of stoppers 45 in the first embodiment, having chevron cross-sectional shapes, as depicted in FIG. 10. Note that when the inner gear 374 moves within the second housing 340, the movement limiting raised portions 375 and the pairs of stoppers 345 make linear contact, limiting the movement of the inner gear 374, where, additionally, the movement of the inner gear 374 is limited through the arc portions 376 of the inner gear 374 contacting the inner wall 344a of the second housing 340. The arc portions 376 and the inner wall 344a make facial contact. However, the formation of the openings 376a forms parts wherein vibrations do not propagate within the inner gear 374, and also reduce the rigidity of the arc portion 376. This makes it possible to reduce the propagation of vibration through the arc portions 376 to the second housing 340. This makes it possible to suppress the noise that is produced from the planetary gear device, through suppressing the transmission of vibration to the second housing 340, even when the inner gear 374 is in contact with the second housing 340 through the movement limiting raised portions 375, and even when it is in contact with the second housing 340 through the arc portions 376. Note that protrusions may be provided protruding on the outside of the arc portions 376, to contact the inner wall 344a of the second housing 340 through the protrusions. This makes it possible to limit, into a narrow range, the range of contact between the arc portions 376 and the second housing 340.

EXAMPLE 4

Figure 20:
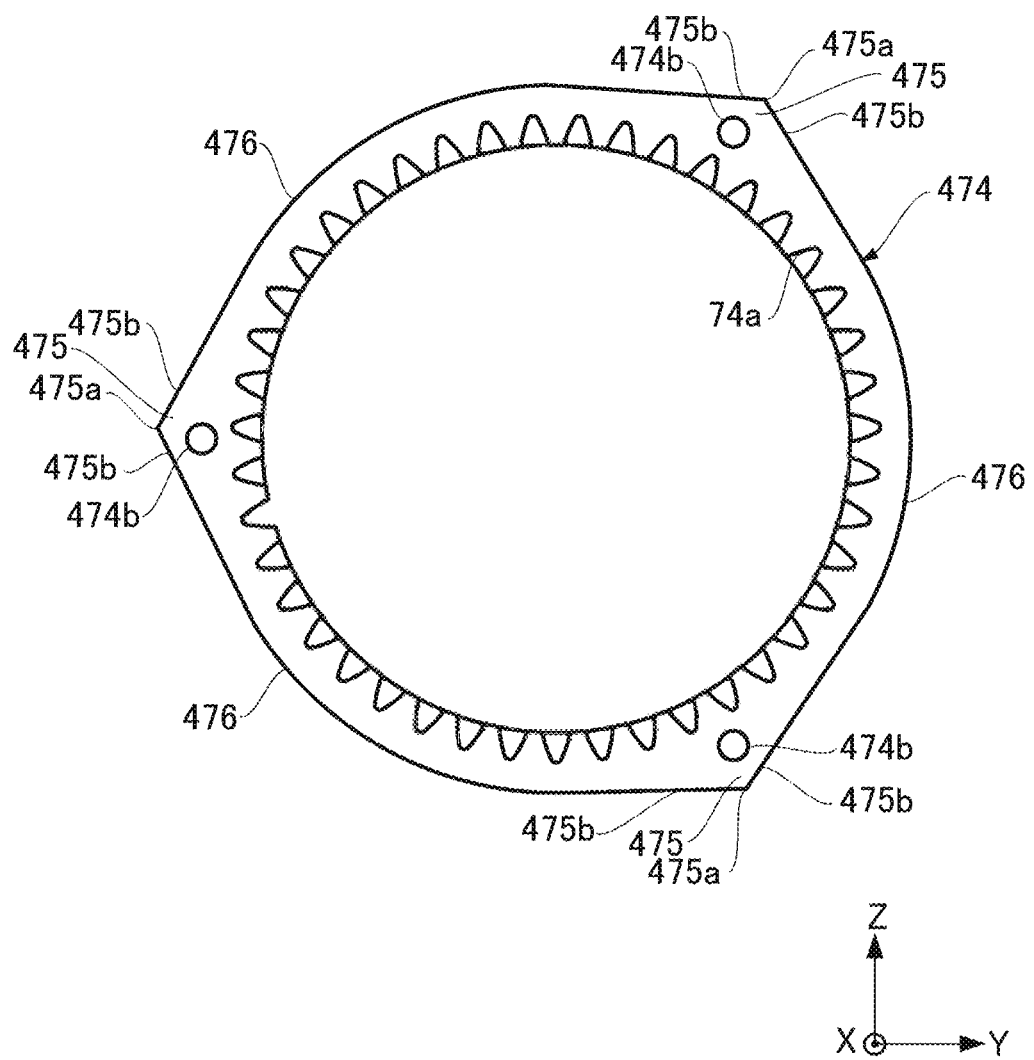
FIG. 20 is a diagram depicting an inner gear according to a fourth embodiment according to the present disclosure.

A fourth embodiment will be explained next in reference to FIG. 20 and FIG. 21. As depicted in FIG. 20, three movement limiting raised portions 475 that extend in the X axial direction are formed, with equal spacing, on the outer peripheral surface of the inner gear 474. The movement limiting raised portion 475 has a triangular cross-section that has an apex 475b and slanted edge portions 475a formed on both sides of the apex 475b. Three arc portions 476 that structure the outer peripheral surface of the inner gear 474 are formed between the movement limiting raised portions 475. These three arc portions 476 are formed in a state further pulled in toward the axis side (the inside) than with the arc portions 376 of the third embodiment, depicted in FIG. 19.

Figure 21:
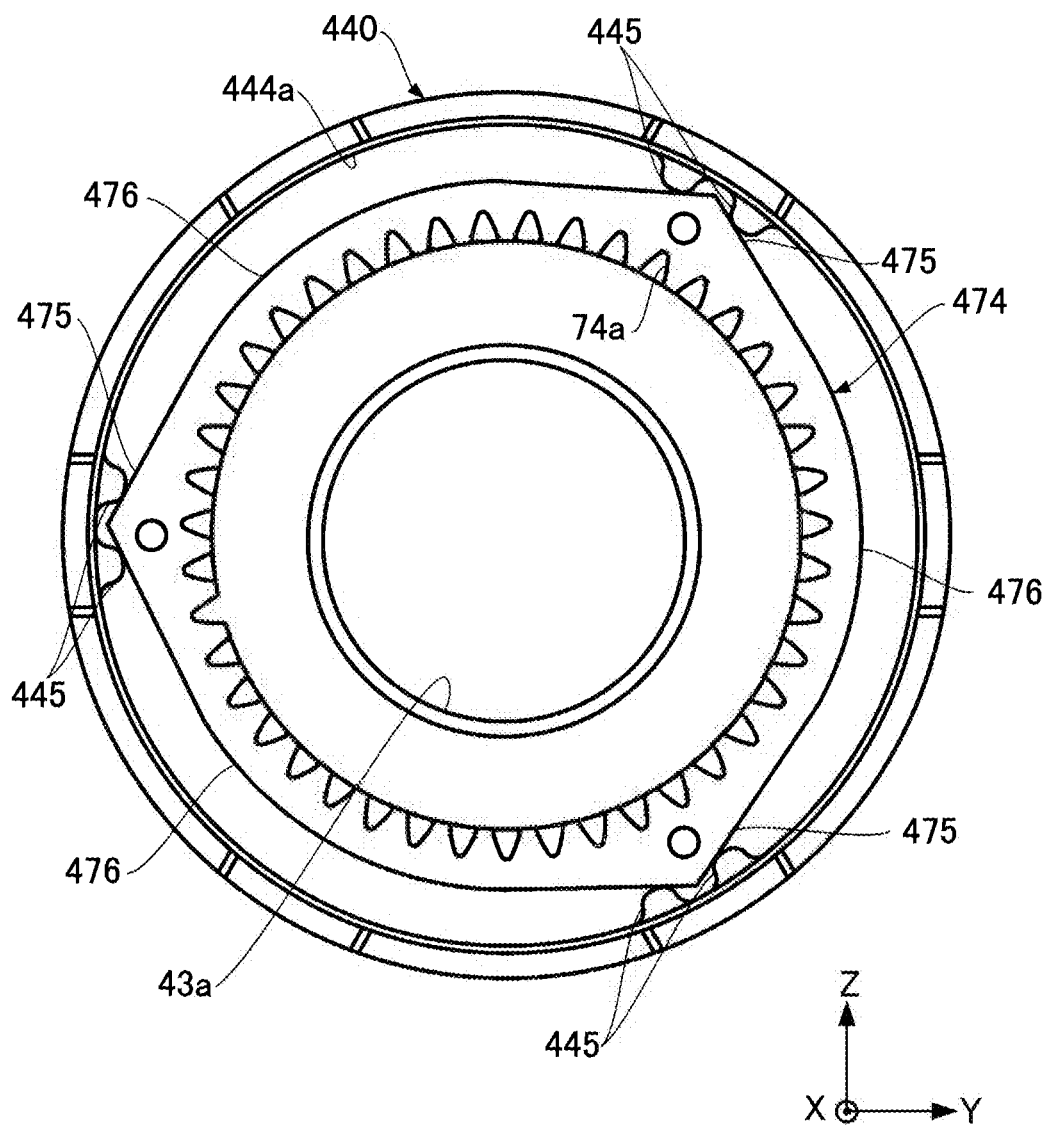
FIG. 21 is a diagram depicting the state wherein the inner gear is housed in the second housing according to the fourth embodiment according to the present disclosure.

As depicted in FIG. 21, three pairs of stoppers 445 are also formed with equal spacing on the inner wall 444a of the second housing 440, inserted between the movement limiting raised portions 475. The cross sections of the pairs of stoppers 445 are the same shapes as the cross sections of the pairs of stoppers 45 in the first embodiment, having chevron cross-sectional shapes, as depicted in FIG. 10. Note that when the inner gear 474 moves within the second housing 440, the movement limiting raised portions 475 and the pairs of stoppers 445 make linear contact, limiting the movement of the inner gear 474. On the other hand, the arc portions 476 are formed in a state that is pulled in toward the axis side (inside), as described above, and thus do not make contact with the inner wall 444a of the second housing 440. In this way, the number of locations wherein there is contact between the movement limiting raised portions 475 and the pairs of stoppers 445 is reduced to 3 locations, and linear contact is made between the two, making it possible to reduce the area of contact when compared to the forms described above, reducing the transmission of vibration from the inner gear 474 that is operating to the second housing 440. This suppresses the vibration of the second housing 440, which can suppress the noise that is produced from the planetary gear device.

EXAMPLE 5

Figure 22:
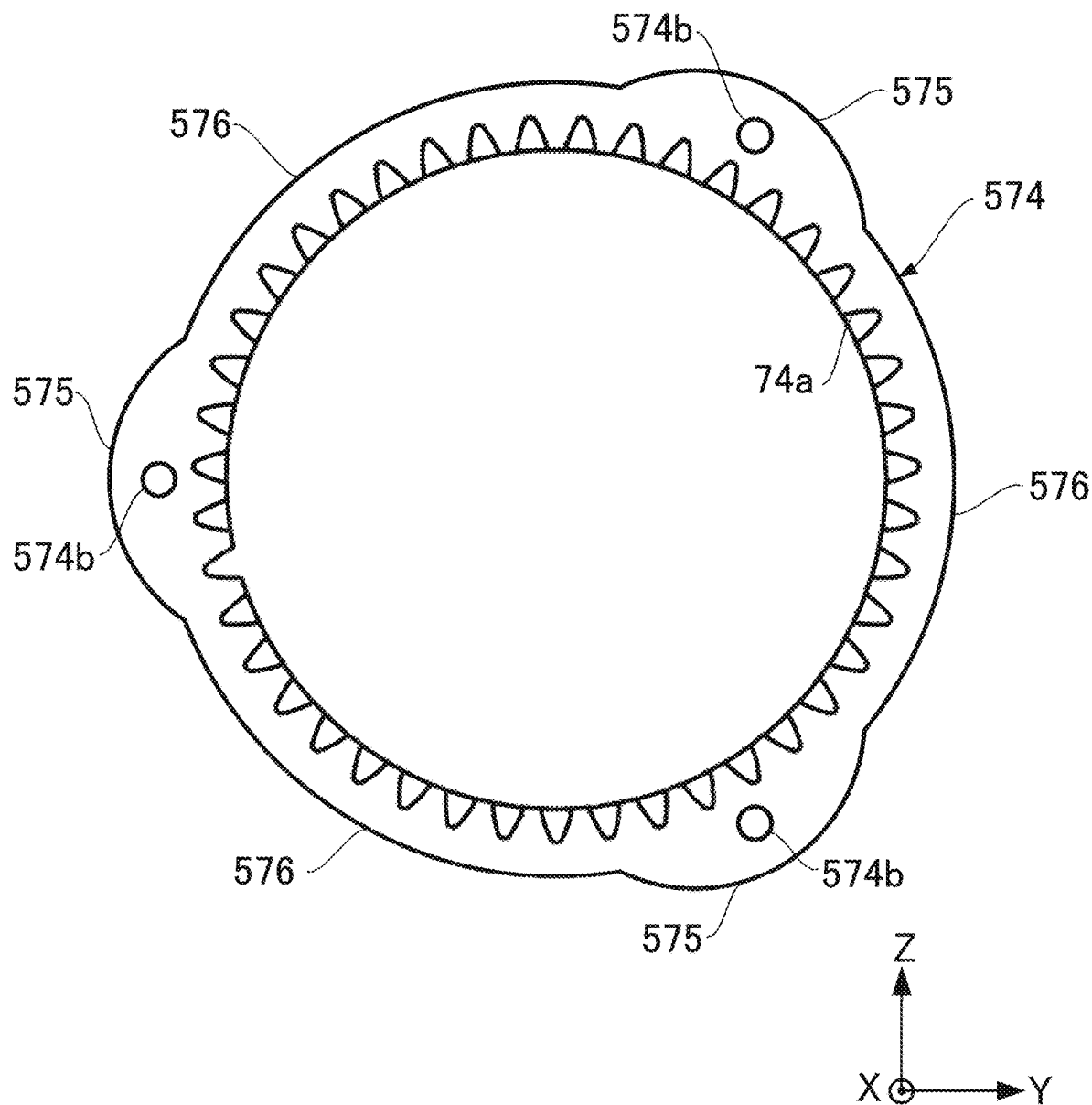
FIG. 22 is a diagram depicting an inner gear according to a fifth embodiment according to the present disclosure.

A fifth embodiment will be explained next in reference to FIG. 22 through FIG. 24. As depicted in FIG. 22, three movement limiting raised portions 575 that extend in the X axial direction are formed, with equal spacing, on the outer peripheral surface of the inner gear 574. The movement limiting raised portion 575 has a chevron shape that bulges outward. Three arc portions 576 that structure the outer peripheral surface of the inner gear 574 are formed between the movement limiting raised portions 575. These three arc portions 576 are formed in a state pulled in toward the axis side (the inside) in the same way as with the arc portions 476 of the fourth embodiment, depicted in FIG. 21.

Figure 23:
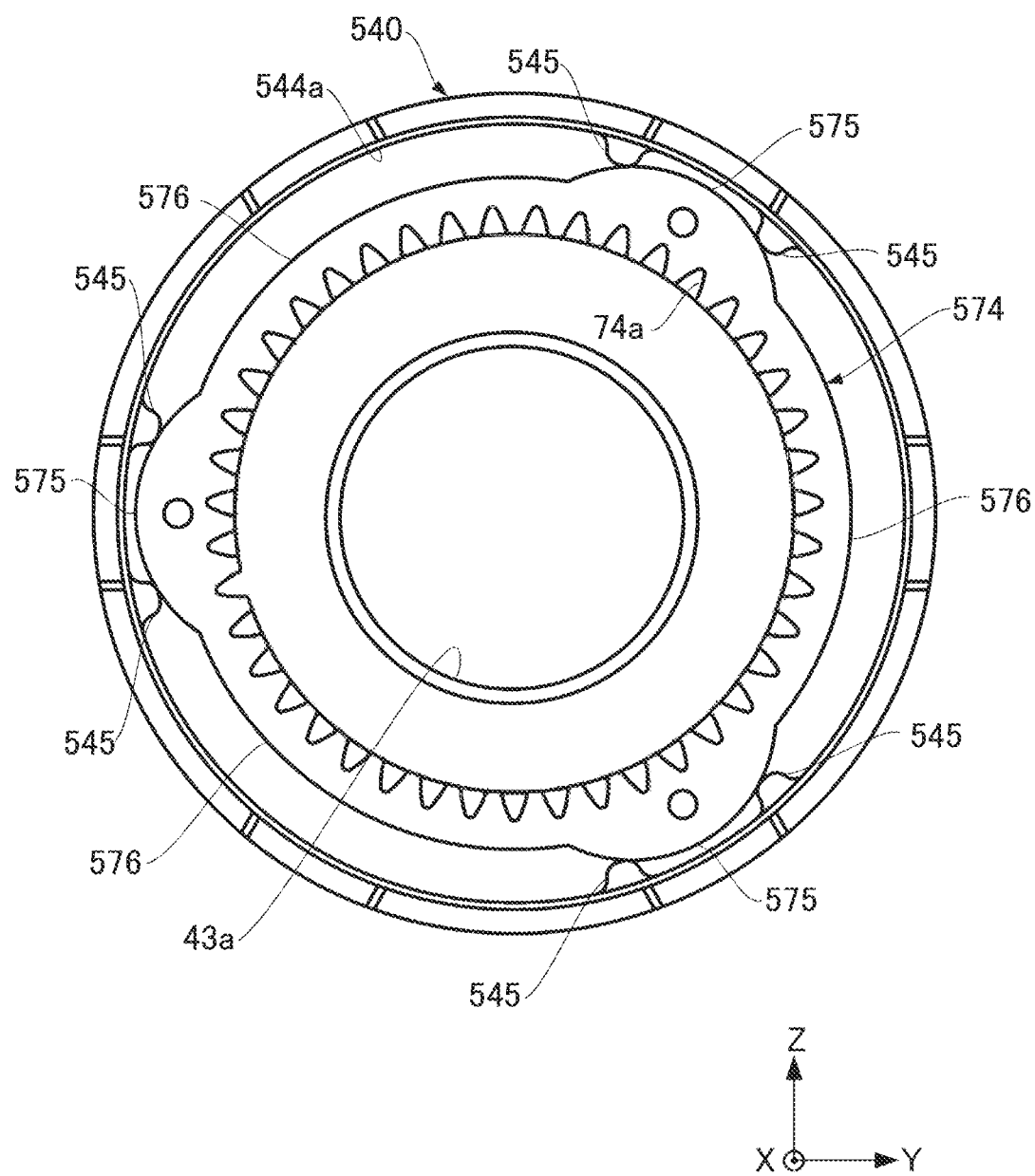
FIG. 23 is a diagram depicting the state wherein the inner gear is housed in the second housing according to the fifth embodiment according to the present disclosure.
Figure 24:
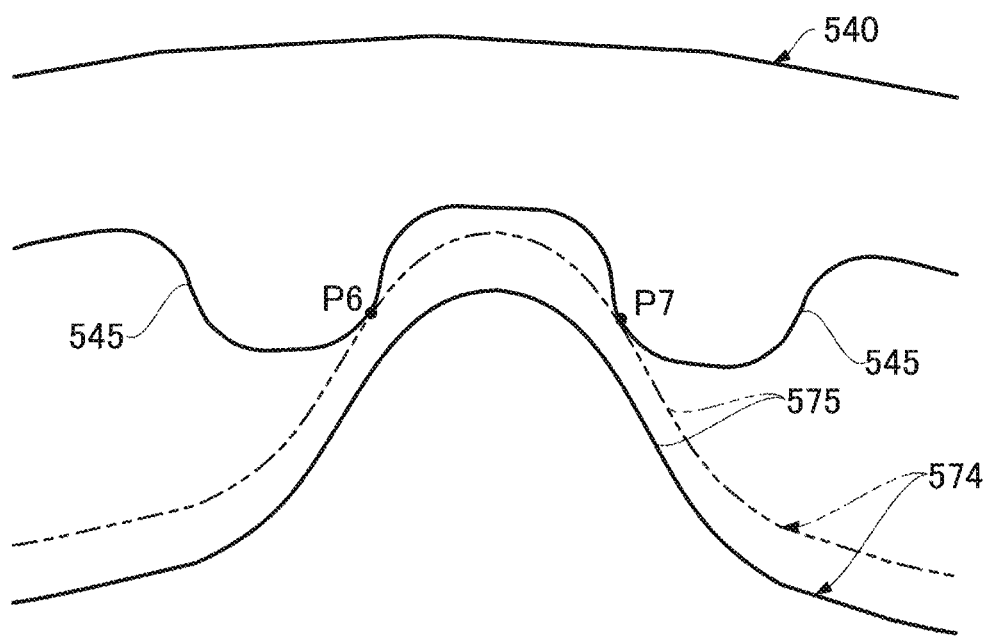
FIG. 24 is an explanatory diagram focusing on the location of contact between the inner gear and the second housing according to the fifth embodiment according to the present disclosure.

As depicted in FIG. 23, three pairs of stoppers 545 are also formed with equal spacing on the inner wall 544a of the second housing 540, inserted between the movement limiting raised portions 575. The cross sections of the pairs of stoppers 545 are the same shapes as the cross sections of the pairs of stoppers 45 in the first embodiment, having chevron cross-sectional shapes, as depicted in FIG. 10. Note that when the inner gear 574 moves within the second housing 540, the movement limiting raised portions 575 and the pairs of stoppers 545 make contact, limiting the movement of the inner gear 574.

Here the contact between each of the movement limiting raised portions 575 that have the chevron cross-sectional shapes and the pairs of stoppers for 545 will be explained in reference to FIG. 24. In FIG. 24, the inner gear 574, when the actuator is not operating, is indicated by the solid line. Moreover, the inner gear 574, depicted by the double dotted line, is in the state wherein it has moved upward, through the operation of the actuator, to contact the second housing 540. The contact between the pair of stoppers 545 and the movement limiting raised portions 575 is contact between convex curved surfaces, so will be linear contact at the contact points P6 and P7 between the pairs of stoppers 545 and the movement limiting raised portions 575. On the other hand, the arc portions 576 are formed in a state that is pulled in toward the axis side (inside), as described above, and thus do not make contact with the inner wall 544a of the second housing 540. In this way, the area of contact between the movement limiting raised portions 575 and the pairs of stoppers 545, which contact with linear contact, reducing the transmission of vibration from the inner gear 574, during operation, to the second housing 540. This suppresses the vibration of the second housing 540, which can suppress the noise that is produced from the planetary gear device.

EXAMPLE 6

Figure 25:
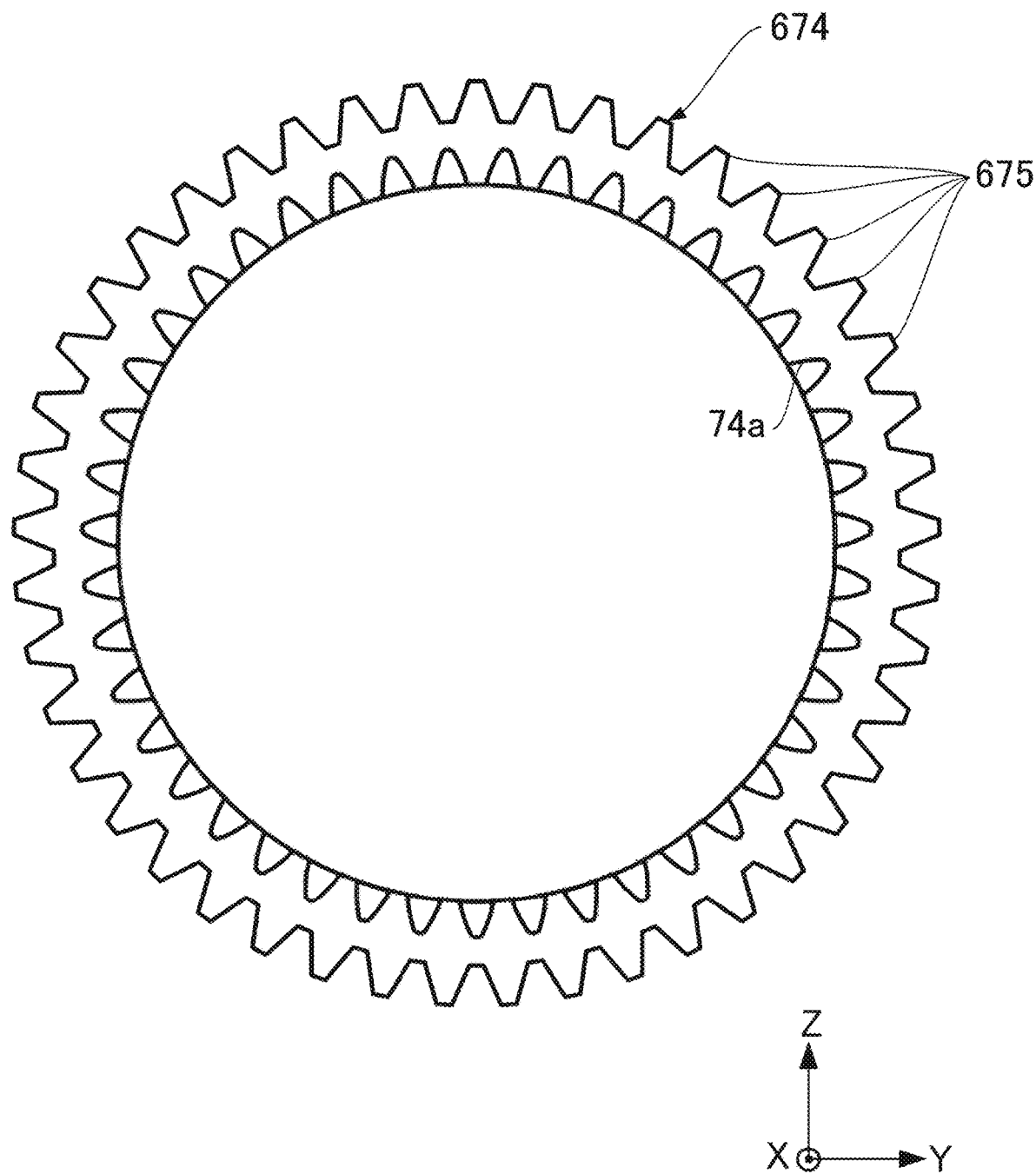
FIG. 25 is a diagram depicting an inner gear according to a sixth embodiment according to the present disclosure.

A sixth embodiment will be explained next in reference to FIG. 25 through FIG. 27. As depicted in FIG. 25, a plurality of movement limiting raised portions 675, structured from external teeth that are cut along the X axial direction is formed with equal spacing on the outer peripheral surface of the inner gear 674. The movement limiting raised portions 675 have a cross-sectional shape that is essentially trapezoidal.

Figure 26:
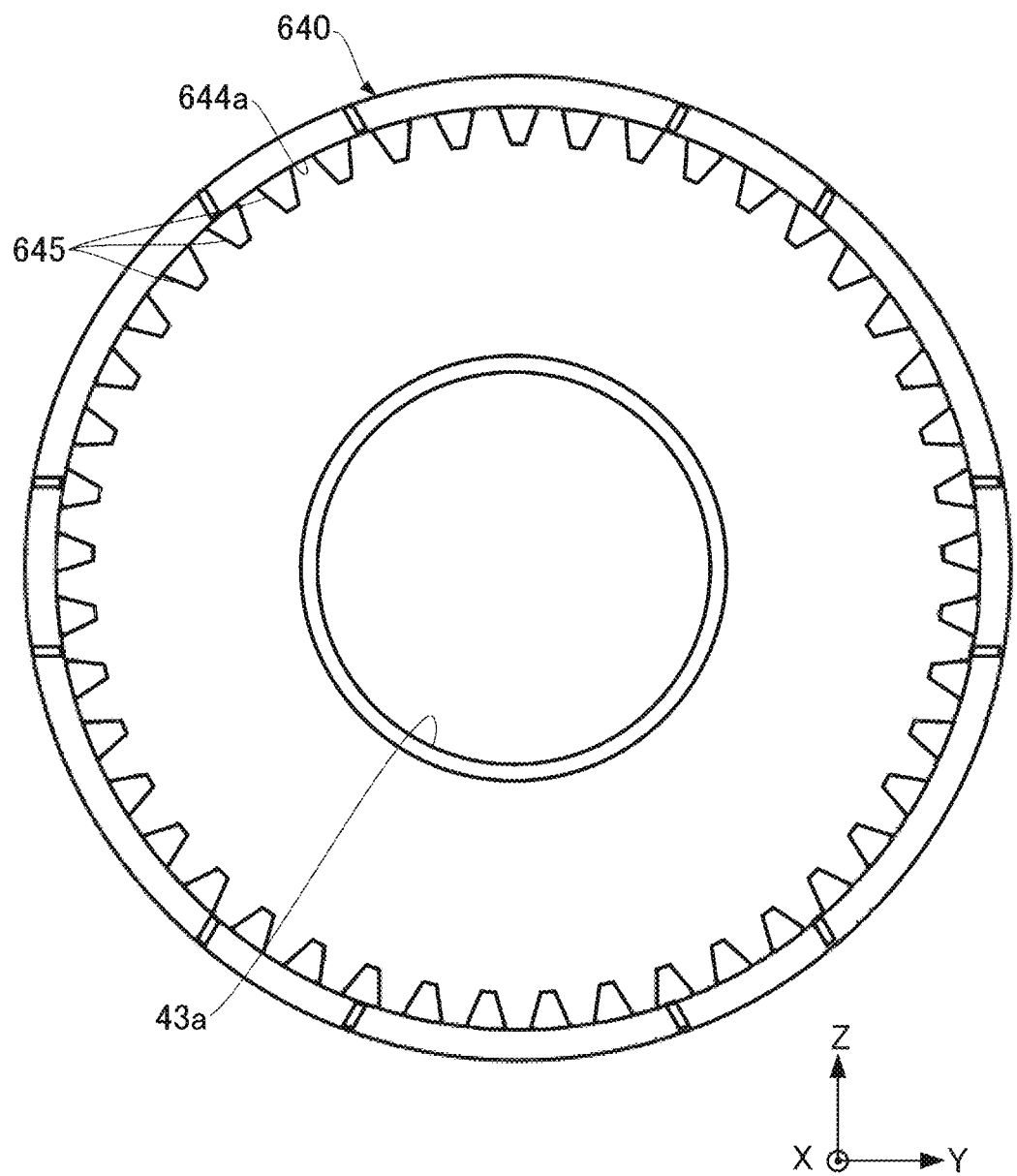
FIG. 26 is a diagram depicting a second housing according to a sixth embodiment according to the present disclosure.
Figure 27:
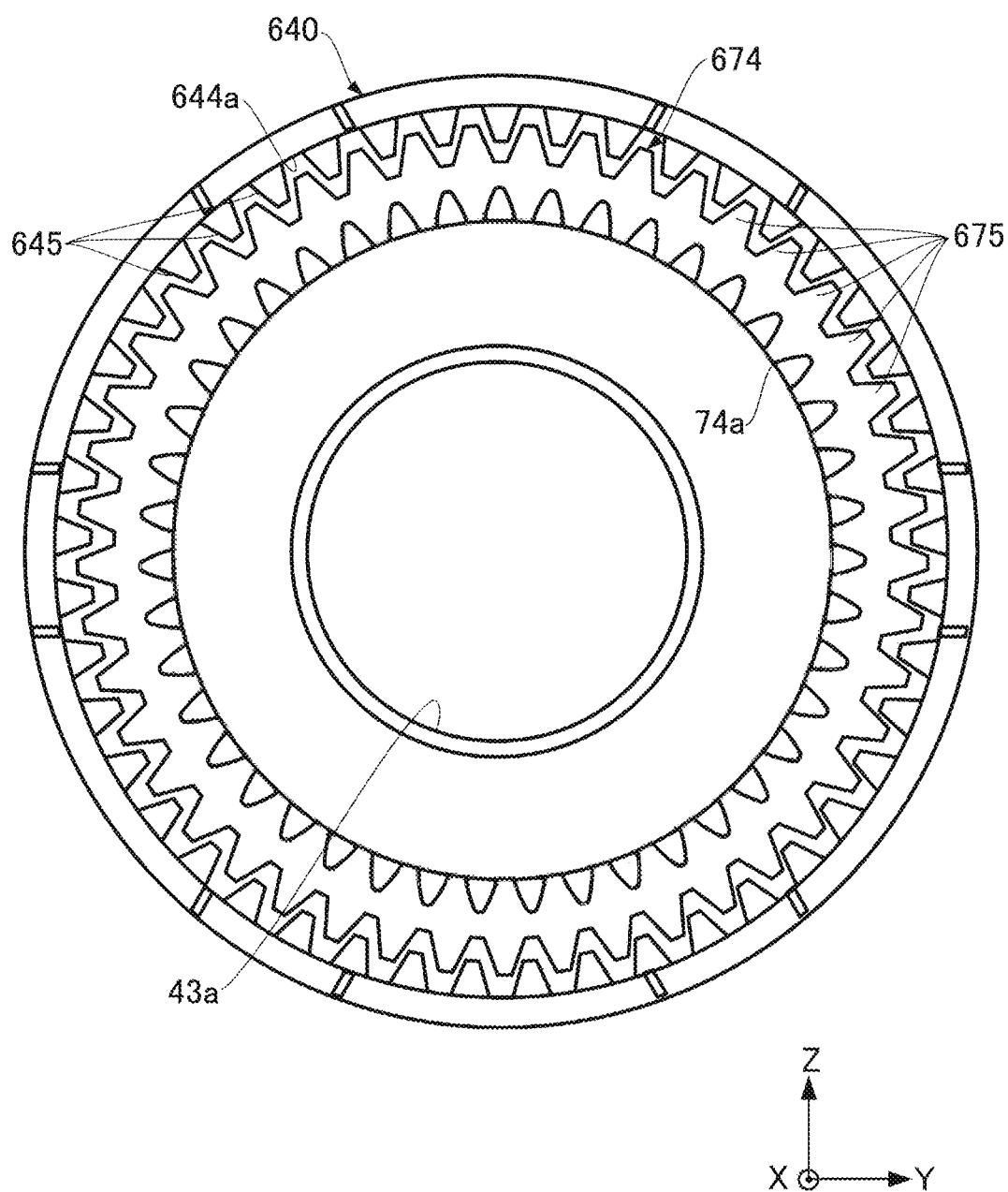
FIG. 27 is a diagram depicting the state wherein the inner gear is housed in the second housing according to the sixth embodiment according to the present disclosure.

As depicted in FIG. 26, a plurality of stoppers 645 that are inserted between the movement limiting raised portions 675 (FIG. 25) are structured from inner teeth that are cut along the X axial direction on the inner wall 644a of the second housing 640. The stoppers 645 have a cross-sectional shape that is essentially trapezoidal. Note that, as depicted in FIG. 27, the inner gear 674 is contained within the second housing 640, and when the inner gear 674 moves from this state, the plurality of movement limiting raised portions 675 contact the plurality of stoppers 645. The movement of the inner gear 674 is limited thereby. Note that the movement limiting raised portions 675 and stoppers 645 are formed in more locations when compared to the forms described above. Because of this, while the movement limiting raised portions 675 and the stoppers 645 make contact in many locations, each individual contact location is limited to a narrow range. Because of this, the propagation to the second housing 640 of the vibrations from the inner gear 674 during operation is reduced. This suppresses the vibration of the second housing 640, which can suppress the noise that is produced from the planetary gear device.

Moreover, the outer teeth that are formed on the outer peripheral surface of the inner gear 674 are not limited to outer teeth that are cut along the X axial direction, but rather may be outer teeth that are cut along a direction that is inclined in respect to the X axial direction. The inner teeth that are formed on the inner wall 644a of the second housing 640 are not limited to inner teeth that are cut along the X axial direction, but rather may be inner teeth that are cut along a direction that is inclined in respect to the X axial direction.

If the outer teeth that are formed on the outer peripheral surface of the inner gear 674 and the inner teeth that are formed on the inner wall 644a of the second housing 640 are cut along a direction that is inclined in respect to the X axial direction, there is no particular limitation on the angle thereof, and, for example, if the inner gear is a helical gear, the incline may be at an angle that is the same as the angle of the teeth, or may be an incline at an angle that is opposite of the angle of the teeth, or may be inclined at some different angle.

If the angle of the outer teeth that are formed on the outer peripheral surface of the inner gear 674 and of the inner teeth that are formed on the inner wall 644a of the second housing 640 is the same as the angle of the helical gear of the inner gear, this can reduce the amount of thrust produced within the planetary gear device.

EXAMPLE 7

A seventh embodiment will be explained next in reference to FIG. 28 through FIG. 30. In the seventh embodiment, the locations wherein the pairs of stoppers and the movement limiting raised portions are provided are switched, where the movement limiting raised portions are provided on the inner peripheral surface of the second housing and the pairs of stoppers are provided on the outer peripheral surface of the inner gear.

Figure 28:
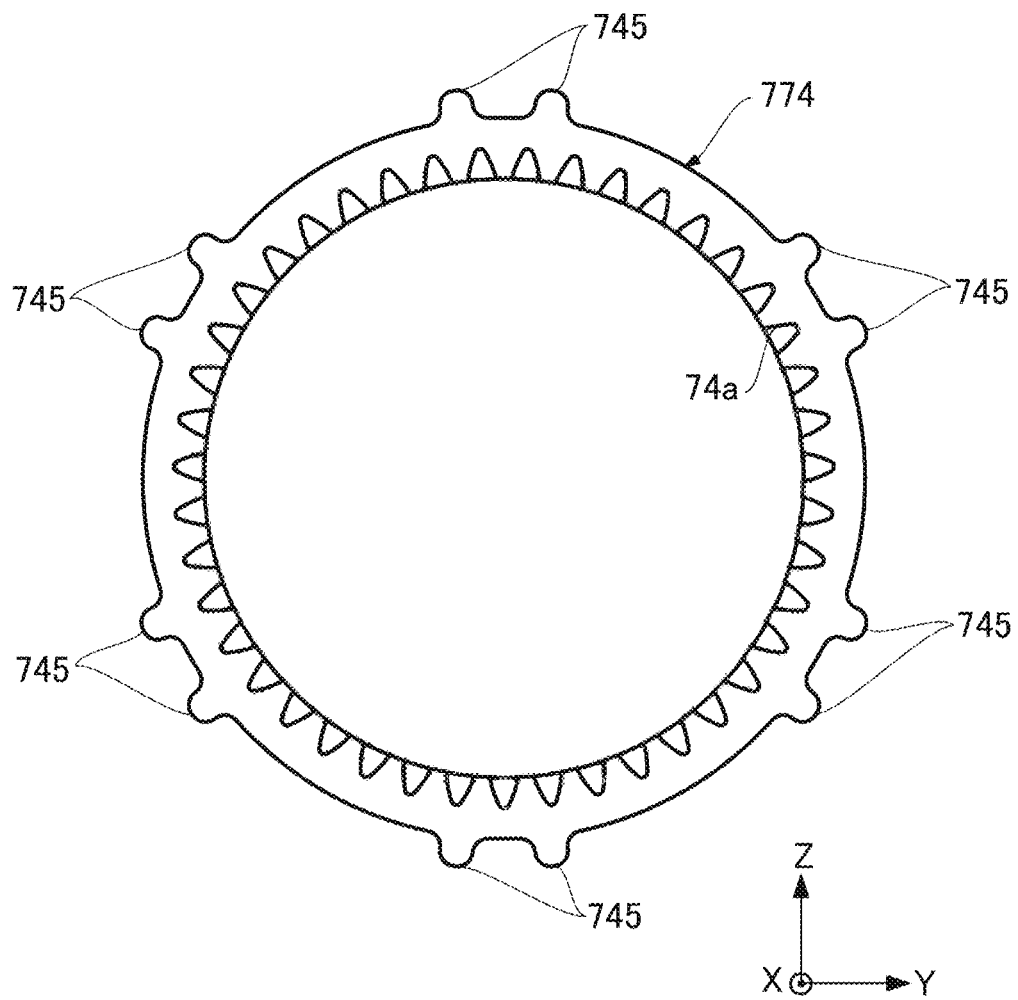
FIG. 28 is a diagram depicting an inner gear according to a seventh embodiment according to the present disclosure.

As depicted in FIG. 28, six stoppers 745 that extend in the X axial direction are formed, with equal spacing, on the outer peripheral surface of the inner gear 774. The cross sections of the pairs of stoppers 745 are the same shapes as the cross sections of the pairs of stoppers 45 in the first embodiment, having chevron cross-sectional shapes, as depicted in FIG. 10. Movement limiting raised portions 775, formed on the second housing 740, depicted in FIG. 29, are inserted between the pairs of stoppers 745.

Figure 29:
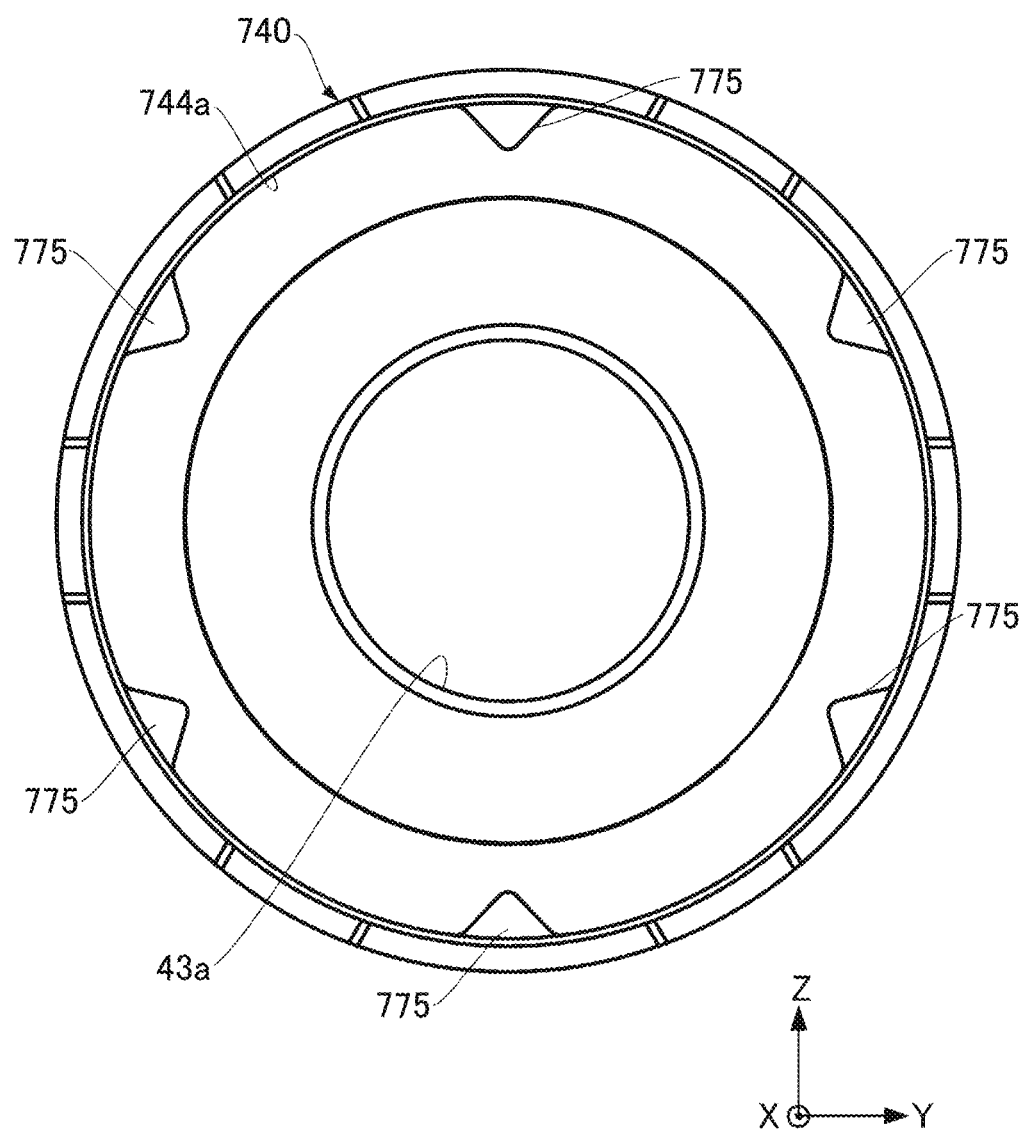
FIG. 29 is a diagram depicting a second housing according to the seventh embodiment according to the present disclosure.
Figure 30:
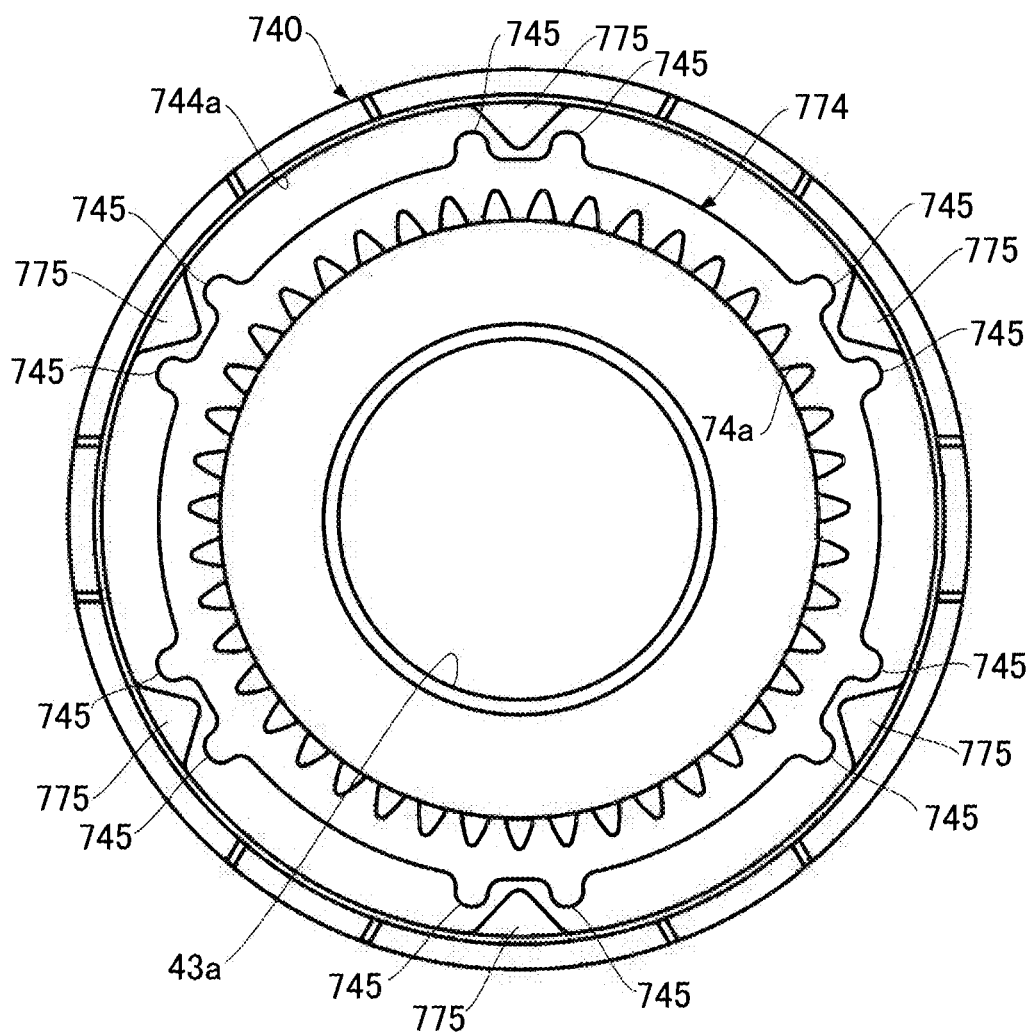
FIG. 30 is a diagram depicting the state wherein the inner gear is housed in the second housing according to the seventh embodiment according to the present disclosure.

As depicted in FIG. 29, six movement limiting raised portions 775 that extend in the X axial direction are formed, with equal spacing, on the second housing 740. The cross sections of the movement limiting raised portions 775 are the same shapes as the cross sections of the movement limiting raised portions 75 in the first embodiment, having triangular cross-sectional shapes, as depicted in FIG. 11. Note that, as depicted in FIG. 30, the inner gear 774 is contained within the second housing 740, and when the inner gear 774 moves from this state, the plurality of movement limiting raised portions 775 contact the pairs of stoppers 745, constraining the movement of the inner gear 774. At this time, the contact between the movement limiting raised portions 775 and the pairs of stoppers 745 can be linear contact, the same as the form of contact in the first embodiment. Because of this, the propagation to the second housing 740 of the vibrations from the inner gear 774 during operation is reduced. This suppresses the vibration of the second housing 740, which can suppress the noise that is produced from the planetary gear device.

EXAMPLE 8

An eighth embodiment will be explained next in reference to FIG. 31 through FIG. 33. In the eighth embodiment, the spacing with which the pairs of stoppers and the movement limiting raised portions are laid out is with unequal spacing rather than with equal spacing.

Figure 31:
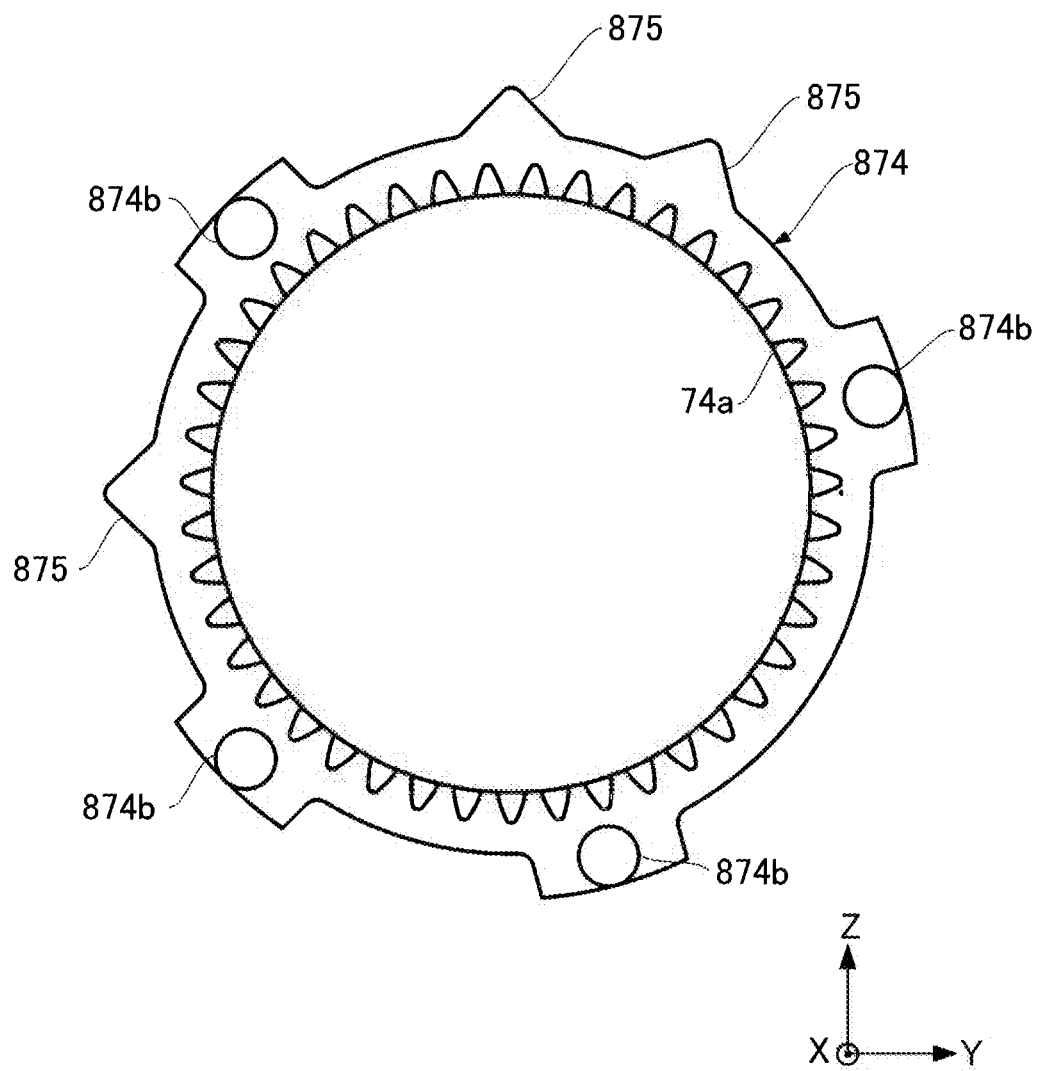
FIG. 31 is a diagram depicting an inner gear according to an eighth embodiment according to the present disclosure.

As depicted in FIG. 31, three movement limiting raised portions 875 that extend in the X axial direction are formed on the outer peripheral surface of the inner gear 874. The movement limiting raised portions 875 are arranged with unequal spacing. The cross sections of the movement limiting raised portions 875 are the same shapes as the cross sections of the movement limiting raised portions 75 in the first embodiment, having triangular cross-sectional shapes, as depicted in FIG. 11.

Figure 32:
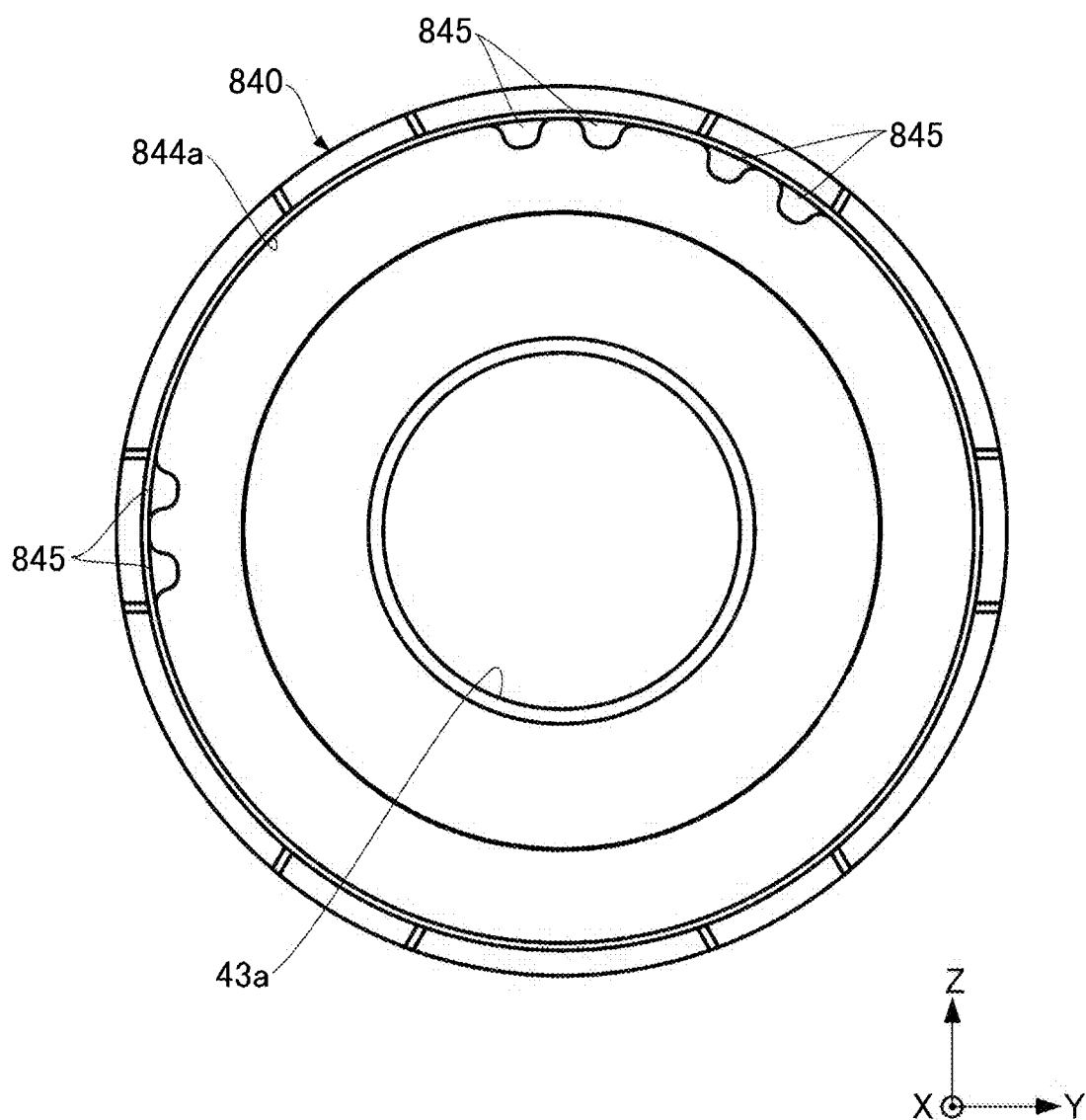
FIG. 32 is a diagram depicting a second housing according to the eighth embodiment according to the present disclosure.
Figure 33:
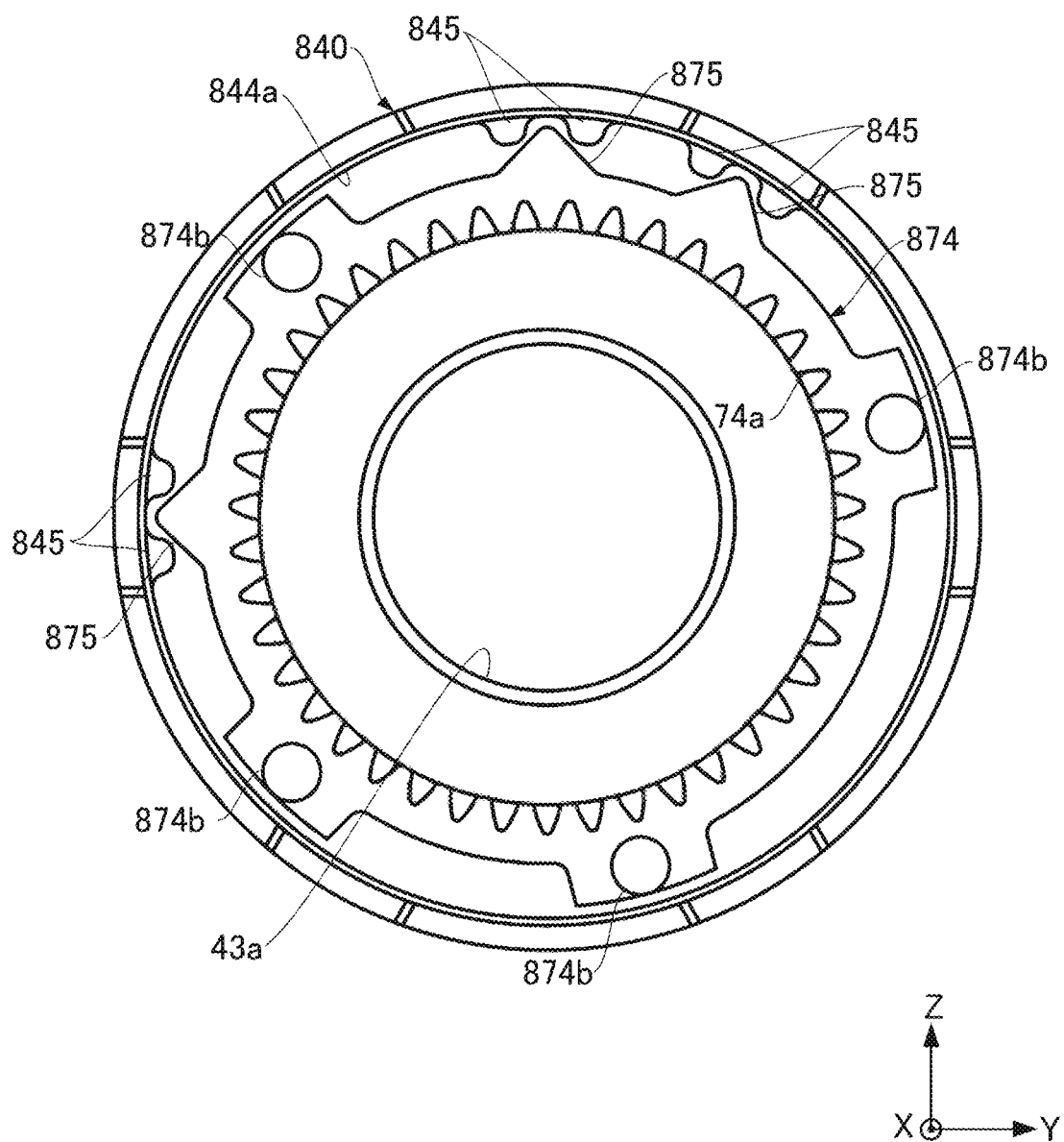
FIG. 33 is a diagram depicting the state wherein the inner gear is housed in the second housing according to the eighth embodiment according to the present disclosure.

As depicted in FIG. 32, three pairs of stoppers 845 are also formed with unequal spacing on the inner wall 844a of the second housing 840, inserted between the movement limiting raised portions 875. The cross sections of the pairs of stoppers 845 are the same shapes as the cross sections of the pairs of stoppers 45 in the first embodiment, having chevron cross-sectional shapes, as depicted in FIG. 10. Note that, as depicted in FIG. 33, the inner gear 874 is contained within the second housing 840, and when the inner gear 874 moves from this state, the plurality of movement limiting raised portions 875 contact the pairs of stoppers 845, constraining the movement of the inner gear 874. At this time, the contact between the movement limiting raised portions 875 and the pairs of stoppers 845 can be linear contact, the same as the form of contact in the first embodiment. Because of this, the propagation to the second housing 840 of the vibrations from the inner gear 874 during operation is reduced. This suppresses the vibration of the second housing 840, which can suppress the noise that is produced from the planetary gear device.

Note that the arc portions 376 depicted in FIG. 18 may be formed at locations wherein there are spaces through the arrangement, with unequal spacing, of the movement limiting raised portions 875 and the pairs of stoppers 845. This makes it possible to limit the movement of the inner gear 874 while suppressing transmission of vibration from the inner gear 874.

EXAMPLE 9

A ninth embodiment will be explained next in reference to FIG. 34 through FIG. 36. In the ninth embodiment, the stoppers that contact the movement limited raised portions are laid out with a one-to-one relationship with the movement limited raised portions, rather than being laid out in pairs.

Figure 34:
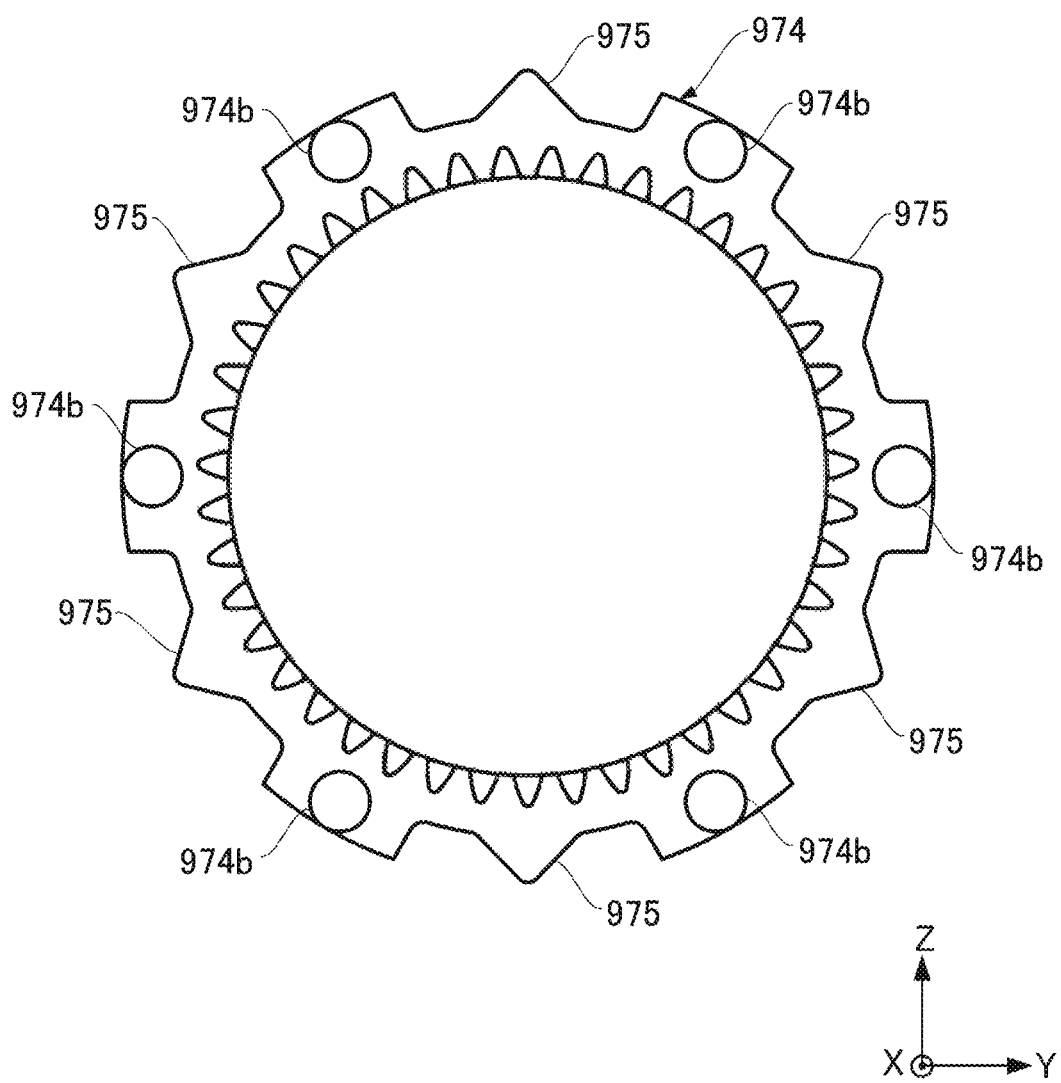
FIG. 34 is a diagram depicting an inner gear according to a ninth embodiment according to the present disclosure.

As depicted in FIG. 34, six movement limiting raised portions 975 that extend in the X axial direction are formed, with equal spacing, on the outer peripheral surface of the inner gear 974. The cross sections of the movement limiting raised portions 975 are the same shapes as the cross sections of the movement limiting raised portions 75 in the first embodiment, having triangular cross-sectional shapes, as depicted in FIG. 11.

Figure 35:
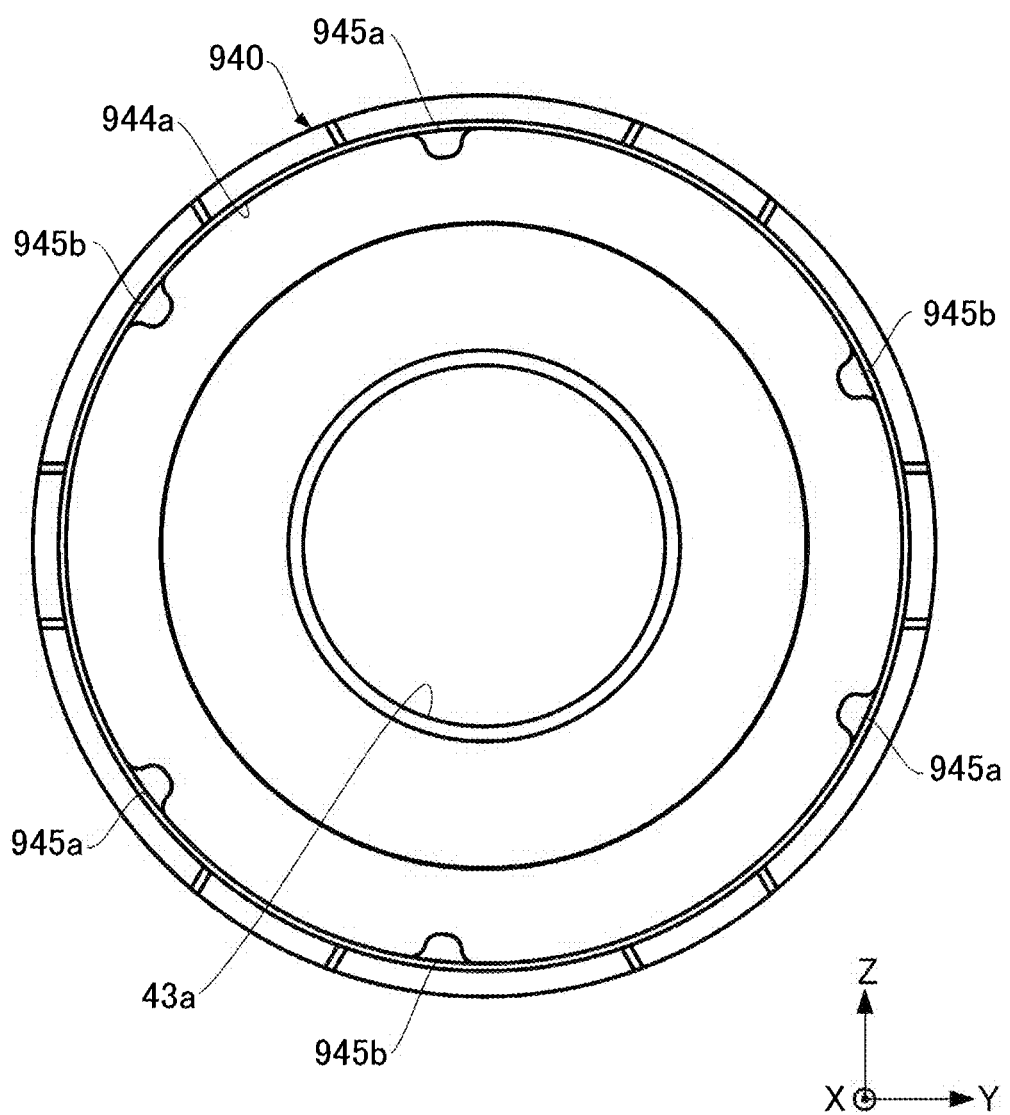
FIG. 35 is a diagram depicting a second housing according to the ninth embodiment according to the present disclosure.

As depicted in FIG. 35, three first stoppers 945a are formed with equal spacing, and three second stoppers 945b are formed with equal spacing, on the inner wall 344a of the second housing 340. The positions wherein the first stoppers 945a are arranged and the positions wherein the second stoppers 945b are arranged are shifted from each other in the circumferential direction. The cross sections of the first stoppers 945a and the cross sections of the second stoppers 945b are the same shapes as the cross sections of the pairs of stoppers 45 in the first embodiment, having chevron cross-sectional shapes, as depicted in FIG. 10.

Figure 36:
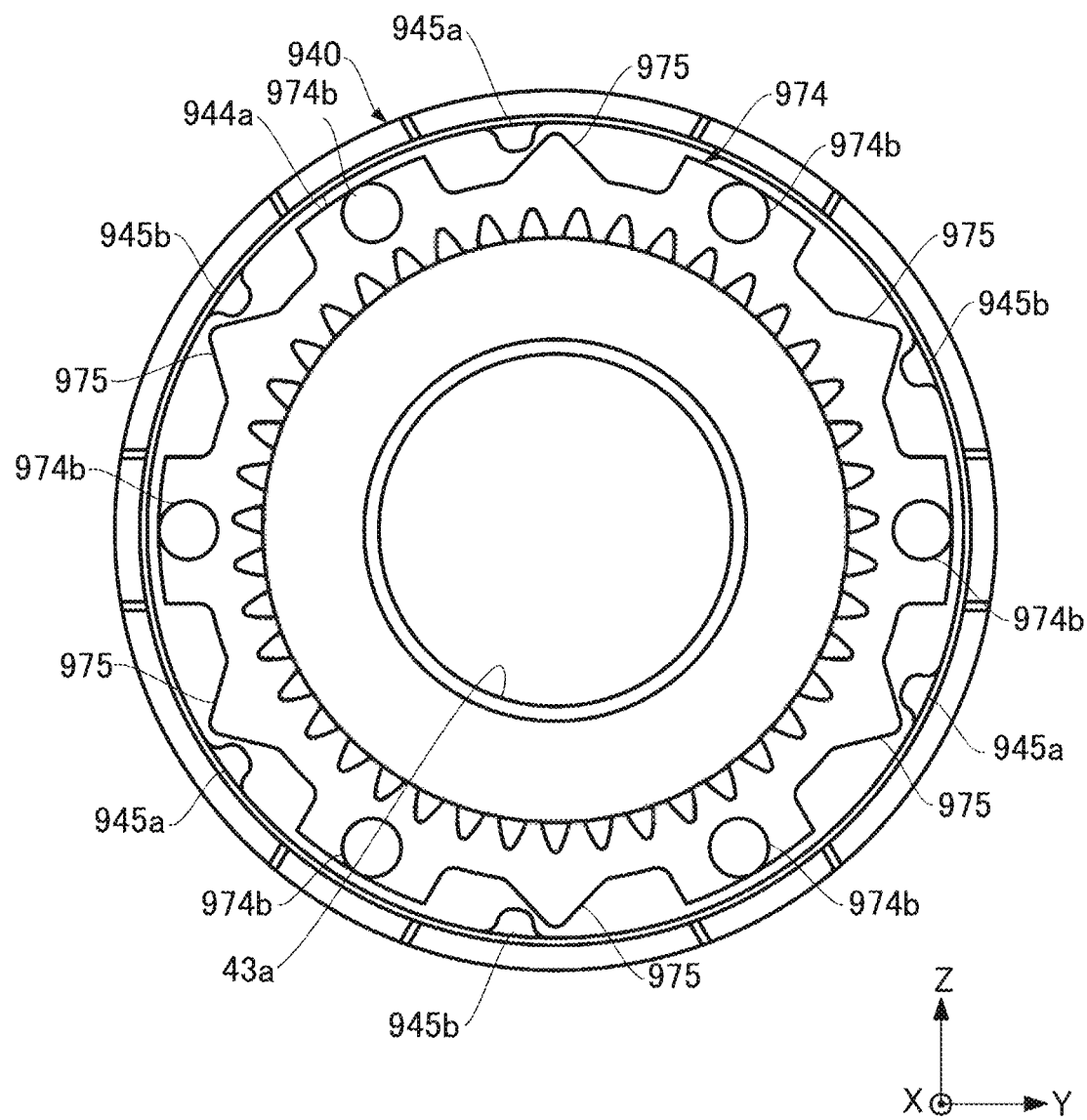
FIG. 36 is a diagram depicting the state wherein the inner gear is housed in the second housing according to the ninth embodiment according to the present disclosure.

Note that, as depicted in FIG. 36, when the inner gear 974 is contained within the second housing 940, the first stopper 945a is disposed on one of the two sides of the nearest movement limiting raised portion 975. On the other hand, a second stoppers 945b is disposed on the other of the two sides of the nearest movement limiting raised portion 975. Here, explaining an example of a movement limiting raised portion 975 that protrudes upward in FIG. 36, the "one side" is the left side of the movement limiting raised portion 975 in the figure, the side wherein the first stopper 945a is disposed. Moreover, the "other side" is the right side in the figure of the movement limiting raised portion 975 that protrudes upward.

When the inner gear 974 rotates in the counterclockwise direction in the figure (the second direction) from the state depicted in FIG. 36, the movement limiting raised portion 975 makes contact with the first stopper 945a, limiting the rotation of the inner gear 974. Additionally, when the inner gear 974 rotates in the clockwise direction in the figure (the first direction), the movement limiting raised portion 975 makes contact with the second stopper 945b, limiting the rotation of the inner gear 974. Moreover, when the inner gear 974 moves in the radial direction, the movement limiting raised portion 975 makes contact with the first stopper 945a and the second stopper 945b, limiting the movement of the inner gear 974. The contact of limiting raised portion 975 with the first stopper 945a and the second stopper 945b in this way can be linear contact, the same as the form of contact in the first embodiment. Because of this, the propagation to the second housing 940 of the vibrations from the inner gear 974 during operation is reduced. This suppresses the vibration of the second housing 940, which can suppress the noise that is produced from the planetary gear device.

MODIFIED EXAMPLES

The present disclosure is not limited to the embodiments described above, but rather a variety of modifications and applications are possible. While in the embodiments set forth above, the cross sections of the pairs of stoppers 45 were chevron shapes and the cross sections of the movement limiting raised portions 75 were triangular, instead the cross-sectional shapes may be switched, with the cross sections of the pairs of stoppers being triangular and the cross sections of the movement limited raised portions that are inserted between the stoppers being chevron shapes.

Moreover, there is no particular limitation on the number of locations wherein the pairs of stoppers 45 and the corresponding movement limiting raised portions 75 are disposed, where it may be a larger number of locations than the six locations given in the embodiments described above, or a smaller number of locations. When the number of locations is small, arc portions 376, depicted in FIG. 18, may be provided so as to complement the functioning thereof. This makes it possible to stabilize the orientation of the inner gear during operation, making it possible to suppress the noise that is produced from the planetary gear device.

Moreover, there is no limitation thereto, where the linear contact may be achieved through the second housing 40 having locally concave parts with large curvature, the inner gear 74 having convex curved surfaces with less curvature, where the concave curved surfaces with high curvature contact the convex curved surfaces that are bulging. The actual structure for achieving linear contact is arbitrary.

Note that in another example for achieving the linear contact described above, the configuration of the inner gear in the location that makes linear contact may be swapped with the configuration of the second housing.

Moreover, while the actuator 1 was provided with a two-stage planetary gear mechanism of a first planetary gear mechanism 70 and a second planetary gear mechanism 80, as the reduction mechanism for reducing the rotation of the motor 10, the number of stages can be set arbitrarily. For example, the reduction ratio may be increased through providing three or more stages of planetary gear mechanisms, or the structure may include only a single-stage planetary gear mechanism.

Moreover, in the embodiments set forth above, a configuration was used wherein the structure wherein the housing and the inner gear were separate was applied only to the first planetary gear mechanism 70, which is the first-stage mechanism that rotates at a high speed, and a housing that was formed with inner teeth on the inner peripheral surface thereof was used in the second planetary gear mechanism 80, which is the second-stage mechanism that rotates at a low speed. However, a structure wherein the housing and the inner gear are separated may be used also in the second planetary gear mechanism 80 that is the second-stage mechanism, to achieve a reduction in vibration and noise.

Moreover, while in the embodiments set forth above the explanation was for a case wherein a reduction gear was used for reducing the rotation of the motor 10 and outputting it from an output gear 86*a*, there is no limitation to this application. For example, the part that is provided with the output shaft 86, depicted in FIG. 8, may be used as the input side and connected to the rotary shaft of a motor, and the part that is provided with the sun gear 71, depicted in FIG. 7, may be used as the output side, and connected to the output shaft. This would increase and output the rotation of the motor, to be used as an increasing the mechanism. In this case as well, preferably the structure wherein the inner gear and the housing are separated is employed due to the higher-speed operation of the first planetary gear mechanism 70 that is shown in FIG. 7. Moreover, because the rotation of the motor is transmitted directly to the second planetary gear mechanism 80 that is depicted in FIG. 8, preferably the structure wherein the inner gear and the housing are separated is employed, as necessary. Moreover, the present disclosure may also be applied to industrial equipment such as robots and machine tools, and to playground equipment such as so-called "teacups."

When using the present disclosure in various applications, the separate structural units for the inner gear and the housing are applied to the planetary gear mechanism that operates at the highest speed, when planetary gear mechanisms are provided in three or more stages. This can reduce effectively the vibration and noise that is produced. Moreover, because there is little vibration and noise produced by the planetary gear mechanism that operates at the lowest speed, a structure is applied that is equipped with a housing where inner teeth are formed on the inner peripheral surface. This eliminates the need for the separate structures, more than necessary, for the inner gear and the housing, making it possible to avoid increases in the number of components and increases in the assembly operation and assembly costs, thus making it possible to suppress production costs.

Moreover, while in the embodiments set forth above the explanation was for each of the gears used for transmitting the power from the motor 10 to the output shaft 86 being helical gears, other gears may be used instead. Spur gears, for example, may be used. While this tends to produce more play at the locations wherein the teeth mesh, when compared to the case of using helical gears, the structure of the present disclosure can be used even in such a case to reduce (suppress) vibration and noise of the planetary gear device.

Moreover, while the explanations were for cases wherein they separate structural units for the inner gear and the housing were used in a portion of the planetary gear device, the application is not limited thereto, but may be used as a portion of another gear mechanism.

In the embodiment set forth above the planetary gear mechanism of the planetary gear device was achieved through three planetary gears; however, the present disclosure is not limited thereto. In the present disclosure, the planetary gear device may be achieved through the use of a planetary gear mechanism that uses, for example, a single planetary gear or a plurality, other than three, of planetary gears.

Moreover, the planetary gear device to which the present disclosure is applied may be applied to a variety of machines and apparatuses that use reducing mechanisms or increasing mechanisms, such as automobiles, robots, industrial equipment, playground equipment, or the like.

Moreover, instead of a structure that limits the movement within the housing through producing linear contact, along the axial direction, between the movement limiting raised portions (first raised portions) and pairs of stoppers (second raised portions) in the embodiments described above, the structure may be one wherein the movement is limited within the housing through point contact between the movement limiting raised portions (first raised portions) and the pairs of stoppers (second raised portions). More specifically, the pairs of stoppers in FIG. 5 (second raised portions) 45 may be of a shape that is discontinuous in the axial direction (with a plurality of gaps), and the movement limiting raised portions (first raised portions) 75 in FIG. 7 may be of a shape that is discontinuous in the axial direction (with a plurality of gaps).

EXAMPLE 2

Figure 37:
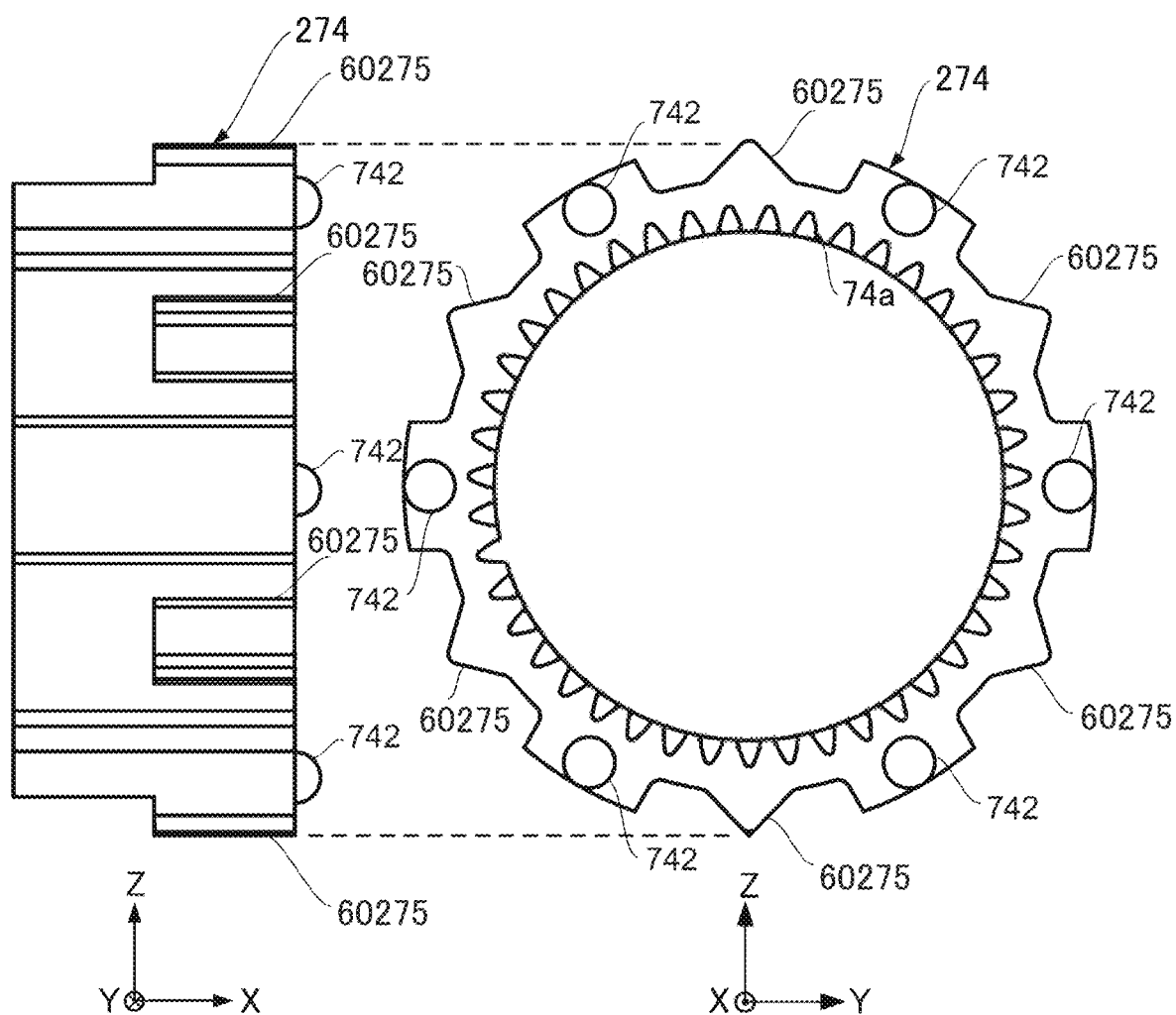
FIG. 37 is a diagram depicting an inner gear according to a second embodiment according to the present disclosure.
Figure 38:
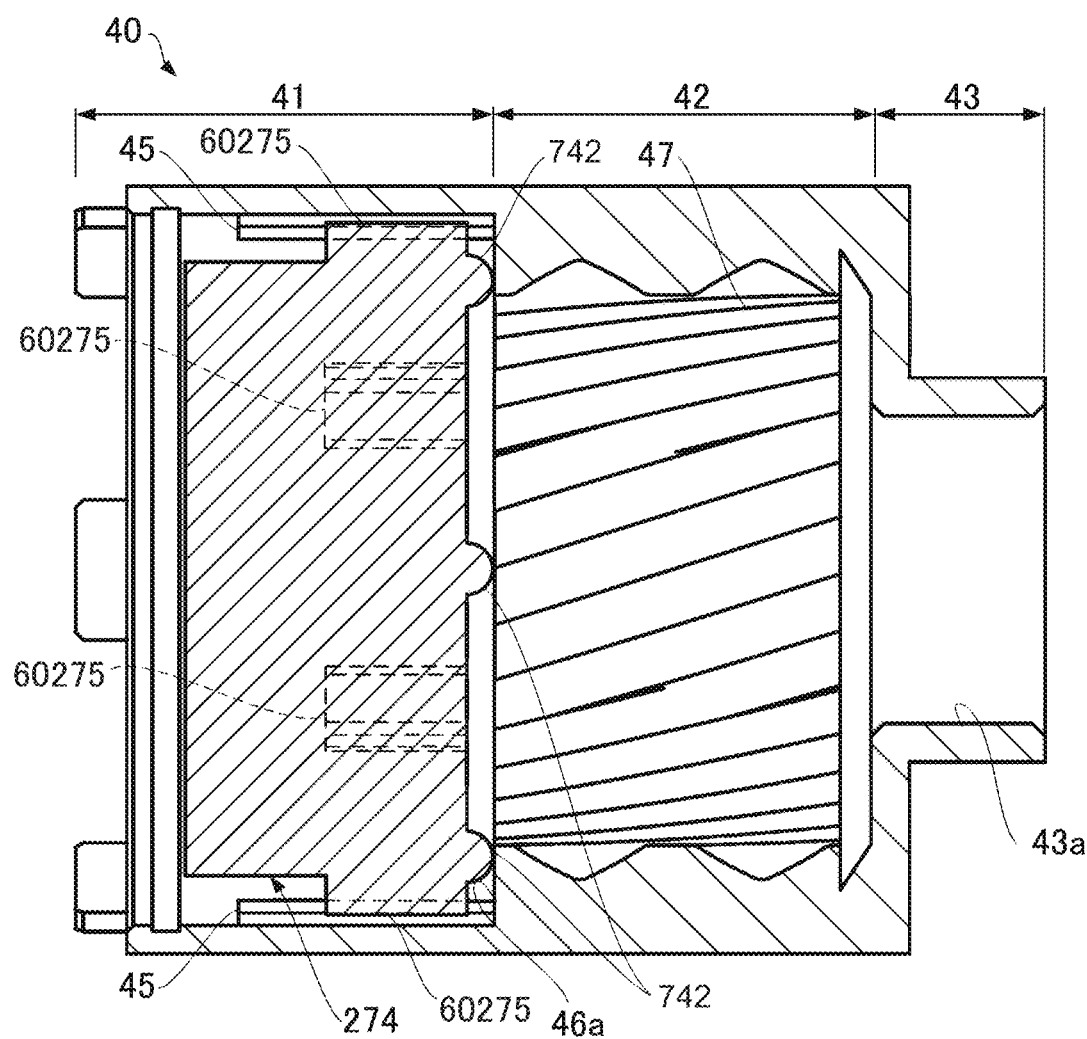
FIG. 38 is a cross-sectional diagram of a second housing according to a second embodiment according to the present disclosure.

In the first embodiment, six movement limiting raised portions 75, as depicted in FIG. 7, were formed with the full width of the inner gear 74. However, in the second embodiment, the six movement limiting raised portions 60275 are formed in only a portion of the range of the full width of the inner gear 274, where this point differs from that of the structure in the first embodiment. Note that the other structures are identical to the structures in the first embodiment. As depicted in FIG. 37, movement limiting raised portions 60275 are formed over only about half of the width in the axial direction (the X axial direction), on the +X axial direction side of the inner gear 274. Note that the cross-section of the movement limiting raised portion 60275 is a triangle. On the other hand, the movement limiting raised portions 60275 are not formed on the –X axial direction side of about the center of the inner gear 274. Through the inner gear 274 being contained at the first position 41 of the second housing 40, as depicted in FIG. 38, the movement limiting raised portions 60275 that are formed on only the +X axial direction side of the center are inserted between the pairs of stoppers 45. This makes it possible to make the length of linear contact along the X axial direction between the movement limiting raised portions 60275 and the stoppers 45 about half as long as in the first embodiment. Through this, the contact area between the outer peripheral surface of the inner gear 274 and the inner peripheral surface of the second housing 40 can be reduced even further, reducing the transmission of the vibration from the inner gear 274 to the second housing 40 during operation.

EXAMPLE 3

Figure 39:
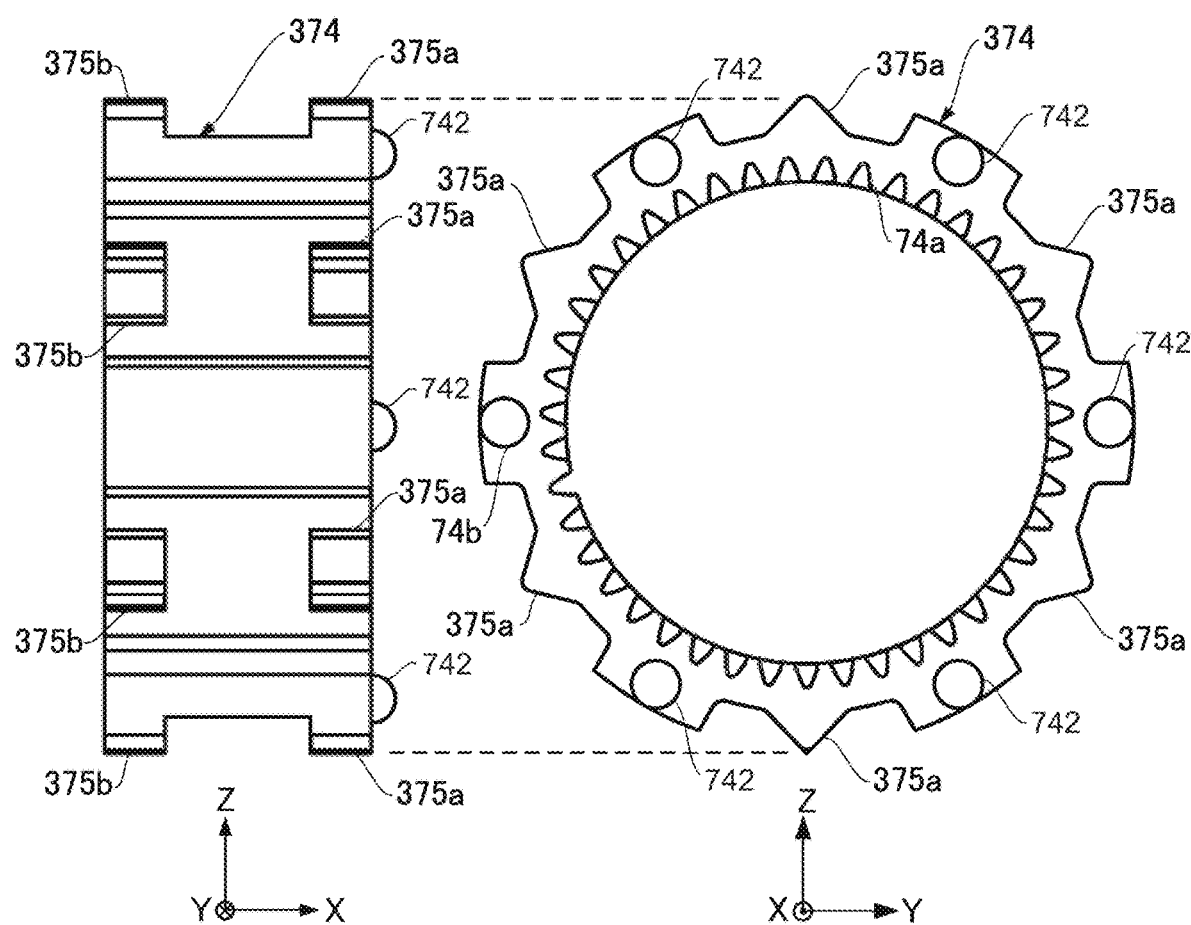
FIG. 39 is a diagram depicting an inner gear according to a third embodiment according to the present disclosure.
Figure 40:
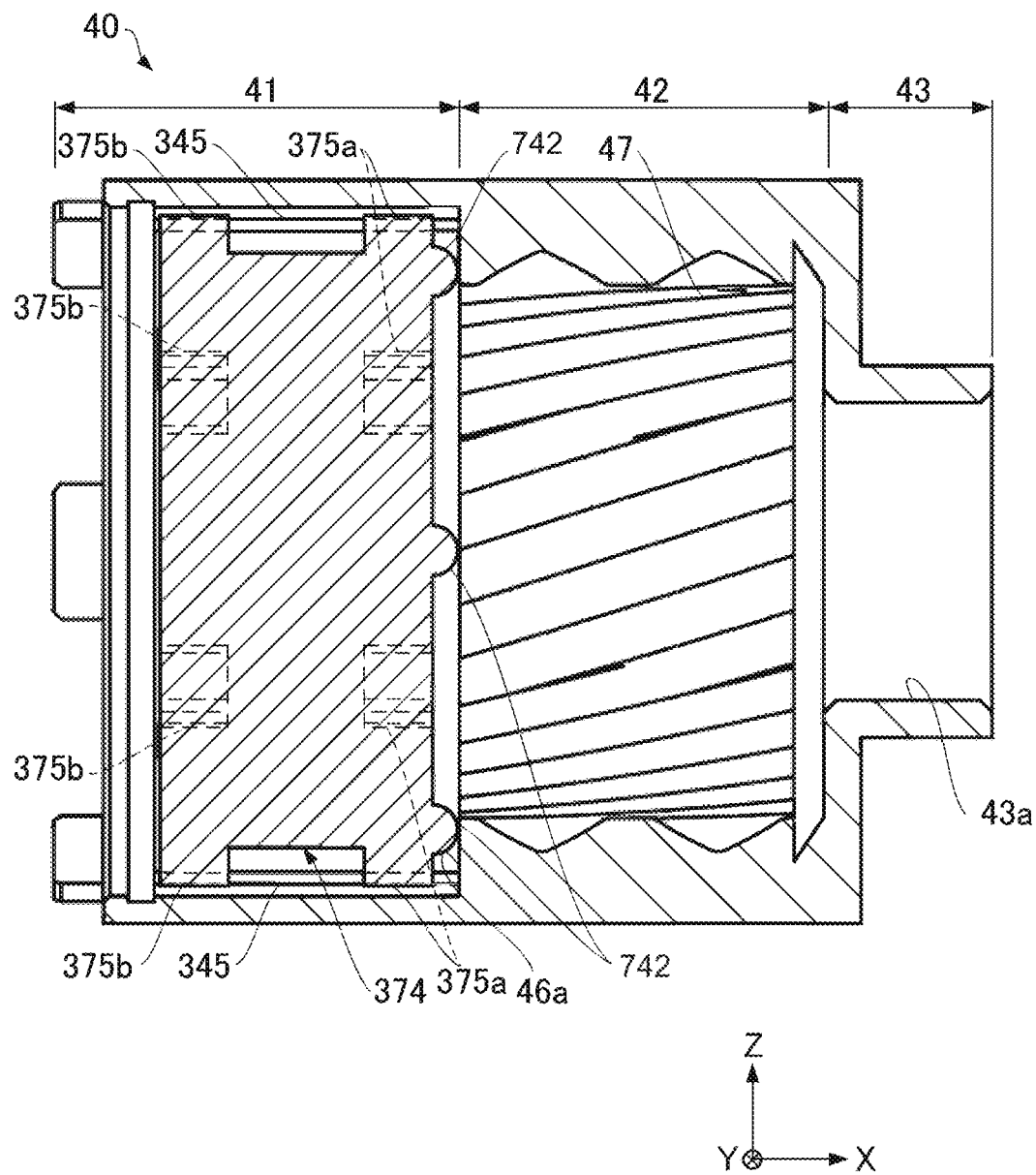
FIG. 40 is a cross-sectional diagram of a second housing according to a third embodiment according to the present disclosure.

The movement limiting raised portions 60275 provided on the inner gear 274 in the second embodiment were provided over about half the width thereof on the +X axial direction side. On the other hand, the movement limiting raised portions 375a are provided over about one quarter of the width, from the end portion in the +X axle direction side, as depicted in FIG. 39, on the inner gear 374 in the third embodiment, and movement limiting raised portions 375b are provided over about one quarter of the width thereof from the end portion in the –X axial direction side. The cross sections of the movement limiting raised portions 375a and of the movement limiting raised portions 375b are triangles. As depicted in FIG. 40, when the inner gear 374 is contained in the first position 41 of the second housing 40, the movement limiting raised portions 375a that are formed from the end portion on the +X axial direction side and the movement limiting raised portions 375b that are formed from the end portion on the –X axial direction side are inserted between pairs of stoppers 345. To enable insertion of the movement limiting raised portions 375b, formed on the end portion on the –X axial direction side, the pairs of stoppers 345 are formed so as to be longer in the –X axial direction when compared to the pairs of stoppers 45 in the second embodiment. Because of this, the pairs of stoppers 345 are provided extending over essentially the entire range of the space wherein the second housing 40 contains the inner gear 374, as depicted in FIG. 40.

The movement limiting raised portions 375a are formed over one quarter of the X axial direction width of the inner gear 374, and the movement limiting raised portions 375b are formed over one quarter said width. That is, both together are formed over about one half the width of the inner gear 374. Because of this, the contact area between the outer peripheral surface of the inner gear 374 and the inner peripheral surface of the second housing 40 can be reduced to half of that in the first embodiment, reducing the transmission of vibration from the inner gear 374 to the second housing 40 during operation. Moreover, because movement limiting raised portions 375a and movement limiting raised portions 375b that contact the pairs of stoppers 345 are provided at both end portions of the inner gear 374, the orientation of the inner gear 374 can be stabilized, without tilting. This can suppress the vibration and noise that is caused by the inner gear 374 during operation. Moreover, when the planetary gears mesh at the center of the inner gear 347, the vibration and noise can be suppressed even more through the provision of the stoppers 345 at both end portions.

Note that, as depicted in FIG. 40, the pairs of stoppers 345 that are formed on the second housing 40 need not be formed continuously over the entire range of the space wherein the inner gear 374 is contained. For example, the stoppers may be provided at only the locations corresponding to the movement limiting raised portions 375a and the movement limiting raised portions 375b, with the parts therebetween omitted.

EXAMPLE 4

Figure 41:
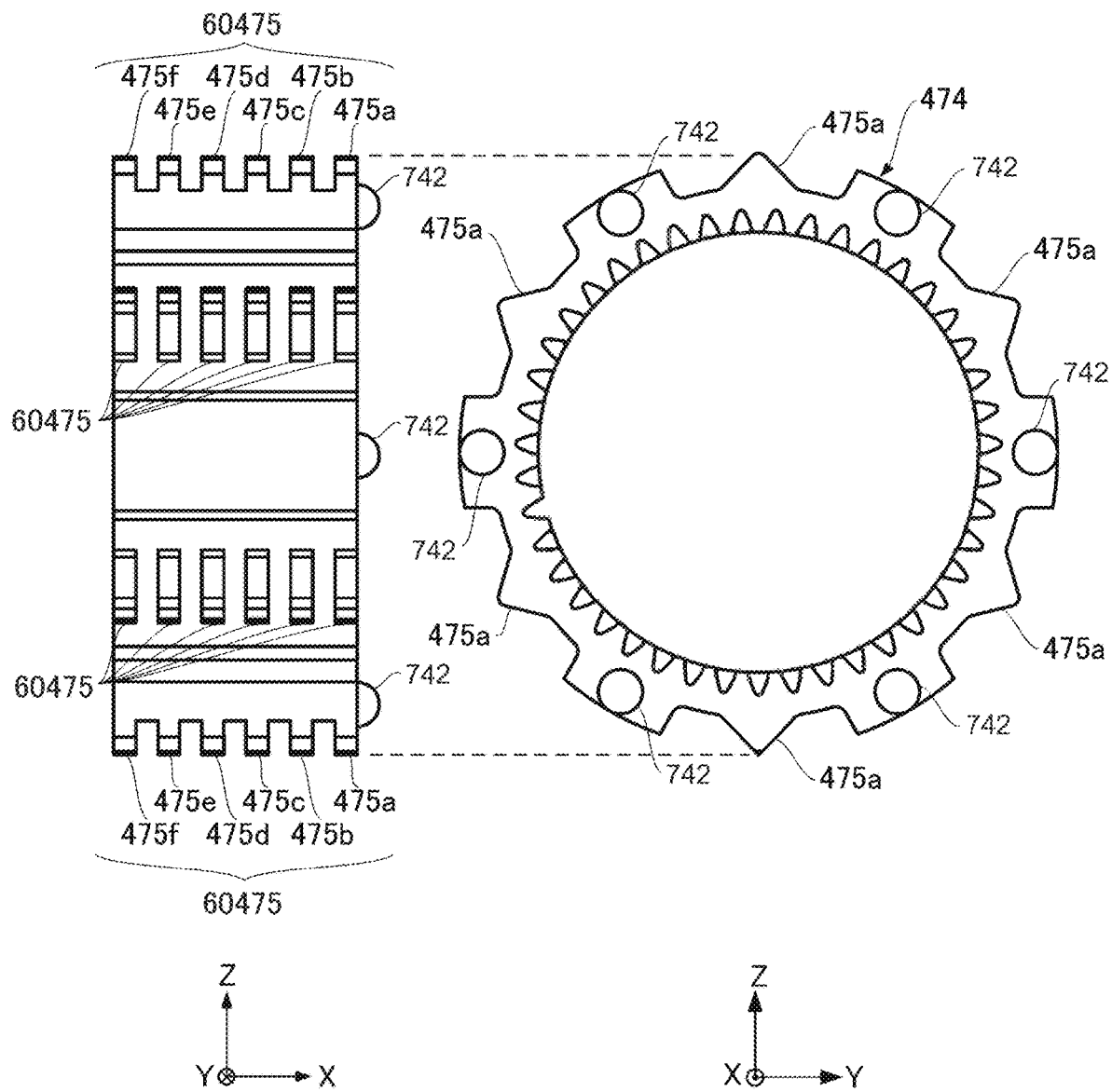
FIG. 41 is a diagram depicting an inner gear according to a fourth embodiment according to the present disclosure.
Figure 42:
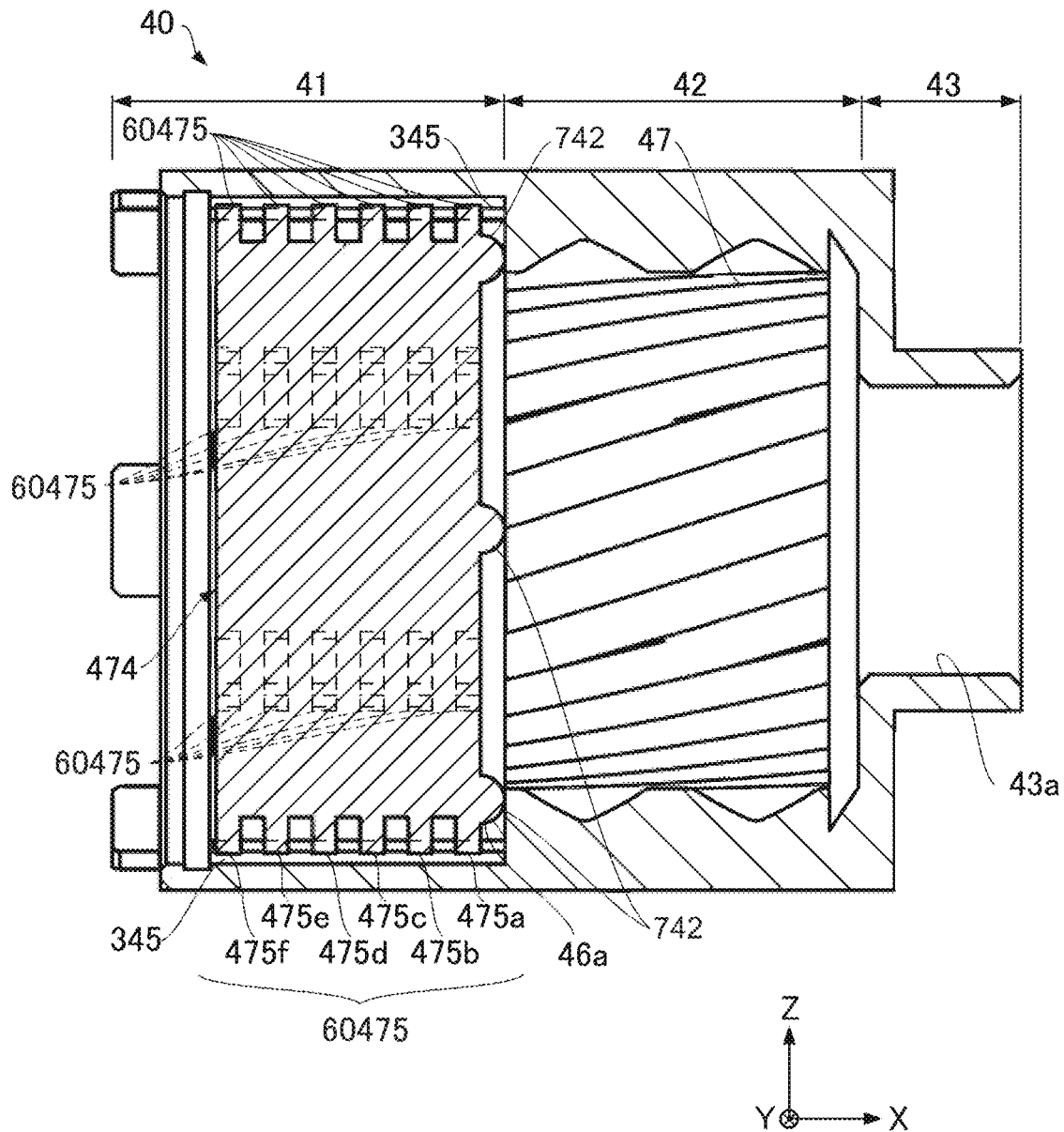
FIG. 42 is a cross-sectional diagram of a second housing according to a fourth embodiment according to the present disclosure.

In an inner gear 474 according to a fourth embodiment, as depicted in FIG. 41, a plurality of movement limiting raised portions 60475a through 60475f (which may be termed "movement limiting raised portions 60475," as a general term), which are narrow in width in the X axial direction, are provided with equal spacing from the +X direction side to the –X direction side. The cross-section of the movement limiting raised portion 60475 is a triangle. The movement limiting raised portion 60475a is provided at an end portion of the inner gear 474 on the +X axial direction side. Additionally, the movement limiting raised portion 60475f is provided at an end portion of the inner gear 474 on the –X axial direction side. When the inner gear 474 is contained at the first position 41 in the second housing 40, as depicted in FIG. 42, the movement limiting raised portions 60475 are inserted between pairs of stoppers 345. The pairs of stoppers 345 are formed continuously across the entire range of the space wherein the second housing 40 contains the inner gear 474, so as to enable insertion of the movement limiting raised portions 60475, formed with equal spacing from the end portion on the +X side to the end portion on the –X side of the inner gear 474. Through this, the form of contact between the movement limiting raised portions 60475 and the pairs of stoppers 345 will be a form wherein the parts with linear contact between the individual movement limiting raised portions 60475a through 60475f and the pairs of stoppers 345 will be lined up in a line along the X axial direction, with prescribed spacing therebetween.

In this way, ranges wherein movement limiting raised portions 60475 are and are not provided on the inner gear 474 are provided alternatingly. The total length of linear contact between the movement limiting raised portions 60475 and the stoppers 345 along the X axial direction can be shortened thereby. Through this, the contact area between the outer peripheral surface of the inner gear 474 and the inner peripheral surface of the second housing 40 can be reduced even further, reducing the transmission of the vibration from the inner gear 474 to the second housing 40 during operation. Moreover, the inner gear 474 can contact the pairs of stoppers 345 that are formed on the second housing 40 through a plurality of movement limiting raised portions 60475a through 60475f that are arranged with equal spacing, thus making it possible to stabilize the orientation of the inner gear 474, so as to not tilt. This can suppress the vibration and noise that is caused by the inner gear 374 during operation.

EXAMPLE 5

In the embodiments set forth above the regions of contact were limited to narrow ranges through structuring so as to produce linear contact, in the X axial direction, between the pairs of stoppers and the movement limiting raised portions. However, the direction in which linear contact is produced is not limited to being along the X axial direction, but rather may be set arbitrarily. For example, it may be along a direction that is perpendicular to the X axial direction, or may be along the direction that is between the X axial direction and a direction that is perpendicular to the X axial direction. A form wherein the linear contact is produced between the pairs of stoppers in the movement limiting raised portions in a direction that is perpendicular to the X axial direction will be explained as a fifth embodiment.

Figure 43:
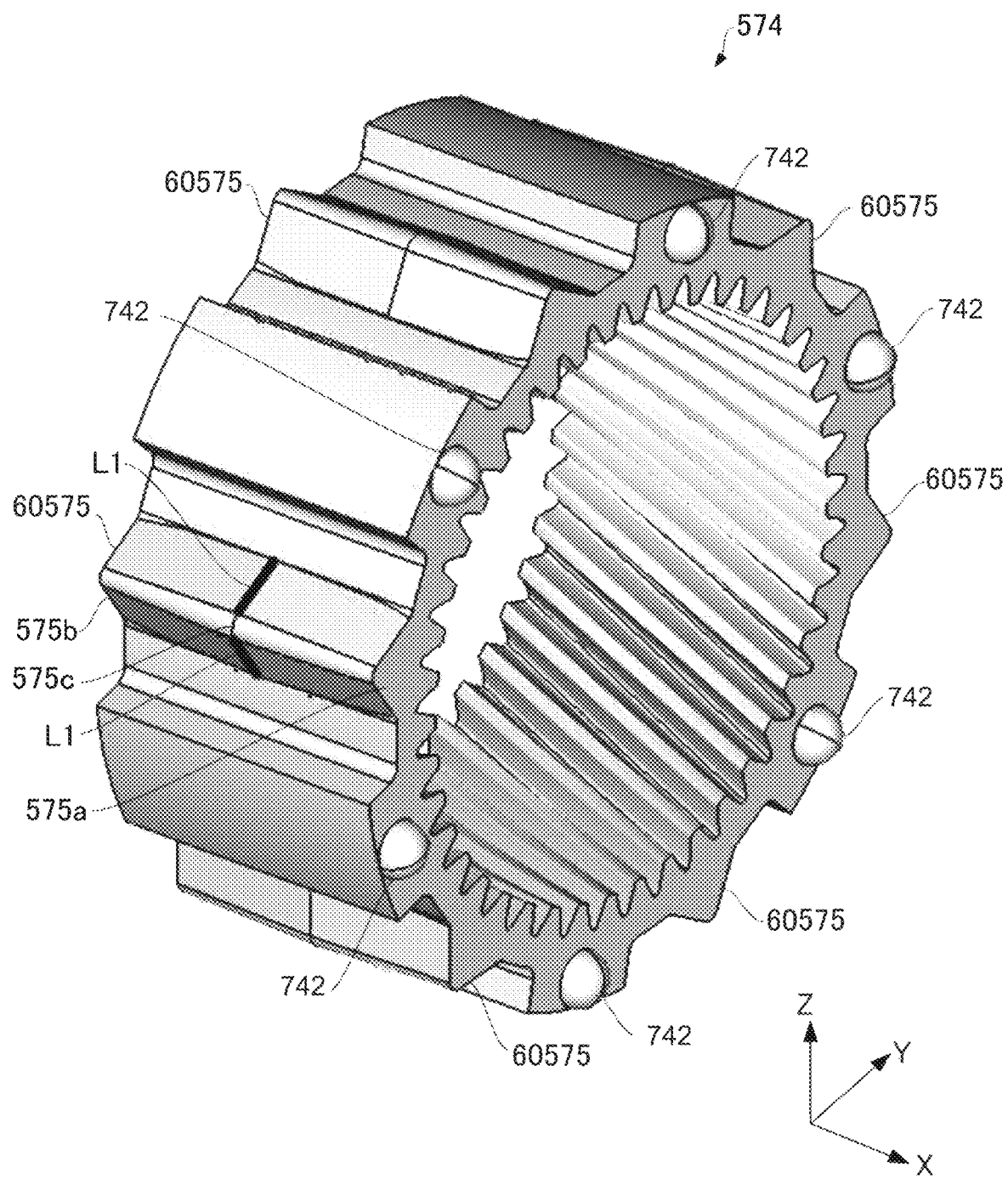
FIG. 43 is a perspective diagram of an inner gear according to a fifth embodiment according to the present disclosure.

As depicted in FIG. 43, the inner gear 574, as with the inner gear 74 in the first embodiment, depicted in FIG. 7, has movement limiting raised portions 60575, with cross-sections that are triangles, formed across the entire width of the inner gear 574. However, the cross-sectional sizes of the triangles of the movement limiting raised portions 60575 are formed so as to be different depending on the position in the X axial direction. This point differs from that of the inner gear 74 in the first embodiment, which had movement limiting raised portions 75 that were of a constant cross-sectional size, regardless of the position in the X axial direction. The cross-sectional size of the movement limiting raised portion 60575, as depicted in FIG. 43, is smallest at the end portion 60575*a* on the +X axial direction side and the end portion 60575*b* on the −X axial direction side of the inner gear 574, and becomes gradually larger toward the center along the X axial direction. Given this, the cross-section of the movement limiting raised portion 60575 is at a maximum at the center portion 60575*c* in the X axial direction.

Figure 44:
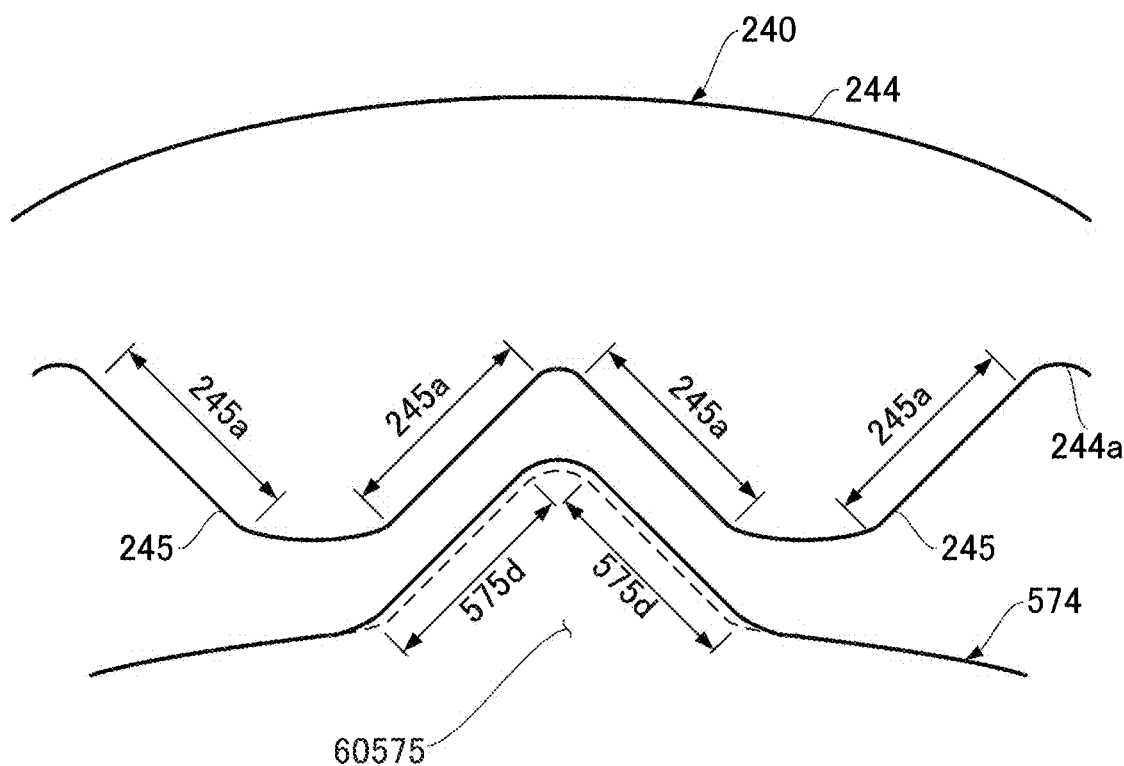
FIG. 44 is an explanatory diagram showing the state wherein the inner gear and the second housing according to the fifth embodiment according to the present disclosure are separated.

Moreover, the outer surfaces of the pair of stoppers 45 in the first embodiment is a curved surface made up from a standing portion 45*a*, a connecting portion 45*b*, and an apex 45*c*, as depicted in FIG. 10. On the other hand, as depicted in FIG. 44, the pair of stoppers 245*a* have straight slanted edge portions 245 that each stand from the inner wall 244*a* of the round cylinder 244. Given this, each of the pair of stoppers 245 has a cross-section that is a triangle, and the slanted edge portions 245*a* form flat regions.

Figure 45:
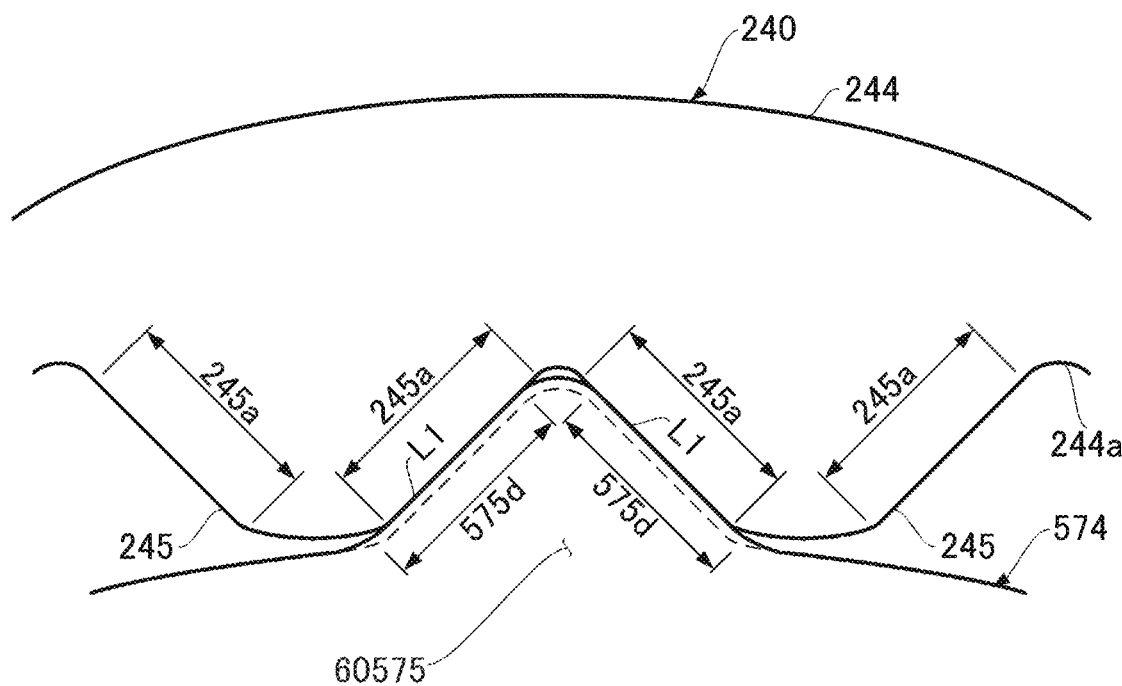
FIG. 45 is an explanatory diagram showing the state wherein the inner gear and the second housing according to the fifth embodiment according to the present disclosure are in contact.

Note that in FIG. 44 and FIG. 45, the dotted lines that describe the movement limiting raised portion 60575 show the cross-sections of the movement limiting raised portions 60575 at the end portions 60575*a* and 60575*b* (FIG. 43) of the inner gear 574. On the other hand, the solid lines show the cross-section of the movement limiting raised portion 60575 at the center portion 60575*c* (FIG. 43) of the inner gear 574 in the X axial direction. As described above, the cross-section of the movement limiting raised portion 60575 in the center portion 60575*c* of the inner gear 574 is larger than the cross-section of the movement limiting raised portion 60575 at the end portions 60575*a* and 60575*b* of the inner gear 574. As depicted in FIG. 44, the inner gear 574 moves in a direction that is perpendicular to the axis, for example, upward, from a state wherein it is not in contact with the second housing 240. Given this, the movement limiting raised portions 60575 are inserted between the pairs of stoppers 245, as depicted in FIG. 45, and soon the planes that structure the slanted edge portions 245*a* of the pair of stoppers 245 will contact the slanted edge portion 60575*d* of the movement limiting raised portion 60575. Note that the cross-sectional size of the movement limiting raised portion 60575 is a maximum at the center portion 60575*c* (FIG. 43). Because of this, the movement limiting raised portion 60575 makes contact with the stopper 245 at the slanted edge portion 60575*d* in the center portion 60575*c* (FIG. 43), but does not contact a stopper 245 at the slanted edge portion 60575*d* other than at the center portion 60575*c* (FIG. 43) (for example, at the parts indicated by the dotted line). Given this, the inner gear 574 can contact the second housing 240 (FIG. 44) only on the line L1, as depicted in FIG. 43. That is, the outer peripheral surface of the inner gear 574 and the inner peripheral surface of the second housing 240 can make linear contact along the direction that is perpendicular to the X axis. Note that while, in FIG. 43 the line L1 of linear contact is illustrated for only a single movement limiting raised portion 60575, linear contact can be made similarly along the lines that are perpendicular to the axis in the other movement limiting raised portions 60575 as well.

Note that while in the above the explanation was for a case wherein the inner gear 574 moved in a direction that is perpendicular to the axis, linear contact can be made along a direction that is perpendicular to the X axis in the same way even when contact with the second housing 240 is through rotation around the axis. In this way, it is possible to limit the contact between the outer peripheral surface of the inner gear 574 and the inner peripheral surface of the second housing 240 to be linear contact, thus making it possible to reduce the transmission of the vibration from the operating inner gear 574 to the second housing 240.

EXAMPLE 6

While in the embodiments described above the explanations were for structures wherein the contact between the pairs of stoppers and the movement limiting raised portions formed linear contacts, other forms of contact are possible insofar as they can reduce the area of contact. An embodiment wherein the contacts between the stoppers and the movement limiting raised portions are point contacts will be explained next as a sixth embodiment.

Figure 46:
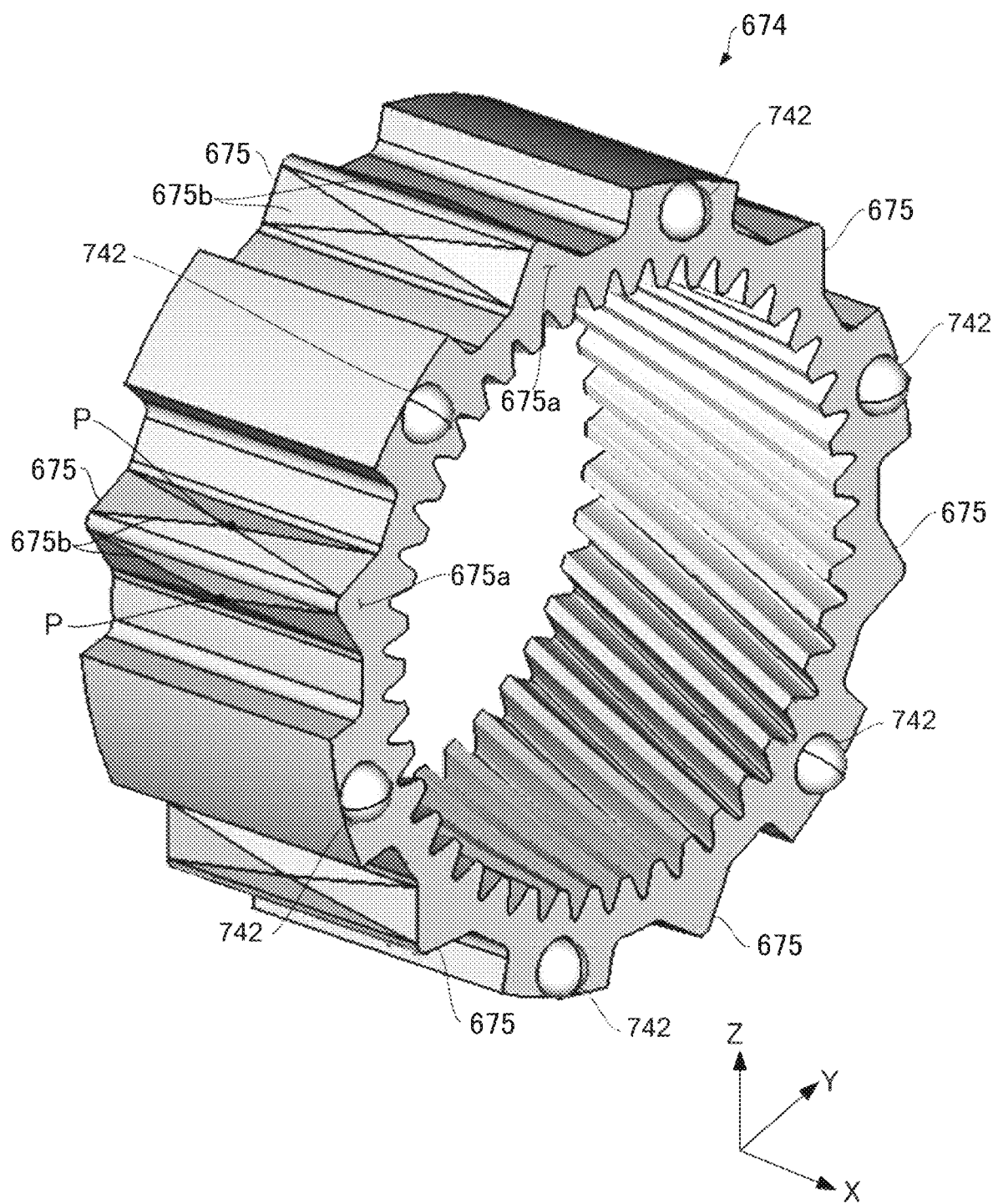
FIG. 46 is a perspective diagram of an inner gear according to a sixth embodiment according to the present disclosure.
Figure 47:
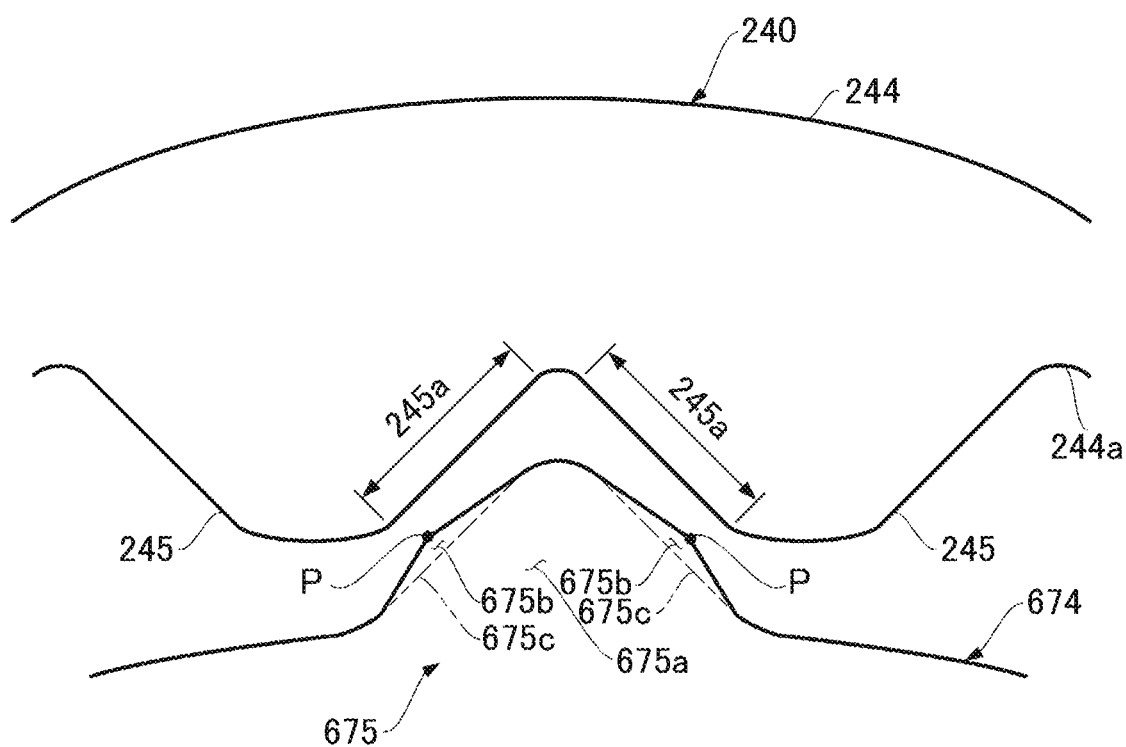
FIG. 47 is an explanatory diagram showing the state wherein the inner gear and the second housing according to the sixth embodiment according to the present disclosure are separated.
Figure 48:
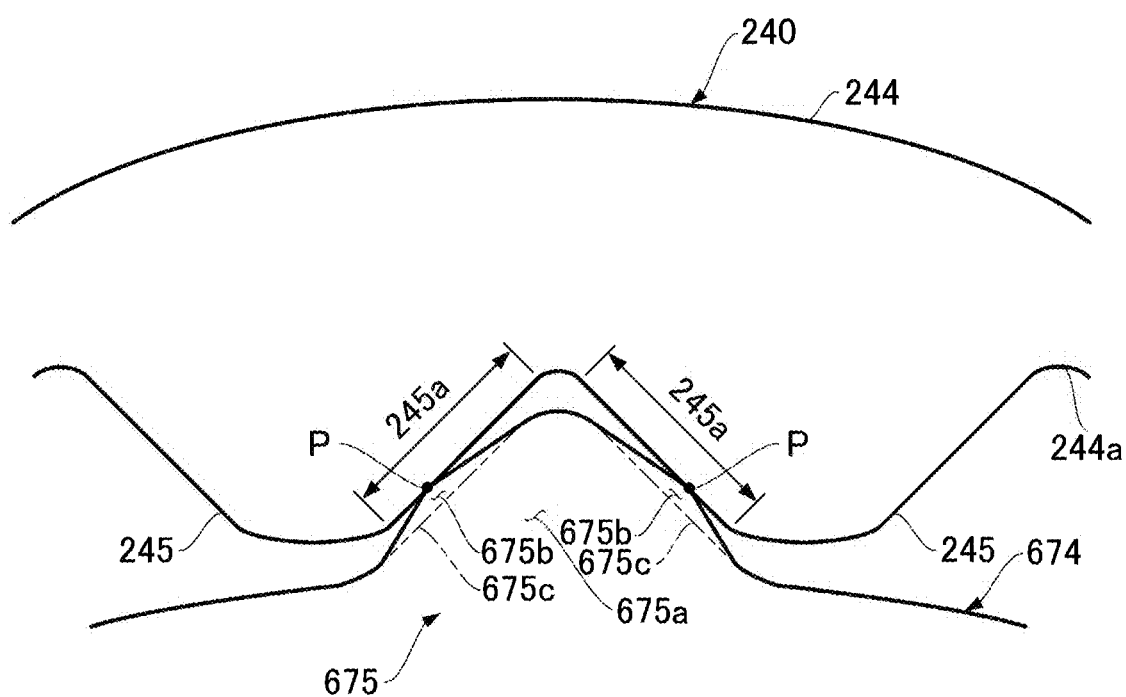
FIG. 48 is an explanatory diagram showing the state wherein the inner gear and the second housing according to the sixth embodiment according to the present disclosure are in contact.

As depicted in FIG. 46, the movement limiting raised portions 675 are formed across the entire width of the inner gear 674. The movement limiting raised portions 675, as depicted in FIG. 46 through FIG. 48, have a first position 675*a* that has a cross-section that is a triangle and that extends in the X axial direction, and convex second positions 675*b* that are provided on each of the inclined surfaces of the first position 675*a*. The second position 675*b* has a square pyramid shape that is defined by a bottom face 675*c* (FIG. 47) that is coincident with the rectangular inclined surfaces of the first position 675*a*, and by an apex P. Consequently, the location of the second position 675*b* that is furthest from the first position 675*a* is the apex P. Note that the pairs of stoppers 245 are structured similarly to that which is described in FIG. 44. That is, on the outer surfaces of the pairs of stoppers 245, planar regions are structured from slanted edge portions 245*a*.

As depicted in FIG. 47, the inner gear 674 moves in a direction that is perpendicular to the axis, for example, upward, from a state wherein it is not in contact with the second housing 240. Given this, as depicted in FIG. 48, the movement limiting raised portion 675 is inserted between the pair of stoppers 245, and soon the apex P contacts the slanted edge portions 245*a* of the pair of stoppers 245. This type of contact is a point contact by the plane that forms the slanted edge portion 245*a* of the pair of stoppers 245 and the apex P of the second position 675*b* that has a square pyramid shape.

Note that while in the above the explanation was for a case wherein the inner gear 674 moved in a direction that is perpendicular to the axis, the apex P can be caused to form a point contact with the pair of stoppers 245 even when the contact with the second housing 240 is through rotation around the axis. In this way, the range of contact between the outer peripheral surface of the inner gear 674 and the inner peripheral surface of the second housing 240 can be kept to a range that can be termed a point contact. This can reduce the transmission, to the second housing 240, of vibration from the inner gear 674 that is in operation.

EXAMPLE 7

In the sixth embodiment, the structure was to enable a point contact with the pair of stoppers 245 at a single point through the provision of the second position 675b of a square pyramid shape at each of the inclined surfaces of the movement limiting raised portion 675; however, there is no particular limitation on the number of point contacts. A form that enables point contacts with the pair of stoppers at a plurality of locations on a single inclined surface of a movement limiting raised portion will be explained next.

Figure 49:
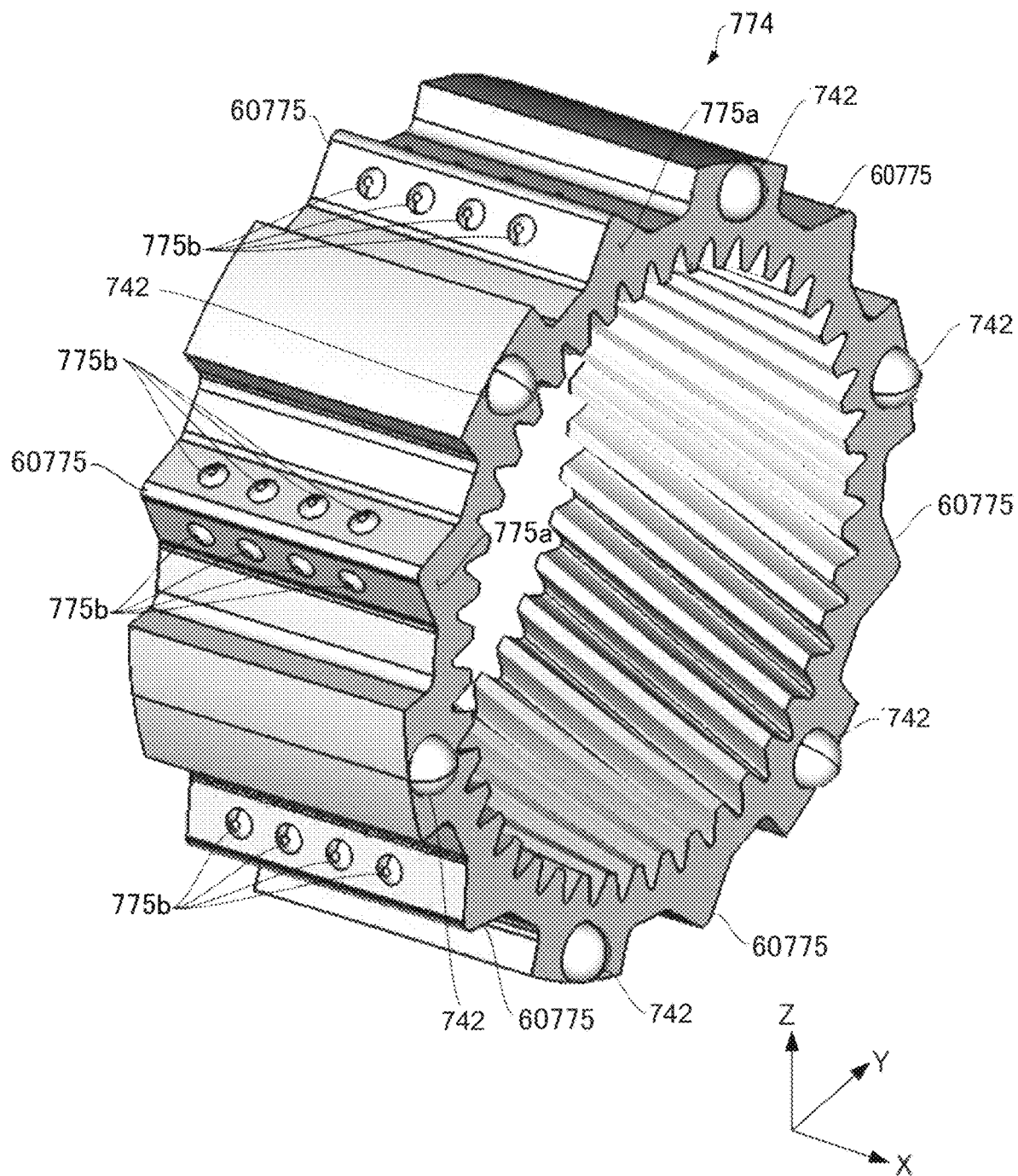
FIG. 49 is a perspective diagram of an inner gear according to a seventh embodiment according to the present disclosure.
Figure 50:
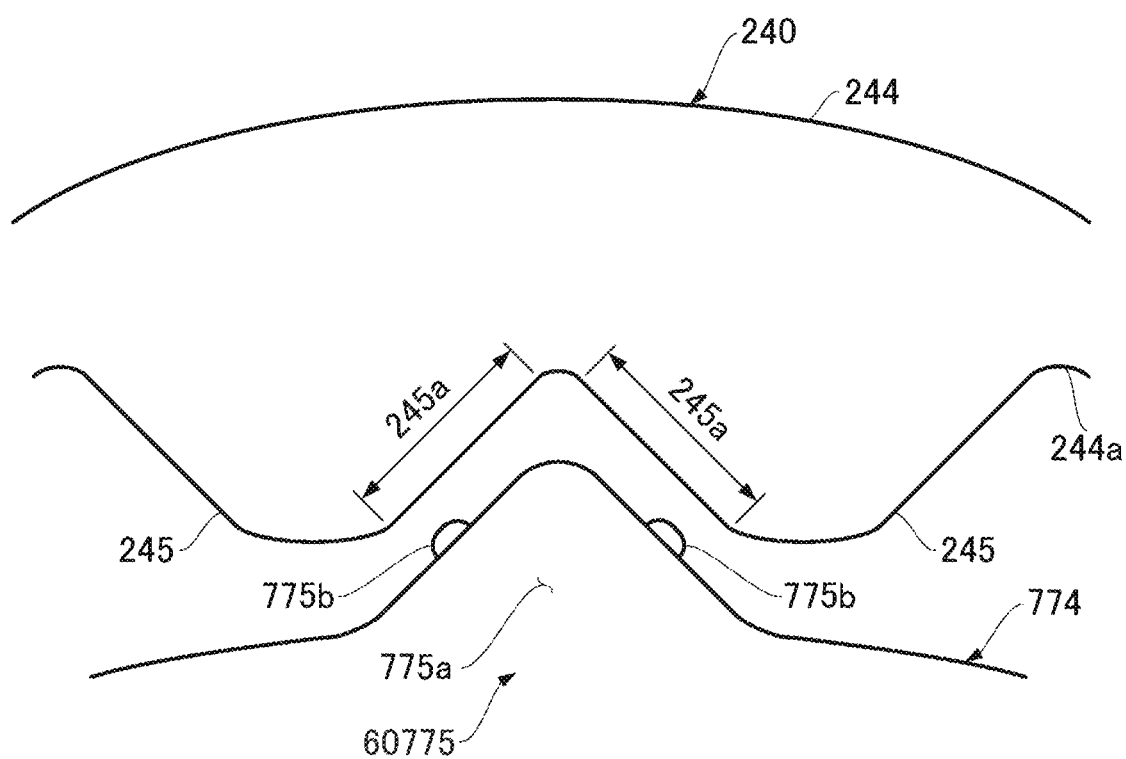
FIG. 50 is an explanatory diagram showing the state wherein the inner gear and the second housing according to the seventh embodiment according to the present disclosure are separated.
Figure 51:
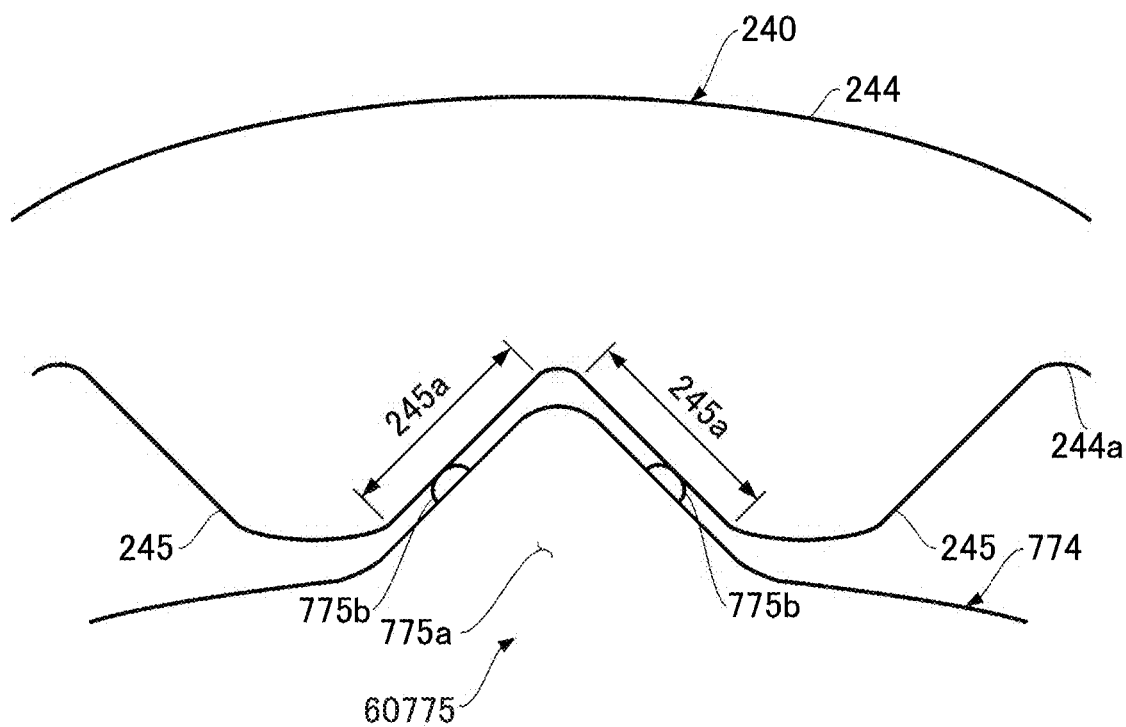
FIG. 51 is an explanatory diagram showing the state wherein the inner gear and the second housing according to the seventh embodiment according to the present disclosure are in contact.

As depicted in FIG. 49, the movement limiting raised portions 60775 are formed across the entire width of the inner gear 774. The movement limiting raised portion 60775 has a first position 60775a, with a cross-section that is a triangle, extending along the X axial direction, and four second positions 60775b that are laid out in a line on each of the inclined surfaces of the triangular first positions 60775a, as depicted in FIG. 49 through FIG. 51. Each of the second positions 60775b form truncated circular cones, laid out in a line along the X axial direction. Note that the pairs of stoppers 245 are structured similarly to that which is described in FIG. 44. That is, on the outer surfaces of the pairs of stoppers 245, planar regions are structured from slanted edge portions 245a.

As depicted in FIG. 50, the inner gear 774 moves in a direction that is perpendicular to the axis, for example, upward, from a state wherein it is not in contact with the second housing 240. Given this, as depicted in FIG. 51, the movement limiting raised portion 60775 is inserted between the pair of stoppers 245, and soon the second positions 60775b of the truncated circular cone shape contacts the pair of stoppers 245. This type of contact is a contact between the plane that forms the slanted edge portion 245a of the pair of stoppers 245 and the second position 60775b that is the truncated circular cone. Through this, the inner gear 774 and the second housing 240 can be made to form point contacts at four locations along the X axial direction.

Note that while in the above the explanation was for a case wherein the inner gear 774 moved in a direction that is perpendicular to the axis, the second position 60775b of the circular cone shape can be caused to form a point contact with the pair of stoppers 245 even when the contact with the second housing 240 is through rotation around the axis. In this way, the range of contact between the outer peripheral surface of the inner gear 774 and the inner peripheral surface of the second housing 240 can be kept to a range that can be termed a point contact. This can reduce the transmission, to the second housing 240, of vibration from the inner gear 774 that is in operation.

MODIFIED EXAMPLES

The present disclosure is not limited to the embodiments described above, but rather a variety of modifications and applications are possible. In the embodiments described above, pairs of stoppers 45 are provided in the second housing 40, and movement limiting raised portions 75 that are inserted between the pairs of stoppers 45 are provided on the inner gear 74. However, the present disclosure is not limited thereto, but rather the locations wherein the pairs of stoppers 45 and the movement limiting raised portions 75 are provided may be switched, so that the movement limiting raised portions 75 are provided on the inner peripheral surface of the second housing 40 and the pairs of stoppers 45 are provided on the outer peripheral surface of the inner gear 74.

While the cross sections of the pairs of stoppers 45 were chevron shapes and the cross sections of the movement limiting raised portions 75 were triangular, instead the cross-sectional shapes may be switched, with the cross sections of the pairs of stoppers being triangular and the cross sections of the movement limiting raised portions that are inserted between the stoppers being chevron shapes.

Moreover, there is no particular limitation on the number of locations wherein the pairs of stoppers 45 and the corresponding movement limiting raised portions 75 are disposed, where it may be a larger number of locations than the six locations given in the embodiments described above, or a smaller number of locations.

Figure 52:
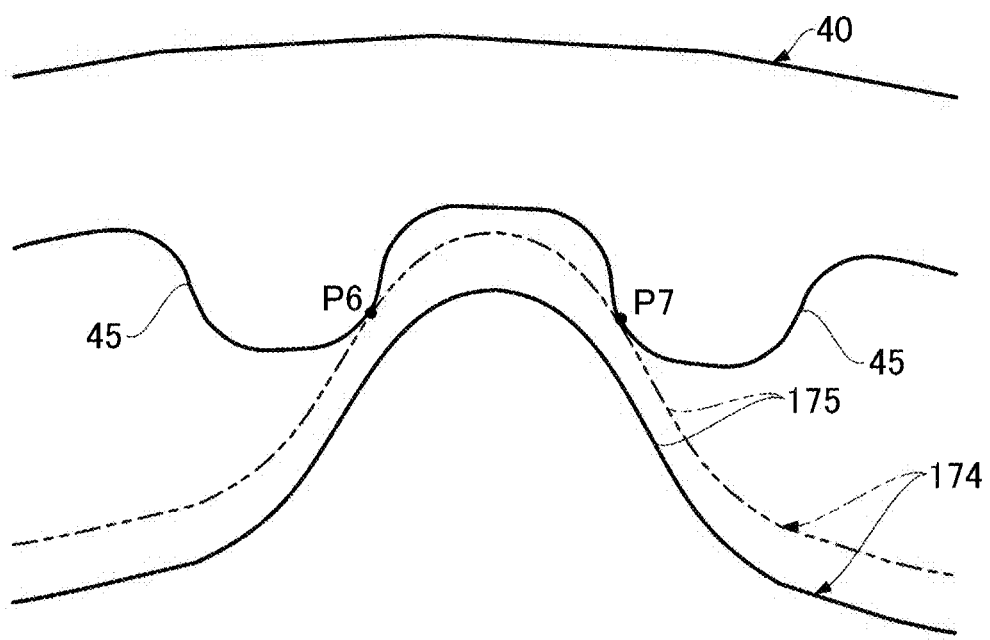
FIG. 52 is an explanatory diagram focusing on the location of contact between the inner gear and the second housing according to the another embodiment according to the present disclosure.
Figure 53:
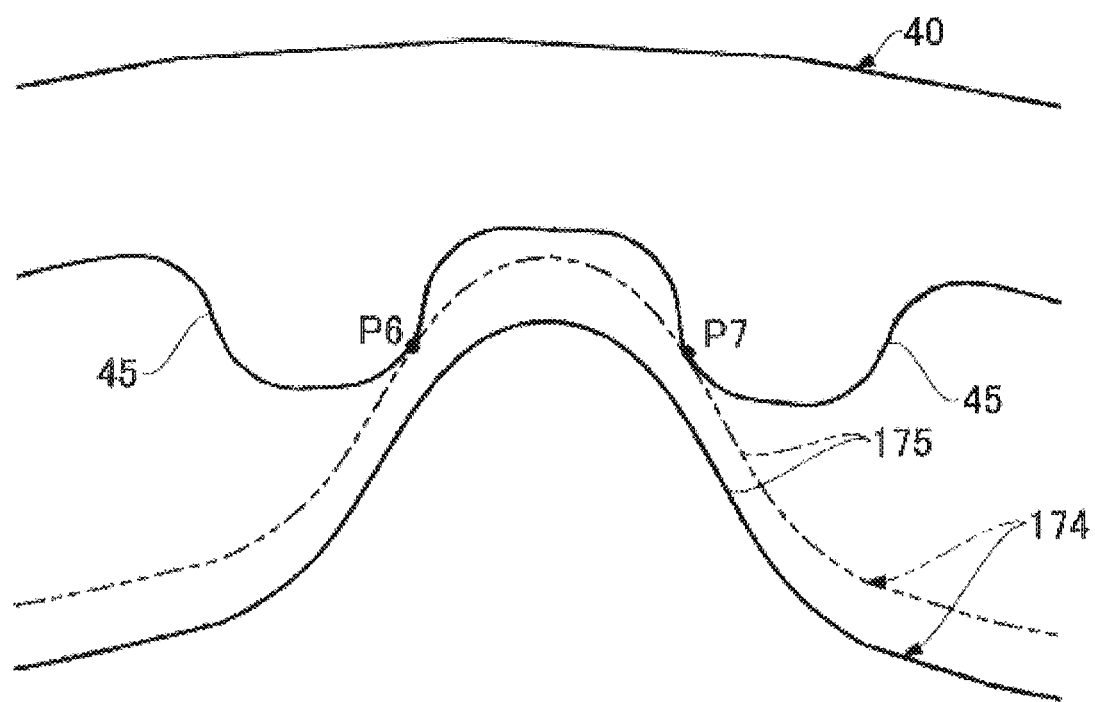
FIG. 53 is an explanatory diagram focusing on the location of contact between the inner gear and the second housing according to the another embodiment according to the present disclosure.

Moreover, while in the first embodiment a convex curved surface of the pair of stoppers 45 was caused to contact a plane of the movement limiting raised portion 75, to cause a linear contact therebetween, linear contacts can be achieved through causing contacts of other shapes as well. Another embodiment that achieves linear contact will be explained next in reference to FIG. 52. The point of difference from the structure depicted in the enlarged view can FIG. 9 is that the cross-section of the movement limiting raised portion (first raised portion) 175 is not that of a triangle, but instead is a rounded chevron shape. Note that the structure of the second housing 40 is the same as the structure depicted in the enlarged view in FIG. 9. In FIG. 52, the inner gear 174, when the actuator is not operating, is indicated by the solid line. Moreover, the inner gear 174, depicted by the double dotted line, is in the state wherein it has moved upward, through the operation of the actuator, to contact the second housing 40. As depicted in FIG. 52, the contact between the pair of stoppers 45 and the movement limiting raised portions 175 is contact between convex curved surfaces, so will be linear contact at the contact points P6 and P7 between the pairs of stoppers 45 and the movement limiting raised portions 175. In this way, in the present embodiment a linear contact is achieved through causing the convex curved surfaces, which are bulging, to contact each other.

Moreover, there is no limitation thereto, where the linear contact may be achieved through the second housing 40 having locally concave parts with large curvature, the inner gear 74 having convex curved surfaces with less curvature, where the concave curved surfaces with high curvature contact the convex curved surfaces that are bulging. The actual structure for achieving linear contact is arbitrary.

Note that in another example for achieving the linear contact described above, the configuration of the inner gear in the location that makes linear contact may be swapped with the configuration of the second housing.

Moreover, while the actuator 1 was provided with a two-stage planetary gear mechanism of a first planetary gear mechanism 70 and a second planetary gear mechanism 80, as the reduction mechanism for reducing the rotation of the motor 10, the number of stages can be set arbitrarily. For example, the reduction ratio may be increased through providing three or more stages of planetary gear mechanisms, or the structure may include only a single-stage planetary gear mechanism.

Moreover, in the embodiments set forth above, a configuration was used wherein the structure wherein the housing and the inner gear were separate was applied only to the first planetary gear mechanism 70, which is the first-stage mechanism that rotates at a high speed, and a housing that was formed with inner teeth on the inner peripheral surface thereof was used in the second planetary gear mechanism 80, which is the second-stage mechanism that rotates at a low speed. However, a structure wherein the housing and the inner gear are separated may be used also in the second planetary gear mechanism 80 that is the second-stage mechanism, to achieve a reduction in vibration and noise.

Moreover, while in the embodiments set forth above the explanation was for a case wherein a reduction gear was used for reducing the rotation inputted from the motor 10 and outputting it from an output gear 86a, there is no limitation to this application. For example, the part that is provided with the output shaft 86, depicted in FIG. 8, may be used as the input side and connected to the rotary shaft of a motor, and the part that is provided with the sun gear 71, depicted in FIG. 7, may be used as the output side, and connected to the output shaft. This would increase and output the rotation of the motor, to be used as an increasing the mechanism. In this case as well, preferably the structure wherein the inner gear and the housing are separated is employed due to the higher-speed operation of the first planetary gear mechanism 70 that is shown in FIG. 7. Moreover, because the rotation of the motor is transmitted directly to the second planetary gear mechanism 80 that is depicted in FIG. 8, preferably the structure wherein the inner gear and the housing are separated is employed, as necessary. Moreover, the present disclosure may also be applied to industrial equipment such as robots and machine tools, and to playground equipment such as so-called "teacups."

When using the present disclosure in various applications, the separate structural units for the inner gear and the housing are applied to the planetary gear mechanism that operates at the highest speed, when planetary gear mechanisms are provided in three or more stages. This can reduce effectively the vibration and noise that is produced. Moreover, because there is little vibration and noise produced by the planetary gear mechanism that operates at the lowest speed, a structure is applied that is equipped with a housing where inner teeth are formed on the inner peripheral surface. This eliminates the need for the separate structures, more than necessary, for the inner gear and the housing, making it possible to avoid increases in the number of components and increases in the assembly operation and assembly costs, thus making it possible to suppress production costs.

Moreover, while in the embodiments set forth above the explanation was for each of the gears used for transmitting the power from the motor 10 to the output shaft 86 being helical gears, other gears may be used instead. Spur gears, for example, may be used. While this tends to produce more play at the locations wherein the teeth mesh, when compared to the case of using helical gears, the structure of the present disclosure can be used even in such a case to reduce (suppress) vibration and noise of the planetary gear device.

Moreover, while the explanations were for cases wherein they separate structural units for the inner gear and the housing were used in a portion of the planetary gear device, the application is not limited thereto, but may be used as a portion of another gear mechanism.

In the embodiment set forth above the planetary gear mechanism of the planetary gear device was achieved through three planetary gears; however, the present disclosure is not limited thereto. In the present disclosure, the planetary gear device may be achieved through the use of a planetary gear mechanism that uses, for example, a single planetary gear or a plurality, other than three, of planetary gears.

Moreover, the planetary gear device to which the present disclosure is applied may be applied to a variety of machines and apparatuses that use reducing mechanisms or increasing mechanisms, such as automobiles, robots, industrial equipment, playground equipment, or the like.

Moreover, while in the second embodiment the movement limiting raised portions 60275 were formed on the +X axial direction side of the inner gear 274, they may be formed on the −X axial direction side instead. In this case, the pairs of stoppers 45 formed on the second housing 40 extend to the −X axial direction side, so that the movement limiting raised portions that are formed on the −X axial direction side will be inserted between the pairs of stoppers.

Moreover, in the inner gear 474 according to the fourth embodiment, depicted in FIG. 41, the movement limiting raised portions 60475 were disposed with equal spacing. However, the distances between neighboring movement limiting raised portions 60475 may be varied arbitrarily, and the movement limiting raised portions 60475 may be disposed at different intervals. Moreover, six movement limiting raised portions 60475 were provided along the X axial direction on the inner gear 474. However, the number of movement limiting raised portions 60475 formed along the X axial direction may be determined arbitrarily.

Moreover, in embodiments 2 through 4, depicted in FIG. 37 through FIG. 42, the widths, in the X axial direction, of the movement limiting raised portions formed on the inner gear were narrow, or the plurality of movement limiting raised portions were laid out with equal spacing along the X axial direction, to cause continuous contact with the pairs of stoppers in the X axial direction. However, such a correspondence relationship can be reversed, where the movement limiting raised portions are continuous in the X axial direction, and the widths of the pairs of stoppers, in the X axial direction, may be reduced, or may be divided into a plurality of stoppers and laid out with equal spacing in the X axial direction.

Moreover, while in the inner gear 674 according to the sixth embodiment, depicted in FIG. 46, the apex P was positioned in the center of the inclined surfaces of the first position 675a, the position of the apex P may be changed arbitrarily through changing the shape of the square pyramid.

Moreover, while in the inner gear 774 according to the seventh embodiment, depicted in FIG. 49, the second positions 60775b, of the truncated circular cones, were laid out in a line along the X axial direction, how the second positions 60775b are laid out may be determined arbitrarily. For example, the second positions may be arranged in a grid shape horizontally and vertically, or may form a zigzag pattern.

Moreover, in embodiments 5 through 7, depicted in FIG. 43 through FIG. 51, a feature was added for having linear contact or point contact of the pairs of stoppers with the movement limiting raised portions of the inner gears. However, these features may be provided on the pairs of stoppers instead. For example, the structure in the fifth embodiment wherein the cross-sectional size of the movement limiting raised portions are varied along the X axial direction, as depicted in FIG. 43, may be applied to the pairs of stoppers, where the cross sections of the stoppers are varied along the X axial direction so as to be at a maximum in the center. The structure that corresponds to the second position 675b that has the square pyramid shape depicted in FIG. 46, in the sixth embodiment, may be formed in the pairs of stoppers instead. In the seventh embodiment, the structure corresponding to the second position 60775b that is a truncated circular cone, shown in FIG. 49, may be formed for the pairs of stoppers instead.

MODIFIED EXAMPLES OF INNER GEARS

Inner Gear Modified Example 1

Figure 54A:
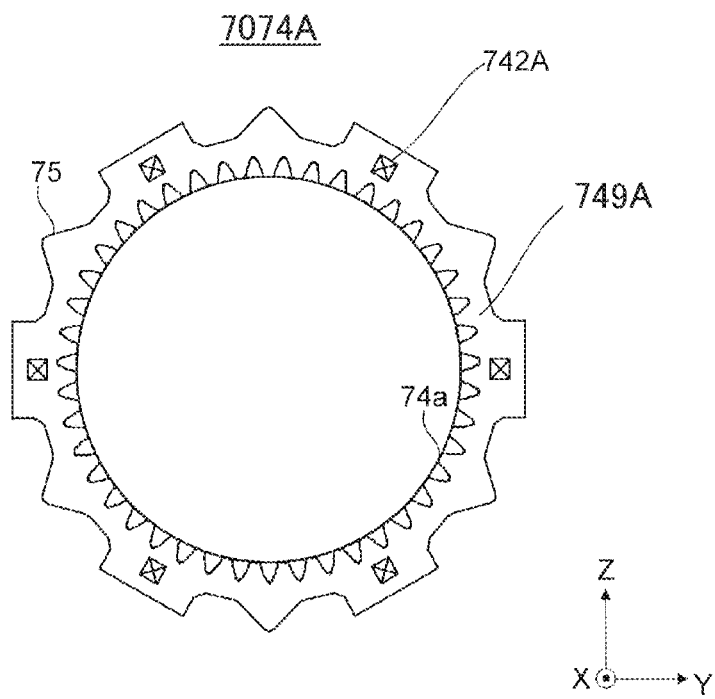
FIGS. 54A and 54B is a diagram accompanying an explanation of a first modified example of an inner gear according to an embodiment according to the present disclosure, where
Figure 54B:
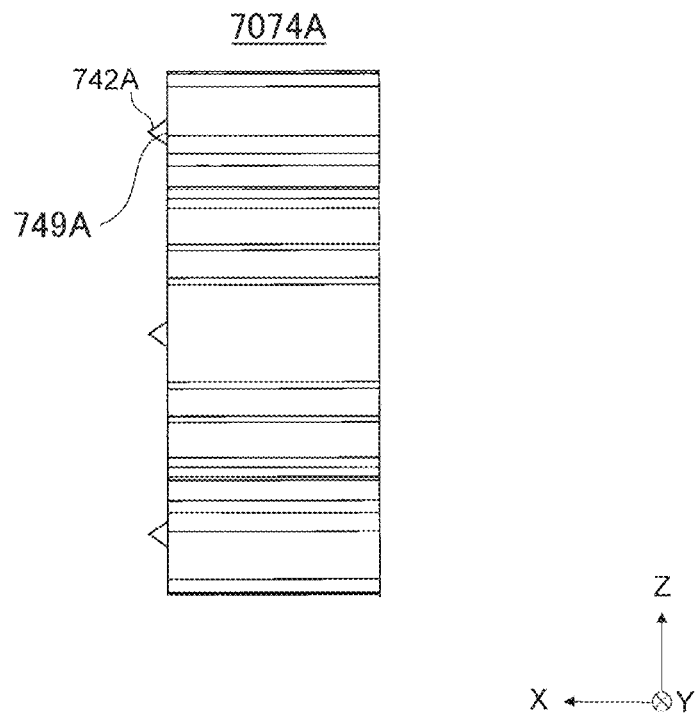

FIG. 54 is a diagram accompanying an explanation of a first modified example of an inner gear 74 according to an embodiment according to the present disclosure, where FIG. 54A is a rear view of an inner gear 7074A as the first modified example and FIG. 54B is a right side view of said inner gear 7074A. As depicted in FIG. 54A and FIG. 54B, the inner gear 7074A, when compared to the inner gear 74, differs only in the shape of the contact raised portion 742A.

Figures 55A, 55B:
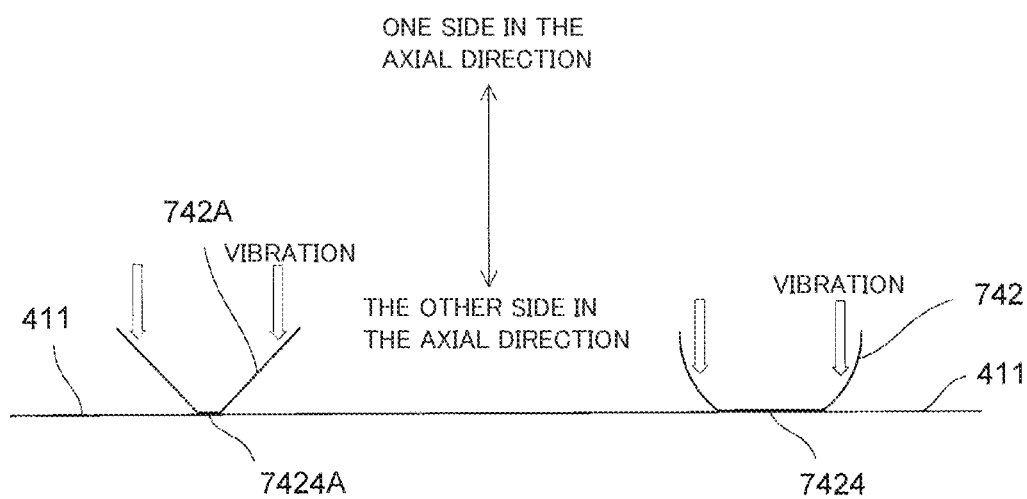
FIGS. 55A and 55B is a schematic diagram comparing the raised portion with the pointed tip end, depicted in FIG. 54, to a raised portion with a rounded tip end.

The contact raised portion 742A is formed in a square pyramid shape that, in the end face (opening end face) 749A of the side of the inner gear 7074A that contacts the contact surface portion 411 of the second housing 40 (the other side in the axial direction), protrudes to the contact surface portion 411 side, and has an apex that the tip end portion on the contact surface portion 411 side. As depicted in FIG. 55A, the contact raised portion 742A is shaped with a point 7424A so that the tip end that contacts the contact surface portion 411 (i.e., the apex of 742A) is pointy. Through this, as depicted in FIG. 55B, the area of contact 7424 with the contact surface can be reduced, even if the contact raised portion is deformed, when compared to the contact raised portion 742 wherein the tip end of contact raised portion 742 is round. Through this, the contact raised portion 742A can transmit the vibration that occurs on the inner gear 7074A side, that is, the one side in the axial direction, in a state wherein the vibration is more suppressed, when compared to that of contact raised portion 742, when transmitting to the other side in the axial direction.

Inner Gear Modified Example 2

Figure 56A:
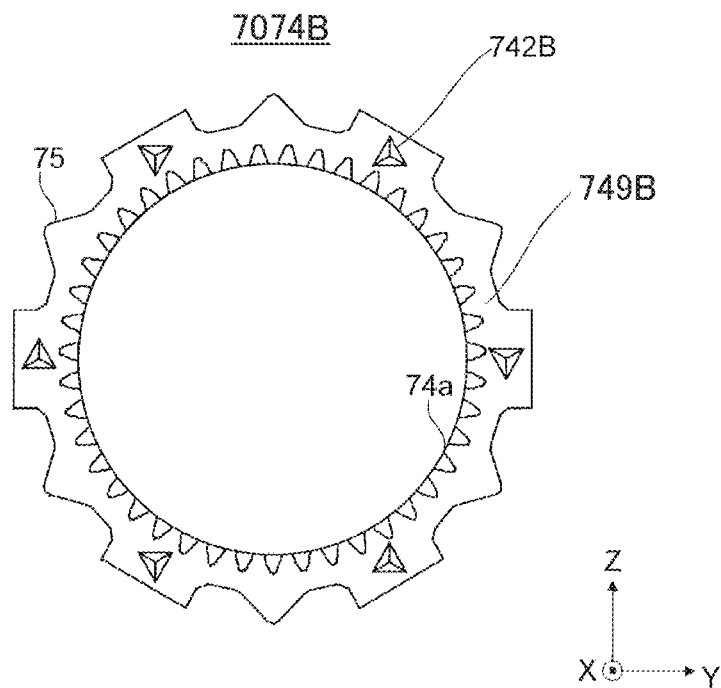
FIGS. 56A and 56B is a diagram accompanying an explanation of a second modified example of an inner gear according to an embodiment according to the present disclosure, where
Figure 56B:
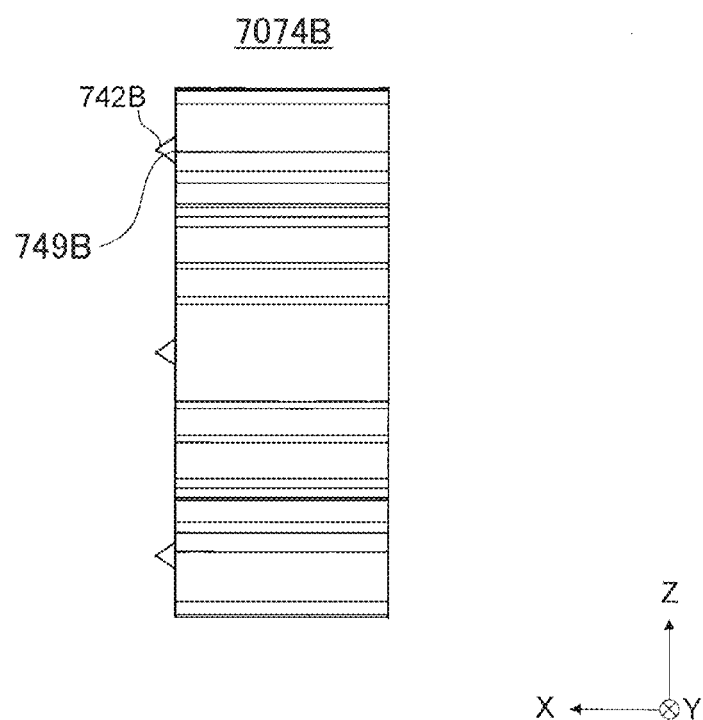

FIGS. 56A and 56B is a diagram accompanying an explanation of a second modified example of an inner gear 74 according to an embodiment according to the present disclosure, where FIG. 56A is a rear view of an inner gear 7074B as the second modified example and FIG. 56B is a right side view of said inner gear 7074B. When compared to the inner gear 74, in the inner gear 7074B the shape of the contact raised portion 742B is different, where the contact raised portion 742B is formed in a triangular pyramid shape that, in the end face (opening end face) 749B of the side of the inner gear 7074B that contacts the contact surface portion 411 of the second housing 40 (the other side in the axial direction), protrudes to the contact surface portion 411 side, and has an apex that the tip end portion on the contact surface portion 411 side. This can produce similar effects in operation as in modified example 1.

Inner Gear Modified Example 3

Figure 57A:
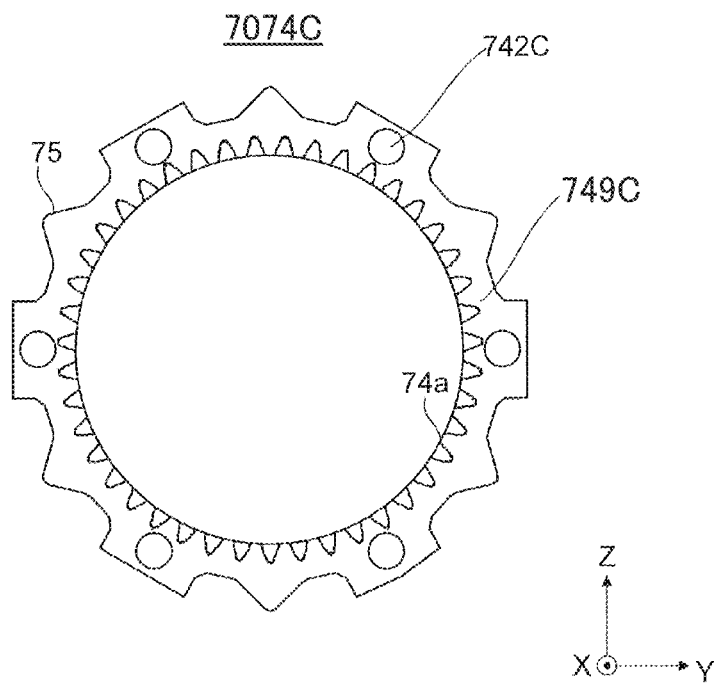
FIGS. 57A and 57B is a diagram accompanying an explanation of a third modified example of an inner gear according to an embodiment according to the present disclosure, where
Figure 57B:
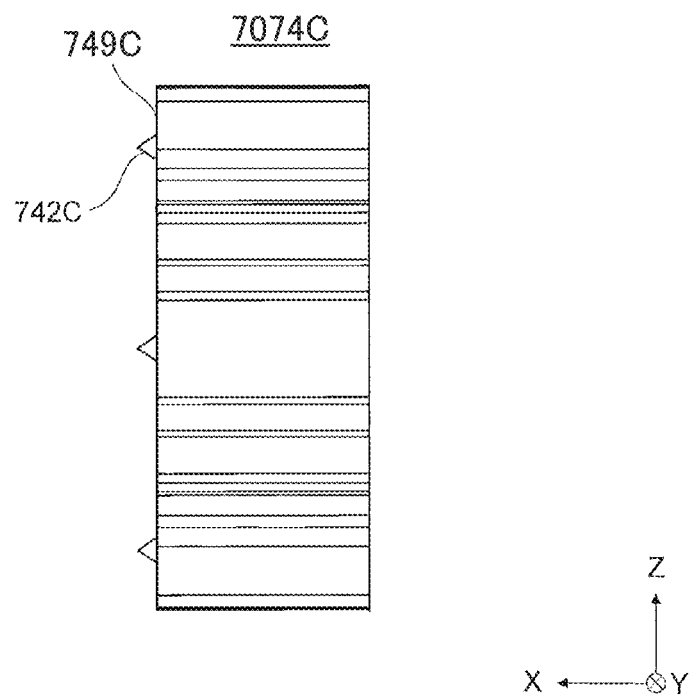

FIGS. 57A and 57B is a diagram accompanying an explanation of a third modified example of an inner gear 74 according to an embodiment according to the present disclosure, where FIG. 57A is a rear view of an inner gear 7074C as the third modified example and FIG. 57B is a right side view of said inner gear 7074C. The inner gear 7074C, when compared to the inner gear 74, is different only in the shape of the contact raised portion 742C. The contact raised portion 742C is formed in a round conical shape that, in the end face (opening end face) 749C of the side of the inner gear 7074C that contacts the contact surface portion 411 of the second housing 40 (the other side in the axial direction), protrudes to the contact surface portion 411 side, and has an apex that the tip end portion on the contact surface portion 411 side. This can produce similar effects in operation as in modified example 1.

Inner Gear Modified Example 4

Figure 58A:
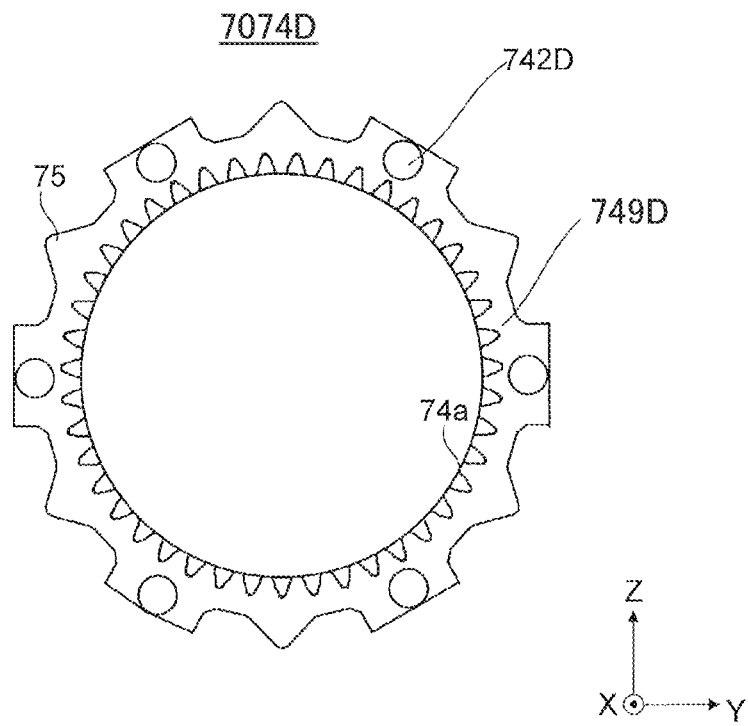
FIGS. 58A and 58B is a diagram accompanying an explanation of a fourth modified example of an inner gear according to an embodiment according to the present disclosure, where
Figure 58B:
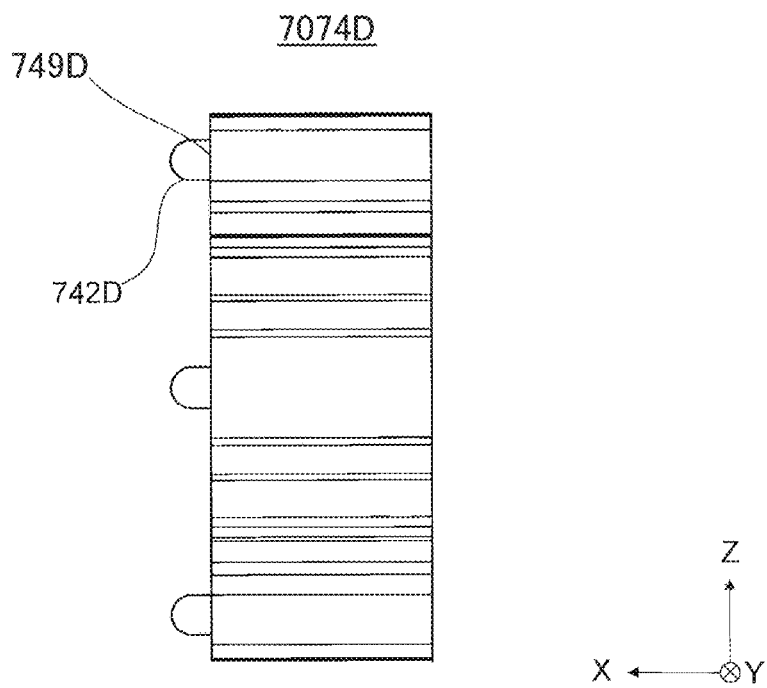

FIGS. 58A and 58B is a diagram accompanying an explanation of a fourth modified example of an inner gear 4 according to an embodiment according to the present disclosure, where FIG. 58A is a rear view of an inner gear 7074D as the fourth modified example and FIG. 58B is a right side view of said inner gear 7074D. The inner gear 7074D, when compared to the inner gear 74, is different only in the shape of the contact raised portion 742D.

The contact raised portion 742D is formed in a rod-shaped body that protrudes from the end face (opening end face) 749D of the side of the inner gear 7074D that contacts the contact surface portion 411 of the second housing 40 (the other side in the axial direction) to the contact surface portion 411 side, and wherein the tip end of 742D is rounded into the shape of a spherical surface. Specifically, the contact raised portion 742D has a rod-shaped extending portion and a hemispherical surface portion that is provided on the tip end of the extending portion. In this case, the tip end has a hemispherical surface shape, and thus makes point contact with the contact surface 411 portion. This can suppress even further the transmission of vibration from the inner gear 7074D side to the second housing 40.

Inner Gear Modified Example 5

Figure 59A:
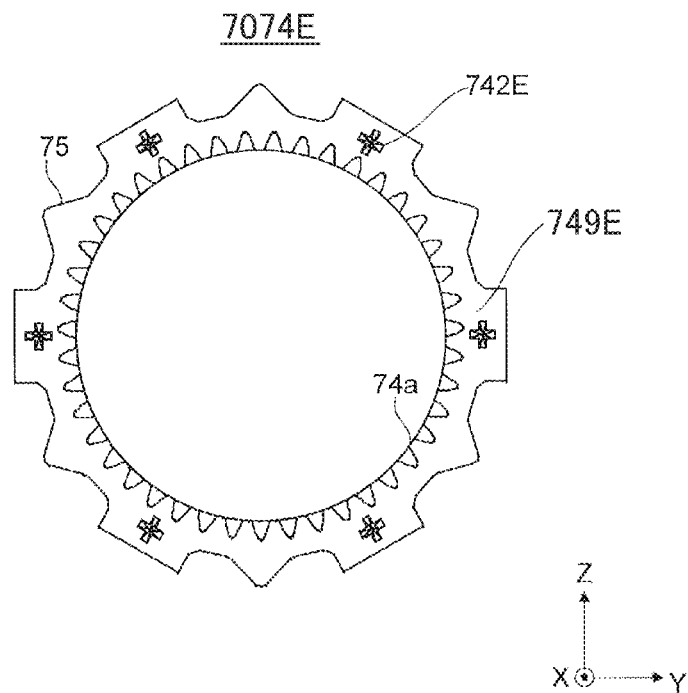
FIGS. 59A and 59B is a diagram accompanying an explanation of a fifth modified example of an inner gear according to an embodiment according to the present disclosure, where
Figure 59B:
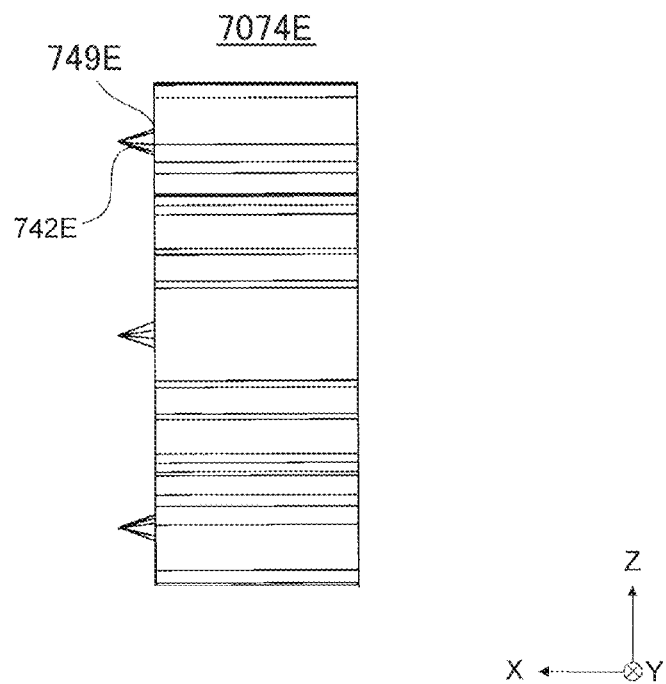

FIGS. 59A and 59B is a diagram accompanying an explanation of a fifth modified example of an inner gear 74 according to an embodiment according to the present disclosure, where FIG. 59A is a rear view of an inner gear 7074E as the fifth modified example and FIG. 59B is a right side view of said inner gear 7074E. The inner gear 7074E, when compared to the inner gear 74, is different only in the shape of the contact raised portion 742E. The contact raised portion 742E is formed, in the end face (opening end face) 749E of the side of the inner gear 7074E that contacts the contact surface portion 411 of the second housing 40 (the other side in the axial direction), protruding to the contact surface portion 411 side, and has a "+" shape when viewed from the back. The tip end portion of the contact raised portion 742E forms a pointed shape, so makes point contact with the contact surface portion 411.

The contact raised portion 742E, when compared to the contact raised portions 742A through 742C, with the pyramid or conical shapes, and the contact raised portion 742D with the rod shape, has an area in the cross-section that is perpendicular to the axial direction, that is, the area for propagation of the vibration along the axial direction, that is smaller. This can suppress even further the transmission of vibration from the one side to the other side in the axial direction.

Inner Gear Modified Example 6

Figure 60A:
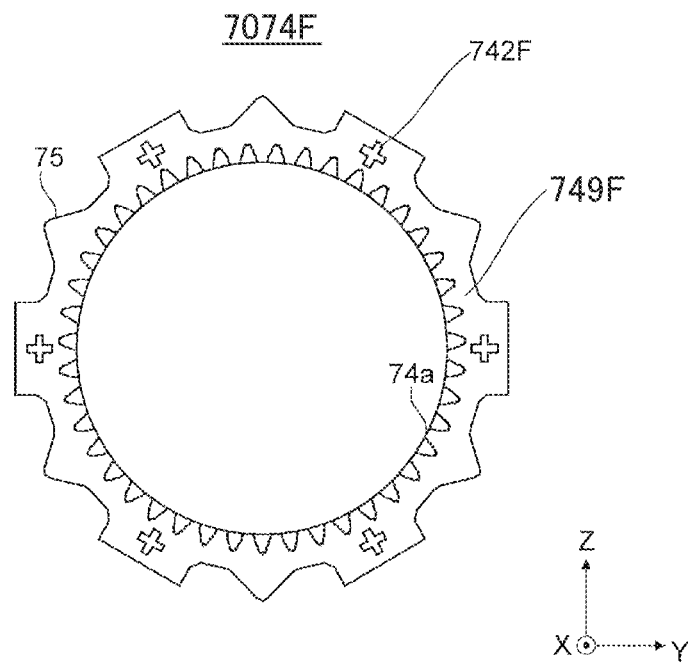
FIGS. 60A and 60B is a diagram accompanying an explanation of a sixth modified example of an inner gear according to an embodiment according to the present disclosure, where
Figure 60B:
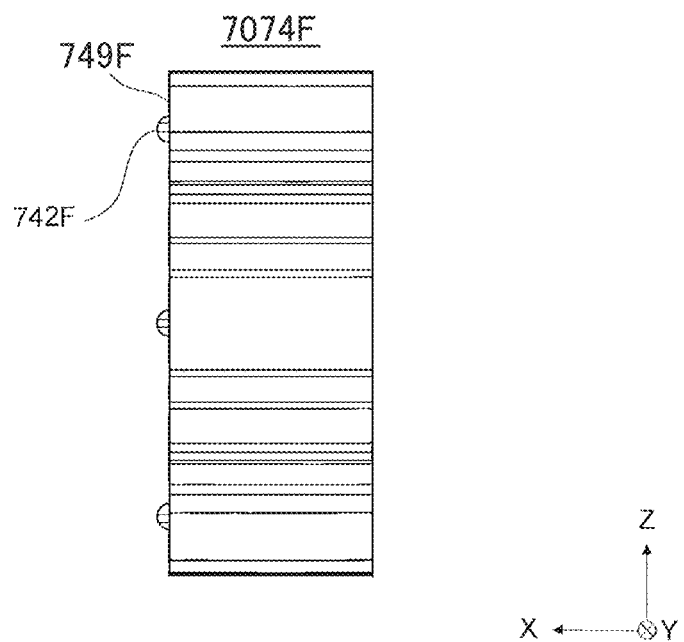

FIGS. 60A and 60B is a diagram accompanying an explanation of a sixth modified example of an inner gear 74 according to an embodiment according to the present disclosure, where FIG. 60A is a rear view of an inner gear 7074F as the sixth modified example and FIG. 59B is a right side view of the inner gear 7074F. The inner gear 7074F that is depicted in FIG. 60, when compared to the inner gear 74, is different only in the shape of the contact raised portion 742F.

The contact raised portion 742F is provided, in the end face (opening end face) 749F of the side of the inner gear 7074F that contacts the contact surface portion 411 of the second housing 40 (the other side in the axial direction), protruding to the contact surface portion 411 side, and where the shape in the cross-section that is perpendicular to the axial direction forms a "+", that is, a plus sign. The external shape of the contact raised portion 742F is bent so as to protrude toward the tip end, to make point contact with the contact surface portion 411 at the tip end portion that is bent.

The contact raised portion 742F, when compared to the contact raised portions 742A through 742C that are pyramid or conical bodies, and to the contact raised portion 742D with the rod shape, has an area in the cross-section that is perpendicular to the axial direction, that is, the area for propagation of the vibration along the axial direction, that is smaller. This can suppress even further the transmission of vibration from the one side to the other side in the axial direction.

Inner Gear Modified Example 7

Figure 61A:
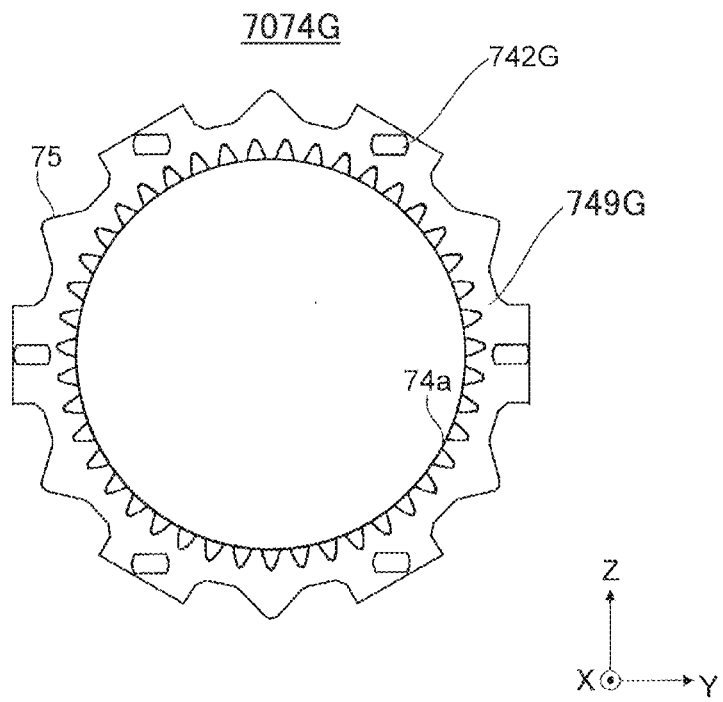
FIGS. 61A and 61B is a diagram accompanying an explanation of a seventh modified example of an inner gear according to an embodiment according to the present disclosure, where
Figure 61B:
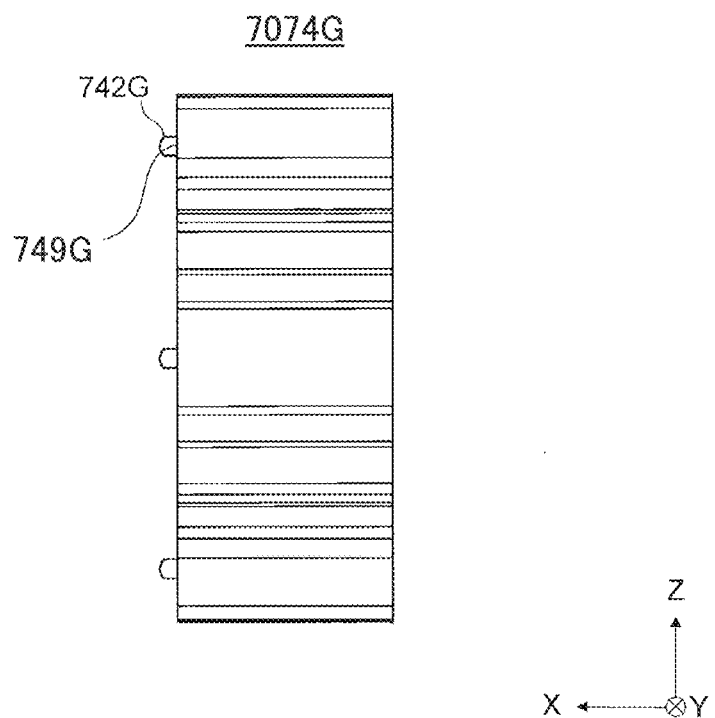

FIGS. 61A and 61B is a diagram accompanying an explanation of a seventh modified example of an inner gear 74 according to an embodiment according to the present disclosure, where FIG. 61A is a rear view of an inner gear 7074G as the seventh modified example and FIG. 61B is a right side view of said inner gear 7074G. The inner gear 7074G, when compared to the inner gear 74, is different only in the shape of the contact raised portion 742G. The contact raised portion 742G is formed, in the end face (opening end face) 749G of the side of the inner gear 7074G that contacts the contact surface portion 411 of the second housing 40 (the other side in the axial direction), protruding to the contact surface portion 411 side.

The contact raised portion 742G is an arched plate-shaped body that protrudes to the other side and that is bent so that the center of the tip end face is an apex. That is, the tip end portion of the contact raised portion 742G is formed in the shape of a spherical surface. Contact raised portions 742G are provided in parallel with each other, with a prescribed spacing therebetween in the circumferential direction, on the end face 749G.

The contact raised portion 742G, when compared to the contact raised portions 742A through 742C, with the pyramid or conical shapes, and the contact raised portion 742D with the rod shape, has an area in the cross-section that is perpendicular to the axial direction, that is, the area for propagation of the vibration along the axial direction, that is smaller. This can suppress even further the transmission of vibration from the one side to the other side in the axial direction.

Inner Gear Modified Example 8

Figure 62A:
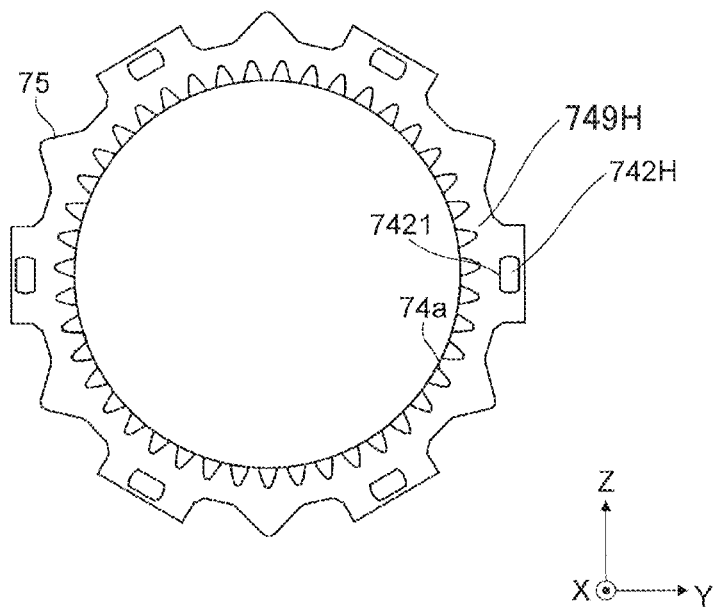
FIGS. 62A and 62B is a diagram accompanying an explanation of an eighth modified example of an inner gear according to an embodiment according to the present disclosure, where
Figure 62B:
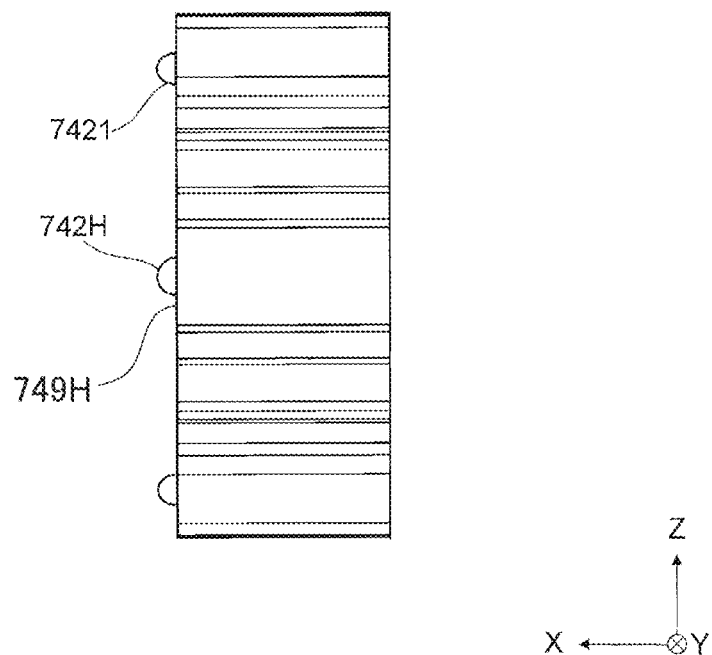

FIGS. 62A and 62B is a diagram accompanying an explanation of an eighth modified example of an inner gear 8 according to an embodiment according to the present disclosure, where FIG. 62A is a rear view of an inner gear 7074H as the eighth modified example and FIG. 61B is a right side view of said inner gear 7074H. In the inner gear 7074H, the direction of the contact raised portion 742G in the structure of the inner gear 7074G is changed.

Specifically, the inner gear 7074H has a contact raised portion 742H of the same shape as the contact raised portion 742G, protruding to the contact surface portion 411 at the end face (opening end face) 749H of the side of the inner gear 7074H that contacts the contact surface portion 411 of the second housing 40 (the other side in the axial direction).

The contact raised portion 742H is an arched plate-shaped portion that protrudes to the other side, and is provided at prescribed intervals in the circumferential direction on the end face 749H, where respective flat portions (for example, back faces) are provided facing the axis of the second housing 40. This can suppress even further the transmission of vibration from the inner gear 7074H to the second housing 40 side.

Moreover, in contact raised portion 742H each flat portion (and, in particular, the inner surfaces 7421 on the axis side) in the end faces 749H is in a state that is arranged along the circumferential direction. The inner gear 7074H is provided so as to enable floating movement, in the circumferential direction, within the second housing 40, where the interior of the second housing 40 is coated with a lubricant, such as grease, on the parts that slide with the inner gear 7074H. In the inner gear 7074H, when coated with a lubricant, within the second housing 40 the lubricant will tend to remain on the inner surface 7421 along the circumferential direction, even when the inner gear 7074H moves in the circumferential direction, causing the inner gear 7074H to maintain well its floating state within the second housing 40.

Inner Gear Modified Example 9

Figure 63A:
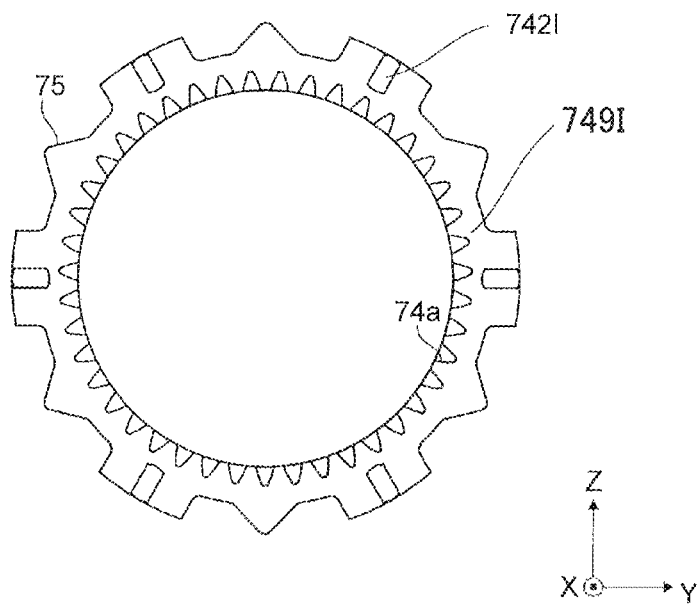
FIGS. 63A and 63B is a diagram accompanying an explanation of a ninth modified example of an inner gear according to an embodiment according to the present disclosure, where
Figure 63B:
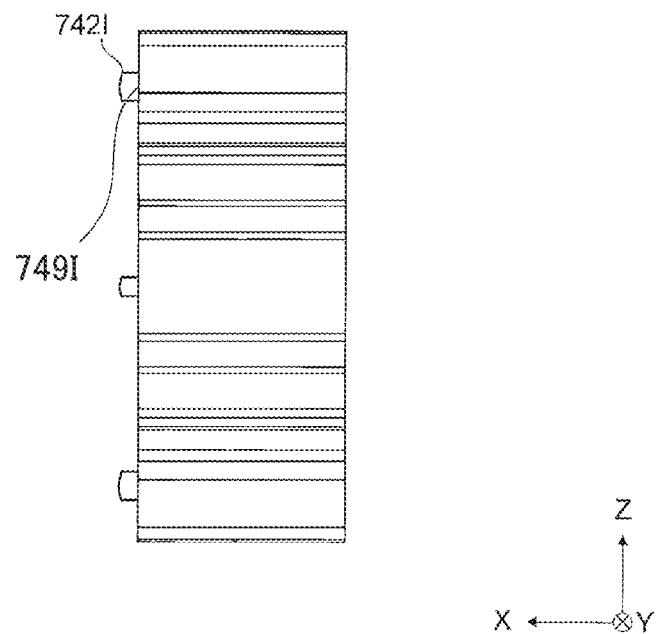

FIGS. 63A and 63B is a diagram accompanying an explanation of a ninth modified example of an inner gear 9 according to an embodiment according to the present disclosure, where FIG. 63A is a rear view of an inner gear 7074I as the ninth modified example and FIG. 63B is a right side view of said inner gear 7074I. In the inner gear 7074I, the direction of the contact raised portion 742G in the structure of the inner gear 7074G is changed.

Specifically, the inner gear 7074I has a contact raised portion 742I of the same shape as the contact raised portion 742G, protruding to the contact surface portion 411 at the end face (opening end face) 749I of the side of the inner gear 7074I that contacts the contact surface portion 411 of the second housing 40 (the other side in the axial direction).

The contact raised portion 742I is an arched plate-shaped portion that protrudes to the other side, and is provided at prescribed intervals in the circumferential direction on the end face 749I, where respective flat portions (for example, back faces) are provided in a radiating shape, along the radial direction of the second housing 40. This can suppress even further the transmission of vibration from the inner gear 7074I to the second housing 40 side.

Inner Gear Modified Example 10

Figure 64A:
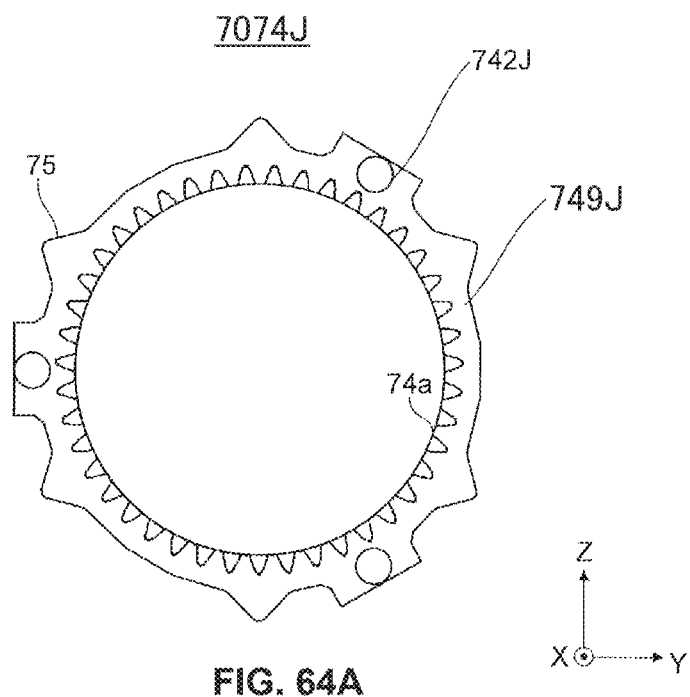
FIGS. 64A and 64B is a diagram accompanying an explanation of a $10^{th}$ modified example of an inner gear according to an embodiment according to the present disclosure, where
Figure 64B:
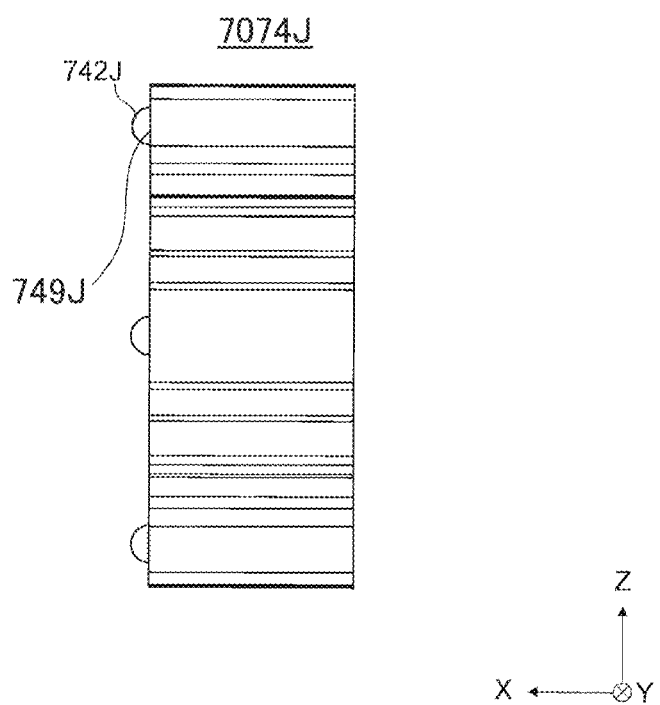

While the contact raised portions 742 and 742A through 742I in the embodiment and each of the modified examples 1 through 8, described above, were provided six each, with equal spacing therebetween in the circumferential direction on the respective end faces (opening end faces) 749 and 749A through 749I, any numbers thereof may be provided. For example, as shown with the inner gear 7074J depicted in FIG. 64, three contact raised portions 742J may be provided protruding, with spaces therebetween in the circumferential direction, on the end face (opening end face) 749J on the side that contacts the contact surface portion 411 of the second housing 40 (the other side in the axial direction). The contact raised portion 742J is not limited to a structure in the same shape as the contact raised portion 742J as depicted in FIG. 64, but rather may be provided in a shape that is the same as any of the contact raised portions 742A through 742I.

As depicted for the inner gear 7074J, the smaller the contact raised portion 742J provided on the end face 749J, the smaller the propagation path of the vibration to the contact surface portion 411, enabling suppression of the transmission of vibration from the inner gear 7074J side to the second housing 40. Moreover, while the contact raised portions 742 and 742A through 742J in the inner gears 74 and 7074A through 7074J were each configured laid out with equal spacing therebetween in the circumferential direction on the respective end faces 749 and 749A through 749J, there is no limitation thereto.

Inner Gear Modified Example 11

Figure 65A:
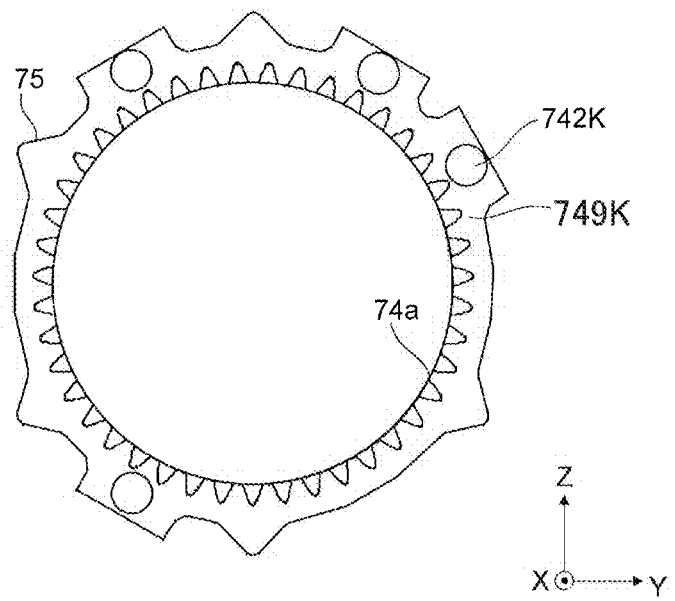
FIGS. 65A and 65B is a diagram accompanying an explanation of an $11^{th}$ modified example of an inner gear according to an embodiment according to the present disclosure, where
Figure 65B:
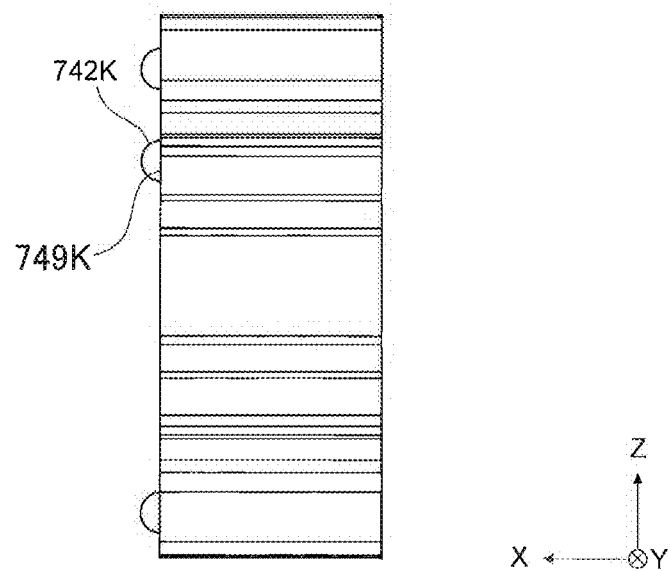

In an inner gear 7074K, as a 11th modified example of the inner gear 74 that is depicted in FIG. 65, a contact raised portion 742K protrudes to the other side, with unequal spacing therebetween in the circumferential direction on the end face (opening end face) 749K. While, in the inner gear 7074K in the 11th modified example, the contact raised portion 742K is formed in a hemispherical shape, the same as with the contact raised portion 740, there is no limitation thereto, but it may be the same shape as any of the contact raised portions 742A through 742I of the inner gears 7074A through 7074I.

Inner Gear Modified Example 12

Figure 66A:
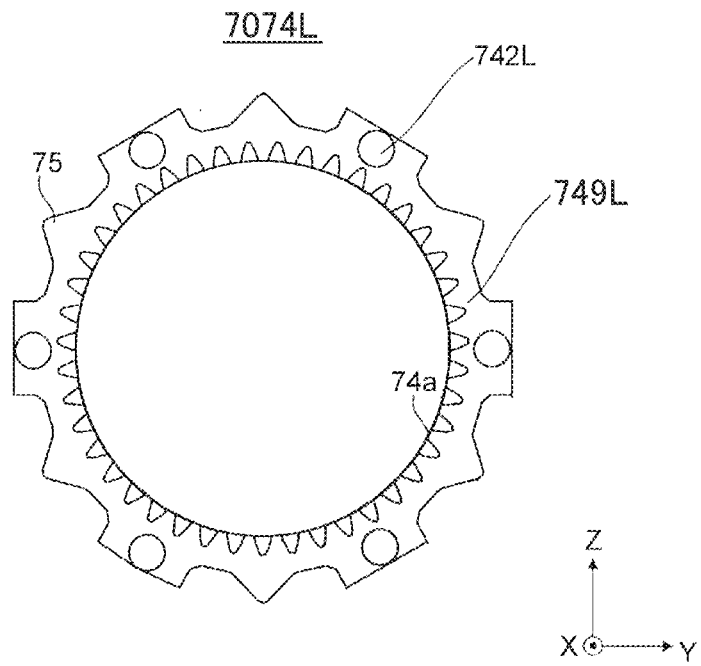
FIGS. 66A and 66B is a diagram accompanying an explanation of a $12^{th}$ modified example of an inner gear according to an embodiment according to the present disclosure, where
Figure 66B:
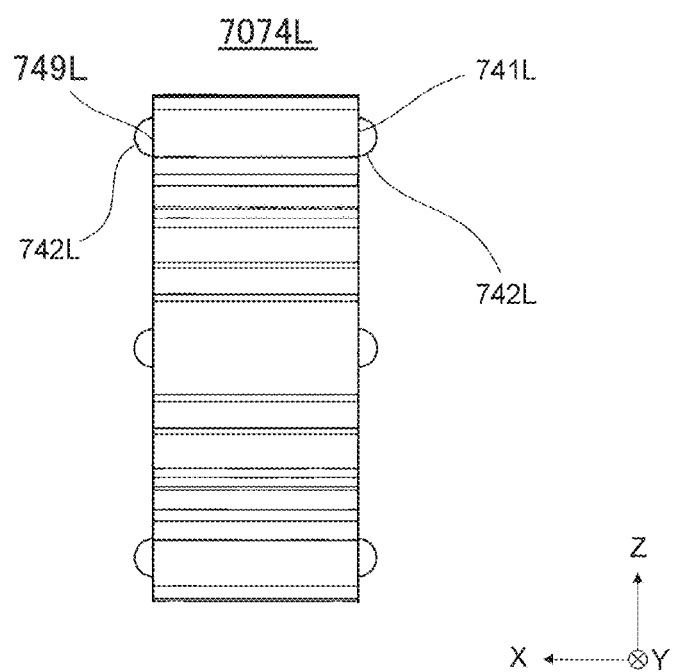

The inner gear 7074L, as a 12th modified example of an inner gear 74, depicted in FIG. 66, when compared to the inner gear 74, is equipped with contact raised portions 742L on both the end face 749L on the other side and the end face on the side opposite from the end face 749L on the other side (the opening end face) 741L. The contact raised portions 742L are provided protruding in a plurality thereof, with prescribed spacing therebetween (which, in the present embodiment, is equal spacing) in the circumferential direction, on both end faces 749L and 741L. That is, the inner gear 7074L is provided with contact raised portions (contacting portions on the one side), that protrude on the end face (opening end face) 741L on the one side, in the same manner as the contact raised portions 742L.

The inner gear 7074L makes point contact with the contact surface 411 portion of the second housing 40 through the contact raised portion 742L on the end face 749L on the other side, and makes point contact with the first housing 30 through the contact raised portion 742L on the end face 741L on the one side.

Through this, in an actuator wherein the inner gear 7074L is connected through a point contact to the motor side as well, this can suppress transmission of vibration to the housing and to the motor. Note that this configuration wherein contact raised portions are provided on both opening end faces that are separated in the axial direction of the inner gear 74 can be applied to any of the inner gears 7074A through 7074K of the various modified examples 1 through 11, and, in addition to the various effects described above, can also produce a similar effect in operation as that of the inner gear 7074L.

With the inner gears 74, 7074A through 7074C, and 7074E through 7074L depicted in the present embodiment and in modified examples 1 through 12, the contact raised portions 742, 742A through 742C, and 742E through 742L were formed so that the area of the cross-section that is perpendicular to the axial direction will be smaller toward the direction of protrusion. That is, in addition to the contact raised portions 742, 742A through 742C, and 742E through 742L being structured so that the area of the cross-section that is perpendicular to the axial direction will be smaller the further from the end face (opening end face) 749, 749A through 749C, and 749E through 749L) on the other side, the inner gears 74, 7074A through 7074C, and 7074E through 7074L are held within the first housing 30 and the second housing 40 in a state wherein the respective contact raised portions 742, 742A through 742C, and 742E through 742L make point contacts with the contact surface portions 411. This makes it possible to suppress the transmission of vibration from the inner gears 74, 7074A through 7074C, and 7074E through 7074L through the contact surface portions 411 to the first housing 30 and the second housing 40.

Moreover, while the explanations were for cases wherein they separate structural units for the inner gear and the housing were used in a portion of the planetary gear device, the application is not limited thereto, but may be used as a portion of another gear mechanism.

In the embodiment set forth above the planetary gear mechanism of the planetary gear device was achieved through three planetary gears; however, the present disclosure is not limited thereto. In the present disclosure, the planetary gear device may be achieved through the use of a planetary gear mechanism that uses, for example, a single planetary gear or a plurality, other than three, of planetary gears.

Moreover, the planetary gear device to which the present disclosure is applied may be applied to a variety of machines and apparatuses that use reducing mechanisms or increasing mechanisms, such as automobiles, robots, industrial equipment, playground equipment, or the like.

Moreover, instead of a structure that limits the movement within the housing through producing linear contact, along the axial direction, between the movement limiting raised portions (first raised portions) and pairs of stoppers (second raised portions) in the embodiments described above, the structure may be one wherein the movement is limited within the housing through point contact between the movement limiting raised portions (first raised portions) and the pairs of stoppers (second raised portions). More specifically, the pairs of stoppers in FIG. 5 (second raised portions) 45 may be of a shape that is discontinuous in the axial direction, and the movement limiting raised portions (first raised portions) 75 in FIG. 7 may be of a shape that is discontinuous in the axial direction.

While in the reference examples set forth above the raised portions formed on the outer peripheral surface of the inner gear 74 and the raised portions formed on the inner peripheral surface of the first housing 40 were caused to come into contact in order to limit the movement of the inner gear 74, the locations that are caused to come into contact can be set arbitrarily, and there is no limitation to the reference examples set forth above. In a first embodiment according to the present disclosure the movement of the inner gear is limited through causing protrusion is formed on an end face of the inner gear to contact recessed portions that are formed in the second housing.

Figure 67:
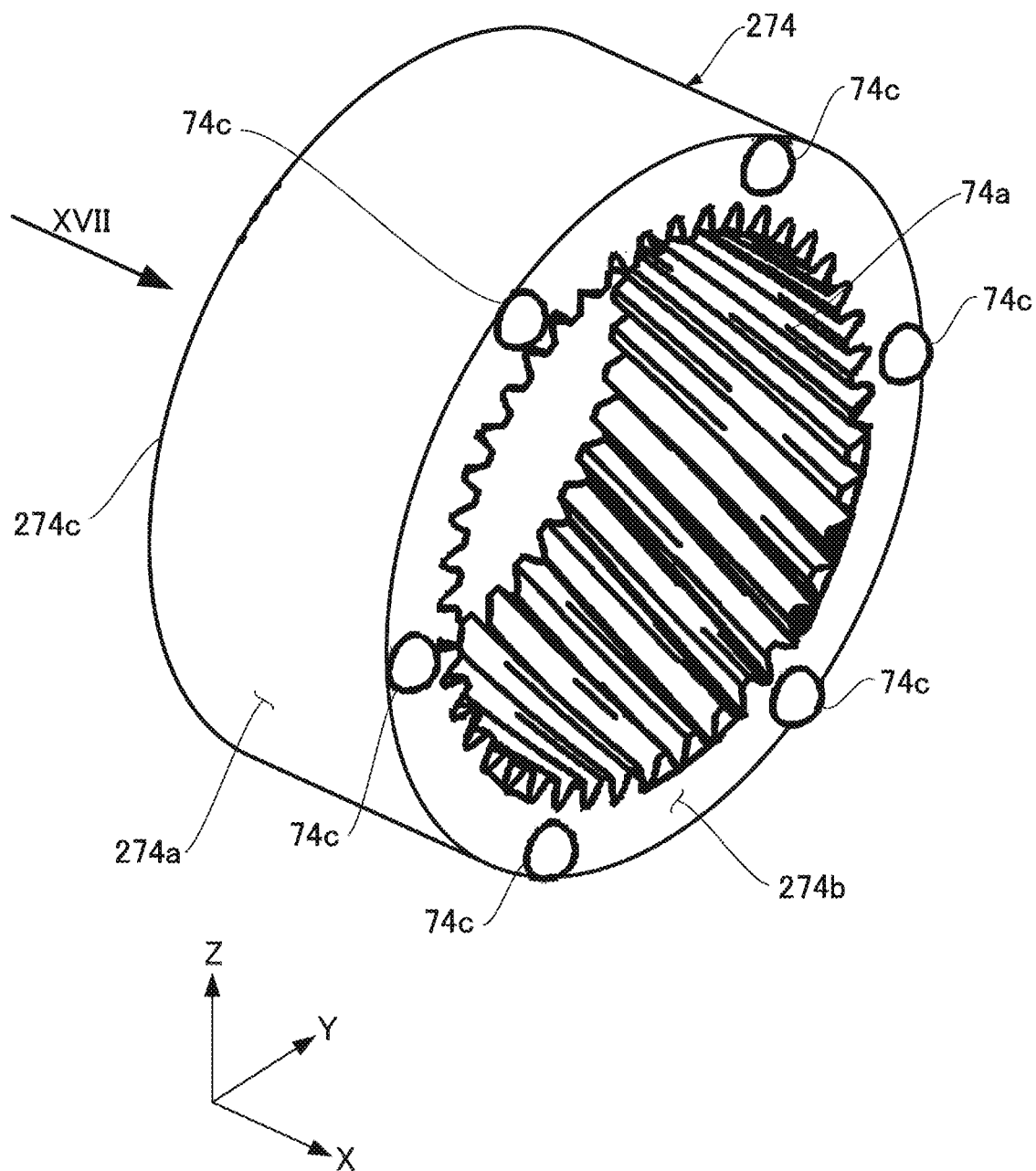
FIG. 67 is a perspective diagram of an inner gear according to a first embodiment according to the present disclosure.

As depicted in FIG. 67, rather than forming the movement limiting raised portions 75 (FIG. 7), explained in the reference examples, the outer peripheral surface 274a of the inner gear 274 according to the present embodiment is structured from a curved surface wherein no recessed or raised portions are formed on the surface. Because of this, in the present embodiment the pairs of stoppers 45, depicted in FIG. 6, which had been arranged corresponding to the movement limiting raised portions may be omitted. Through this, the inner gear 274 is contained within the first housing 40 in a state wherein a gap is provided from the inner peripheral surface of the first housing 40.

Figure 68A:
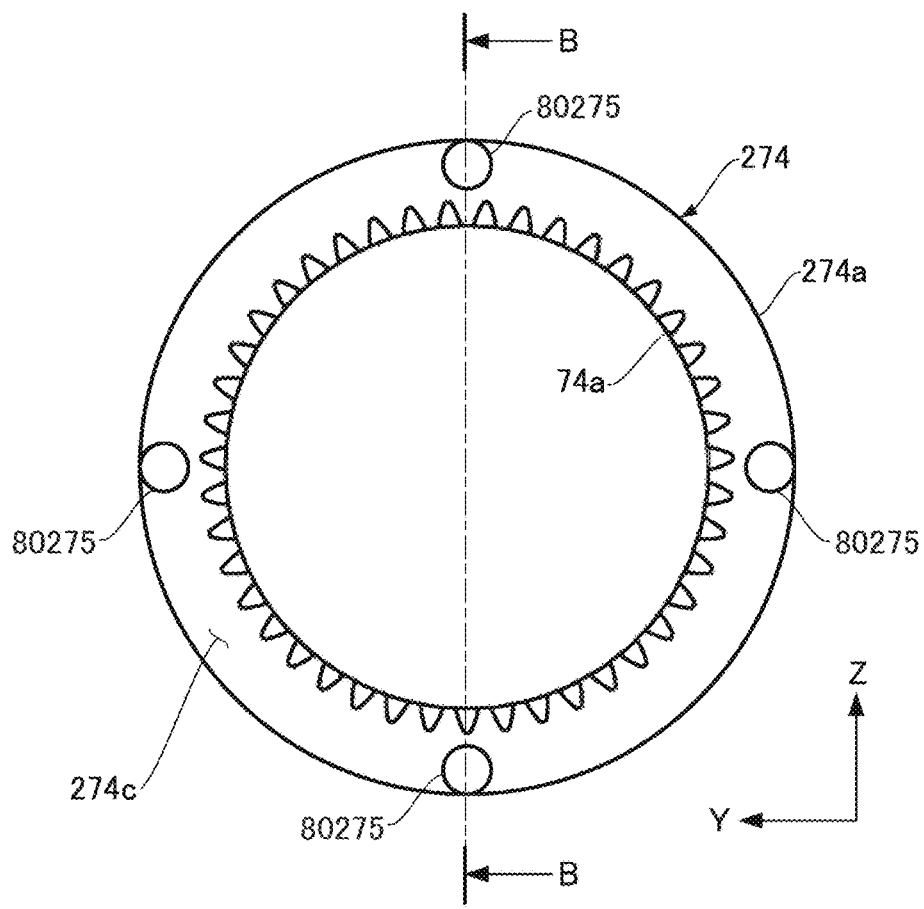
FIGS. 68A and 68B are diagrams depicting the inner gear shown in FIG. 67, where
Figure 68B:
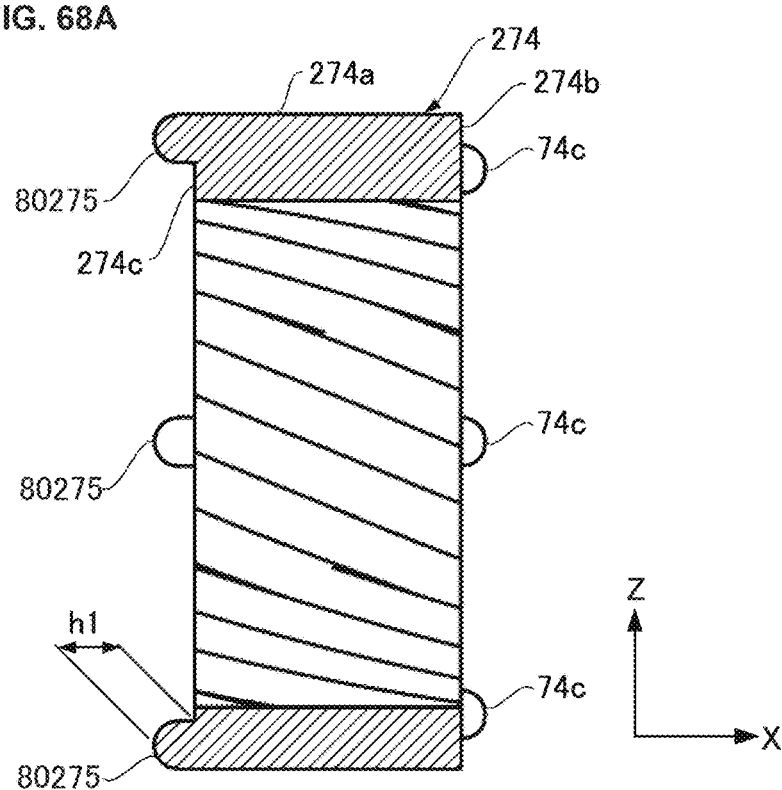
Figure 71:
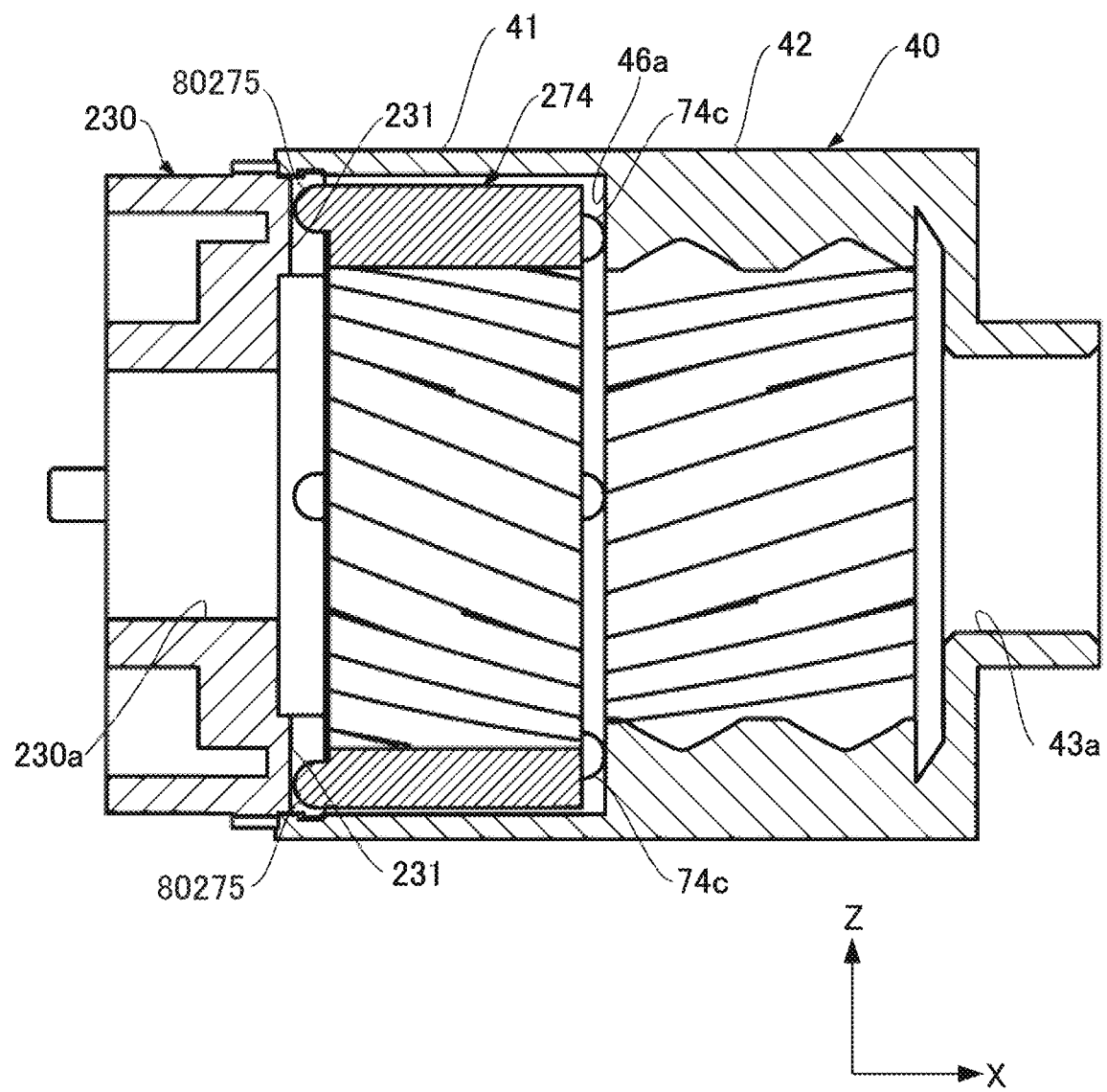
FIG. 71 is a cross-sectional diagram depicting the state wherein a second housing and an inner gear are attached to a first housing according to a first embodiment according to the present disclosure.

As with the inner gear 74 depicted in FIG. 7, six hemispherical protrusions 74c are formed on an end face 274b on the +X direction side of the inner gear 274. As depicted in FIG. 71, the apex of the protrusion 74c that is formed in a hemisphere makes point contact with the stepped surface 46a that is the boundary between the first position 41 and the second position 42 of the first housing 40. On the other hand, as depicted in FIGS. 68A and 68B, four protrusions 80275 are arranged spaced at equal angles around the inner gear 274, on the end face 274c on the −X direction side of the inner gear 274. As depicted in FIG. 68B, the four protrusions 80275 protrude from the end face 274c by a height of h1. The protrusions 80275 have a shape wherein a hemispherical body is connected to the end face of a circular column, thereby securing a height h1 that is greater than the radius of the hemispherical body.

Figure 69:
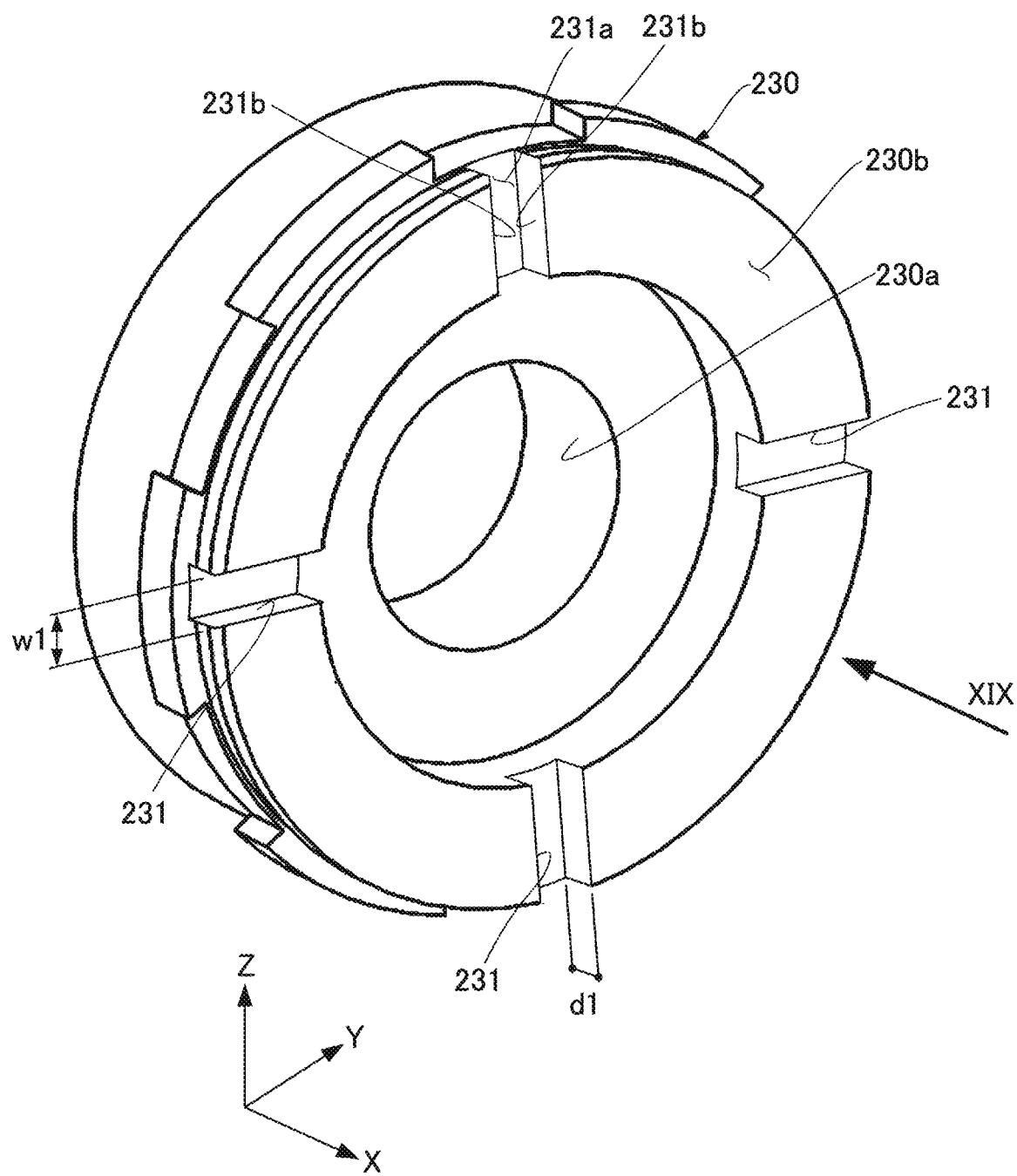
FIG. 69 is a perspective diagram of a second housing according to a first embodiment according to the present disclosure.

A second housing 230 according to the present embodiment, which assembles together with the first housing 40 (FIG. 71), as depicted in FIG. 69, is formed with an opening 230a in the center thereof, into which is inserted a rotary shaft 12 of a motor 10 (FIG. 4). The end face 230b on the +X axial direction side of the second housing 230 is formed in a ring shape, and there are four recessed portions 231, formed along the radial directions from the center thereof (the position of the axis). The directions in which recessed portions 231 that are adjacent to each other in the circumferential direction are formed have mutually perpendicular relationships. That is, the four recessed portions 231 are grooves that are formed overlapping into a "+", having a point of intersection that is coincident with the center of the second housing 230 (the position of the axis).

Figure 70A:
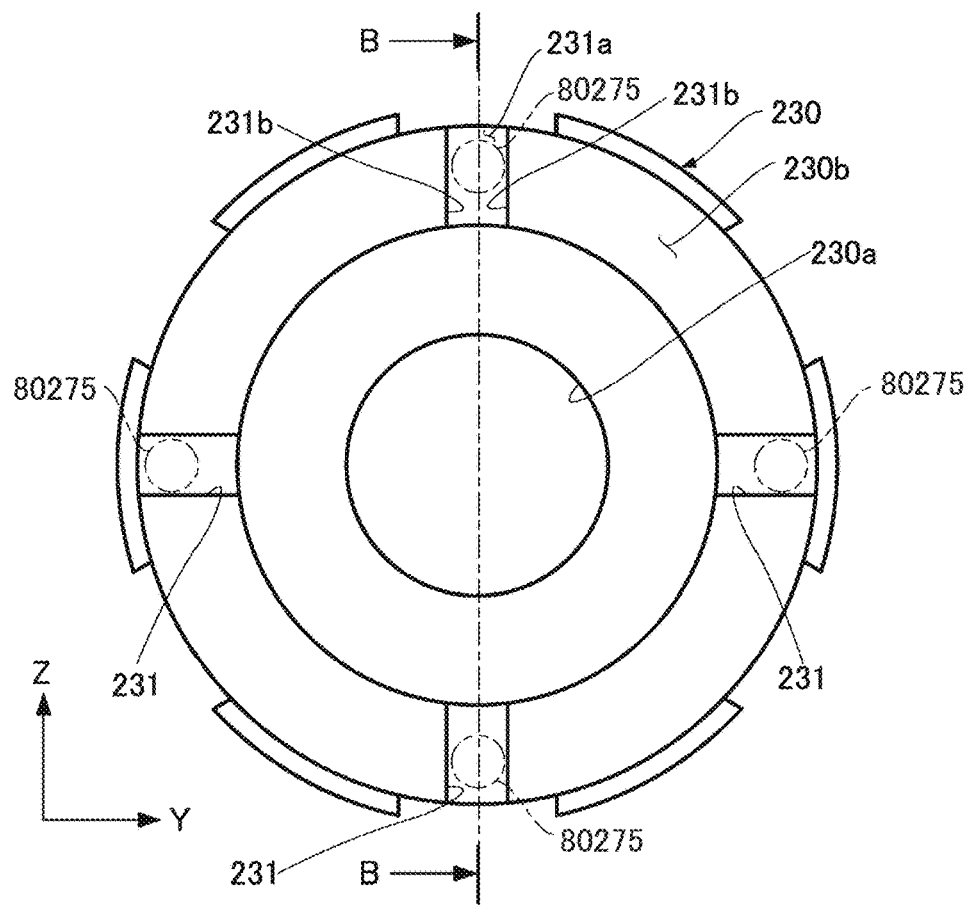
FIGS. 70A and 70B are diagrams depicting the second housing shown in FIG. 69, where

The dimensions of the recessed portions 231, as depicted in FIG. 69, are a width of w1 and a depth of d1. Here the depth d1 of the recessed portion 231 is shallower than the height h1 of the protrusion 80275 depicted in FIGS. 68A and 68B. Moreover, the width w1 of the recessed portion 231 is wider than the diameter of the protrusion 80275 depicted in FIGS. 68A and 68B. For example, the width w1 of the recessed portion 231 is about 1.2 times the diameter of the protrusion 80275. As depicted in FIG. 71, the inner gear 274 is contained in the housing made up of the second housing 230 and the first housing 40 in a state wherein the four protrusions 80275 are inserted into the respective corresponding recessed portions 231. Because the width w1 of the recessed portion 231 is wider than the diameter of the protrusion 80275, a gap is formed around the protrusion 80275 that is inserted into the recessed portion 231, as depicted in FIG. 70A.

When, in the state that the inner gear 274 is contained within the housing, it is moved to the +X direction side, then, as depicted in FIG. 71, the apex of a protrusion 74c that is formed on the inner gear 274 makes point contact with the stepped surface 46a of the first housing 40, to prevent further movement of the inner gear 274. In this way, when the inner gear 274 moves to the +X direction side, the contact between the protrusion 74c and the stepped surface 46a, which is of a narrow range that can be termed a point contact, limits the movement of the inner gear 274 to the +X direction side.

Figure 70B:
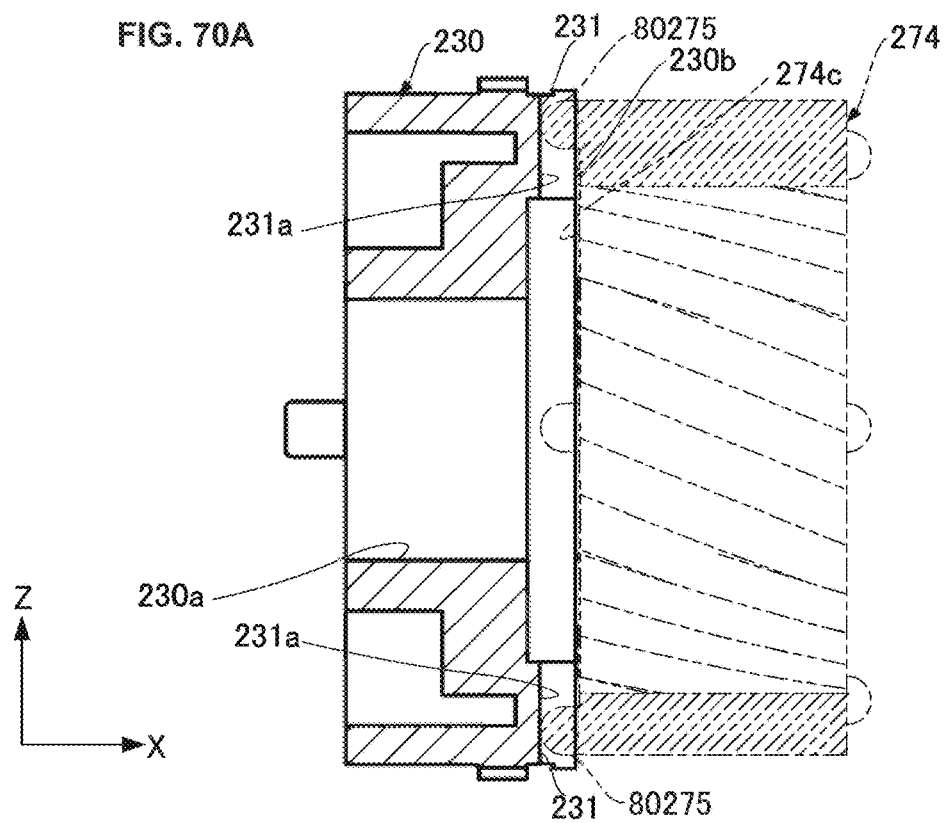

On the other hand, when, in a state wherein the inner gear 274 is contained within the housing, it moves to the −X direction side, then, as depicted in FIG. 70B, the apex of the protrusion 80275 that is formed on the inner gear 274 contacts the bottom face 231a of the recessed portion 231 that is formed in the second housing 230. The movement of the inner gear 274 to the −X axial direction side is limited thereby. As described above, because the tip ends of the protrusions 80275 are formed into hemispherical-shapes, the contacts between the apexes of the protrusions 80275 and the bottom faces 231a of the recessed portion 231 will be point contacts. Moreover, because the depth d1 of the recessed portions 231 (FIG. 69) is shallower than the height h1 of the protrusions 80275 (FIG. 68B), when in a state wherein the apexes of the protrusions 80275 are in contact with the bottom faces 231a of the recessed portions 231, the end faces 230b of the second housing 230 can be kept away from the end faces 274c of the inner gear 274. Through this, the inner gear 274 that has moved to the −X direction side is prevented from moving toward the −X direction side of the inner gear 274 through only the contact between the protrusions 80275 and the bottom faces 231a of the recessed portions 231 that are in narrow ranges that can be termed point contacts.

In this way, despite the inner gear 274 moving along the axial direction, the movement is limited by contacts in narrow ranges that can be termed point contacts. Because of this, the transmission of vibration from the inner gear 274 during operation to the second housing 230 and the first housing 40 can be reduced.

Figure 72:
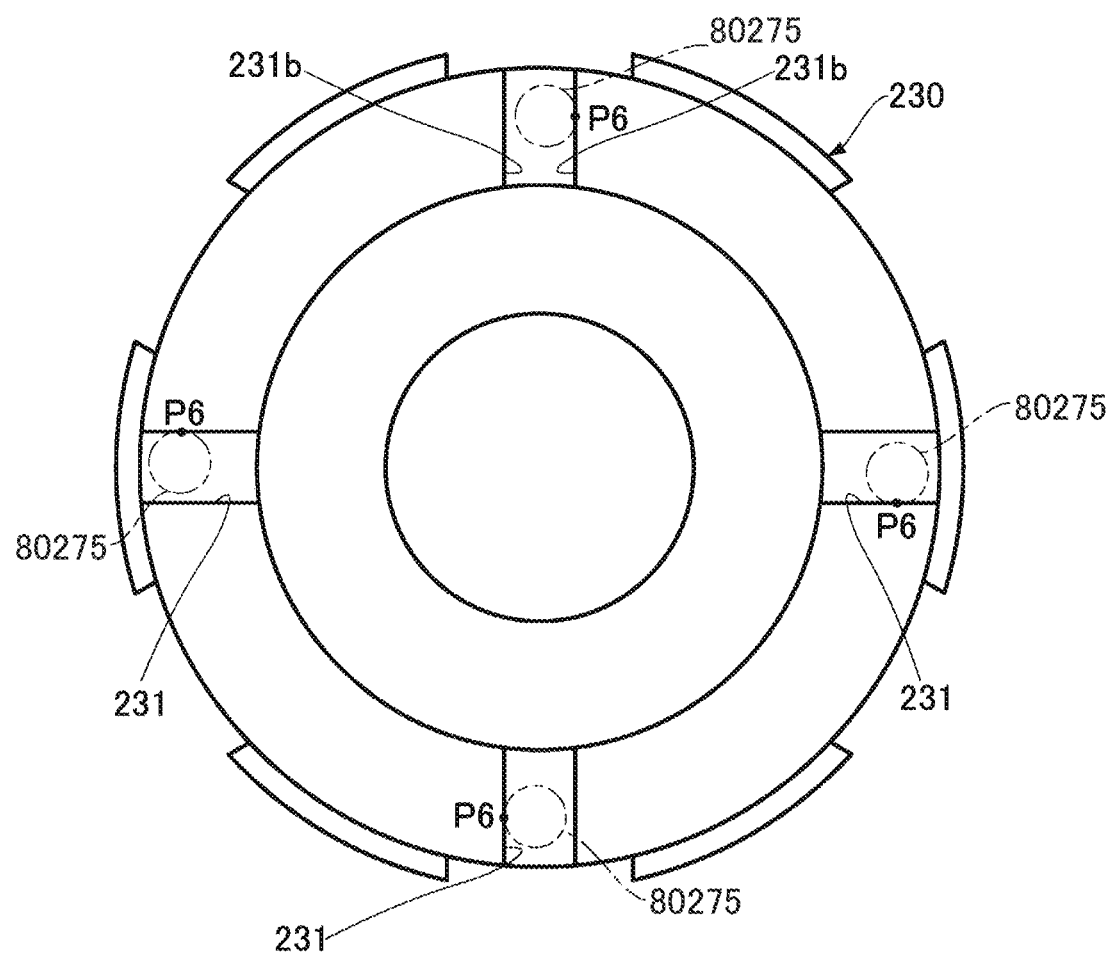
FIG. 72 is a diagram for explaining a state wherein the inner gear has rotated around the axis from the state depicted in FIG. 70A.

Moreover, let us assume that the inner gear 274 has rotated clockwise, centered on the axis, from the states depicted in FIG. 70A. Given this, the side faces of all of the protrusions 80275, as depicted in FIG. 72, will contact the side wall portions 231b of the recessed portions 231 with the contact points P6, preventing further rotation of the inner gear 274. The contact points P6 are contacts in extremely limited ranges, given that they are contacts between the protrusions 80275, which are described as circles, and the side wall portions 231b of the recessed portions 231, which are described as straight lines. The circular column that structures a portion of the protrusion 80275 and the side wall portion 231b of the recessed portion 231 are continuous in the axial direction (the vertical direction in the drawings). Because of this, the form of contact between a protrusion 80275 and a recessed portion 231 can be linear contact along the axial direction. Note that even if the inner gear 274 were to rotate in the counterclockwise direction around axis from the state depicted in FIG. 70A, the form of contact between the protrusions 80275 and the recessed portions 231 would still be linear contact.

Figure 73:
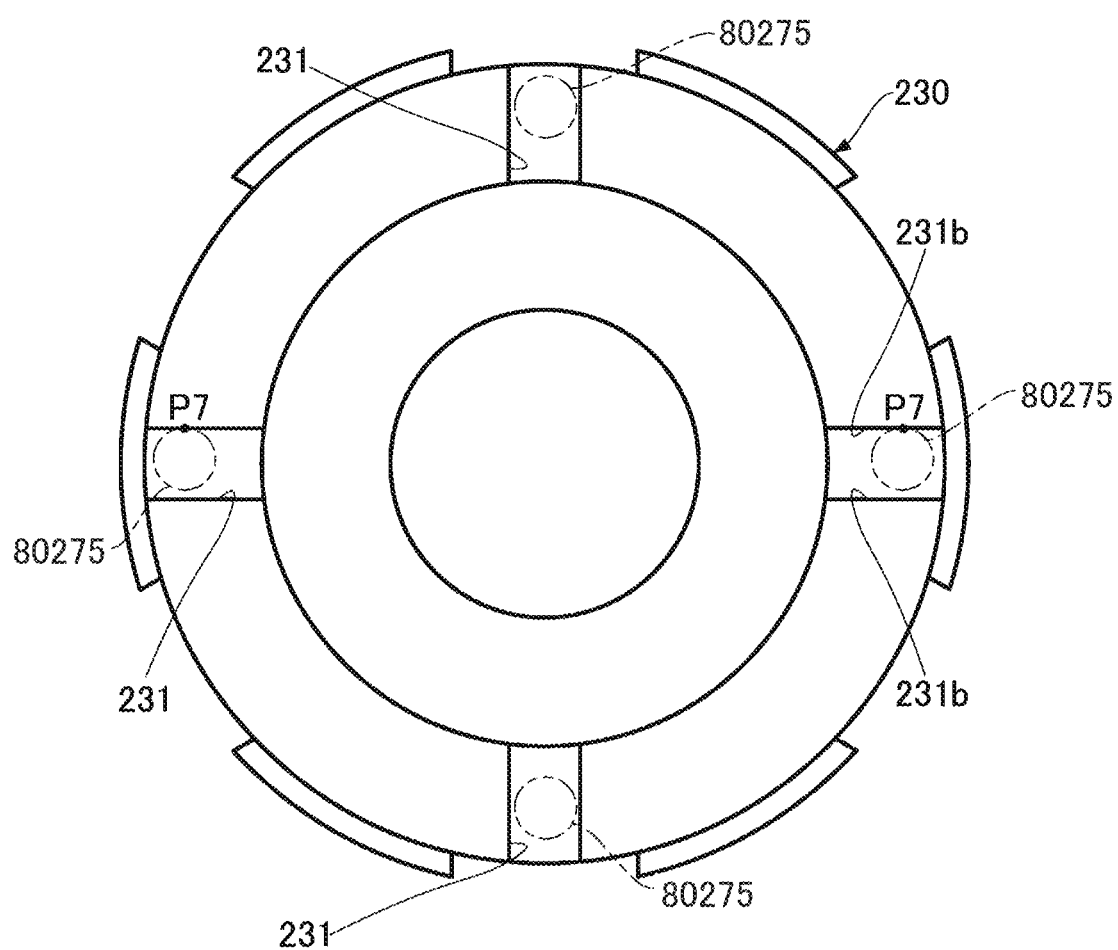
FIG. 73 is a diagram for explaining a state wherein the inner gear has moved in a direction that is perpendicular to the axis from the state depicted in FIG. 70A.

Moreover, the let us assume that the inner gear 274 has moved, from the state depicted in FIG. 70A in a direction that is perpendicular to the axis, for example, upward in the figure. Given this, the side faces of two protrusions 80275, as depicted in FIG. 73, contact the side wall portions 231b of the recessed portions 231 at the contact points P7, limiting further movement of the inner gear 274 in the direction perpendicular to the axis. The contact points P7 are contacts in extremely limited ranges, given that they are contacts between the protrusions 80275, which are described as circles, and the side wall portions 231b of the recessed portions 231, which are described as straight lines. The circular column that structures a portion of the protrusion 80275 and the side wall portion 231b of the recessed portion 231 are continuous in the axial direction (the vertical direction in the drawings). Because of this, the form of contact between a protrusion 80275 and a recessed portion 231 can be linear contact along the axial direction. Note that even if the inner gear 274 were to move in the downward direction from the state depicted in FIG. 70A, the form of contact between the protrusions 80275 and the recessed portions 231 would still be linear contact.

In this way can, regardless of whether the inner gear 274 has rotated clockwise around the axis or moved in a direction that is perpendicular to the axial direction, the form of contact between the protrusions 80275 and the recessed portions 231 can be limited to a narrow range that can be termed linear contact. The transmission of vibration from the inner gear 274 to the second housing 230 can be reduced thereby. In this way, protrusions 80275 are formed as the first contacting portions on the end face 274c in the −X direction side of the inner gear 274. Moreover, four recessed portions 231 are formed as the second contacting portions on the end face 230b on the +X direction side of the second housing 230.

Moreover, the recessed portion 231 for limiting the movement of the inner gear 274 is formed in the second housing 230 that forms the end portion of the housing, rather than in the first housing 40 (FIG. 71) that occupies a size that is most of the housing. This makes it possible to reduce the contact area between the inner gear 274 and the housing. Moreover, the second housing 230 functions as a portion of a cap that covers the opening portion of the first housing 40, thus reducing the transmission of the vibration to the first housing 40 (FIG. 71). The noise produced from the planetary gear device 20 (FIG. 4) can be suppressed thereby.

In the first embodiment, the movement of the inner gear 274 was limited through causing a linear contact between a protrusion 80275 formed in the inner gear 274 and a recessed portion 231 formed in the second housing 230. On the other hand, in this second embodiment, the locations where the protrusions are formed are switched with the locations where the recessed portions are formed, and recessed portions are formed in the inner gear and protrusions are formed in the second housing.

Figure 74A:
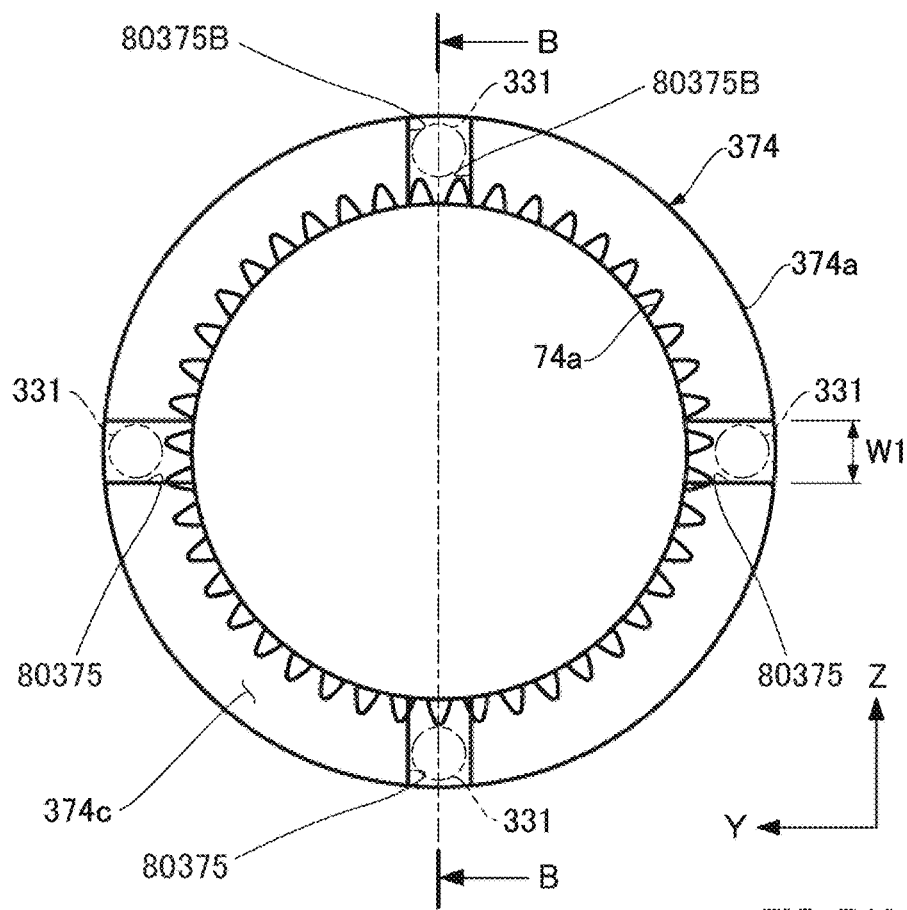
FIGS. 74A and 74B are diagrams depicting an inner gear according to a second embodiment according to the present disclosure, where
Figure 74B:
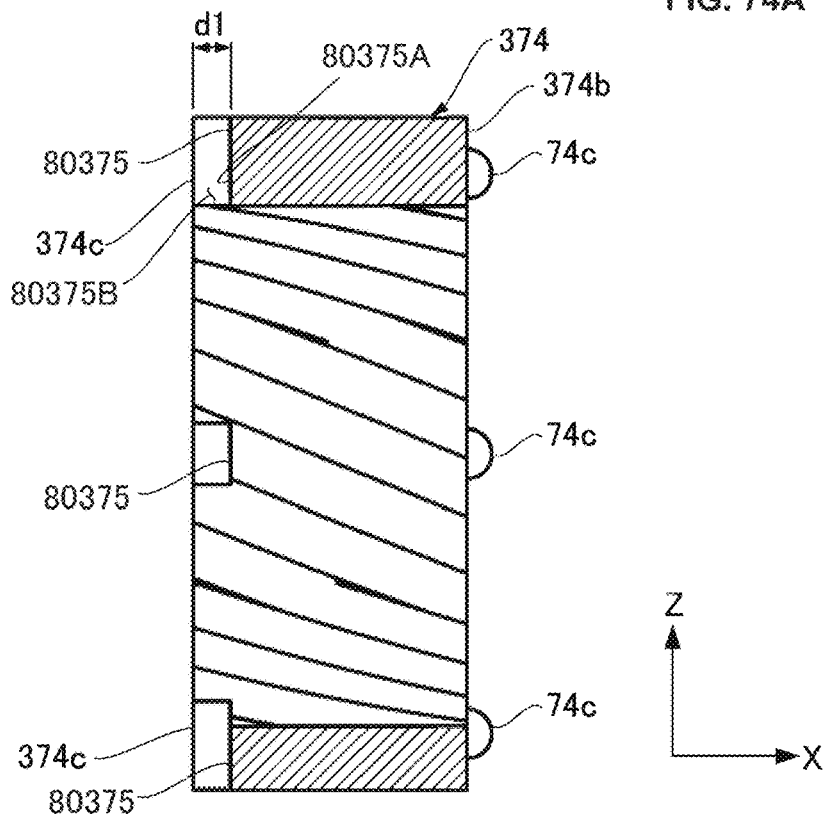

As depicted in FIGS. 74A and 74B, the outer peripheral surface 374a of the inner gear 374 according to the present embodiment is structured from a curved surface wherein no recessed or raised portions are formed on the surface. As with the inner gear 274 depicted in FIG. 67, six hemispherical protrusions 74c are formed on an end face 374b on the +X direction side of the inner gear 374. On the other hand, the end face 374c on the −X direction side of the inner gear 374 has four recessed portions 80375 that are formed along the radial direction from the center (the position of the axis) of the inner gear 374. The four recessed portions 80375 overlap as a "+", the same as the four recessed portions 231 explained in reference to FIGS. 70A and 70B. Note that the dimensions of the recessed portions 80375, as depicted in FIGS. 74A and 74B, are a width of w1 and a depth of d1. The depth d1 of the recessed portions 80375 is shallower than the height h1 of the protrusions 331 formed in the second housing 330, depicted in FIGS. 75A and 75B. Additionally, the width w1 of the recessed portions 80375 wider than the diameter of the protrusions 331 formed in the second housing 330, depicted in FIGS. 75A and 75B.

Figure 75A:
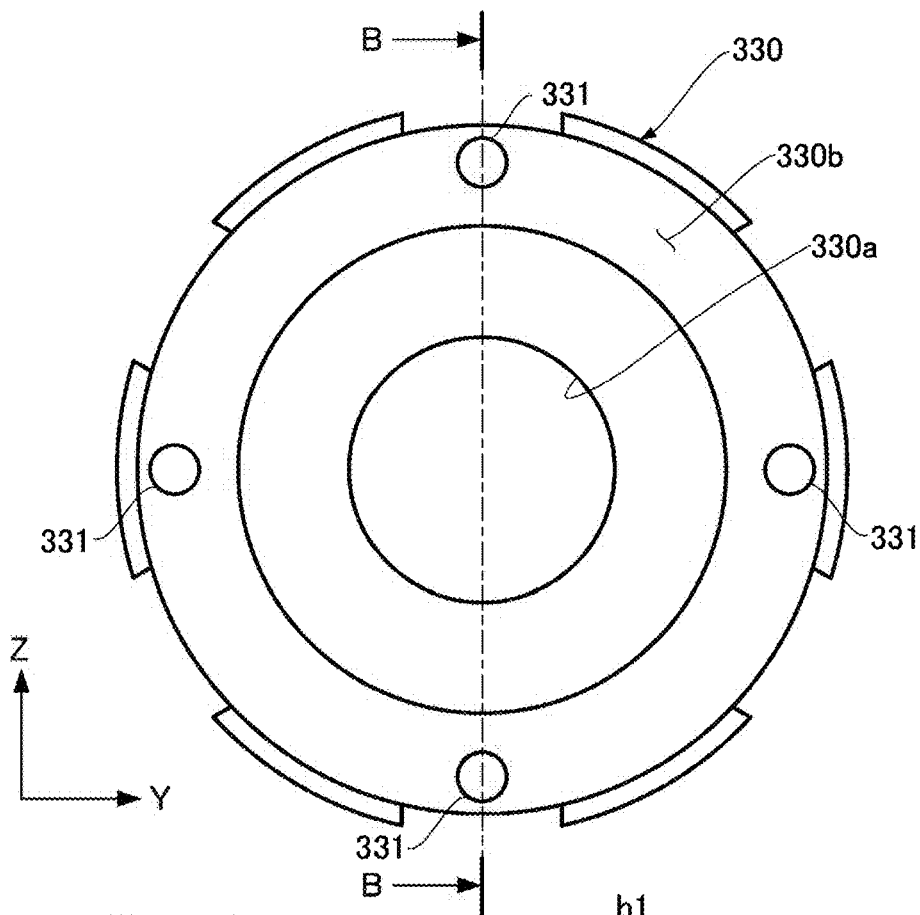
FIGS. 75A and 75B are diagrams depicting a second housing according to a second embodiment according to the present disclosure, where
Figure 75B:
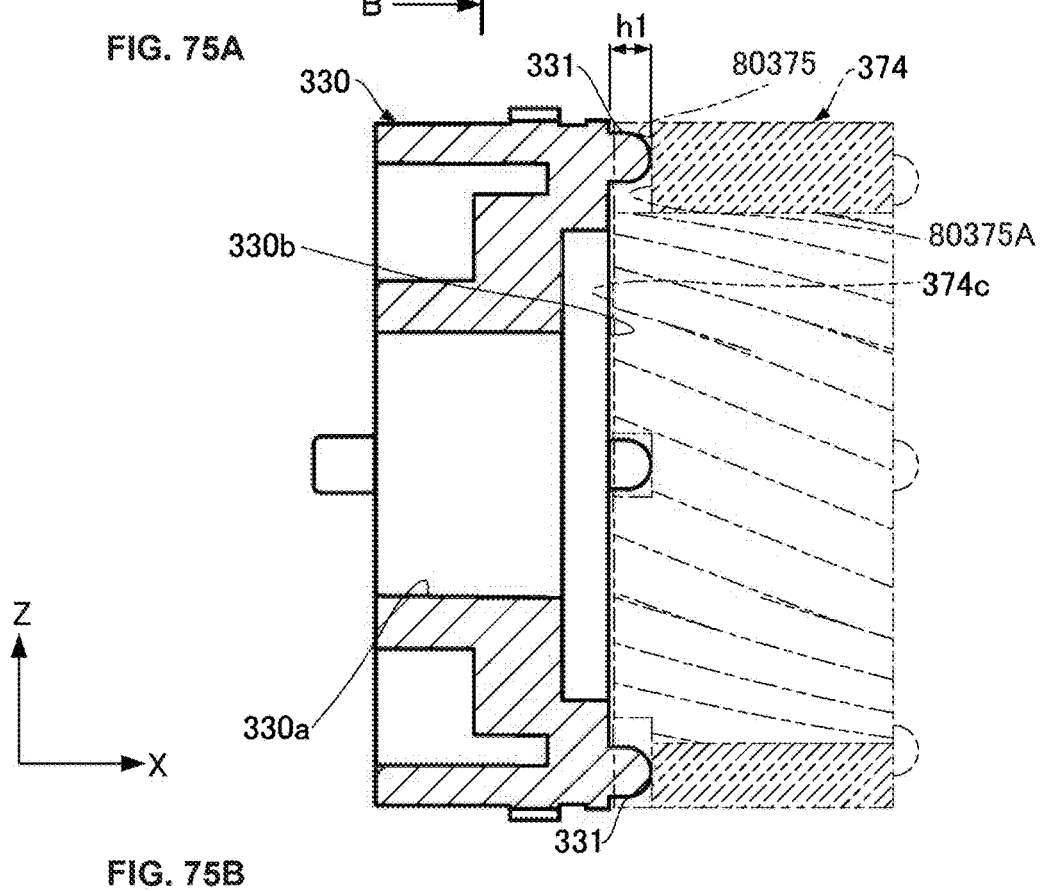

The second housing 330, as depicted in FIGS. 75A and 75B, is formed, in the center thereof, with an opening 330a through which the rotor shaft 12 (FIG. 4) of the motor 10 passes. The four protrusions 331 are positioned with equal angles around the center (the position of the axis) of the second housing 330, on the end face 330b on the +X axial direction side of the second housing 330. As depicted in FIG. 75B, the four protrusions 331 protrude from the end face 330b by a height of h1 along the +X axial direction. The protrusions 331 have a shape wherein a hemispherical body is connected to the end face of a circular column, thereby securing a height h1 that is greater than the radius of the hemispherical body.

When, in the state wherein the inner gear 374 is contained within the housing, it is moved to the +X direction side, then, in the same manner as in the first embodiment, described above, the apex of a protrusion 74c (FIG. 74B) that is formed on the inner gear 374 makes point contact with the stepped surface 46a (FIG. 71) of the first housing 40, to prevent further movement of the inner gear 374.

On the other hand, when, in the state that the inner gear 374 is contained within the housing, it is moved to the −X direction side, then, as depicted in FIG. 75B, the protrusion 331 that is formed in the second housing 330 makes point contact with the bottom face 80375a of the recessed portion 80375 that is formed in the inner gear 374, to prevent further movement of the inner gear 374.

In this way, despite the inner gear 374 moving along the axial direction, the movement is limited by contacts in narrow ranges that can be termed point contacts. Because of this, the transmission of vibration from the inner gear 374 during operation to the second housing 330 and the first housing 40 can be reduced.

Moreover, because, in comparison with the first embodiment, this is just switching of the locations wherein the protrusions and the recessed portions are formed, even if the inner gear 374 has been rotated in the clockwise direction around the axis, and even if it has moved in a direction that is perpendicular to the axis, the movement of the inner gear 374 is limited through linear contact between the side faces of the protrusions 331 that are formed in the second housing 330 and the side wall portions 80375b of the recessed portions 80375 that are formed in the inner gear 374. The same effects of operation as in the first embodiment can be produced thereby.

In the embodiments set forth above, as the structure for contacting the protrusions 80275 and 331, groove-shaped recessed portions 231 and 80375 that overlap in the form of a "+" were formed. However, the shape of the recessed portions can be set arbitrarily, and is not limited to a groove shape. Moreover, the positions for forming the recessed portions are also not limited to the form described above. Next, a structure wherein the shapes and positions of the recessed portions contacted by the protrusions are different from the form described above will be explained as a third embodiment. Note that the second housing in the present embodiment is the same as the second housing 330 that is depicted in FIGS. 75A and 75B.

As depicted in FIGS. 25 and 26, the outer surface 474a of the inner gear 474 according to the present embodiment is structured from a curved surface wherein no recessed or raised portions are formed on the surface. As with the inner gear 274 depicted in FIG. 67, six hemispherical protrusions 74c are formed on an end face 474b on the +X direction side of the inner gear 474. On the other hand, as depicted in FIGS. 25 and 26, four recessed portions 80475 are arranged on the end face 474c On the −X direction side of the inner gear 474, spaced at equal angles around the inner gear (a position of the axis) of the inner gear 474. The protrusions 331 that are formed in the second housing 330, depicted in FIGS. 75A and 75B, are inserted into these four recessed portions 80475.

Figure 76:
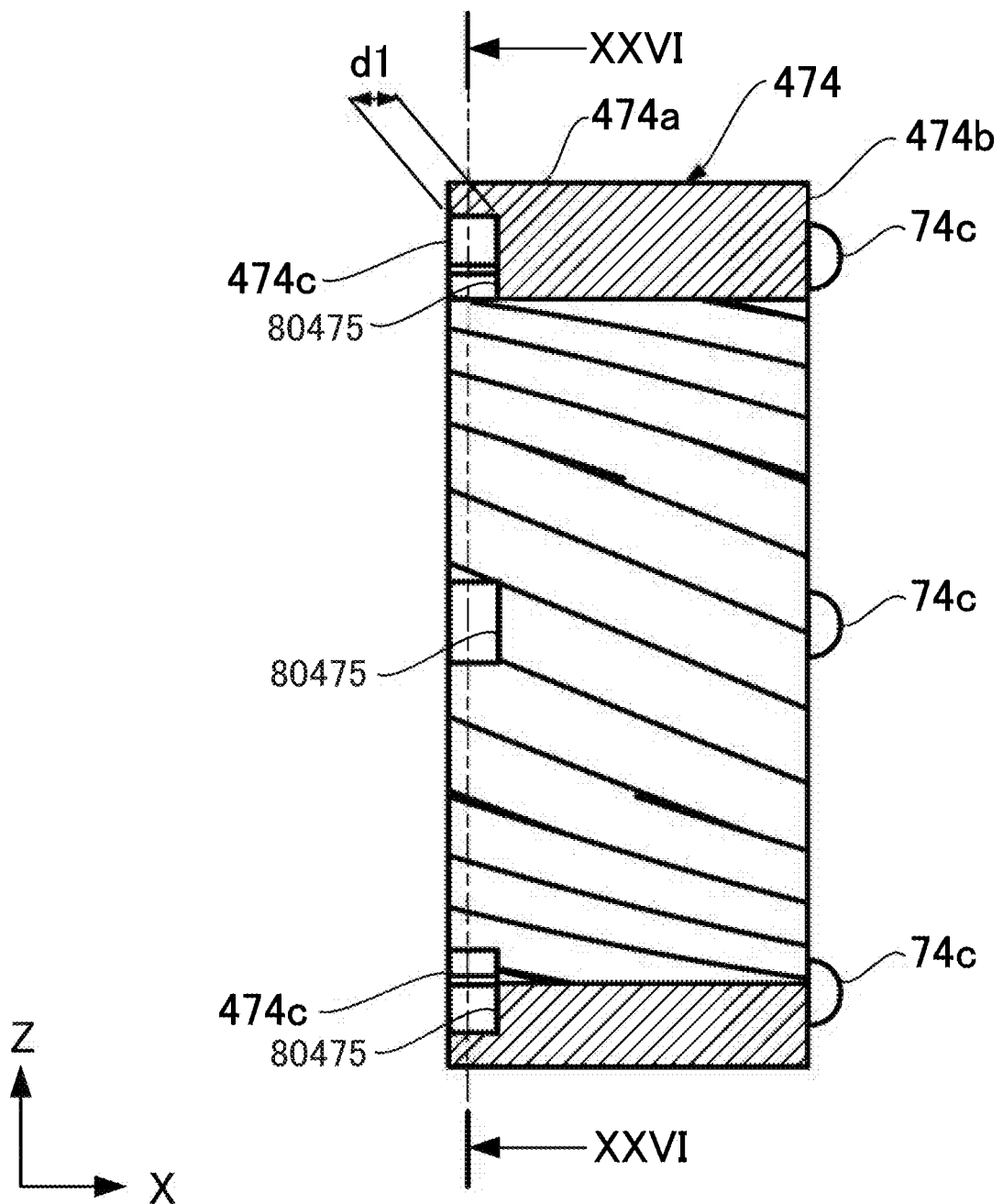
FIG. 76 is a cross-sectional diagram of an inner gear according to a third embodiment according to the present disclosure.

Note that the recessed portions 80475, as depicted in FIG. 76, are formed with a depth d1 from the end face 474c. This depth d1 of the recessed portions 80475 is shallower than the height h1 of the protrusions 331 formed in the second housing 330, depicted in FIG. 75B. Through this, the inner gear 474 that moves along the axial direction makes point contact with the second housing 230 and the first housing 40 through the protrusions 74c and the protrusions 331 (FIGS. 75A and 75B) that are formed on the second housing 330. The transmission of vibration from the inner gear 474 that moves in the axial direction to the second housing 230 and the first housing 40 can be reduced thereby.

Figure 77:
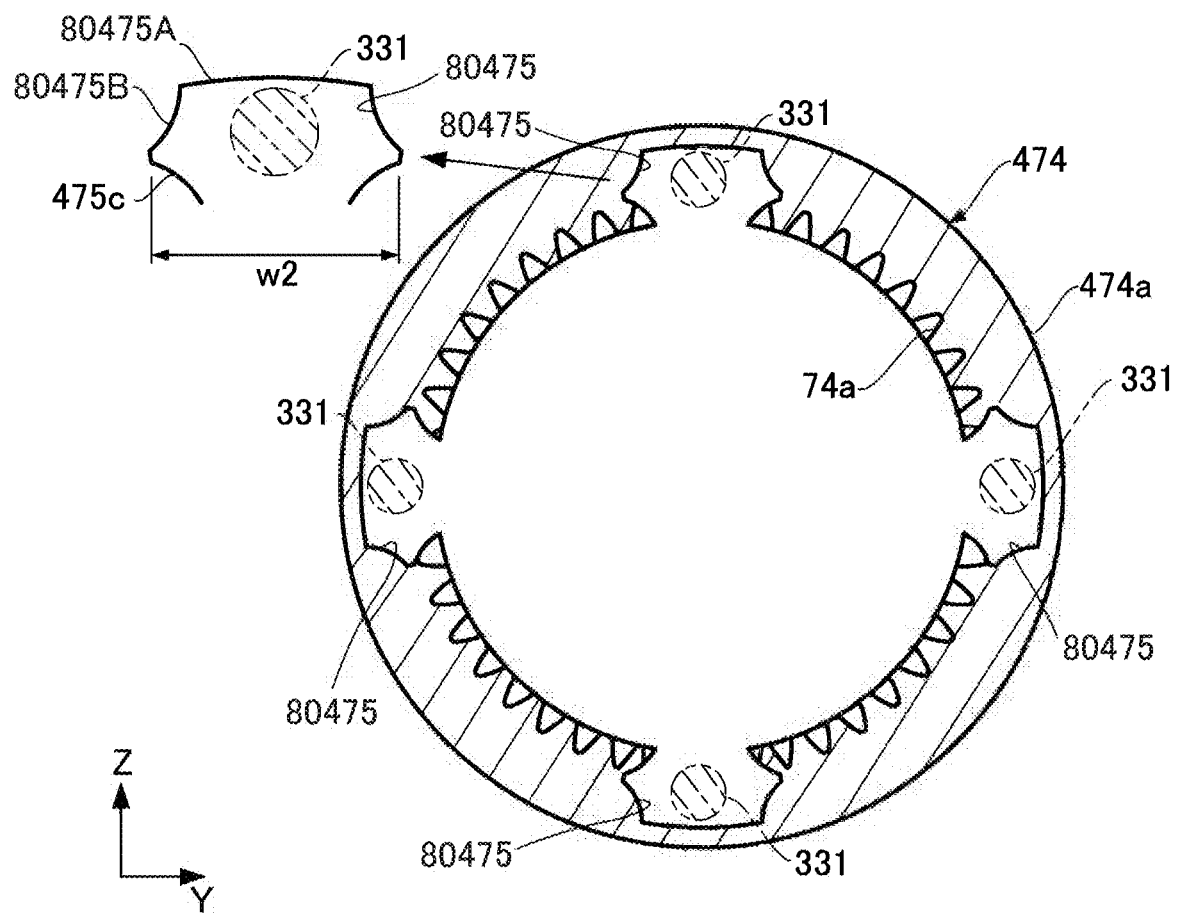
FIG. 77 is a cross-sectional diagram of an inner gear, sectioned on the section line XXVI-XXVI in FIG. 76.

As shown in the enlarged view in FIG. 77, the recessed portion 80475 is partitioned by an outer edge portion 80475a that is essentially straight, with large curvature, a convex arc portion 80475b that connects to the inside of the outer edge portion 80475a, and a convex arc portion 80475c that connects on the inside to the arc portion 80475b. The recessed portion 80475 has a width w2 along the circumferential direction of the inner gear 474. The width w2 is wider than the width w1 of the recessed portion 80375 that is depicted in FIG. 74A.

Figure 78:
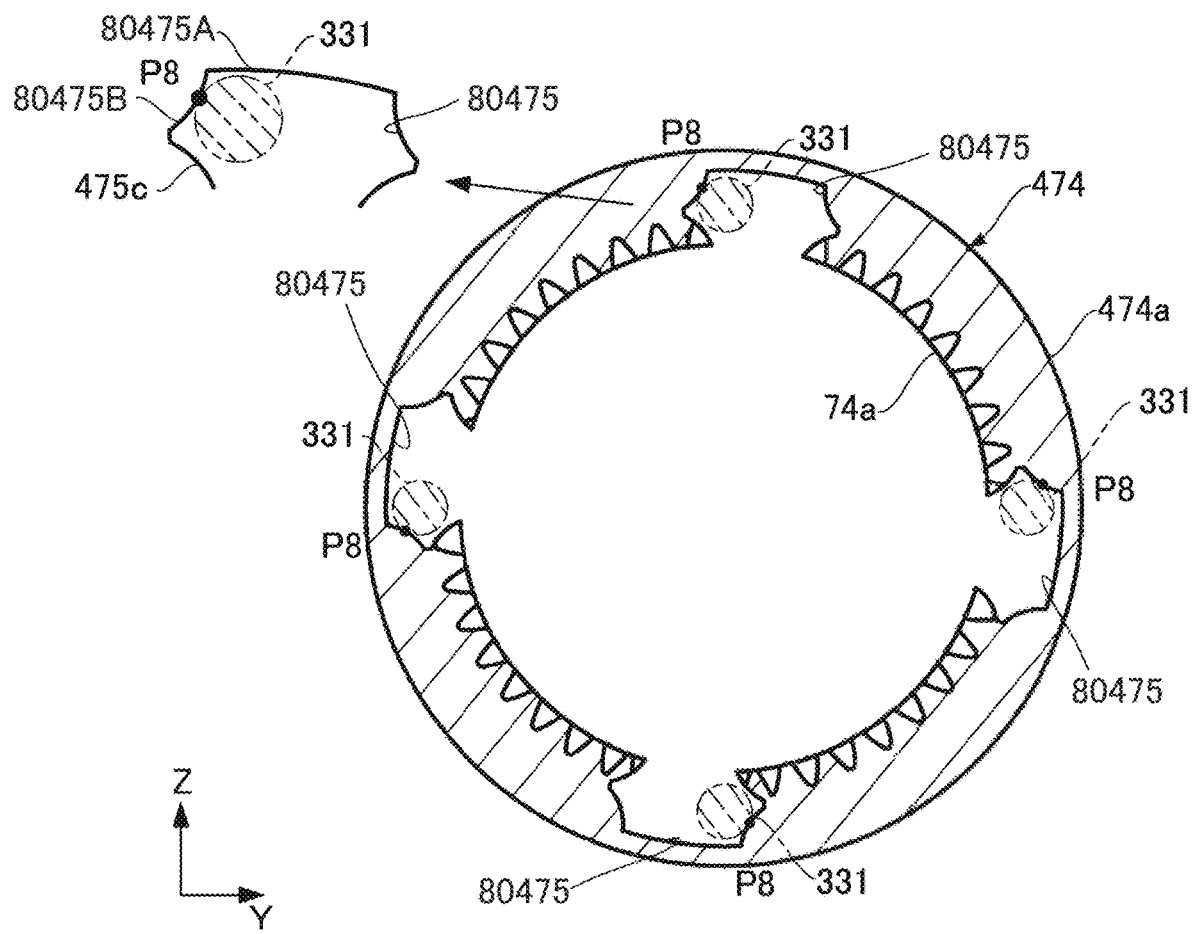
FIG. 78 is a diagram for explaining a state wherein the inner gear has rotated around the axis from the state depicted in FIG. 77.

Let us assume that the inner gear 474 has rotated clockwise, centered on the axis, from the states depicted in FIG. 77. Given this, each of the four recessed portions 80475 contact, at contact points P8, the protrusions 331 when there is rotation in the clockwise direction, as depicted in FIG. 78. The further rotation of the inner gear 474 is limited thereby. As shown in the enlarged view in FIG. 78, the contact point P8 is a point in an extremely limited range, through contact between the arc portion 80475b that is described as an arc and the protrusion 331 that is described as a circle. Note that the circular column that structures a portion of the protrusion 331 and arc portion 80475b are continuous in the axial direction (the vertical direction in the drawings). Because of this, the form of contact between a protrusion 331 and a recessed portion 80475 can be linear contact along the axial direction. Even if the inner gear 474 were to rotate in the counterclockwise direction around axis from the state depicted in FIG. 77, the form of contact between the protrusions 331 and the recessed portions 80475 would still be linear contact.

Note that the locations wherein the protrusions 331 contact the recessed portions 80475 were explained as arc portions 80475b. However, through varying the position of the inner gear 474 within the plane that is perpendicular to the axial direction, the protrusion 331 may also contact the arc portion 80475c. Even in this case, the arc portion 80475c is formed in the same arc shape as the arc portion 80475b, making it possible for the contact with the protrusion 331 to be linear contact.

Figure 79:
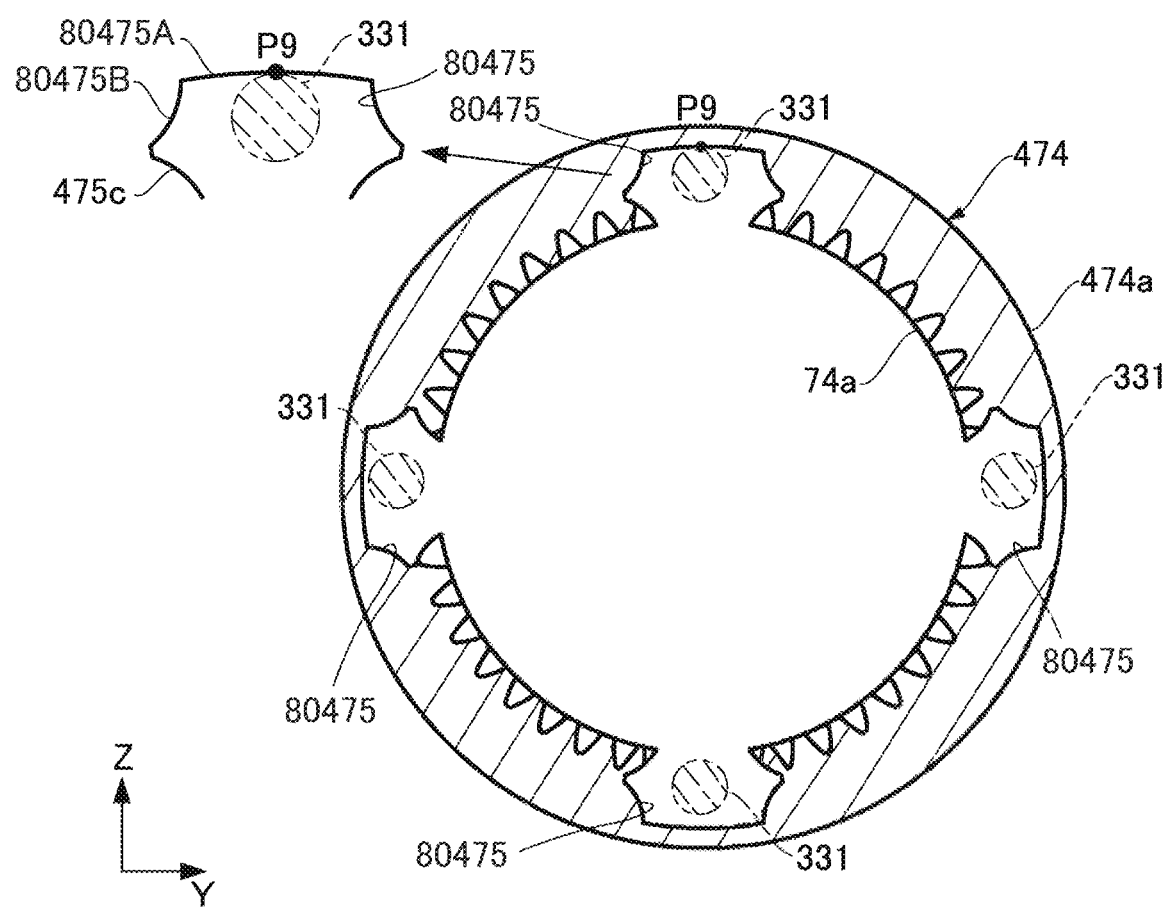
FIG. 79 is a diagram for explaining a state wherein the inner gear has rotated around the axis from the state depicted in FIG. 77.

Moreover, let us assume that the inner gear 474 moves, from the state depicted in FIG. 77, in a direction that is perpendicular to the axis, moving, for example, downward in the figure. Given this, the recessed portion 80475 that is positioned for the furthest upward in the figure, as depicted in FIG. 79, makes contact with the protrusion 331 at the contact point P9, preventing further movement of the inner gear 474. This contact point P9, as shown in the enlarged view in FIG. 79, is in contact in an extremely limited range, as it is contact with the outer edge portion 80475a, which is essentially a straight line, with a large curvature, and the protrusion 331 that is described as a circle. Note that the circular column that structures a portion of the protrusion 331 and outer edge portion 80475a are continuous in the axial direction (the vertical direction in the drawings). Because of this, the form of contact between a protrusion 331 and a recessed portion 80475 can be linear contact that is continuous along the axial direction. Note that even if the inner gear 474 were to move in the upward direction from the state depicted in FIG. 77, the form of contact between the protrusions 331 and the recessed portions 80475 would still be linear contact.

In this way can, regardless of whether the inner gear 474 has rotated around the axis or moved in a direction that is perpendicular to the axial direction, the form of contact between the protrusions 331 and the recessed portions 80475 can be limited to a narrow range that can be termed linear contact. This makes it possible to suppress the noise that is produced from the planetary gear device 20 (FIG. 4) in the same manner as in the embodiment described above.

In the embodiment set forth above, the contacting portion that is formed on the end face on one side (the second housing side) in the axial direction of the inner gear is caused to contact the contacting portion that is formed in the housing, to limit the movement of the inner gear. In the present embodiment, the contacting portion that is formed on the end portion on the other side, in the axial direction, of the inner gear is caused to contact a contacting portion that is formed in the first housing, to limit the movement of the inner gear.

Figure 80:
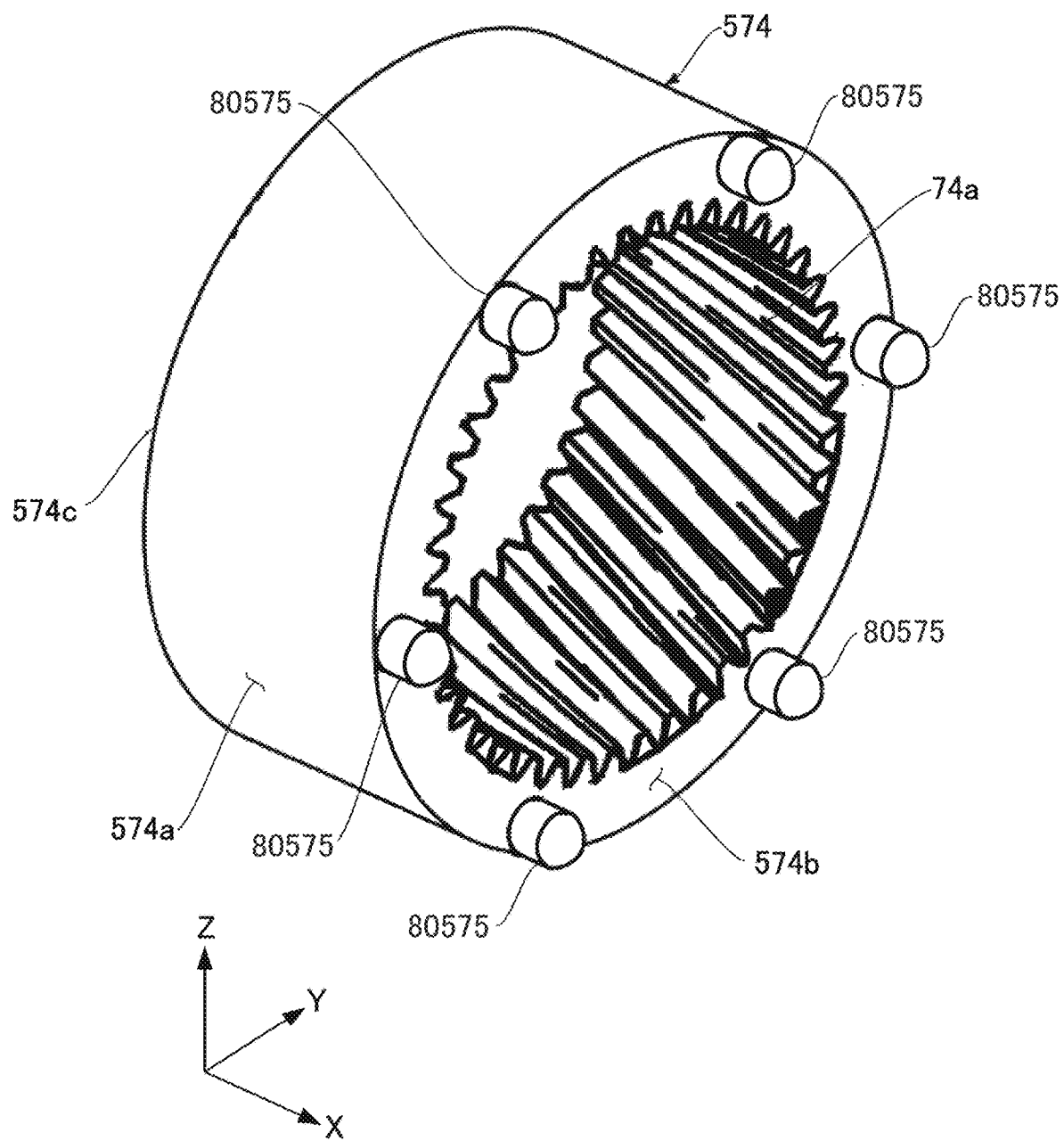
FIG. 80 is a perspective diagram of an inner gear according to a fourth embodiment according to the present disclosure.
Figure 83:
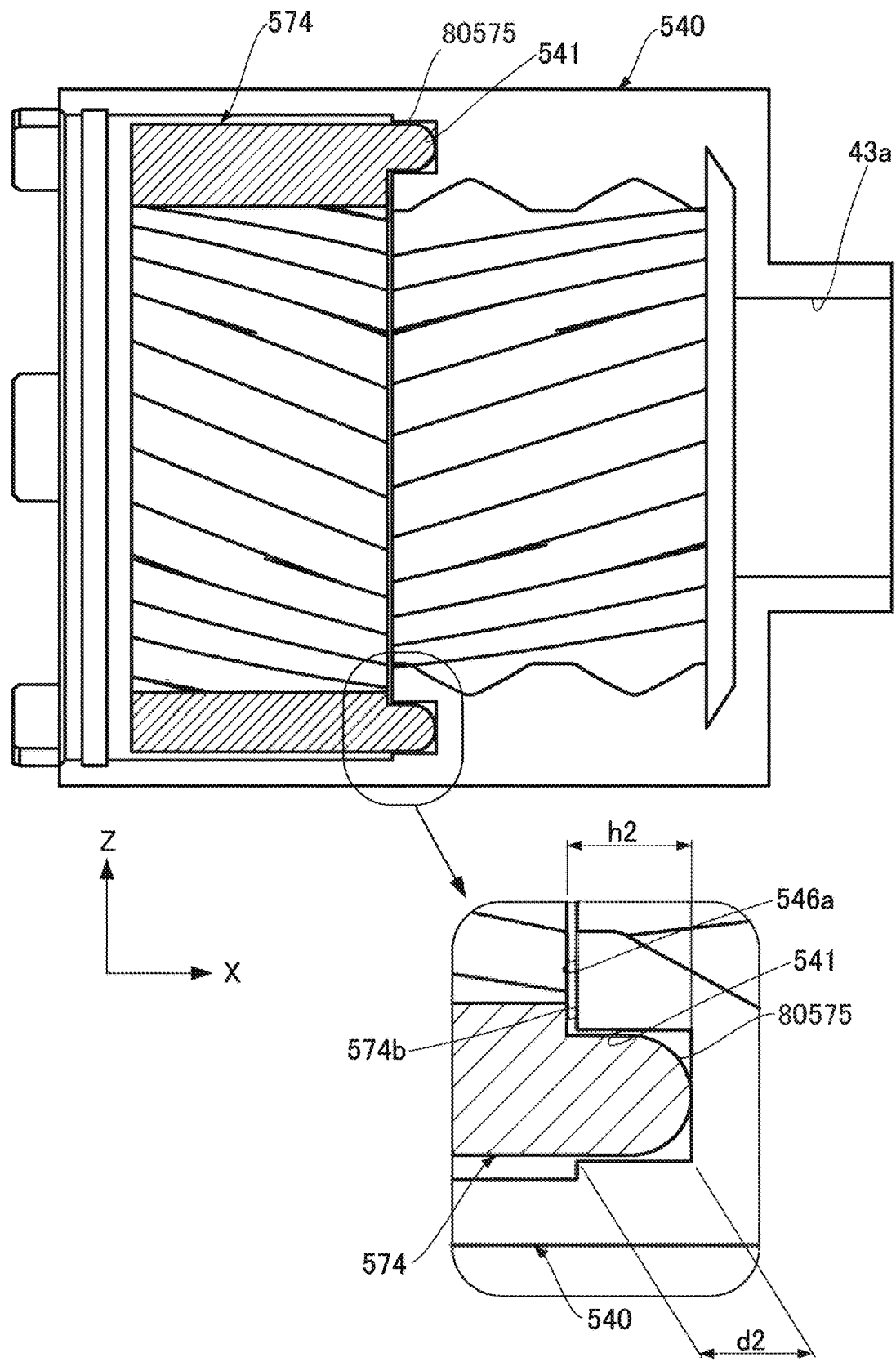
FIG. 83 is a diagram for explaining the state wherein the inner gear is housed in the first housing according to the fourth embodiment according to the present disclosure.

As depicted in FIG. 80, the outer peripheral surface 574a of the inner gear 574 is formed from a curved surface having no recessed or raised portions on the surface, the same as in the embodiment described above. Six protrusions 8080575 positions spaced at equal angles around the center of the inner gear 574, on the end face 574b on the +X direction side of the inner gear 574. As shown in the enlarged view in FIG. 83, the six protrusions 8080575 protrude from the end face 574b by a height of h2. The protrusions 8080575 have a shape wherein a hemispherical body is connected to the end face of a circular column, thereby securing a height h2 that is greater than the radius of the hemispherical body.

The second housing according to the present embodiment is the same as the second housing 30 in the reference examples, described above, depicted in FIG. 4.

Figure 81:
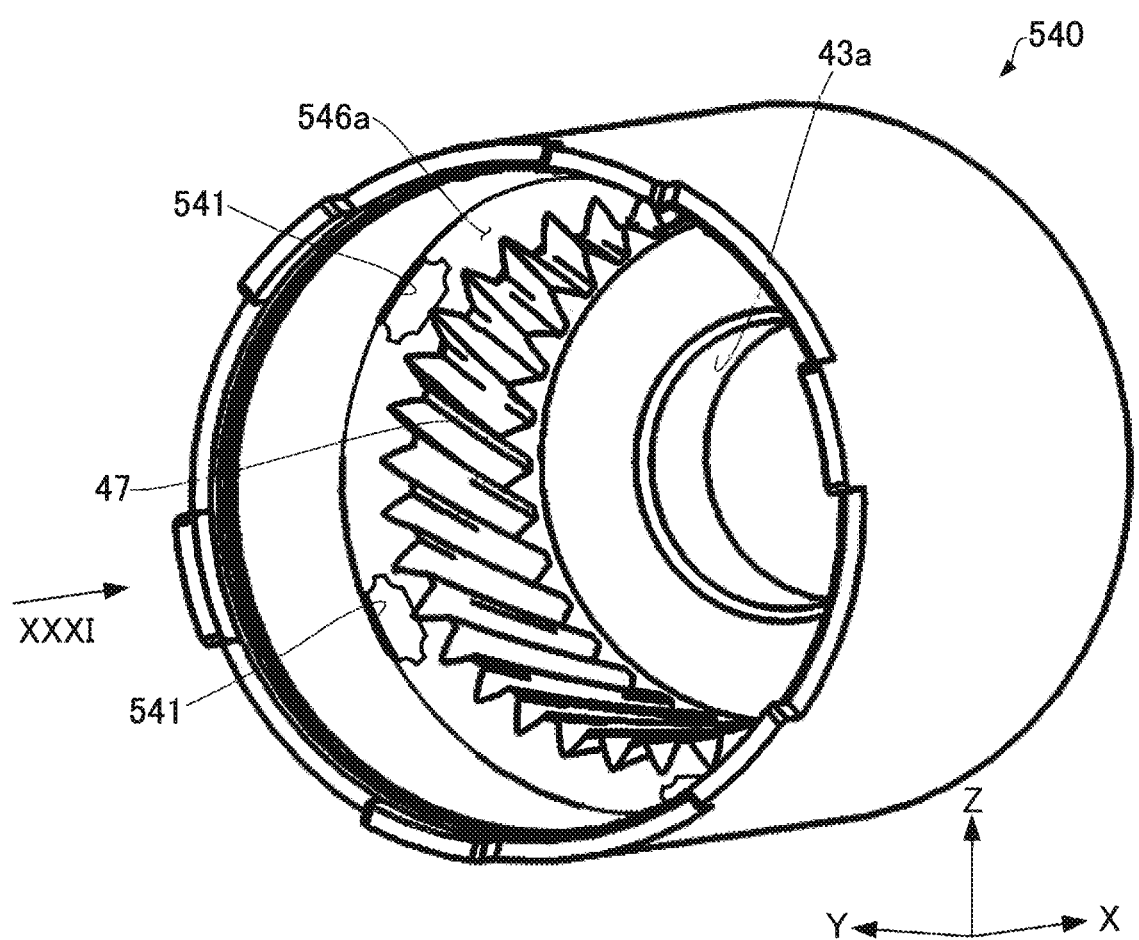
FIG. 81 is a perspective diagram of a first housing according to a fourth embodiment according to the present disclosure.

As depicted in FIGS. 81 and 31, the first housing 540 that is assembled together with the second housing does not have the stoppers 45 (FIG. 6) that are form on the first housing 40 in the reference examples. Through this, the inner gear 574 is contained within the first housing 540 in a state wherein a gap is provided from the inner peripheral surface of the first housing 540. A recessed portion 541 is formed in a stepped surface 546a that is formed in the interior of the first housing 540. The recessed portions 541 are arranged at intervals with equal angles in around the axis, and the protrusions 8080575 that are formed in the inner gear 574, depicted in FIG. 80, are inserted. The recessed portions 541, as depicted in the enlarged view in FIG. 83, have a depth of d2. The depth d2 of the recessed portions 541 is shallower than the height h2 of the protrusions 8080575 that are formed in the inner gear 574. As shown in the enlarged view in FIG. 83, when the tips of the protrusions 8080575 may contact with the bottom surfaces of the recessed portions 541, this can produce a state wherein the end face 574b of the inner gear 574 is away from the stepped surface 546a of the first housing 540. Through this, the inner gear that has moved in the +X axial direction will make point contact with the first housing 540 at the tip of the protrusions 8080575.

Figure 82:
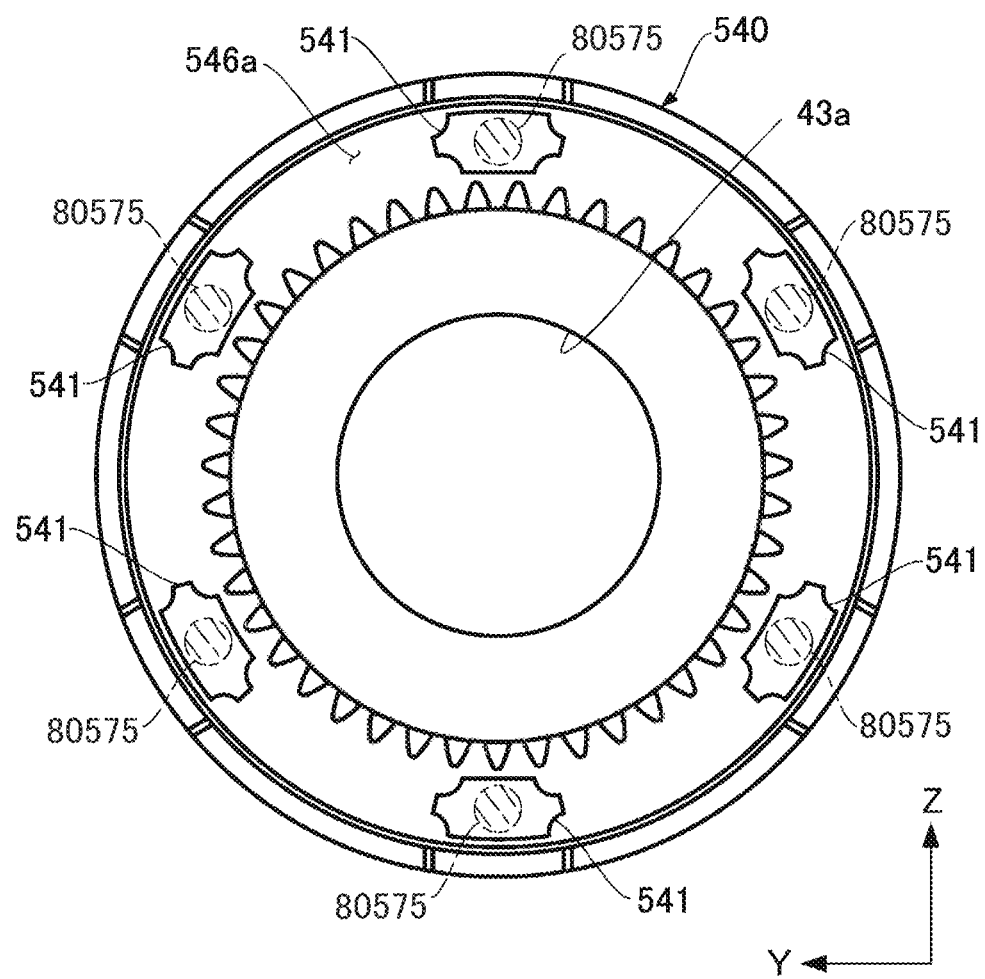
FIG. 82 is a plan view of the first housing, viewed from the arrow XXXI in FIG. 81.

As depicted in FIG. 82, the shapes of the recessed portions 541 that are formed on the stepped surface 546a are the same as the shapes of the recessed portions 80475 that are formed in the inner gear 474, depicted in FIG. 77. Because of this, regardless of whether the inner gear 574 depicted in FIG. 80 has rotated around the axis or moved in a direction that is perpendicular to the axial direction, the form of contact between the protrusions 8080575 and the recessed portions 541 can be limited to a narrow range that can be termed linear contact. This makes it possible to suppress the noise that is produced from the planetary gear device 20 (FIG. 4) in the same manner as in the embodiment described above.

A fifth embodiment disclosure will be explained next in reference to the drawings. In comparison with the first embodiment, the point of difference, as depicted in FIG. 84, is the point that openings are formed on both sides of the recessed portions 631 that are formed in the second housing 630, where the other structures are identical.

Figure 84:
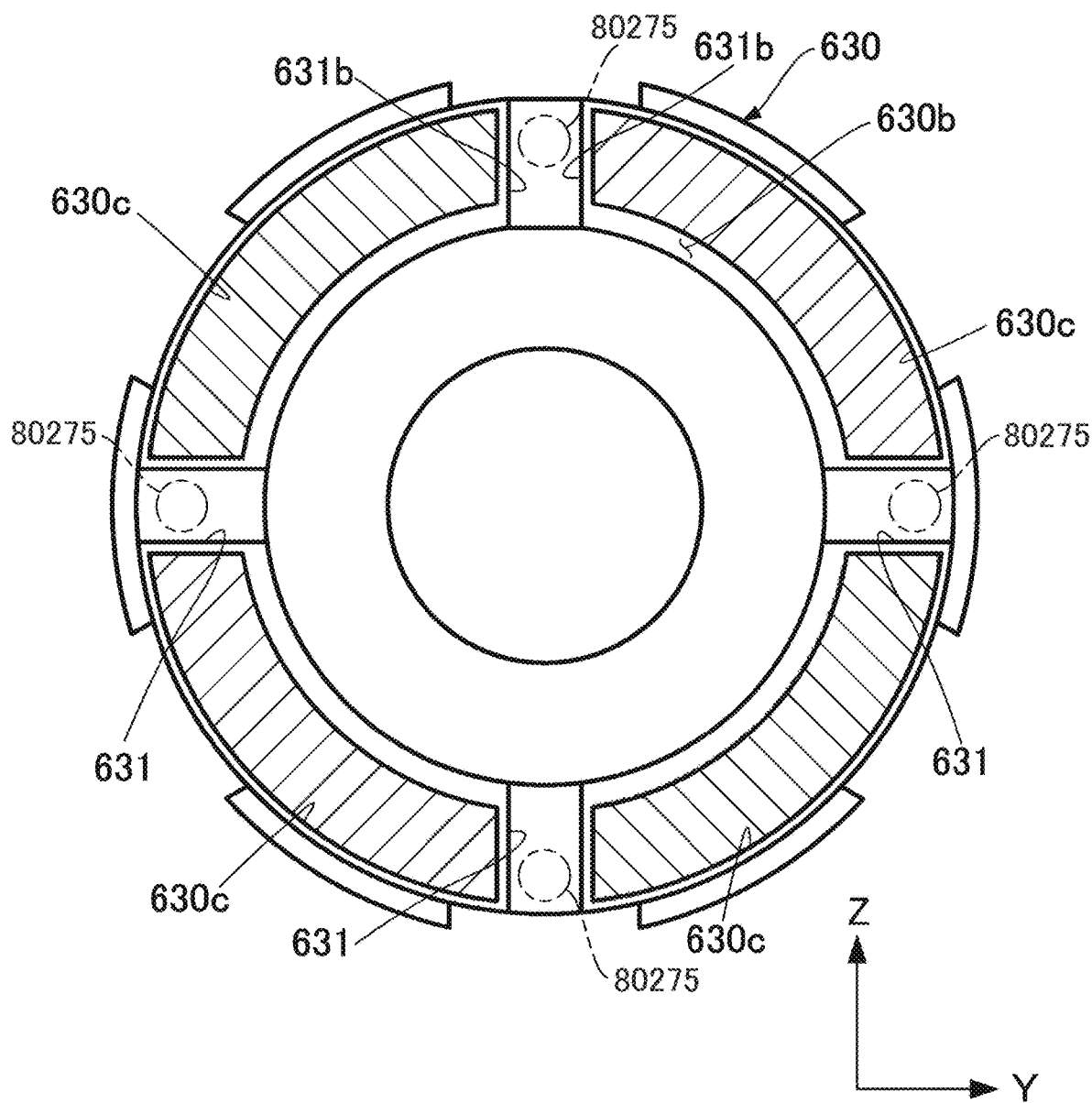
FIG. 84 is a diagram viewing, from the +X direction side, a second housing according to a fifth embodiment according to the present disclosure.

As depicted in FIG. 84, an opening 630c is formed between adjacent recessed portions 631, passing through the second housing 630. The opening 630c is shaped in a fan shape in that it is a quarter circle ring shaped opening (i.e., a quarter circle opening where part of the quarter circle extending radially outward form the center is filled in). Through forming openings 630c on both sides of the recessed portion 631 in this way, the rigidity of the side wall portion 631b of the recessed portion 631 that is contacted by the protrusion 80275 can be reduced, which can add elasticity to the side wall portion 631b. Through this, this can absorb the shock and noise when the protrusions 80275 contact the side wall portion 631b of the recessed portion 631, which can reduce the vibration and noise that is produced from the planetary gear device 20 (FIG. 4). The other actions and effects are the same as in the embodiments described above.

Figure 85A:
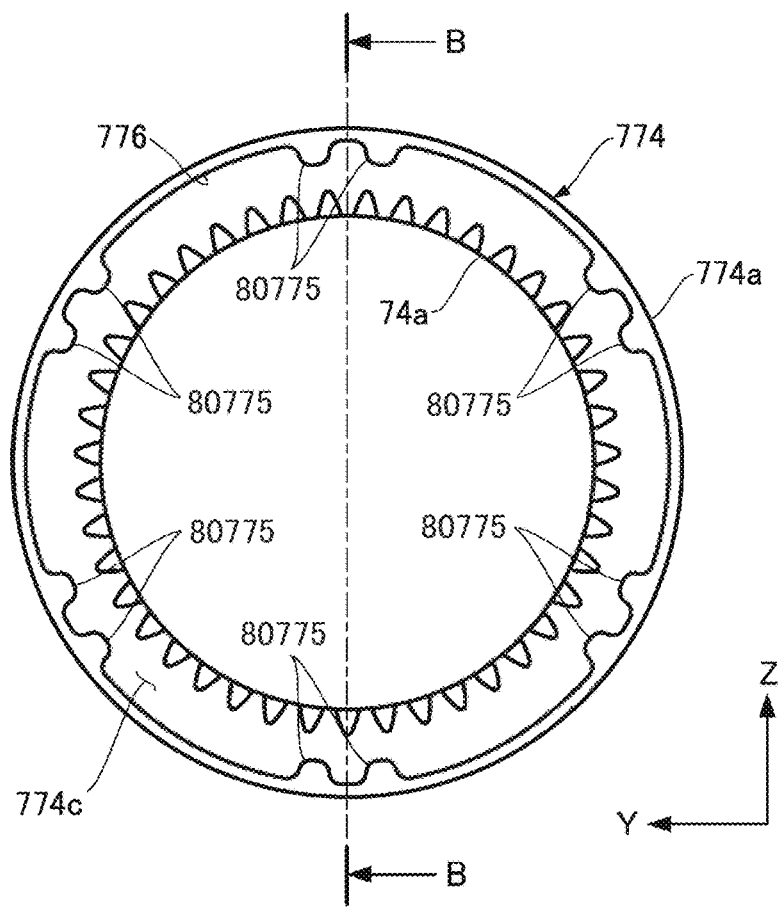
FIGS. 85A and 85B are diagrams depicting an inner gear according to a sixth embodiment according to the present disclosure, where
Figure 85B:
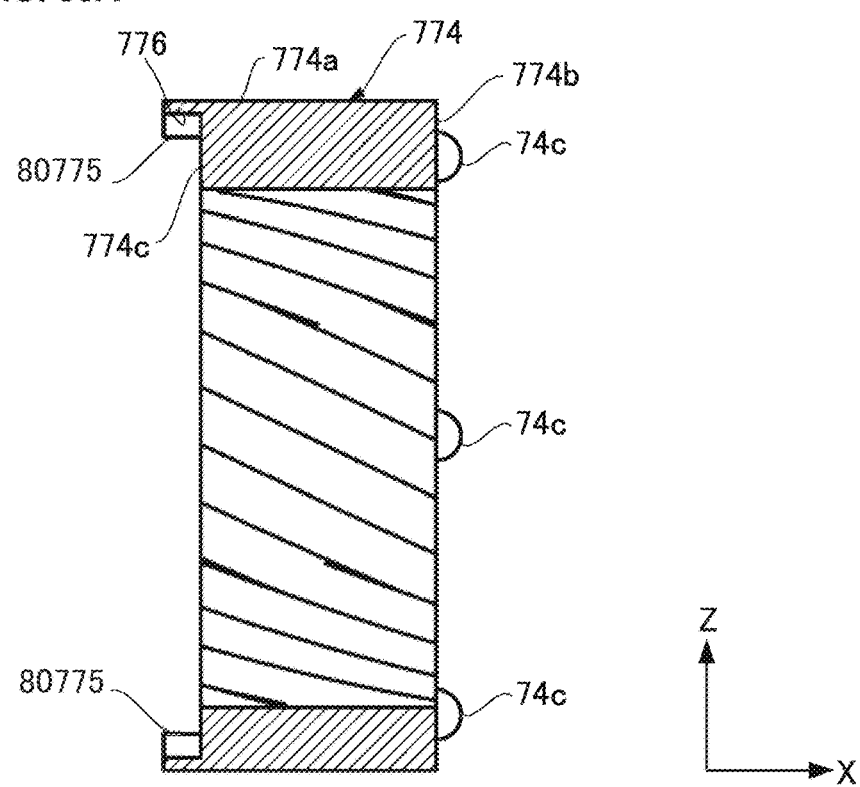
Figure 86A:
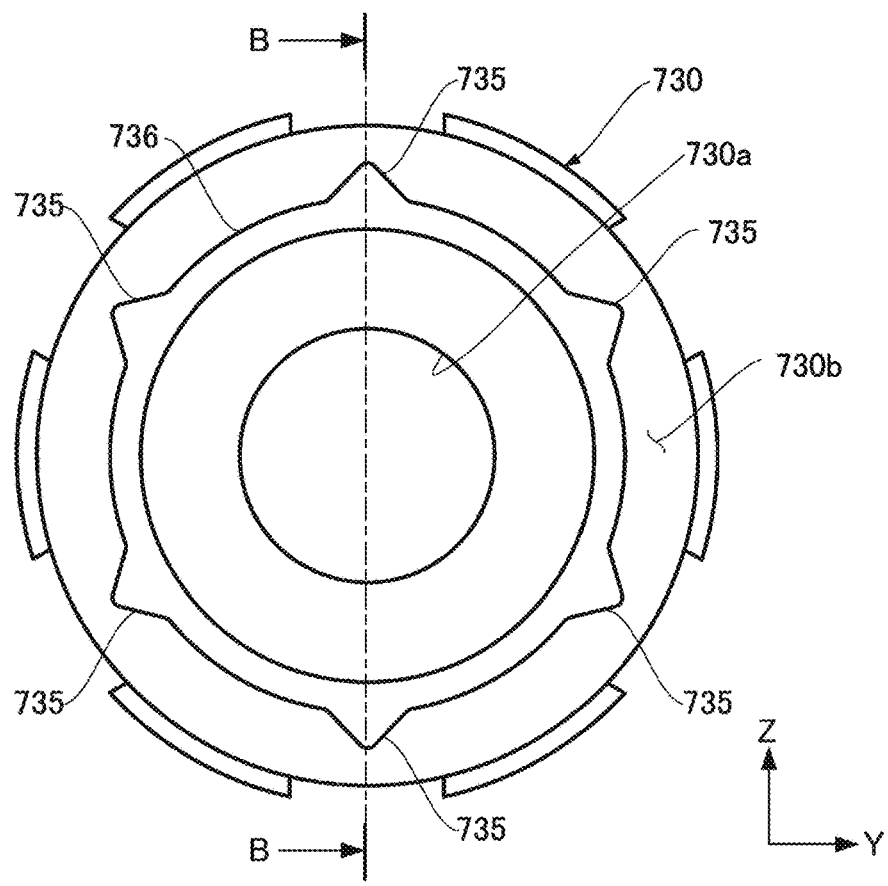
FIGS. 86A and 86B are diagrams depicting a second housing according to the sixth embodiment according to the present disclosure, where
Figure 86B:
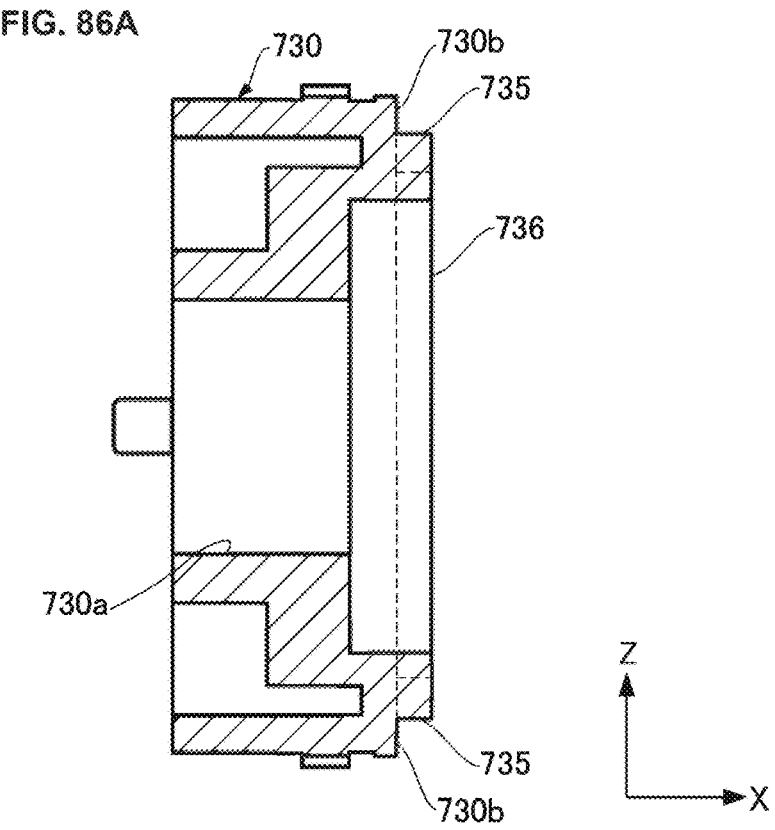
Figure 87:
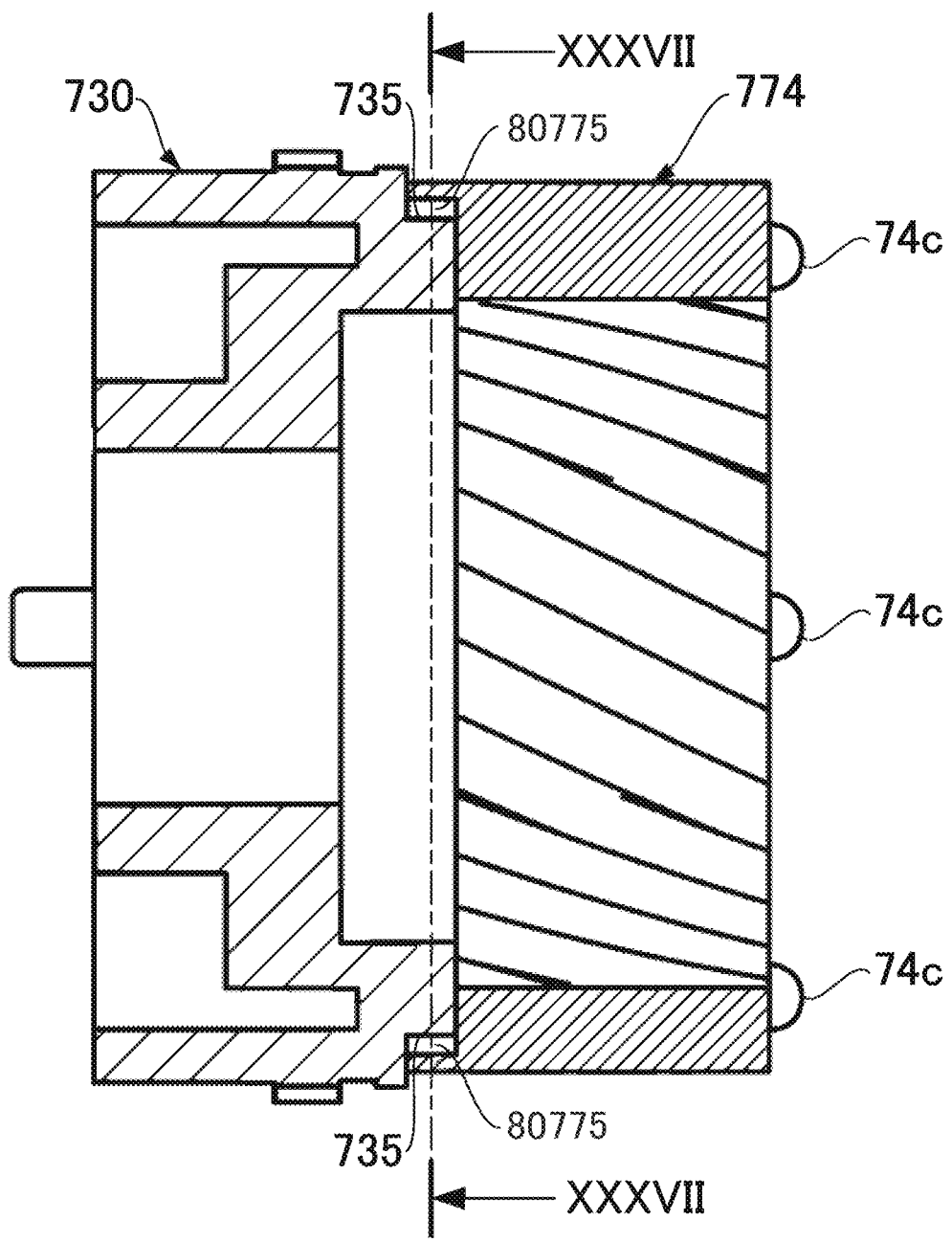
FIG. 87 is a cross-sectional diagram depicting the state wherein an inner gear is attached to a second housing according to the sixth embodiment according to the present disclosure.
Figure 88:
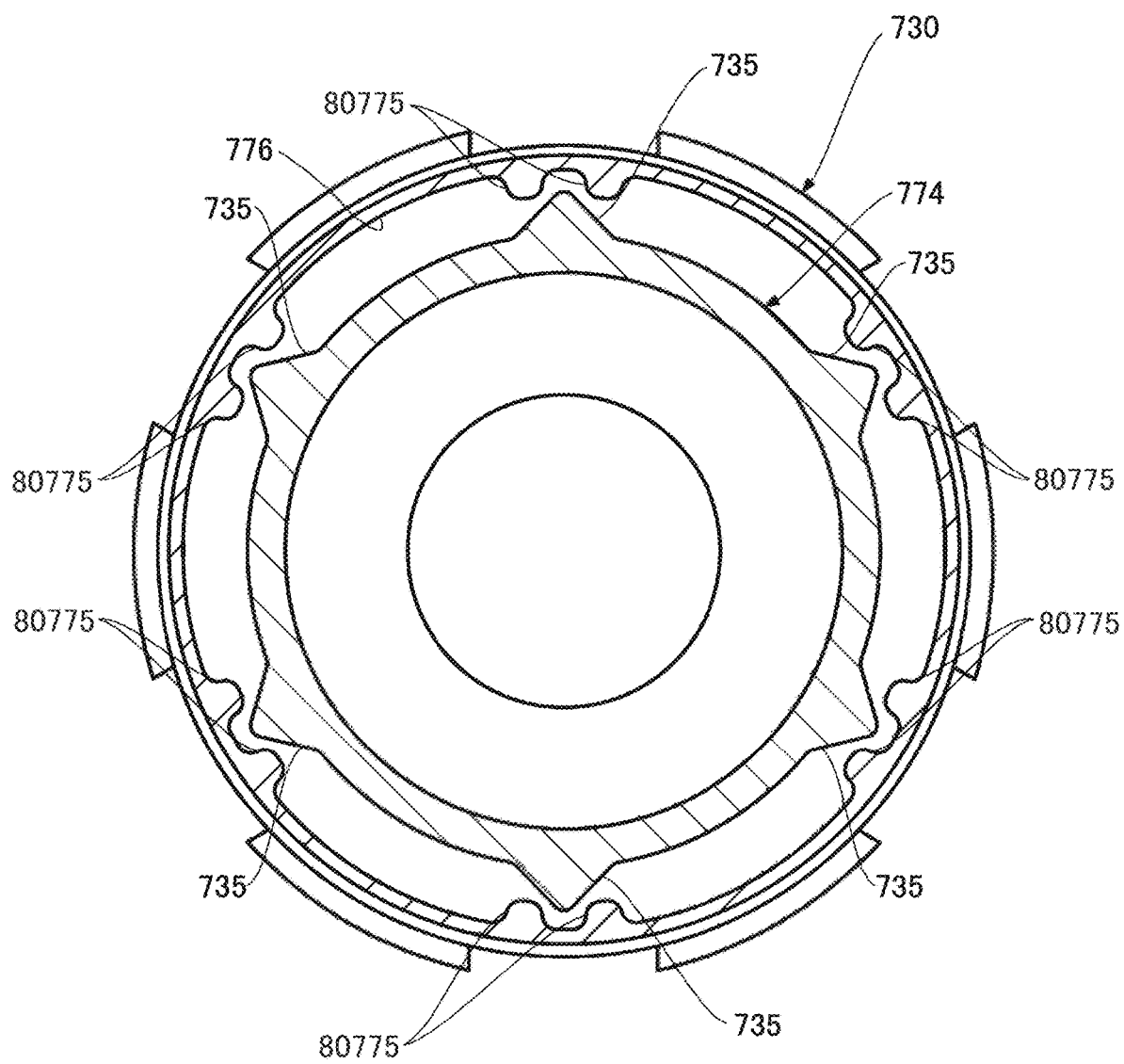
FIG. 88 is a cross-sectional diagram of an inner gear, sectioned on the section line XXXVII-XXXVII in FIG. 87.

A sixth embodiment disclosure will be explained next in reference to the drawings. As depicted in FIGS. 85A and 85B, the outer peripheral surface 774a of the inner gear 774 according to the present embodiment is structured from a curved surface wherein no recessed or raised portions are formed on the surface. As with the inner gear 274 depicted in FIG. 67, six hemispherical protrusions 74c are formed on an end face 774b on the +X direction side of the inner gear 774. On the other hand, a periphery-shaped portion 776 that stands in the shape of the periphery along the outer edge, and a pair of stoppers 80775 that protrude toward the inside from the periphery-shaped portion 776, are formed on the end face 774c on the −X direction side of the inner gear 374. The pair of stoppers 80775 are provided at six locations spaced with equal angles around the axis. The shape of each stopper 80775 is the same as the shape in the pairs of stoppers 45 in the reference examples explained referencing FIG. 10, having a chevron shape.

The second housing 730, as depicted in FIGS. 85A and 85B, is formed, in the center thereof, with an opening 730a through which the rotor shaft 12 (FIG. 4) of the motor 10 passes. A ring body 736 that is centered on the position of the axis is provided protruding in the +X direction on the end face 730b on the +X direction side of the second housing 730, and movement limiting raised portions 735 are formed protruding to the outside from the ring body 736. The movement limiting raised portions 735 are provided in six locations, spaced with equal angles around the axis. The movement limiting raised portions 735 are provided correspondingly to the pairs of stoppers 80775, as depicted in FIGS. 36 and 37, and the tip ends of each of the movement limiting raised portions 735 are inserted between the pairs of stoppers 80775. The shapes of the movement limiting raised portions 735 are the same as the shapes of the movement limiting raised portions 75 of the reference examples explained in reference to FIG. 11, forming triangles.

In this way, the relationship between the pairs of stoppers 80775 and the movement limiting raised portions 735 in the present embodiment is the same as the relationship between the stoppers 45 and the movement limiting raised portions 75 depicted in FIG. 9 and explained in the reference examples described above. Because of this, as with the explanation in reference to FIG. 12, even if the inner gear 774 were to rotate around the axis, the pairs of stoppers 80775 and the movement limiting raised portions 735 would make linear contact to limit the rotation of the inner gear 774. Additionally, as with the explanation in reference to FIG. 13, even if the inner gear 774 were to move in a direction that is perpendicular to the axis, the pairs of stoppers 80775 and the movement limiting raised portions 735 would make linear contact to limit the movement of the inner gear 774. This makes it possible to suppress the noise that is produced from the planetary gear device 20 (FIG. 4) in the same manner as in the embodiment described above.

MODIFIED EXAMPLES

The present disclosure is not limited to the embodiments described above, but rather a variety of modifications and applications are possible. While, for example, the protrusions 80275 formed on the inner gear 274 and the recessed portions 231 formed in the second housing 230 were each formed in four locations in the first embodiment, this number of locations can be set arbitrarily. For example, it may be set to 3 locations, or may be set to a number of locations that is greater than 4.

Moreover, while, for example, in the first embodiment protrusions 80275 that contact recessed portions 231 were formed on the end face 274c on the one side (the −X direction side) of the inner gear 274, but in addition to this, protrusions may be formed, for contacting recessed portions, on the end face 274b on the other side (the +X direction side) as well. In this case, recessed portions that contact these protrusions that are now formed can be formed on a stepped surface 46a of the first housing 40 as depicted in FIG. 71. In this way, the orientation of the inner gear can be stabilized through forming protrusions, for contacted the recessed portions, on both end faces of the inner gear. Conversely, protrusions, for forming recessed portions, may be formed on only one end face 274b on the other side (the +X direction side) of the inner gear 274.

Moreover, while in the second embodiment, recessed portions 80375 that contact protrusions 331 were formed on the end face 374c on the one side (the −X direction side) of the inner gear 374, instead recessed portions may be formed only on the end face 374b on the other side (the +X direction side), or recessed portions may be formed on both end faces 374b and 374c on the one side and the other side. When recessed portions are formed on the end face 374b on the other side, new protrusions may be formed on the stepped surface 46a of the first housing 40, depicted in FIG. 71.

Moreover, in the first embodiment, for example, it was explained that the protrusions 80275 that contact the recessed portions 231 have a shape wherein a hemispherical body is connected to the end face of a circular column; however, what shape to have for the protrusion 80275 is arbitrary. For example, it may be a shape wherein a circular cone is connected to the end face of a circular column, and may be structured from a hemispherical body alone insofar as it can secure the height that is required in the protrusion. If the protrusion is formed from a hemispherical body alone, there will be no circular column portion for making linear contact, enabling the contact with the recessed portion 231 to be a point contact. This can further reduce the contact area between the recessed portion 231 and the protrusion 80275.

Moreover, the shapes of the recessed portions 80475 and 541 in the third and fourth embodiment are not limited to the shapes described above, but rather may be set arbitrarily. For example, they may be rectangular shapes, or pentagonal shapes. Even with such shapes, the contacts with the protrusions that have the circular columns can be linear contacts.

Moreover, the openings 630c that are formed in the second housing 630 in the fifth embodiment are not limited to the shapes and sizes depicted in FIG. 84. For example, the openings may be formed divided into a plurality of openings, and a plurality of thin holes may be formed in the vicinity of the recessed portion 631 to add elasticity to the recessed portions 631. Moreover, these openings may be formed between adjacent protrusions 331, depicted in FIGS. 75A and 75B, and may be formed between adjacent recessed portions 80475, depicted in FIG. 78.

Moreover, while in the sixth embodiment the movement limiting raised portions 735 were formed on the second housing 730 and the pairs of stoppers 80775 were formed on the inner gear 774, instead the movement limiting raised portions 735 and of the pairs of stoppers 80775 may be switched, with the pairs of stoppers 80775 formed on the second housing 730 and the movement limiting raised portions 735 formed on the inner gear 774. Moreover, while the pairs of stoppers 80775 were formed on the end face on the −X direction side of the inner gear 774, instead the pairs of stoppers may be formed on the end face on the +X direction side, and the movement limiting raised portions 735 may be formed on the +X direction side. In this case, the movement limiting raised portions or pairs of stoppers may be formed on the stepped surface 46a of the first housing 40, as depicted in FIG. 71.

Moreover, as a modified example of the movement limiting raised portions 735 and the pairs of stoppers 80775 in the sixth embodiment, the movement limiting raised portions 75 and pairs of stoppers 45 of the modified examples in the reference examples given above may be applied as appropriate.

While in the embodiments described above examples were given wherein the movement limiting raised portions 75 (FIG. 7) and pairs of stoppers 45 (FIG. 6), explained in the reference examples, shown in FIG. 67, for example are not formed, the present disclosure is not limited thereto, but rather the movement limiting raised portions and pairs of stoppers of the reference examples may be present. That is, in addition to the first contacting portions and the second contacting portions being formed in the axial direction, as in the embodiments described above, first raised portions and second raised portions may be formed in a direction that is perpendicular to the axial direction.

Moreover, in the reference examples described above, pairs of stoppers 45 are provided in the first housing 40, and movement limiting raised portions 75 that are inserted between the pairs of stoppers 45 are provided on the inner gear 74. However, the present disclosure is not limited thereto, but rather the locations wherein the pairs of stoppers 45 and the movement limiting raised portions 75 are provided may be switched, so that the movement limiting raised portions 75 are provided on the inner peripheral surface of the first housing 40 and the pairs of stoppers 45 are provided on the outer peripheral surface of the inner gear 74.

While the cross sections of the pairs of stoppers 45 were chevron shapes and the cross sections of the movement limiting raised portions 75 were triangular, instead the cross-sectional shapes may be switched, with the cross sections of the pairs of stoppers being triangular and the cross sections of the movement limited raised portions that are inserted between the stoppers being chevron shapes.

Moreover, there is no particular limitation on the number of locations wherein the pairs of stoppers 45 and the corresponding movement limiting raised portions 75 are disposed, where it may be a larger number of locations than the six locations given in the embodiments described above, or a smaller number of locations.

Figure 89:
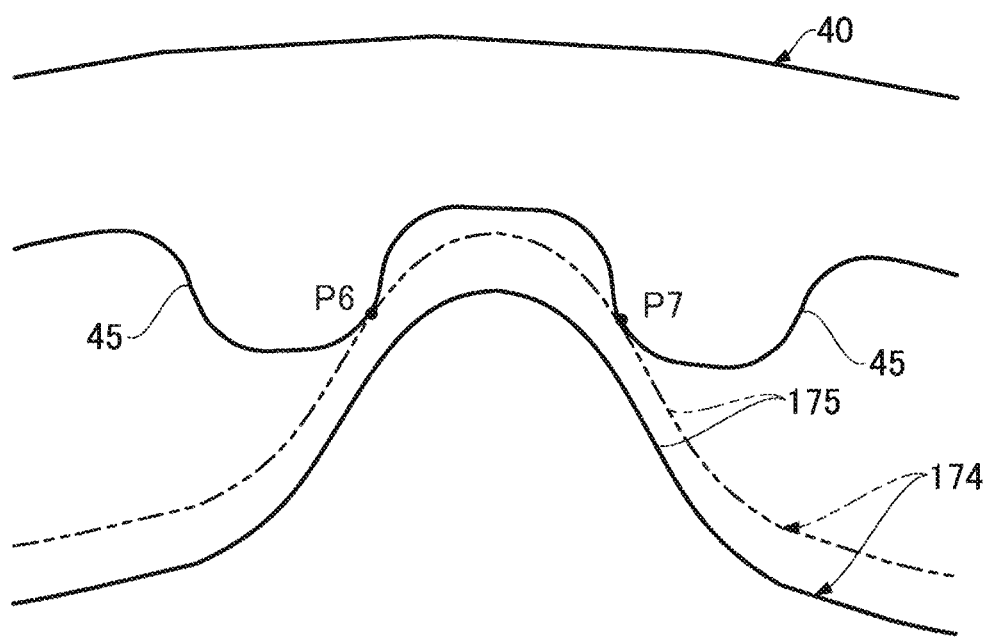
FIG. 89 is an explanatory diagram focusing on the location of contact between the inner gear and the first housing according to another embodiment according to the present disclosure

Moreover, while a convex curved surface of the pair of stoppers 45 was caused to contact a plane of the movement limiting raised portion 75, to cause a linear contact therebetween, linear contacts can be achieved through causing contacts of other shapes as well. Another embodiment that achieves linear contact will be explained next in reference to FIG. 89. The point of difference from the structure depicted in the enlarged view can FIG. 9 is that the cross-section of the movement limiting raised portion (first raised portion) 175 is not that of a triangle, but instead is a rounded chevron shape. Note that the structure of the first housing 40 is the same as the structure depicted in the enlarged view in FIG. 9. In FIG. 89, the inner gear 174, when the actuator is not operating, is indicated by the solid line. Moreover, the inner gear 174, depicted by the double dotted line, is in the state wherein it has moved upward, through the operation of the actuator, to contact the first housing 40. As depicted in FIG. 89, the contact between the pair of stoppers 45 and the movement limiting raised portions 175 is contact between convex curved surfaces, so will be linear contact at the contact points P10 and P11 between the pairs of stoppers 45 and the movement limiting raised portions 175. In this way, in the present embodiment a linear contact is achieved through causing the convex curved surfaces, which are bulging, to contact each other.

Moreover, there is no limitation thereto, where the linear contact may be achieved through the first housing 40 having locally concave parts with large curvature, the inner gear 74 having convex curved surfaces with less curvature, where the concave curved surfaces with high curvature contact the convex curved surfaces that are bulging. The actual structure for achieving linear contact is arbitrary.

Note that in another example for achieving the linear contact described above, the configuration of the inner gear in the location that makes linear contact may be swapped with the configuration of the first housing.

Moreover, while the actuator 1 was provided with a two-stage planetary gear mechanism of a first planetary gear mechanism 70 and a second planetary gear mechanism 80, as the reduction mechanism for reducing the rotation of the motor 10, the number of stages can be set arbitrarily. For example, the reduction ratio may be increased through providing three or more stages of planetary gear mechanisms, or the structure may include only a single-stage planetary gear mechanism.

Moreover, in the embodiments set forth above, a configuration was used wherein the structure wherein the housing and the inner gear were separate was applied only to the first planetary gear mechanism 70, which is the first-stage mechanism that rotates at a high speed, and a housing that was formed with inner teeth on the inner peripheral surface thereof was used in the second planetary gear mechanism 80, which is the second-stage mechanism that rotates at a low speed. However, a structure wherein the housing and the inner gear are separated may be used also in the second planetary gear mechanism 80 that is the second-stage mechanism, to achieve a reduction in vibration and noise.

Moreover, while in the embodiments set forth above the explanation was for a case wherein a reduction gear was used for reducing the rotation of the motor 10 and outputting it from an output gear 86a, there is no limitation to this application. For example, the part that is provided with the output shaft 86, depicted in FIG. 8, may be used as the input side and connected to the rotary shaft of a motor, and the part that is provided with the sun gear 71, depicted in FIG. 7, may be used as the output side, and connected to the output shaft. This would increase and output the rotation of the motor, to be used as an increasing the mechanism. In this case as well, preferably the structure wherein the inner gear and the housing are separated is employed due to the higher-speed operation of the first planetary gear mechanism 70 that is shown in FIG. 7. Moreover, because the rotation of the motor is transmitted directly to the second planetary gear mechanism 80 that is depicted in FIG. 8, preferably the structure wherein the inner gear and the housing are separated is employed, as necessary. Moreover, the present disclosure may also be applied to industrial equipment such as robots and machine tools, and to playground equipment such as so-called "teacups."

When using the present disclosure in various applications, the separate structural units for the inner gear and the housing are applied to the planetary gear mechanism that operates at the highest speed, when planetary gear mechanisms are provided in three or more stages. This can reduce effectively the vibration and noise that is produced. Moreover, because there is little vibration and noise produced by the planetary gear mechanism that operates at the lowest speed, a structure is applied that is equipped with a housing where inner teeth are formed on the inner peripheral surface. This eliminates the need for the separate structures, more than necessary, for the inner gear and the housing, making it possible to avoid increases in the number of components and increases in the assembly operation and assembly costs, thus making it possible to suppress production costs.

Moreover, while in the embodiments set forth above the explanation was for each of the gears used for transmitting the power from the motor 10 to the output shaft 86 being helical gears, other gears may be used instead. Spur gears, for example, may be used. While this tends to produce more play at the locations wherein the teeth mesh, when compared to the case of using helical gears, the structure of the present disclosure can be used even in such a case to reduce (suppress) vibration and noise of the planetary gear device.

Moreover, while the explanations were for cases wherein they separate structural units for the inner gear and the housing were used in a portion of the planetary gear device, the application is not limited thereto, but may be used as a portion of another gear mechanism.

In the embodiment set forth above the planetary gear mechanism of the planetary gear device was achieved through three planetary gears; however, the present disclosure is not limited thereto. In the present disclosure, the planetary gear device may be achieved through the use of a planetary gear mechanism that uses, for example, a single planetary gear or a plurality, other than three, of planetary gears.

Moreover, the planetary gear device to which the present disclosure is applied may be applied to a variety of machines and apparatuses that use reducing mechanisms or increasing mechanisms, such as automobiles, robots, industrial equipment, playground equipment, or the like.

Moreover, instead of a structure that limits the movement within the housing through producing linear contact, along the axial direction, between the movement limiting raised portions (first raised portions) and pairs of stoppers (second raised portions) in the embodiments described above, the structure may be one wherein the movement is limited within the housing through point contact between the movement limiting raised portions (first raised portions) and the pairs of stoppers (second raised portions). More specifically, the pairs of stoppers in FIG. 5 (second raised portions) 45 may be of a shape that is discontinuous in the axial direction, and the movement limiting raised portions (first raised portions) 75 in FIG. 7 may be of a shape that is discontinuous in the axial direction.

What is claimed is:

1. An apparatus for suppressing noise produced in a planetary gear device, comprising:
   an inner gear with a first contacting portion formed on an end face of the inner gear on a first side of the inner gear in an axial direction; and
   a housing for containing the inner gear as a floating inner gear with a second contacting portion for limiting movement of the inner gear through contact with the first contacting portion,
   wherein the inner gear is contained in the housing such that a gap is formed between an inner peripheral surface of the housing and the inner gear,
   wherein one of the first contacting portion and the second contacting portion is a protrusion that is formed along the axial direction and another of the first contacting portion and the second contacting portion is a recessed portion into which the protrusion is configured to be inserted,
   wherein a tip end portion of the protrusion is formed in a hemispherical shape, and
   wherein movement of the inner gear in the axial direction is limited through contact of the tip end portion with a bottom face of the recessed portion.

2. A planetary gear device, comprising:
   the apparatus for suppressing noise produced in the planetary gear device of claim 1;
   one or more planetary gears that mesh with the inner gear;
   a sun gear that meshes with the one or more planetary gears, positioned at the center of the one or more planetary gears; and
   a carrier that supports the one or more planetary gears rotatably.

3. An actuator comprising:
   the planetary gear device as set forth in claim 2; and
   a motor, connected to the planetary gear device, for driving the planetary gear device.

* * * * *